United States Patent
Huang et al.

(10) Patent No.: US 12,503,704 B2
(45) Date of Patent: Dec. 23, 2025

(54) MODIFIED CELL

(71) Applicant: Oxford University Innovation Limited, Oxford (GB)

(72) Inventors: Wei Huang, Oxford (GB); Catherine Fan, Oxford (GB); Yutong Yin, Oxford (GB); Boon Chuan Lim, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 781 days.

(21) Appl. No.: 17/560,330

(22) Filed: Dec. 23, 2021

(65) Prior Publication Data

US 2022/0259605 A1    Aug. 18, 2022

Related U.S. Application Data

(63) Continuation-in-part of application No. PCT/GB2020/052690, filed on Oct. 23, 2020.

(30) Foreign Application Priority Data

Oct. 25, 2019    (GB) .................................... 1915526

(51) Int. Cl.
| | |
|---|---|
| C12N 15/63 | (2006.01) |
| A61K 35/74 | (2015.01) |
| C12N 9/02 | (2006.01) |
| C12N 9/12 | (2006.01) |
| C12N 9/22 | (2006.01) |
| C12N 15/70 | (2006.01) |

(52) U.S. Cl.
CPC ............ *C12N 15/635* (2013.01); *A61K 35/74* (2013.01); *C12N 9/0008* (2013.01); *C12N 9/1217* (2013.01); *C12N 9/22* (2013.01); *C12N 15/70* (2013.01)

(58) Field of Classification Search
None
See application file for complete search history.

(56) References Cited

U.S. PATENT DOCUMENTS

2006/0183129 A1    8/2006    Pellenz et al.

FOREIGN PATENT DOCUMENTS

| CN | 102131927 A | 7/2011 |
|---|---|---|
| CN | 102762726 A | 10/2012 |
| WO | 2009/158364 A1 | 12/2009 |

OTHER PUBLICATIONS

International Search Report and Written Opinion for WO 2021/079145 (PCT/GB2020/052690), dated Mar. 22, 2021, pp. 1-22.
UK Search Report for GB 1915526.6 2, dated Jul. 7, 2020, pp. 1-2.
Chinese Office Action for Application No. 2020800900899, dated Jul. 21, 2023, pp. 1-30 (Including Translation).
European Exam Report for Application No. 20 796 914.8, dated Mar. 23, 2023, pp. 1-7.
Shingo Tsuji et al: "An Efficient Thermoinducible Bacterial Suicide System; Elimination of Viable Parental Bacteria from Minicells", Apr. 1, 2010 (Apr. 1, 2010).
Catherine Fan et al: "Defensive Function of Transposable Elements in Bacteria", ACS Synthetic Biology, vol. 8, No. 9, Aug. 2, 2019 (Aug. 2, 2019), pp. 2141-2151.
Cordelia P. N. Rampley et al: "Development of SimCells as a novel chassis for functional biosensors", Scientific Reports, vol. 7, No. 1, Aug. 3, 2017 (Aug. 3, 2017).
Catherine Fan et al: "Chromosome-free bacterial cells are safe and programmable platforms for synthetic biology", Proceedings of the National Academy of Sciences, vol. 117, No. 12, Mar. 6, 2020 (Mar. 6, 2020), pp. 6752-6761.

*Primary Examiner* — Brian Gangle
(74) *Attorney, Agent, or Firm* — Thomas|Horstemeyer, LLP

(57) ABSTRACT

The invention relates to a method of producing a chromosome-free bacterial cell having surface-displayed nanobodies, comprising: i) degrading native chromosomal DNA in a bacterial cell by expressing an endonuclease in the bacterial cell that is capable of recognition and double-stranded cutting of the native chromosomal DNA, wherein the expression of the endonuclease is under control of an inducible or repressible promoter; and ii) transforming the bacterial cell with recombinant nucleic acid encoding enzymes of one or more biochemical energy pathways, or parts thereof, which provide the chromosome-free bacterial cell with energy. The invention further relates to associated compositions, chromosome-free bacterial cells and treatments.

25 Claims, 65 Drawing Sheets
Specification includes a Sequence Listing.

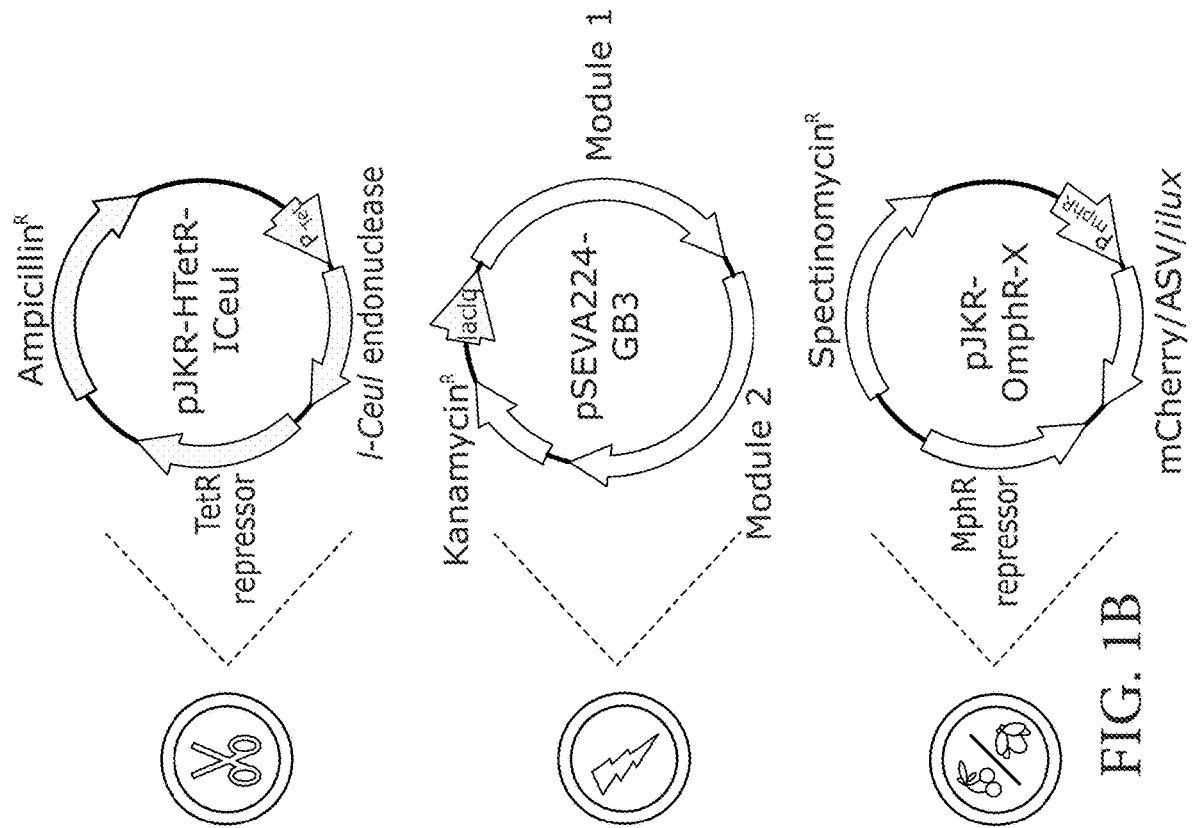
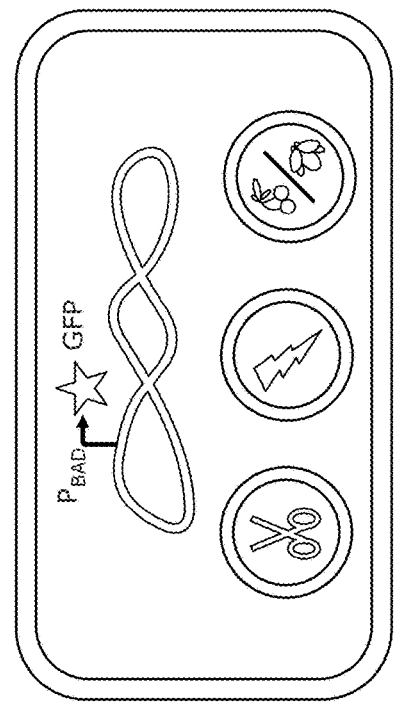
FIG. 1A
FIG. 1B

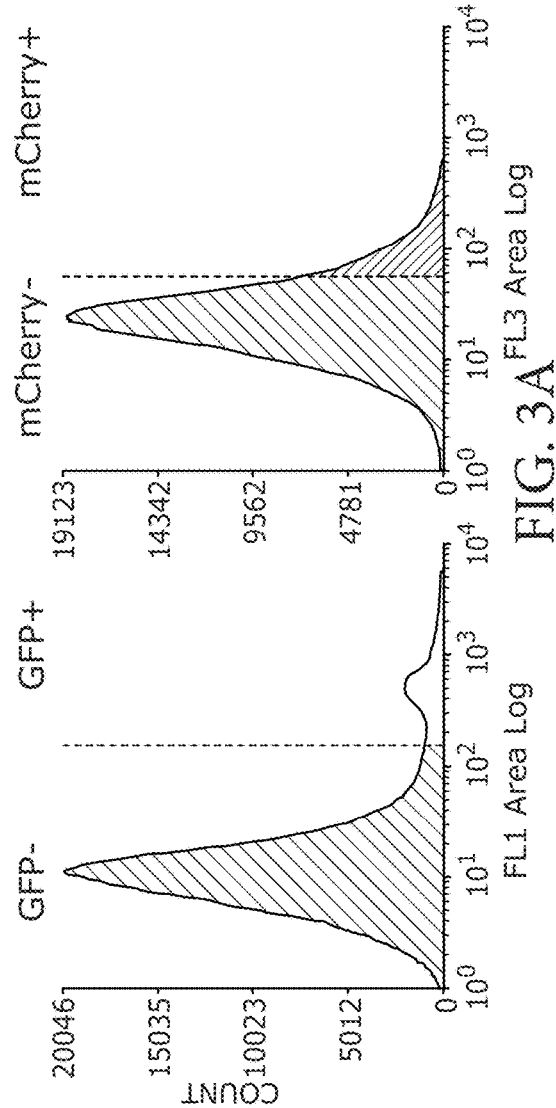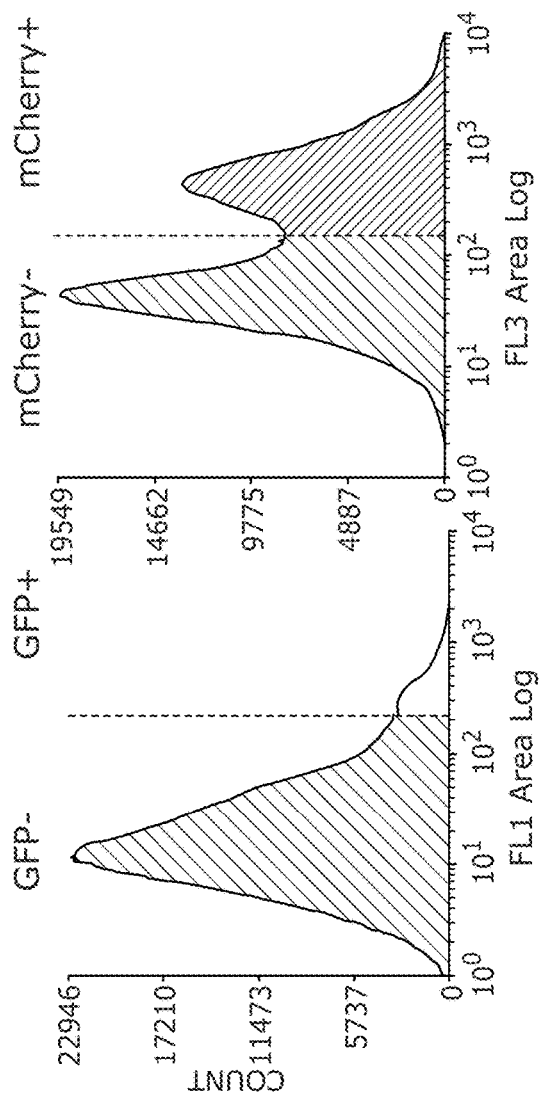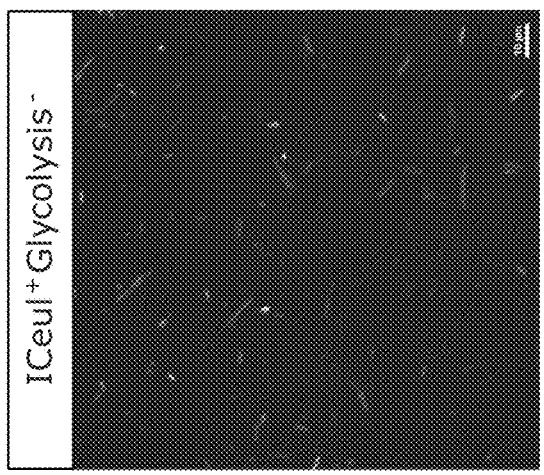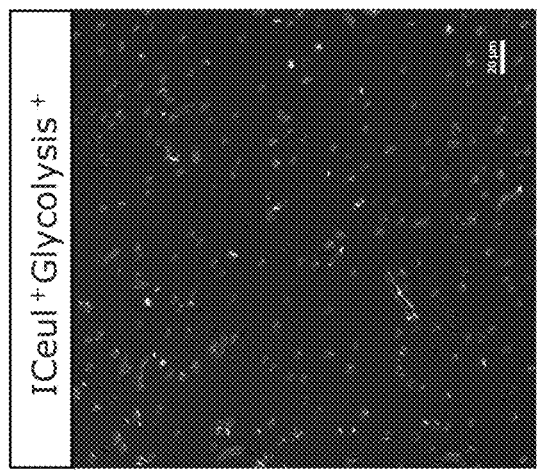
FIG. 3A
FIG. 3B

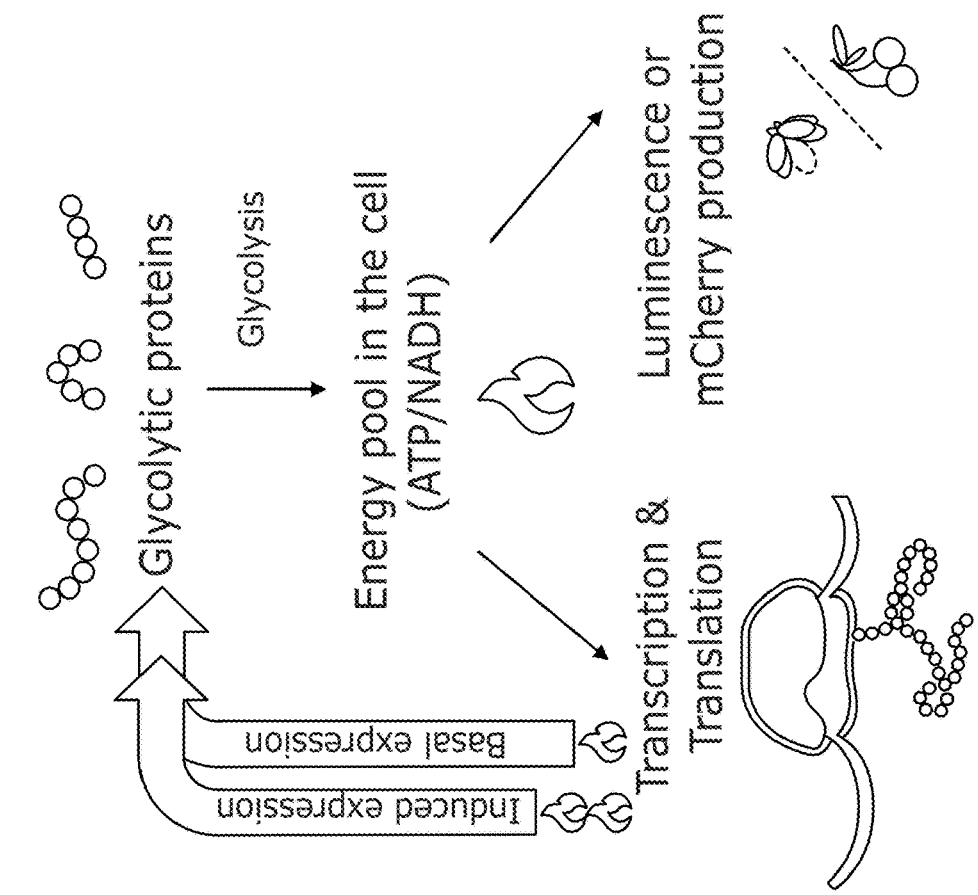
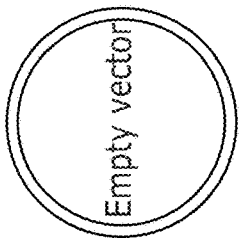
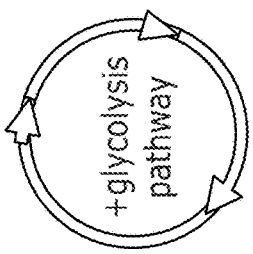
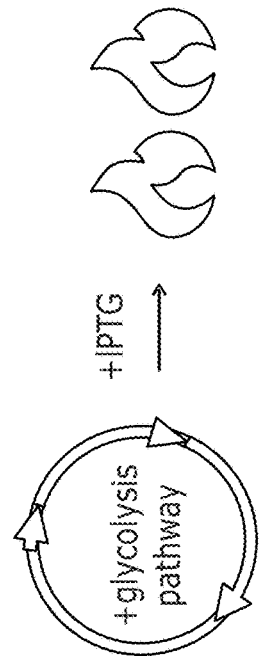
FIG. 32B
FIG. 32A

FIG. 40A
FIG. 40B
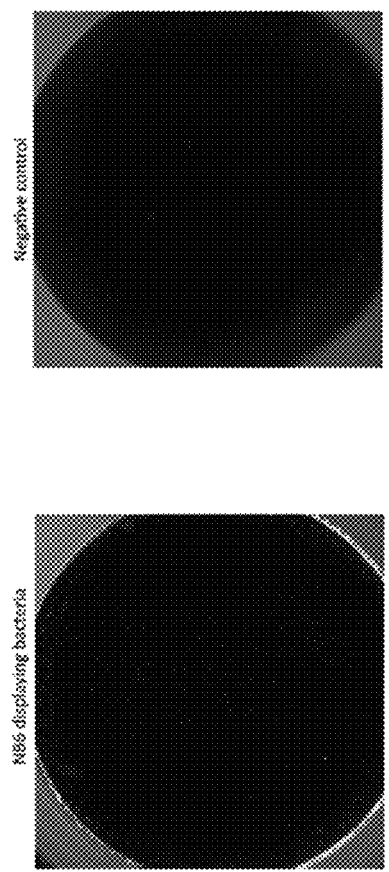
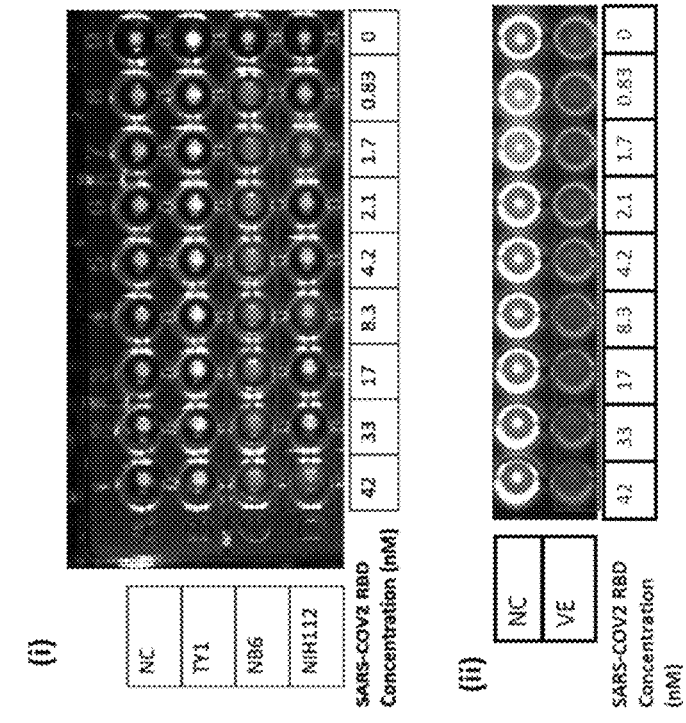

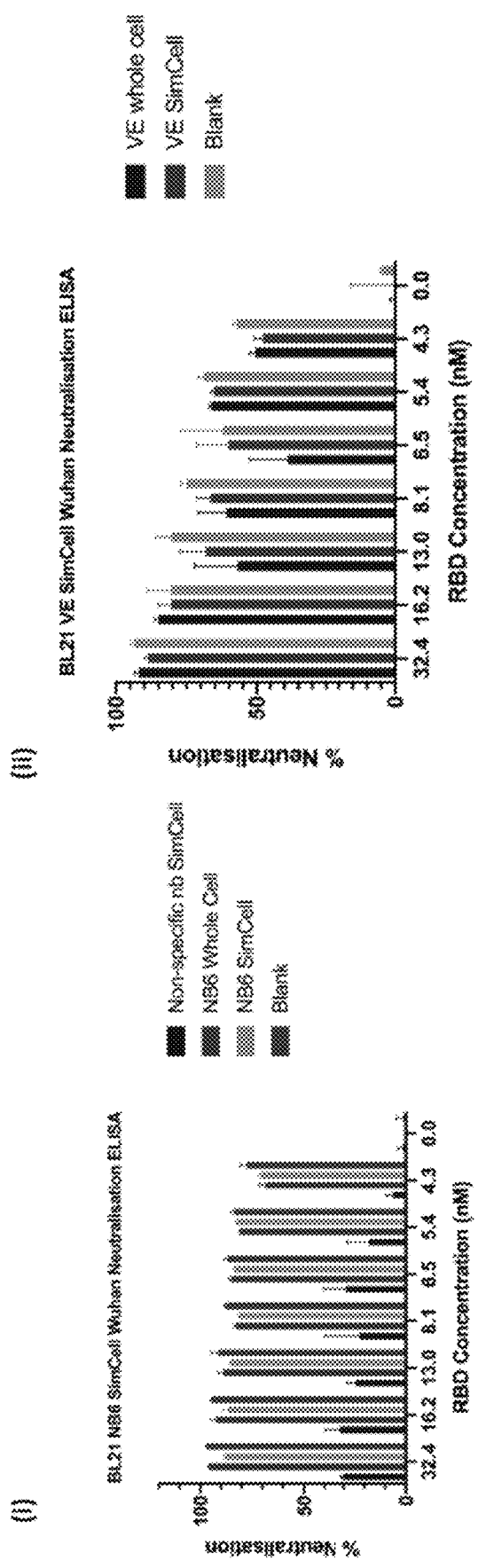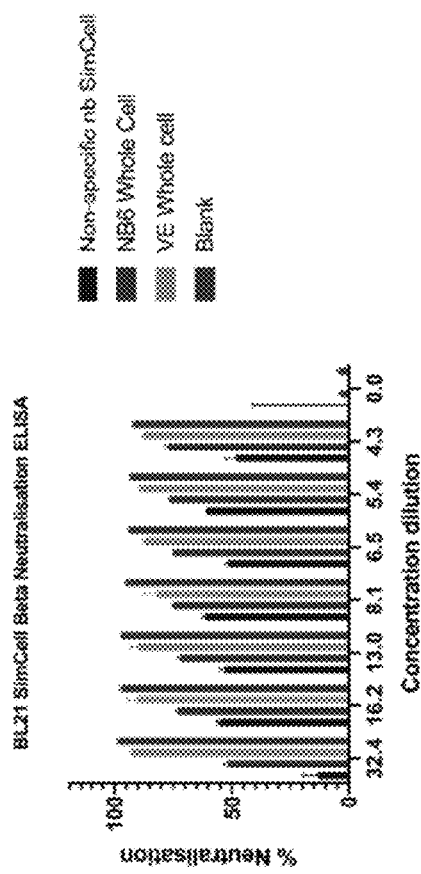
FIG. 42A
FIG. 42B

Pseudo Virus neutralization Assay (mVNT)

Micro-fusion inhibition test (mFIT)

SEQUENCE LISTING

```
<160> NUMBER OF SEQ ID NOS: 38

<210> SEQ ID NO 1
<211> LENGTH: 26
<212> TYPE: DNA
<213> ORGANISM: Unknown
<220> FEATURE:
<223> OTHER INFORMATION: I-CeuI endonuclease recognition sequence

<400> SEQUENCE: 1
taactataac ggtcctaagg tagcga                                          26

<210> SEQ ID NO 2
<211> LENGTH: 120
<212> TYPE: PRT
<213> ORGANISM: Artificial Sequence
<220> FEATURE:
<223> OTHER INFORMATION: Nanobody

<400> SEQUENCE: 2

Glu Val Gln Leu Val Glu Ser Gly Gly Gly Phe Val Gln Ala Gly Glu
1               5                   10                  15

Ser Leu Thr Leu Ser Cys Thr Ser Ser Thr Leu Thr Phe Thr Pro Tyr
            20                  25                  30

Arg Met Ala Trp Tyr Arg Gln Ala Pro Gly Lys Gln Arg Asp Leu Val
        35                  40                  45
```

```
Ala Asp Ile Ser Ser Gly Asp Gly Arg Thr Thr Asn Tyr Ala Asp Phe
         50                  55                  60

Ala Lys Gly Arg Phe Thr Ile Ser Arg Asp Asn Ile Lys Asn Thr Val
 65                  70                  75                  80

Phe Leu Arg Met Thr Asn Leu Lys Pro Glu Asp Thr Ala Val Tyr Tyr
                 85                  90                  95

Cys Asn Thr Phe Val Ser Phe Val Gly Ile Ala Arg Ser Trp Gly Gln
                100                 105                 110

Gly Thr Gln Val Thr Val Ser Ser
            115                 120
```

<210> SEQ ID NO 3
<211> LENGTH: 120
<212> TYPE: PRT
<213> ORGANISM: Artificial Sequence
<220> FEATURE:
<223> OTHER INFORMATION: Nanobody

<400> SEQUENCE: 3

```
Glu Val Gln Leu Val Glu Ser Gly Gly Gly Leu Val Gln Ala Gly Gly
 1               5                  10                  15

Ser Leu Thr Leu Ser Cys Thr Ser Thr Leu Thr Phe Thr Pro Tyr
             20                  25                  30

Arg Met Gly Trp Tyr Arg Gln Thr Pro Gly Lys Gln Arg Asp Leu Val
             35                  40                  45

Ala Asp Ile Ser Pro Gly Asp Gly Ser Thr Lys Asn Tyr Ala Gly Phe
         50                  55                  60

Ala Gln Gly Arg Phe Thr Ile Ser Arg Asp Asn Ile Lys Asn Thr Val
 65                  70                  75                  80

Tyr Leu Gln Met Asn Asp Leu Lys Pro Glu Asp Thr Ala Val Tyr Tyr
                 85                  90                  95

Cys Asn Thr Tyr Val Ala Phe Val Gly Arg Ala Arg Thr Trp Gly Gln
                100                 105                 110

Gly Thr Gln Val Thr Val Ser Ser
            115                 120
```

<210> SEQ ID NO 4
<211> LENGTH: 118
<212> TYPE: PRT
<213> ORGANISM: Artificial Sequence
<220> FEATURE:
<223> OTHER INFORMATION: Nanobody

<400> SEQUENCE: 4

```
Gln Val Gln Leu Val Glu Thr Gly Gly Gly Leu Val Gln Pro Gly Gly
 1               5                  10                  15

Ser Leu Arg Leu Ser Cys Ala Ala Ser Gly Phe Thr Phe Ser Ser Val
             20                  25                  30

Tyr Met Asn Trp Val Arg Gln Ala Pro Gly Lys Gly Pro Glu Trp Val
             35                  40                  45

Ser Arg Ile Ser Pro Asn Ser Gly Asn Ile Gly Tyr Thr Asp Ser Val
         50                  55                  60

Lys Gly Arg Phe Thr Ile Ser Arg Asp Asn Ala Lys Asn Thr Leu Tyr
 65                  70                  75                  80

Leu Gln Met Asn Asn Leu Lys Pro Glu Asp Thr Ala Leu Tyr Tyr Cys
                 85                  90                  95

Ala Ile Gly Leu Asn Leu Ser Ser Ser Val Arg Gly Gln Gly Thr
```

Gln Val Thr Val Ser Ser
        115

<210> SEQ ID NO 5
<211> LENGTH: 125
<212> TYPE: PRT
<213> ORGANISM: Artificial Sequence
<220> FEATURE:
<223> OTHER INFORMATION: Nanobody

<400> SEQUENCE: 5

Gln Val Gln Leu Val Glu Ser Gly Gly Gly Leu Val Gln Ala Gly Gly
1               5                   10                  15

Ser Leu Arg Leu Ser Cys Ala Ala Ser Gly Tyr Ile Phe Gly Arg Asn
            20                  25                  30

Ala Met Gly Trp Tyr Arg Gln Ala Pro Gly Lys Glu Arg Glu Leu Val
        35                  40                  45

Ala Gly Ile Thr Arg Arg Gly Ser Ile Thr Tyr Tyr Ala Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Asp Pro Ala Ser Pro Ala Tyr Gly Asp Tyr Trp Gly Gln Gly
            100                 105                 110

Thr Gln Val Thr Val Ser Ser His His His His His
        115                 120                 125

<210> SEQ ID NO 6
<211> LENGTH: 130
<212> TYPE: PRT
<213> ORGANISM: Artificial Sequence
<220> FEATURE:
<223> OTHER INFORMATION: Nanobody

<400> SEQUENCE: 6

Asp Val Gln Leu Gln Glu Ser Gly Gly Gly Leu Val Gln Pro Gly Gly
1               5                   10                  15

Ser Leu Arg Leu Ser Cys Ala Ala Ser Gly Leu Thr Leu Asp Tyr Tyr
            20                  25                  30

Ala Ile Gly Trp Phe Arg Gln Ala Pro Gly Lys Glu Arg Glu Gly Val
        35                  40                  45

Ser Cys Ile Ser Ser Ser Asp Gly Ser Thr Tyr Tyr Ala Asp Ser Val
    50                  55                  60

Lys Gly Arg Phe Thr Thr Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Val Pro Ser Thr Tyr Tyr Ser Gly Thr Tyr Tyr Thr Cys
            100                 105                 110

His Pro Gly Gly Met Asp Tyr Trp Gly Lys Gly Thr Gln Val Thr Val
        115                 120                 125

Ser Ser
    130

<210> SEQ ID NO 7
<211> LENGTH: 122

```
<212> TYPE: PRT
<213> ORGANISM: Artificial Sequence
<220> FEATURE:
<223> OTHER INFORMATION: Nanobody

<400> SEQUENCE: 7

Gln Val Gln Leu Val Glu Thr Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Gly Trp Ala Arg Gln Val Pro Gly Lys Gly Leu Glu Trp Val
        35                  40                  45

Ser Tyr Ile Tyr Ser Asp Gly Ser Thr Glu Tyr Gln Asp Ser Val Lys
    50                  55                  60

Gly Arg Phe Thr Ile Ser Arg Asp Asn Ala Lys Ser Thr Val Tyr Leu
65                  70                  75                  80

Gln Met Asn Ser Leu Lys Pro Glu Asp Thr Ala Val Tyr Tyr Cys Ala
                85                  90                  95

Thr Glu Gly Ser Leu Gly Gly Trp Gly Arg Asp Phe Gly Ser Trp Gly
            100                 105                 110

Gln Gly Thr Gln Val Thr Val Ser Ser Gly
        115                 120

<210> SEQ ID NO 8
<211> LENGTH: 144
<212> TYPE: DNA
<213> ORGANISM: Unknown
<220> FEATURE:
<223> OTHER INFORMATION: Promoter

<400> SEQUENCE: 8
cacagctaac accacgtcgt ccctatctgc tgccctaggt ctatgagtgg ttgctggata      60
actttacggg catgcataag gctcgtataa tatattcagg gagaccacaa cggtttccct    120
ctacaaataa ttttgtttaa cttt                                           144

<210> SEQ ID NO 9
<211> LENGTH: 25
<212> TYPE: DNA
<213> ORGANISM: Unknown
<220> FEATURE:
<223> OTHER INFORMATION: g10 ribosome binding site

<400> SEQUENCE: 9
ttaactttaa gaaggagata tacat                                           25

<210> SEQ ID NO 10
<211> LENGTH: 13
<212> TYPE: PRT
<213> ORGANISM: Unknown
<220> FEATURE:
<223> OTHER INFORMATION: Protease tag

<400> SEQUENCE: 10

Val Ser Ala Ala Tyr Asn Glu Asp Asn Ala Ala Pro Arg
1               5                   10

<210> SEQ ID NO 11
<211> LENGTH: 35
<212> TYPE: DNA
<213> ORGANISM: Artificial Sequence
<220> FEATURE:
<223> OTHER INFORMATION: Primer
```

-continued

<400> SEQUENCE: 11
cattaggagc tcatgtcaaa ctttatactt aaacc     35

<210> SEQ ID NO 12
<211> LENGTH: 32
<212> TYPE: DNA
<213> ORGANISM: Artificial Sequence
<220> FEATURE:
<223> OTHER INFORMATION: Primer

<400> SEQUENCE: 12
cattagtcta gactactttta tacctttttt at     32

<210> SEQ ID NO 13
<211> LENGTH: 32
<212> TYPE: DNA
<213> ORGANISM: Artificial Sequence
<220> FEATURE:
<223> OTHER INFORMATION: Primer

<400> SEQUENCE: 13
cattagtcta gacataaccc taatgagtga gc     32

<210> SEQ ID NO 14
<211> LENGTH: 33
<212> TYPE: DNA
<213> ORGANISM: Artificial Sequence
<220> FEATURE:
<223> OTHER INFORMATION: Primer

<400> SEQUENCE: 14
cattaggagc tcatgtatat ctccttctta aag     33

<210> SEQ ID NO 15
<211> LENGTH: 33
<212> TYPE: DNA
<213> ORGANISM: Artificial Sequence
<220> FEATURE:
<223> OTHER INFORMATION: Primer

<400> SEQUENCE: 15
cattagggta ccatgactaa aaaaatttca ttc     33

<210> SEQ ID NO 16
<211> LENGTH: 31
<212> TYPE: DNA
<213> ORGANISM: Artificial Sequence
<220> FEATURE:
<223> OTHER INFORMATION: Primer

<400> SEQUENCE: 16
cattagggat ccgctagctt ggattctcac c     31

<210> SEQ ID NO 17
<211> LENGTH: 33
<212> TYPE: DNA
<213> ORGANISM: Artificial Sequence
<220> FEATURE:
<223> OTHER INFORMATION: Primer

<400> SEQUENCE: 17
cattagggat ccctaatgag tgagctaact tac     33

<210> SEQ ID NO 18

```
<211> LENGTH: 33
<212> TYPE: DNA
<213> ORGANISM: Artificial Sequence
<220> FEATURE:
<223> OTHER INFORMATION: Primer

<400> SEQUENCE: 18
cattagggta ccatgtatat ctccttctta aag                              33

<210> SEQ ID NO 19
<211> LENGTH: 48
<212> TYPE: DNA
<213> ORGANISM: Artificial Sequence
<220> FEATURE:
<223> OTHER INFORMATION: Primer

<400> SEQUENCE: 19
ttaataagct tgagagctaa tgagtgagct aacttacatt aattgcgt              48

<210> SEQ ID NO 20
<211> LENGTH: 80
<212> TYPE: DNA
<213> ORGANISM: Artificial Sequence
<220> FEATURE:
<223> OTHER INFORMATION: Primer

<400> SEQUENCE: 20
ctctcaagct tattaaactg atgcagcgta gttttcgtcg tttgctgcgg atcccttgta  60
cagctcgtcc atgccgccgg                                             80

<210> SEQ ID NO 21
<211> LENGTH: 24
<212> TYPE: DNA
<213> ORGANISM: Artificial Sequence
<220> FEATURE:
<223> OTHER INFORMATION: Primer

<400> SEQUENCE: 21
ctcctgtgtg aaattgttat ccgc                                        24

<210> SEQ ID NO 22
<211> LENGTH: 18
<212> TYPE: DNA
<213> ORGANISM: Artificial Sequence
<220> FEATURE:
<223> OTHER INFORMATION: Primer

<400> SEQUENCE: 22
acctgcaggc atgcaagc                                               18

<210> SEQ ID NO 23
<211> LENGTH: 41
<212> TYPE: DNA
<213> ORGANISM: Artificial Sequence
<220> FEATURE:
<223> OTHER INFORMATION: Primer

<400> SEQUENCE: 23
aagcttgcat gcctgcaggt gacgtcttac gaaaataact c                     41

<210> SEQ ID NO 24
<211> LENGTH: 32
<212> TYPE: DNA
<213> ORGANISM: Artificial Sequence
<220> FEATURE:
<223> OTHER INFORMATION: Primer
```

```
<400> SEQUENCE: 24
taaagttaaa agatcttttg aattcaaagt tg                                    32

<210> SEQ ID NO 25
<211> LENGTH: 37
<212> TYPE: DNA
<213> ORGANISM: Artificial Sequence
<220> FEATURE:
<223> OTHER INFORMATION: Primer

<400> SEQUENCE: 25
caaaagatct tttaacttta agaaggagat atacatg                               37

<210> SEQ ID NO 26
<211> LENGTH: 50
<212> TYPE: DNA
<213> ORGANISM: Artificial Sequence
<220> FEATURE:
<223> OTHER INFORMATION: Primer

<400> SEQUENCE: 26
ctagtaggtt tcctgtgtga actactttat acctttttta taattacgag                 50

<210> SEQ ID NO 27
<211> LENGTH: 50
<212> TYPE: DNA
<213> ORGANISM: Artificial Sequence
<220> FEATURE:
<223> OTHER INFORMATION: Primer

<400> SEQUENCE: 27
tataaagtag ttcacacagg aaacctacta gatggctgaa gcgcaaaatg                 50

<210> SEQ ID NO 28
<211> LENGTH: 28
<212> TYPE: DNA
<213> ORGANISM: Artificial Sequence
<220> FEATURE:
<223> OTHER INFORMATION: Primer

<400> SEQUENCE: 28
tttattattt ttatgacaac ttgacggc                                         28

<210> SEQ ID NO 29
<211> LENGTH: 41
<212> TYPE: DNA
<213> ORGANISM: Artificial Sequence
<220> FEATURE:
<223> OTHER INFORMATION: Primer

<400> SEQUENCE: 29
agttgtcata aaataataa aaagccgga ttaataatct g                            41

<210> SEQ ID NO 30
<211> LENGTH: 28
<212> TYPE: DNA
<213> ORGANISM: Artificial Sequence
<220> FEATURE:
<223> OTHER INFORMATION: Primer

<400> SEQUENCE: 30
ttggtttctt tcacactggc tcaccttc                                         28

<210> SEQ ID NO 31
```

```
<211> LENGTH: 32
<212> TYPE: DNA
<213> ORGANISM: Artificial Sequence
<220> FEATURE:
<223> OTHER INFORMATION: Primer

<400> SEQUENCE: 31
gccagtgtga aagaaaccaa ttgtccatat tg                                       32

<210> SEQ ID NO 32
<211> LENGTH: 29
<212> TYPE: DNA
<213> ORGANISM: Artificial Sequence
<220> FEATURE:
<223> OTHER INFORMATION: Primer

<400> SEQUENCE: 32
ccttcttaaa atggagaaac agtagagag                                           29

<210> SEQ ID NO 33
<211> LENGTH: 36
<212> TYPE: DNA
<213> ORGANISM: Artificial Sequence
<220> FEATURE:
<223> OTHER INFORMATION: Primer

<400> SEQUENCE: 33
gtttctccat tttaagaagg agatatacat atggcg                                   36

<210> SEQ ID NO 34
<211> LENGTH: 52
<212> TYPE: DNA
<213> ORGANISM: Artificial Sequence
<220> FEATURE:
<223> OTHER INFORMATION: Primer

<400> SEQUENCE: 34
ataacaattt cacacaggag cctaggatgg gcccttaagc accggtggag tg                 52

<210> SEQ ID NO 35
<211> LENGTH: 218
<212> TYPE: PRT
<213> ORGANISM: Chlamydomonas moewusii

<400> SEQUENCE: 35
```

Met Ser Asn Phe Ile Leu Lys Pro Gly Glu Lys Leu Pro Gln Asp Lys
1               5                   10                  15

Leu Glu Glu Leu Lys Lys Ile Asn Asp Ala Val Lys Lys Thr Lys Asn
            20                  25                  30

Phe Ser Lys Tyr Leu Ile Asp Leu Arg Lys Leu Phe Gln Ile Asp Glu
        35                  40                  45

Val Gln Val Thr Ser Glu Ser Lys Leu Phe Leu Ala Gly Phe Leu Glu
    50                  55                  60

Gly Glu Ala Ser Leu Asn Ile Ser Thr Lys Lys Leu Ala Thr Ser Lys
65                  70                  75                  80

Phe Gly Leu Val Val Asp Pro Glu Phe Asn Val Thr Gln His Val Asn
                85                  90                  95

Gly Val Lys Val Leu Tyr Leu Ala Leu Glu Val Phe Lys Thr Gly Arg
            100                 105                 110

Ile Arg His Lys Ser Gly Ser Asn Ala Thr Leu Val Leu Thr Ile Asp
        115                 120                 125

Asn Arg Gln Ser Leu Glu Glu Lys Val Ile Pro Phe Tyr Glu Gln Tyr

```
                130                  135                  140
Val Val Ala Phe Ser Ser Pro Glu Lys Val Lys Arg Val Ala Asn Phe
145                 150                  155                 160

Lys Ala Leu Leu Glu Leu Phe Asn Asn Asp Ala His Gln Asp Leu Glu
            165                 170                  175

Gln Leu Val Asn Lys Ile Leu Pro Ile Trp Asp Gln Met Arg Lys Gln
        180                 185                  190

Gln Gly Gln Ser Asn Glu Gly Phe Pro Asn Leu Glu Ala Ala Gln Asp
    195                 200                  205

Phe Ala Arg Asn Tyr Lys Lys Gly Ile Lys
    210                 215

<210> SEQ ID NO 36
<211> LENGTH: 657
<212> TYPE: DNA
<213> ORGANISM: Chlamydomonas moewusii

<400> SEQUENCE: 36
atgtcaaact ttatacttaa accgggcgaa aaactacccc aagacaaact agaagaatta    60
aaaaaaatta atgatgctgt taaaaaaacg aaaaatttct caaatactt gattgactta   120 agaaaacttt ttcaaattga cgaagtccaa gtaacttctg aatcaaaact ctttttagct   180
ggttttttag aaggtgaagc ttctctaaat attagcacta aaaagctcgc tacttctaaa   240
tttggtttgg tggttgatcc tgaattcaat gtgactcaac atgtcaatgg ggttaaagtg   300
ctttatttag cattagaagt atttaaaaca gggcgtattc gtcataaaag tggtagtaat   360
gcaactttag ttttaactat tgacaatcgt caaagtttgg aagaaaaagt aattcctttt   420
tatgaacaat atgttgttgc cttcagttct ccagaaaaag tcaaacgtgt agctaatttt   480
aaagctttgt tagaattatt taataatgac gctcaccaag atttagaaca attggtaaac   540
aaaatcctac caatttggga tcaaatgcgt aaacaacaag gacaaagtaa cgaaggcttt   600
cctaatttag aagcagctca agactttgct cgtaattata aaaaaggtat aaagtag     657

<210> SEQ ID NO 37
<211> LENGTH: 6719
<212> TYPE: DNA
<213> ORGANISM: Artificial Sequence
<220> FEATURE:
<223> OTHER INFORMATION: Plasmid

<400> SEQUENCE: 37
gctaataaca ggcctgctgg taatcgcagg ccttttatt tggtgtattt agaaaaataa    60
acaaataggg gttccgcgca catttccccg aaaagtgcca cctaaattgt aagcgttaat   120
attttgttaa aattcgcgtt aaattttgt taaatcagct cattttttaa ccaataggcc   180
gaaatcggca aaatccctta taaatcaaaa gaatagaccg agatagggtt gagtggccgc   240
tacagggcgc tcccattcgc cattcaggct gcgcaactgt tgggaagggc gtttcggtgc   300
gggcctcttc gctattacgc cagctggcga aggggggatg tgctgcaagg cgattaagtt   360
gggtaacgcc agggttttcc cagtcacgac gttgtaaaac gacggccagt gagcgcgacg   420
taatacgact cactataggg cgaattgtag gcggaaggcc gtcaaggccg catcacagct   480
aacaccacgt cgtccctatc tgctgcccta ggtctatgag tggttgctgg ataactttac   540
gggcatgcat aaggctcgta ggctatattc agggagacca caacggtttc cctctacaaa   600
taattttgtt taacttgaa ataaggaggt aatacaaggt accgcggccg ctgcctggcg   660
```

```
gcagtagcgc ggtggtccca cctgacccca tgccgaactc agaagtgaaa cgccgtagcg    720
ccgatggtag tgtggggtct ccccatgcga gagtagggaa ctgccaggca tcaaataaaa    780
cgaaaggctc agtcgaaaga ctgggcctta gatcttcgag tccctatcag tgatagagat    840
tgacatccct atcagtgata gagatactga gcacatcagc aggacgcact gaccgaattc    900
attaaagagc tcatgggtgg cttgatgtta attgattggt gtgctttagc attggttgtg    960
tttattggtt tgccacatgg tgccttagat gctgctattt cttttcaat gatttcttca    1020 gcaaagagaa ttgctagatt agcaggaata ctattaattt acctgttgtt agcaaccgca   1080
ttttttttaa tttggtatca attaccagca ttttctcttc ttattttct tttgataagc    1140 ataatccatt ttggaatggc tgatttcaat gcatcccaa gtaaacttaa gtggcctcat    1200
attattgcac atggcggcgt tgttactgtt tggttgccgc ttatccaaaa aaatgaagtt    1260
acgaagctat tttcaatatt aacaaatggt ccaactccca ttttatggga catactattg    1320 atatttttt tatgttggag cataggagta tgtcttcata cctatgaaac tttacgttct    1380
aaacattata atatcgcctt tgaacttatt ggattaattt ttctagcctg gtatgcaccc    1440
ccactcgtta cttttgccac atacttctgc tttatccaca gcagacgtca ctttagtttt   1500
gtttggaaac agttacagca tatgagttca aaaaaaatga tgataggtag tgccattatt   1560
ttatcttgta cgagctggtt gataggcgga ggaatatatt ttttcctcaa ttcgaaaatg    1620
attgccagtg aagctgcttt acaaactgtc tttattggtc ttgcagcttt aacagttcct    1680
cacatgatac ttatcgactt tatatttaga ccacactctt ccagaattaa atcaaaaat    1740 aagggcgagc ttgaaggtaa gcctatccct aaccctctcc tcggtctcga ttctacgcgt    1800
accggtcatc atcaccatca ccattgactc gagaaatata atgaccctct tgataaccca    1860
agagggcatt ttttaactag tcacagctaa caccacgtcg tccctatctg ctgccctagg    1920
tctatgagtg gttgctggat aactttacgg gcatgcataa ggctcgtagg ctatattcag    1980
ggagaccaca acggtttccc tctacaaata attttgttta actttgaaat aaggaggtaa    2040
tacaaatgtc tcgtttagat aaaagtaaag tgattaacag cgcattagag ctgcttaatg    2100
aggtcggaat cgaaggttta acaacccgta aactcgccca gaagctaggt gtagagcagc   2160
ctacattgta ttggcatgta aaaaataagc gggctttgct cgacgcctta gccattgaga    2220
tgttagatag gcaccatact cacttttgcc ctttagaagg ggaaagctgg caagattttt    2280
tacgtaataa cgctaaaagt tttagatgtg cttactaag tcatcgcgat ggagcaaaag    2340
tacatttagg tacacggcct acagaaaaac agtatgaaac tctcgaaaat caattagcct    2400
ttttatgcca acaaggtttt tcactagaga atgcattata tgcactcagc gctgtgggc    2460 attttacttt aggttgcgta ttggaagatc aagagcatca agtcgctaaa gaagaaaggg    2520
aaacacctac tactgatagt atgccgccat tattacgaca agctatcgaa ttatttgatc    2580
accaaggtgc agagccagcc ttcttattcg gccttgaatt gatcatatgc ggattagaaa    2640
aacaacttaa atgtgaaagt gggtcttaat ggccatgcct ggcggcagta gcgcggtggt    2700
cccacctgac cccatgccga actcagaagt gaaacgccgt agcgccgatg gtagtgtggg    2760
gtctccccat gcgagagtag ggaactgcca ggcatcaaat aaaacgaaag gctcagtcga    2820
aagactgggc cttgctagct tatgacaact tgacggctac atcattcact ttttcttcac    2880
aaccggcacg gaactcgctc gggctggccc cggtgcattt tttaaatacc cgcgagaaat    2940
agagttgatc gtcaaaacca acattgcgac cgacggtggc gataggcatc cgggtggtgc    3000
tcaaaagcag cttcgcctgg ctgatacgtt ggtcctcgcg ccagcttaag acgctaatcc    3060
```

```
ctaactgctg gcggaaaaga tgtgacagac gcgacggcga caagcaaaca tgctgtgcga      3120
cgctggcgat atcaaaattg ctgtctgcca ggtgatcgct gatgtactga caagcctcgc      3180
gtacccgatt atccatcggt ggatggagcg actcgttaat cgcttccatg cgccgcagta      3240
acaattgctc aagcagattt atcgccagca gctccgaata gcgcccttcc ccttgccggg      3300
cgttaatgat ttgcccaaac aggtcgctga aatgcggctg gtgcgcttca tccgggcgaa      3360 agaacccgt attggcaaat attgacgcc agttaagcca ttcatgccag taggcgcgcg       3420
gacgaaagta aacccactgg tgataccatt cgcgagcctc cggatgacga ccgtagtgat     3480
gaatctctcc tggcgggaac agcaaaatat caccccggtcg gcaaacaaat tctcgtccct    3540
gatttttcac cacccctga ccgcgaatgg tgagattgag aatataaccct tcattccca      3600 gcggtcggtc gataaaaaaa tcgagataac cgttggcctc aatcggcgtt aaacccgcca    3660
ccagatgggc attaaacgag tatcccggca gcagggggatc attttgcgct tcagccatac   3720
ttttcatact cccgccattc agagaagaaa ccaattgtcc atattgcatc agacattgcc     3780
gtcactgcgt cttttactgg ctcttctcgc taaccaaacc ggtaaccccg cttattaaaa     3840
gcattctgta acaaagcggg accaaagcca tgacaaaaac gcgtaacaaa agtgtctata    3900
atcacggcag aaaagtccac attgattatt tgcacggcgt cacactttgc tatgccatag    3960 cattttatc cataagatta gcggatccta cctgacgctt tttatcgcaa ctctctactg      4020
tttctccata cccgttttt tgggctagaa ataattttgt ttaactttaa gaaggagata     4080 tacatacccca gtactatgtc aaactttata cttaaaccgg gcgaaaaact accccaagac    4140
aaactagaag aattaaaaaa aattaatgat gctgttaaaa aaacgaaaaa tttctcaaaa     4200
tacttgattg acttaagaaa actttttcaa attgacgaag tccaagtaac ttctgaatca    4260
aaactctttt tagctggttt tttagaaggt gaagcttctc taaatattag cactaaaaag    4320
ctcgctactt ctaaatttgg tttggtggtt gatcctgaat tcaatgtgac tcaacatgtc     4380
aatggggtta aagtgcttta tttagcatta gaagtatttta aaacagggcg tattcgtcat   4440
aaaagtggta gtaatgcaac tttagtttta actattgaca atcgtcaaag tttggaagaa    4500
aaagtaattc cttttatga acaatatgtt gttgccttca gttctccaga aaaagtcaaa    4560
cgtgtagcta attttaaagc tttgttagaa ttatttaata atgacgctca ccaagattta    4620
gaacaattgg taaacaaaat cctaccaatt tgggatcaaa tgcgtaaaca acaaggacaa    4680
agtaacgaag cttttcctaa tttagaagca gctcaagact ttgctcgtaa ttataaaaaa    4740
ggtataaagt agtctagact gggcctcatg ggccttccgc ctatcactgc ccgctttcca    4800
gtcgggaaac ctgtcgtgcc agctgcatta acatggtcat agctgttttcc ttgcgtattg    4860 ggcgctctcc gcttcctcgc tcactgactc gctgcgctcg gtcgttcggg taaagcctgg    4920
ggtgcctaaa taaacgaaa ggcccagtct tccgactgag ccttttcgttt tattgagcaa    4980 aaggccagca aaaggccagg aaccgtaaaa aggccgcgtt gctggcgttt ttccataggc     5040
tccgcccccc tgacgagcat cacaaaaatc gacgctcaag tcagaggtgg cgaaacccga    5100
caggactata aagataccag gcgtttcccc ctggaagctc cctcgtgcgc tctcctgttc    5160
cgaccctgcc gcttaccgga tacctgtccg cctttctccc ttcgggaagc gtggcgcttt    5220
ctcatagctc acgctgtagg tatctcagtt cggtgtaggt cgttcgctcc aagctgggct   5280
gtgtgcacga accccccgtt cagcccgacc gctgcgcctt atccggtaac tatcgtcttg   5340
agtccaaccc ggtaagacac gacttatcgc cactggcagc agccactggt aacaggatta    5400
```

```
gcagagcgag gtatgtaggc ggtgctacag agttcttgaa gtggtggcct aactacggct   5460
acactagaag aacagtattt ggtatctgcg ctctgctgaa gccagttacc ttcggaaaaa   5520
gagttggtag ctcttgatcc ggcaaacaaa ccaccgctgg tagcggtggt ttttttgttt   5580
gcaagcagca gattacgcgc agaaaaaaag gatctcaaga agatcctttg atcttttcta   5640
cggggtctga cgctcagtgg aacgaaaact cacgttaagg gattttggtc atgagattat   5700
caaaaaggat cttcacctag atccttttaa attaaaaatg aagttttaaa tcaatctaaa   5760
gtatatatga gtaaacttgg tctgacagtt accaatgctt aatcagtgag gcacctatct   5820
cagcgatctg tctatttcgt tcatccatag ttgcctgact ccccgtcgtg tagataacta   5880
cgatacggga gggcttacca tctggcccca gtgctgcaat gataccgcga gaaccacgct   5940
caccggctcc agatttatca gcaataaacc agccagccgg aagggccgag cgcagaagtg   6000
gtcctgcaac tttatccgcc tccatccagt ctattaattg ttgccgggaa gctagagtaa   6060
gtagttcgcc agttaatagt ttgcgcaacg ttgttgccat tgctacaggc atcgtggtgt   6120
cacgctcgtc gtttggtatg gcttcattca gctccggttc ccaacgatca aggcgagtta   6180
catgatcccc catgttgtgc aaaaaagcgg ttagctcctt cggtcctccg atcgttgtca   6240
gaagtaagtt ggccgcagtg ttatcactca tggttatggc agcactgcat aattctctta   6300
ctgtcatgcc atccgtaaga tgcttttctg tgactggtga gtactcaacc aagtcattct   6360
gagaatagtg tatgcggcga ccgagttgct cttgcccggc gtcaatacgg gataataccg   6420
cgccacatag cagaacttta aaagtgctca tcattggaaa acgttcttcg ggcgaaaac   6480 tctcaaggat cttaccgctg ttgagatcca gttcgatgta acccactcgt gcacccaact   6540
gatcttcagc atcttttact ttcaccagcg tttctgggtg agcaaaaaca ggaaggcaaa   6600
atgccgcaaa aagggaata agggcgacac ggaaatgttg aatactcata ctcttccttt   6660
ttcaatatta ttgaagcatt tatcagggtt attgtctcat gagcggatac atatttgaa    6719
```

<210> SEQ ID NO 38
<211> LENGTH: 16472
<212> TYPE: DNA
<213> ORGANISM: Artificial Sequence
<220> FEATURE:
<223> OTHER INFORMATION: Plasmid

<400> SEQUENCE: 38

```
ttaattaatt gacaccatcg aatggtgcaa aacctttcgc ggtatggcat gatagcgccc     60
ggaagagagt caattcaggg tggtgaatgt gaaaccagta acgttatacg atgtcgcaga   120
gtatgccggt gtctcttatc agaccgtttc ccgcgtggtg aaccaggcca gccacgtttc   180
tgcgaaaacg cgggaaaaag tggaagcggc gatggcggag ctgaattaca ttcccaaccg   240
cgtggcacaa caactggcgg gcaaacagtc gttgctgatt ggcgttgcca cctccagtct   300
ggccctgcac gcgccgtcgc aaattgtcgc ggcgattaaa tctcgcgccg atcaactggg   360
tgccagcgtg gtggtgtcga tggtagaacg aagcggcgtc gaagcctgta aagcggcggt   420
gcacaatctt ctcgcgcaac gcgtcagtgg gctgatcatt aactatccgc tggatgacca   480
ggatgccatt gctgtggaag ctgcctgcac taatgttccg gcgttatttc ttgatgtctc   540
tgaccagaca cccatcaaca gtattatttt ctcccatgaa gacggtacgc gactgggcgt   600
ggagcatctg gtcgcattgg gtcaccagca aatcgcgctg ttagcgggcc cattaagttc   660
tgtctcggcg cgtctgcgtc tggctggctg gcataaatat ctcactcgca atcaaattca   720
gccgatagcg gaacgggaag gcgactggag tgccatgtcc ggttttcaac aaaccatgca   780
```

```
aatgctgaat gagggcatcg ttcccactgc gatgctggtt gccaacgatc agatggcgct    840
gggcgcaatg cgcgccatta ccgagtccgg gctgcgcgtt ggtgcggata tctcggtagt    900
gggatacgac gataccgaag acagctcatg ttatatcccg ccgttaacca ccatcaaaca    960
ggattttcgc ctgctggggc aaaccagcgt ggaccgcttg ctgcaactct ctcagggcca   1020
ggcggtgaag ggcaatcagc tgttgcccgt ctcactggtg aaaagaaaaa ccaccctggc   1080
gcccaatacg caaaccgcct ctccccgcgc gttggccgat tcattaatgc agctggcacg   1140
acaggtttcc cgactggaaa gcgggcagtg agcgcaacgc aattaatgta agttagcgcg   1200
aattgatctg gtttgacagc ttatcatcga ctgcacggtg caccaatgct tctggcgtca   1260
ggcagccatc ggaagctgtg gtatggctgt gcaggtcgta atcactgca taattcgtgt   1320
cgctcaaggc gcactcccgt tctggataat gttttttgcg ccgacatcat aacgttctg    1380
gcaaatattc tgaaatgagc tgttgacaat taatcatccg gctcgtataa tgtgtggaat   1440
tgtgagcgga taacaatttc acaccctagg aggaggaaaa acatatgaca aagtatgcat   1500
tagtcggtga tgtgggcggc accaacgcac gtcttgctct gtgtgatatt gccagtggtg   1560
aaatctcgca ggctaagacc tattcagggc ttgattaccc cagcctcgaa gcggtcattc   1620
gcgtttatct tgaagaacat aaggtcgagg tgaaagacgg ctgtattgcc atcgcttgcc   1680
caattaccgg tgactgggtg gcgatgacca accatacctg ggcgttctca attgccgaaa   1740
tgaaaaagaa tctcggtttt agccatctgg aaattattaa cgattttacc gctgtatcga   1800
tggcgatccc gatgctgaaa aaagagcatc tgattcagtt tggtggcgca gaaccggtcg   1860
aaggtaagcc tattgcggtt tacggtgccg gaacggggct tggggttgcg catctggtcc   1920
atgtcgataa gcgttgggtt agcttgccag gcgaaggcgg tcacgtagat tttgcgccga   1980
atagtgaaga agaggccatt atcctcgaaa tattgcgtgc ggaaattggt catgtttcgg   2040
cggagcgcgt gctttctggc cctgggctgg tgaatttgta tcgcgcaatt gtgaaagctg   2100
acaaccgcct gccagaaaat ctcaagccaa aagatattac cgaacgcgcg ctggctgaca   2160
gctgcaccga ttgccgccgc gcattgtcgc tgttttgcgt cattatgggc cgttttggcg   2220
gcaatctggc gctcaatctc gggacatttg gcggcgtgtt tattgcgggc ggtatcgtgc   2280
cgcgcttcct tgagttcttc aaagcctccg gtttccgtgc cgcatttgaa gataaagggc   2340
gctttaaaga atatgtccat gatattccgg tgtatctcat cgtccatgac aatccgggcc   2400
ttctcggttc cggtgcacat ttacgccaga ccttaggtca cattctgtaa gaattcagga   2460
ggaaaaacat atgaaaaaca tcaatccaac gcagaccgct gcctggcagg cactacagaa   2520
acacttcgat gaaatgaaag acgttacgat cgccgatctt tttgctaaag acggcgatcg   2580
tttttctaag ttctccgcaa ccttcgacga tcagatgctg gtggattact ccaaaaaccg   2640
catcactgaa gagacgctgg cgaaattaca ggatctggcg aaagagtgcg atctggcggg   2700
cgcgattaag tcgatgttct ctggcgagaa gatcaaccgc actgaaaaacc gcgccgtgct   2760
gcacgtagcg ctgcgtaacc gtagcaatac cccgattttg gttgatggca agacgtaat    2820
gccggaagtc aacgcggtgc tggagaagat gaaaaccttc tcagaagcga ttatttccgg   2880
tgagtggaaa ggttataccg gcaaagcaat cactgacgta gtgaacatcg ggatcggcgg   2940
ttctgaccctc ggcccataca tggtgaccga agctctgcgt ccgtacaaaa accacctgaa   3000
catgcacttt gtttctaacg tcgatgggac tcacatcgcg gaagtgctga aaaagtaaa    3060
cccggaaacc acgctgttct tggtagcatc taaaaacctt accactcagg aaactatgac   3120
```

```
caacgcccat agcgcgcgtg actggttcct gaaagcggca ggtgatgaaa acacgttgc     3180
aaaacacttt gcggcgcttt ccaccaatgc caaagccgtt ggcgagtttg gtattgatac    3240
tgccaacatg ttcgagttct gggactgggt tggcggccgt tactctttgt ggtcagcgat    3300
tggcctgtcg attgttctct ccatcggctt tgataacttc gttgaactgc tttccggcgc    3360
acacgcgatg gacaagcatt tctccaccac gcctgccgag aaaaacctgc ctgtactgct    3420
ggcgctgatt ggcatctggt acaacaattt ctttggtgcg gaaactgaag cgattctgcc    3480
gtatgaccag tatatgcacc gtttcgcggc gtacttccag cagggcaata tggagtccaa    3540
cggtaagtat gttgaccgta acggtaacgt tgtggattac cagactggcc cgattatctg    3600
gggtgaacca ggcactaacg gtcagcacgc gttctaccag ctgatccacc agggaaccaa    3660
aatggtgccg tgcgatttca tcgctccggc tatcacccat aacccgctct ctgatcatca    3720
ccagaaactg ctgtctaact tcttcgccca gaccgaagcg ctggcgtttg gtaaatcccg    3780
cgaagtagtt gagcaggaat atcgtgatca gggtaaagat ccggcaacgc ttgactacgt    3840
ggtgccgttc aaagtattcg aaggtaaccg cccgaccaac tccatcctgc tgcgtgaaat    3900
cactccgttc agcctgggtg cgttgattgc gctgtatgag cacaaaatct ttactcaggg    3960
cgtgatcctg aacatcttca ccttcgacca gtggggcgtg aactgggta acagctggc     4020
gaaccgtatt ctgccagagc tgaaagatga taaagaaatc agcagccacg atagctcgac    4080
caatggtctg attaaccgct ataaagcgtg gcgcggttaa gagctcagga ggaaaaacat    4140
atgattaaga aaatcggtgt gttgacaagc ggcggtgatg cgccaggcat gaacgccgca    4200
attcgcgggg ttgttcgttc tgcgctgaca gaaggtctgg aagtaatggg tatttatgac    4260
ggctatctgg gtctgtatga agaccgtatg gtacagctag accgttacag cgtgtctgac    4320
atgatcaacc gtgcggtac gttcctcggt tctgcgcgtt cccggagtt ccgcgacgaa      4380
aacatccgcg ccgtggctat cgaaaacctg aaaaaacgtg gtatcgacgc gctggtggtt    4440
atcggcggta cggttccta catgggtgca atgcgtctga ccgaaatggg cttcccgtgc     4500
atcggtctgc cgggcactat cgacaacgac atcaaaggca ctgactacac tatcggtttc    4560
ttcactgcgc tgagcaccgt tgtagaagcg atcgaccgtc tgcgtgacac ctcttcttct    4620
caccagcgta tttccgtggt ggaagtgatg ggccgttatt gtggagatct gacgttggct    4680
gcggccattg ccgtggctg tgaatttgtt gtggttccgg aagttgaatt tagccgtgaa    4740
gacctggtaa acgaaatcaa agcgggtatc gcgaaaggta aaaacacgc gatcgtggcg    4800
attaccgaac atatgtgtga tgttgacgaa ctggcgcatt tcatcgagaa agaaaccggt    4860
cgtgaaaccc gcgcaactgt gctgggccac atccagcgcg gtggttctcc ggtgccttac    4920
gaccgtattc tggcttcccg tatgggcgct tacgctatcg atctgctgct ggcaggttac    4980
ggcggtcgtt gtgtaggtat ccagaacgaa cagctggttc accacgacat catcgacgct    5040
atcgaaaaca tgaagcgtcc gttcaaaggt actggctgg actgcgcgaa aaactgtat     5100
taaggtacca ggaggaaaaa catatgtcta agattttga tttcgtaaaa cctggcgtaa     5160
tcactggtga tgacgtacag aaagttttcc aggtagcaaa agaaaacaac ttcgcactgc    5220
cagcagtaaa ctgcgtcgt actgactcca tcaacgccgt actggaaacc gctgctaaag    5280
ttaaagcgcc ggttatcgtt cagttctcca acggtggtgc ttcctttatc gctggtaaag    5340
gcgtgaaatc tgacgttccg caggtgctg ctatcctggg cgcgatctct ggtgcgcatc     5400
acgttcacca gatggctgaa cattatgtg ttccggttat cctgcacact gaccactgcg     5460
cgaagaaact gctgccgtgg atcgacggtc tgttggacgc gggtgaaaaa cacttcgcag    5520
```

```
ctaccggtaa gccgctgttc tcttctcaca tgatcgacct gtctgaagaa tctctgcaag    5580
agaacatcga aatctgctct aaatacctgg agcgcatgtc caaaatcggc atgactctgg    5640
aaatcgaact gggttgcacc ggtggtgaag aagacggcgt ggacaacagc cacatggacg    5700
cttctgcact gtacacccag ccggaagacg ttgattacgc atacaccgaa ctgagcaaaa    5760
tcagcccgcg tttcaccatc gcagcgtcct tcggtaacgt acacggtgtt tacaagccgg    5820
gtaacgtggt tctgactccg accatcctgc gtgattctca ggaatatgtt tccaagaaac    5880
acaacctgcc gcacaacagc ctgaacttcg tattccacgg tggttccggt tctactgctc    5940
aggaaatcaa agactccgta agctacgcg tagtaaaaat gaacatcgat accgataccc    6000
agtgggcaac ctgggaaggc gttctgaact actacaaagc taacgaagcg tatctgcaag    6060
gtcagctggg taacccgaaa ggcgaagatc agccgaacaa gaaatactac gatccgcgcg    6120
tatggctgcg tgccggtcag acttcgatga tcgctcgtct ggagaaagca ttccaggaac    6180
tgaacgcgat cgacgttctg taacccggga ggaggaaaaa catatgcgac atcctttagt    6240
gatgggtaac tggaaactga acggcagccg ccacatggtt cacgagctgg tttctaacct    6300
gcgtaaagag ctggcaggtg ttgctggctg tgcggttgca atcgcaccac cggaaatgta    6360
tatcgatatg gcgaagcgcg aagctgaagg cagccacatc atgctgggtg cgcaaaacgt    6420
ggacctgaac ctgtccggcg cattcaccgg tgaaacctct gctgctatgc tgaaagacat    6480
cggcgcacag tacatcatca tcggtcactc tgaacgtcgt acttaccaca agaatctga    6540 cgaactgatc gcgaaaaaat cgcggtgct gaaagagcag ggcctgactc cggttctgtg    6600
catcggtgaa accgaagctg aaaatgaagc gggcaaaact gaagaagttt gcgcacgtca    6660
gatcgacgcg gtactgaaaa ctcagggtgc tgcggcattc gaaggtgcgg ttatcgctta    6720
cgaacctgta tgggcaatcg gtactggcaa atctgcaact ccggctcagg cacaggctgt    6780
tcacaaattc atccgtgacc acatcgctaa agttgacgct aacatcgctg aacaagtgat    6840
cattcagtac ggcggctctg taaacgcgtc taacgcagct gaactgtttg ctcagccgga    6900
tatcgacggc gcgctggttg gtggtgcttc tctgaaagct gacgccttcg cagtaatcgt    6960
taaagcagct gaagcggcta acaggcttag ctaggccg cggccgcgcg aattcgagct    7020
cggtacccgg ggatccagga ggaaaaacat atgactatca agtaggtat caacggtttt    7080 ggccgtatcg gtcgcattgt tttccgtgct gctcagaaac gttctgacat cgagatcgtt    7140
gcaatcaacg acctgttaga cgctgattac atggcataca tgctgaaata tgactccact    7200
cacggtcgtt tcgacggcac cgttgaagtg aaagacggtc atctgatcgt taacggtaaa    7260
aaaatccgtg ttaccgctga acgtgatccg gctaacctga atgggacga agttggtgtt    7320 gacgttgtcc tgaagcaac tggtctgttc ctgactgacg aaactgctcg taaacacatc    7380
accgctggtg cgaagaaagt ggttatgact ggtccgtcta agacaacac tccgatgttc    7440 gttaaaggcg ctaacttcga caaatatgct ggccaggaca tcgtttccaa cgcttcctgc    7500
accaccaact gcctggctcc gctggctaaa gttatcaacg ataacttcgg catcatcgaa    7560
ggtctgatga ccaccgttca cgctactacc gctactcaga aaccgttga tggcccgtct    7620 cacaaagact ggcgcggcgg ccgcggcgct tcccagaaca tcatcccgtc ctctaccggt    7680
gctgctaaag ctgtaggtaa agtactgcca gaactgaatg caaactgac tggtatggcg    7740 ttccgcgttc cgacccgaa cgtatctgta gttgacctga ccgttcgtct ggaaaaagct    7800
gcaacttacg agcagatcaa agctgccgtt aaagctgctg ctgaaggcga atgaaaggc    7860
```

```
gttctgggct acaccgaaga tgacgtagta tctaccgatt tcaacggcga agtttgcact    7920
tccgtgttcg atgctaaagc tggtatcgct ctgaacgaca acttcgtgaa actggtatcc    7980
tggtacgaca acgaaaccgg ttactccaac aaagttctgg acctgatcgc tcacatctcc    8040
aaataatcta gaaggaggaa aaacatatgt ctgtaattaa gatgaccgat ctggatcttg    8100
ctgggaaacg tgtattcatc cgtgcggatc tgaacgtacc agtaaaagac gggaaagtaa    8160
ccagcgacgc gcgtatccgt gcttctctgc cgaccatcga actggccctg aaacaaggcg    8220
caaaagtgat ggtaacttcc cacctgggtc gtcctaccga aggcgaatac aacgaagagt    8280
tctctctgct gccggttgtt aactacctga agacaaaact gtctaaccccg gttcgtctgg    8340
ttaaagatta cctcgacggc gttgacgttg ctgaaggtga actggttgtt ctggaaaacg    8400
ttcgcttcaa caaggcgag aagaaagacg acgaaaccct gtccaaaaaa tacgctgcac    8460
tgtgtgacgt gttcgtaatg gacgcattcg gtactgctca ccgcgcgcag gcttctactc    8520
acggtatcgg taaattcgct gacgttgcgt gcgcaggccc gctgctggca gctgaactgg    8580
acgcgctggg taaagcactg aaagaacctg ctcgcccgat ggtggctatc gttggtggtt    8640
ctaaagtatc taccaaactg accgttctgg actccctgtc taaaatcgct gaccagctga    8700
ttgttggtgg tggtatcgct aacacctta tcgcggcaca aggccacgat gtgggtaaat    8760
ccctgtacga agctgacctg gttgacgaag ctaaacgtct gctgaccacc tgcaacatcc    8820
cggttccgtc tgatgttcgc gtagcaaccg agttctctga actgcaccg gctaccctga    8880
aatctgttaa cgatgtgaaa gctgacgagc agatcctgga tatcggtgat gcttccgctc    8940
aggaactggc tgaaatcctg aagaatgcga aaaccattct gtggaacggt ccggttggcg    9000
tgttcgaatt tccgaacttc cgcaaaggta ctgaaatcgt ggctaacgct atcgcagaca    9060
gcgaagcgtt ctccatcgct ggcggcggcg acactctggc agcaatcgac ctgttcggca    9120
ttgctgacaa aatctcctac atctccactg gcggcggcgc attcctcgag ttcgtggaag    9180
gtaaagtact gcctgcggta gcaatgctcg aagaacgcgc taagaagtaa gtcgacagga    9240
ggaaaaacat atggctgtaa ctaagctggt tctggttcgt catggcgaaa gtcagtggaa    9300
caaagaaaac cgtttcaccg gttggtacga cgtggatctg tctgagaaag cgtaagcga    9360
agcaaaagca gcaggtaagc tgctgaaaga ggaaggttac agctttgact ttgcttacac    9420
ttctgtgctg aaacgcgcta tccataccct gtggaatgtg ctggacgaac tggatcaggc    9480
atggctgccc gttgagaaat cctggaaact gaacgaacgt cactacggtg cgttgcaggg    9540
tctgaacaaa gcgaaactg ctgaaaagta tggcgacgag caggtgaaac agtggcgtcg    9600
tggttttgca gtgactccgc cggaactgac taaagatgat gagcgttatc cgggtcacga    9660
tccgcgttac gcgaaactga gcgagaaaga actgccgctg acggaaagcc tggcgctgac    9720
cattgaccgc gtgatccctt actggaatga aactattctg ccgcgtatga agagcggtga    9780
gcgcgtgatc atcgctgcac acggtaactc tttacgtgcg ctggtgaaat atcttgataa    9840
catgagcgaa gaagagattc ttgagcttaa tatcccgact ggcgtgccgc tggtgtatga    9900
gttcgacgag aatttcaaac cgctgaaacg ctattatctg ggtaatgctg acgagatcgc    9960
agcgaaagca gcggcggttg caaaccaggg taaagcgaag taactgcaga ggaggaaaaa   10020
catatgtcca aaatcgtaaa aatcatcggt cgtgaaatca tcgactcccg tggtaacccg   10080
actgttgaag ccgaagtaca tctggaaggt ggtttcgtcg gtatggcagc tgctccgtca   10140
ggtgcttcta ctggttcccg tgaagctctg gaactgcgcg atggcgacaa atcccgtttc   10200
ctgggtaaag gcgtaaccaa agctgttgct gcggtaaacg gcccgatcgc tcaggcgctg   10260
```

```
attggcaaag atgctaaaga tcaggctggc attgacaaga tcatgatcga cctggacggc    10320
accgaaaaca aatccaaatt cggcgcgaac gcaatcctgg ctgtatctct ggctaacgcc    10380
aaagctgctg ctgctgcaaa aggtatgccg ctgtacgagc acatcgctga actgaacggt    10440
actccgggca aatactctat gccggttccg atgatgaaca tcatcaacgg tggtgagcac    10500
gctgacaaca acgttgatat ccaggaattt atgattcagc cggttggcgc gaaaactgtg    10560
aaagaagcca tccgcatggg ttctgaagtt ttccatcacc tggcaaaagt tctgaaagcg    10620
aaaggcatga acactgctgt tggtgacgaa ggtggctatg cgccgaacct gggttccaac    10680
gctgaagctc tggctgttat cgctgaagct gttaaagctg ctggttatga actgggcaaa    10740
gacatcactt tggcgatgga ctgcgcagct tctgagttct acaaagatgg taaatacgtt    10800
ctggctggcg aaggcaacaa agcgttcacc tctgaagagt tcactcactt cctgaagaa     10860 ctgaccaaac agtacccgat cgtttctatc gaagacggtc tggacgaatc tgactgggac    10920
ggtttcgcat accagaccaa agttctgggc gacaaaatcc agctggttgg tgacgacctg    10980
ttcgtaacca acaccaagat cctgaaagaa ggtatcgaaa aaggtatcgc taactccatc    11040
ctgatcaaat tcaaccagat cggttctctg accgaaactc tggctgcaat caagatggcg    11100
aaagatgcag gctacactgc tgttatctct caccgttctg gcgaaactga agacgctacc    11160
atcgcagacc tggctgttgg tactgctgct ggccagatca aaactggttc tatgagccgt    11220
tctgaccgtg ttgctaaata caaccagctg attcgtatcg aagaagctct gggcgaaaaa    11280
gcaccgtaca acgtcgtaa agaaatcaaa ggccaggcat aagcatgcag gaggaaaaac    11340
atatgaaaaa gaccaaaatt gtttgcacca tcggaccgaa aaccgaatct gaagagatgt    11400
tagctaaaat gctggacgct ggcatgaacg ttatgcgtct gaacttctct catggtgact    11460
atgcagaaca cggtcagcgc attcagaatc tgcgcaacgt gatgagcaaa actggtaaaa    11520
ccgccgctat cctgcttgat accaaaggtc cggaaatccg caccatgaaa ctggaaggcg    11580
gtaacgacgt ttctctgaaa gctggtcaga cctttacttt caccactgat aaatctgtta    11640
tcggcaacag cgaaatggtt gcggtaacgt atgaaggttt cactactgac ctgtctgttg    11700
gcaacaccgt actggttgac gatggtctga tcggtatgga agttaccgcc attgaaggta    11760
acaaagttat ctgtaaagtg ctgaacaacg gtgacctggg cgaaaacaaa ggtgtgaacc    11820
tgcctggcgt ttccattgct ctgccagcac tggctgaaaa agacaaacag gacctgatct    11880
ttggttgcga cagggcgta gactttgttg ctgcttcctt tattcgtaag cgttctgacg    11940
ttatcgaaat ccgtgagcac ctgaaagcgc acggcggcga aaacatccac atcatctcca    12000
aaatcgaaaa ccaggaaggc ctcaacaact tcgacgaaat cctcgaagcc tctgacggca    12060
tcatggttgc gcgtggcgac ctgggtgtag aaatcccggt agaagaagtt atcttcgccc    12120
agaagatgat gatcgaaaaa tgtatccgtg cacgtaaagt cgttatcact gcgacccaga    12180 tgctggatto catgatcaaa aacccacgcc cgactcgcgc agaagccggt gacgttgcaa    12240
acgccatcct cgacggtact gacgcagtga tgctgtctgg tgaatccgca aaaggtaaat    12300
acccgctgga agcggtttct atcatggcga ccatctgcga acgtaccgac cgcgtgatga    12360
acagccgtct cgagttcaac aatgacaacc gtaaactgcg cattaccgaa gcggtatgcc    12420
gtggtgccgt tgaaactgct gaaaaactgg atgctccgct gatcgtggtt gctactcagg    12480
gcggtaaatc tgctcgcgca gtacgtaaat acttcccgga tgccaccatc ctggcactga    12540
ccaccaacga aaaaacggct catcagttgg tactgagcaa aggcgttgtg ccgcagcttg    12600
```

```
ttaaagagat cacttctact gatgatttct accgtctggg taaagaactg gctctgcaaa    12660
gcggtctggc acacaaaggt gacgttgtag ttatggtttc tggtgcactg gttccgagcg    12720
gcactactaa caccgcatct gtacacgtcc tgtaaaagct gcggccgcg tcgtgactgg     12780
gaaaaccctg gcgactagtc ttggactcct gttgatagat ccagtaatga cctcagaact   12840
ccatctggat ttgttcagaa cgctcggttg ccgccgggcg ttttttattg gtgagaatcc   12900
aggggtcccc aataattacg atttaaattt gtgtctcaaa atctctgatg ttacattgca   12960
caagataaaa atatatcatc atgaacaata aaactgtctg cttacataaa cagtaataca   13020
aggggtgtta tgagccatat tcagcgtgaa acgagctgta gccgtccgcg tctgaacagc   13080
aacatggatg cggatctgta tggctataaa tgggcgcgtg ataacgtggg tcagagcggc   13140
gcgaccattt atcgtctgta tggcaaaccg gatgcgccgg aactgttct gaaacatggc    13200
aaaggcagcg tggcgaacga tgtgaccgat gaaatggtgc gtctgaactg gctgaccgaa   13260
tttatgccgc tgccgaccat taaacatttt attcgcaccc cggatgatgc gtggctgctg   13320
accaccgcga ttccgggcaa aaccgcgttt caggtgctgg aagaatatcc ggatagcggc   13380
gaaaacattg tggatgcgct ggccgtgttt ctgcgtcgtc tgcatagcat tccggtgtgc   13440
aactgcccgt ttaacagcga tcgtgtgttt cgtctggccc aggcgcagag ccgtatgaac   13500
aacggcctgg tggatgcgag cgattttgat gatgaacgta acggctggcc ggtggaacag   13560
gtgtggaaag aaatgcataa actgctgccg tttagcccgg atagcgtggt gacccacggc   13620
gattttagcc tggataacct gattttcgat gaaggcaaac tgattggctg cattgatgtg   13680
ggccgtgtgg gcattgcgga tcgttatcag gatctggcca ttctgtggaa ctgcctgggc   13740
gaatttagcc cgagcctgca aaaacgtctg tttcagaaat atggcattga taatccggat   13800
atgaacaaac tgcaatttca tctgatgctg gatgaatttt tctaataatt aattggaccg   13860
cggtccgcgc gttgtccttt tccgctgcat aaccctgctt cggggtcatt atagcgattt   13920
tttcggtata tccatccttt ttcgcacgat atacaggatt ttgccaaagg gttcgtgtag   13980
actttccttg gtgtatccaa cggcgtcagc cgggcaggat aggtgaagta ggcccacccg   14040
cgagcgggtg ttccttcttc actgtcccct attcgcacct ggcggtgctc aacgggaatc   14100
ctgctctgcg aggctggccg taggccggcc gcgatgcagg tggctgctga accccagcc    14160
ggaactgacc ccacaaggcc ctagcgtttg caatgcacca ggtcatcatt gacccaggcg   14220
tgttccacca ggccgctgcc tcgcaactct tcgcaggctt cgccgacctg ctcgcgccac   14280
ttcttcacgc gggtggaatc cgatccgcac atgaggcgga aggtttccag cttgagcggg   14340
tacggctccc ggtgcgagct gaaatagtcg aacatccgtc gggccgtcgg cgacagcttg   14400
cggtacttct cccatatgaa tttcgtgtag tggtcgccag caaacagcac gacgatttcc   14460
tcgtcgatca ggacctggca acgggacgtt ttcttgccac ggtccaggac gcggaagcgg   14520
tgcagcagcg acaccgattc caggtgccca acgcggtcgg acgtgaagcc catcgccgtc   14580
gcctgtaggc gcgacaggca ttcctcggcc ttcgtgtaat accggccatt gatcgaccag   14640
cccaggtcct ggcaaagctc gtagaacgtg aaggtgatcg gctcgccgat aggggtgcgc   14700
ttcgcgtact ccaacacctg ctgccacacc agttcgtcat cgtcggcccg cagctcgacg   14760
ccggtgtagg tgatcttcac gtccttgttg acgtggaaaa tgaccttgtt ttgcagcgcc   14820
tcgcgcggga ttttcttgtt gcgcgtggtg aacagggcag agcggccgt gtcgtttggc    14880
atcgctcgca tcgtgtccgg ccacggcgca atatcgaaca aggaaagctg catttccttg   14940
atctgctgct tcgtgtgttt cagcaacgcg gcctgcttgg cttcgctgac ctgttttgcc   15000
```

-continued

```
aggtcctcgc cggcggtttt tcgcttcttg gtcgtcatag ttcctcgcgt gtcgatggtc    15060
atcgacttcg ccaaacctgc cgcctcctgt tcgagacgac gcgaacgctc cacgcggcc    15120 gatggcgcgg gcagggcagg gggagccagt tgcacgctgt cgcgctcgat cttggccgta    15180
gcttgctgga ctatcgagcc gacggactgg aaggtttcgc ggggcgcacg catgacggtg    15240
cggcttgcga tggtttcggc atcctcggcg gaaaacccg cgtcgatcag ttcttgcctg    15300
tatgccttcc ggtcaaacgt ccgattcatt caccctcctt gcgggattgc ccggaatta    15360 attcccgga tcgatccgtc gatcttgatc ccctgcgcca tcagatcctt ggcggcaaga    15420
aagccatcca gtttactttg cagggcttcc aaccttacc agagggcgcc ccagctggca    15480
attccggttc gcttgctgtc cataaaaccg cccagtctag ctatcgccat gtaagcccac    15540
tgcaagctac ctgctttctc tttgcgcttg cgtttcct tgtccagata gcccagtagc    15600
tgacattcat ccggggtcag caccgttct gcggactggc tttctacgtg gctgccattt    15660 ttgggtgag gccgttcgcg gccgagggc gcagccctg gggggatggg aggcccgcgt    15720
tagcgggccg ggagggttcg agaaggggg gcacccct tcggcgtgcg cggtcacgcg    15780
cacagggcgc agccctggtt aaaaacaagg tttataaata ttggtttaaa agcaggttaa    15840
aagacaggtt agcggtggcc gaaaaacggg cggaaccct tgcaaatgct ggattttctg    15900
cctgtggaca gccctcaaa tgtcaatagg tgcgcccctc atctgtcagc actctgcccc    15960
tcaagtgtca aggatcgcgc ccctcatctg tcagtagtcg cgccctcaa gtgtcaatac    16020 cgcagggcac ttatcccag gcttgtccac atcatctgtg ggaaactcgc gtaaaatcag    16080
gcgttttcgc cgatttgcga ggctggccag ctccacgtcg ccggccgaaa tcgagcctgc    16140
ccctcatctg tcaacgccgc gccgggtgag tcggccctc aagtgtcaac gtccgcccct    16200
catctgtcag tgagggccaa gttttccgcg aggtatccac aacgccggcg gccctacatg    16260
gctctgctgt agtgagtggg ttgcgctccg gcagcggtcc tgatcccccg cagaaaaaaa    16320
ggatctcaag aagatccttt gatcttttct acggcgcgcc cagctgtcta gggcggcgga    16380
tttgtcctac tcaggagagc gttcaccgac aaacaacaga taaaacgaaa ggcccagtct    16440
ttcgactgag cctttcgttt tatttgatgc ct                                 16472
```

MODIFIED CELL

CROSS-REFERENCE TO RELATED APPLICATIONS

This application is the Continuation-in-Part of National Stage of International Application No. PCT/GB2020/052690, filed Oct. 23, 2020, which claims priority to GB 1915526.6, filed Oct. 25, 2019, which are entirely incorporated herein by reference.

SEQUENCE LISTING

This application contains a sequence listing filed in electronic form as an ASCII.txt file entitled "Sequence listing JDM102470P_USCIP_ST25.txt", created on Tuesday, Apr. 26, 2022 and having a size of 42 kb. The content of the sequence listing is incorporated herein in its entirety.

The present invention relates to a method of producing a chromosome-free bacterial cell (SimCell), their use, and associated compositions, products and methods.

Synthetic biology involves the manipulation and assembly of biological materials such as nucleic acids, genes, and proteins to create new biological components or systems. These can include artificial enzymes, new genetic circuits and metabolic pathways with behaviour that can be predicted by modelling in silico. However, there is conflict of interest between a naturally occurring cell and synthetic biology. The purpose of the cell is to survive, driven by adaptation and reproduction and using a full complement of biological processes, pathways and safeguards to balance all aspects of the effects its environment, in order to ultimately pass on its genes to progeny. Synthetic biology on the other hand concerns the exploitation of biological processes and organisms to perform specific functions or tasks of interest at the highest level of efficiency. This inherent conflict results in cumbersome complexity and variability of cellular behaviour which in turn can be detrimental to the performance of synthetic gene-circuits, unpredictable gene expression due to unwanted interference from native gene networks, and potential defensive disruption from transposable elements universally present in most organisms.

One endeavour of synthetic biology is to build a cell from scratch, the so called bottom-up approach. One approach to achieve this is to create protocells by self-assembly of chemically synthesised lipid bilayer membranes and essential biomolecules (e.g. nucleic acids and enzymes).

Another approach is to create a chromosome-free chassis known as "SimCells", for example by exploiting aberrant division of existing cells, and introducing designed gene circuits or an artificial chromosome or plasmid (Hutchison et al., 2016, Science, 351). Such an approach allows the reprogramming of existing organisms, replacing the native chromosomes whilst maintaining pre-existing cellular machineries (Rampley et al., 2017, Scientific. Rep., 7). One such technology to reprogram existing cells is genome transplantation; however this is extremely inefficient, with at best only 1 in 150,000 target cells being successfully transplanted, whilst transplanting a genome between different bacterial strains reduces efficiency even further (Lartigue et al., 2007, Science, 317, 632-638). Another approach is to produce chromosome-free cells. One technique used to attempt to achieve this is by generating minicells, whereby ΔminC/minD mutants can generate chromosome-free minicells (Rampley et al., 2017, Scientific. Rep., 7). However, some bacteria lack the minC/minD genes (e.g. *Rhodobacter sphaeroides*), so this is not a universally applicable method, and the knockout of specific genes on the genome could be troublesome. Further, these cells have deficiencies, such as poor longevity.

There is thus a need to develop an alternative or improved method to produce chromosome-free (non-replicative) cells which remain metabolically active and have greater stability, for example to perform biological tasks of interest.

According to a first aspect, the invention provides a method of producing a chromosome-free bacterial cell having surface-displayed nanobodies, comprising:
  i) culturing a bacterial cell that is transformed with recombinant nucleic acid for expression of a fusion protein comprising or consisting of a nanobody and an outer-membrane anchor polypeptide;
  ii) degrading native chromosomal DNA in the bacterial cell to provide a chromosome-free bacterial cell by expressing an endonuclease in the bacterial cell that is capable of recognition and double-stranded cutting of the native chromosomal DNA, wherein the expression of the endonuclease is under control of an inducible or repressible promoter; and
  iii) transforming the chromosome-free bacterial cell with recombinant nucleic acid encoding enzymes of one or more biochemical energy pathways, or parts thereof, which provide the chromosome-free bacterial cell with energy.

The invention advantageously provides a new approach to produce and use engineered chromosome-free bacteria to target cells, such as cancer cells. Alternatively, the engineered chromosome-free bacteria can be used to target viral particles, such as coronavirus. It has been successfully demonstrated that chromosome-free bacteria specifically target colorectal cancer cells without cross reactivity with other cells and can target coronavirus. The highly specific interactions through nanobodies produced by the engineered chromosome-free bacteria can be exploited for cancer detection, treatment, immunotherapy and assisted drug delivery. Further advantageously, expression of the surface-displayed nanobody and subsequent cross-linking with the target antigen allows for a biosensing system that does not require active production of signal protein such as GFP or Lux protein. Instead, the surface-displayed nanobody allows the detection of a target through the physical binding between the engineered bacteria (minicell/SimCell) and target analyte (i.e. a biological agglutination test).

According to another aspect, the invention provides a method of producing a chromosome-free bacterial cell, comprising:
  i) degrading native chromosomal DNA in a bacterial cell by expressing an endonuclease in the bacterial cell that is capable of recognition and double-stranded cutting of the native chromosomal DNA, wherein the expression of the endonuclease is under control of an inducible or repressible promoter; and
  ii) transforming the bacterial cell with recombinant nucleic acid encoding enzymes of one or more biochemical energy pathways, or parts thereof, which provide the chromosome-free bacterial cell with energy.

Advantageously, the invention provides a novel and broadly applicable method to create chromosome-free and reprogrammable bacterial cell, herein termed a "SimCell". The SimCell produced according to the method of the invention advantageously has a significant longevity and stability, for example as compared to other minicells previously described. For example the SimCell maintains its core functions such as transcription and translation, and can be functional for 10 continuous days and can be preserved for at least 5 months. The resulting SimCell comprises an intact cell membrane with its associated proteins and the full molecular complement in the cytoplasm, to enable the functionality of cellular machinery, and which has its chromosomal DNA degraded. Such a SimCell is biochemically active and modifiable, for example for introduction of recombinant DNA encoding a non-endogenous genome or even a core genetic operating system, enabling the cells to express artificial genes or mini-genomes and to perform desired functions. The resulting chromosome-free cells may be used to produce molecules of interest or perform specific biochemical energy pathways of interest, for example to produce, degrade or metabolise chemicals and biochemicals. Such cells would also allow the delivery of therapeutics to a target in vivo (Vickers et al., 2010, Nat. Chem. Biol., 875-877), amongst other applications. Further, these cells are able to dedicate most of their energy and resources to the designated function of the recombinant DNA without interference from undesirable endogenous pathways and networks encoded by the endogenous chromosomal DNA.

The Endonuclease

The endonuclease for degrading the chromosomal DNA may comprise a homing endonuclease. The endonuclease for degrading the chromosomal DNA may recognise and make double-stranded breaks (DSBs) in at least 1, 2, 3, 4, 5, 6 or 7 sites of the bacterial cell's chromosomal DNA. In one embodiment, the endonuclease may recognise a 10-bp, or more, recognition sequence. In one embodiment, the endonuclease may recognise a 15-bp, or more, recognition sequence. In another embodiment, the endonuclease may recognise a 20-bp, or more, recognition sequence. In another embodiment, the endonuclease may recognise a 26-bp, or more, recognition sequence. In one embodiment, the endonuclease may recognise a sequence that has a probability of being present in 1 in $4.5 \times 10^{15}$, or more, of a genetic sequence, such as a gene, gene-circuit or mini-genome.

The endonuclease for degrading the chromosomal DNA may recognise and cut a sequence present in 23S bacterial ribosomal RNA encoding gene (rrl). In one embodiment, the endonuclease for degrading the chromosomal DNA recognises the sequence 5'-TAAC-TATAACGGTCCTAAGGTAGCGA-3' (SEQ ID NO: 1), or a variant thereof consisting of 1, 2, 3, 4, or 5 nucleotide substitutions, additions or deletions of said sequence. In one embodiment, the endonuclease for degrading the chromosomal DNA is I-CeuI, or a homologue thereof. The I-CeuI may be a *Chlamydomonas* spp. I-CeuI. In one embodiment, the I-CeuI may comprise the amino acid sequence of CAA78934.1. In one embodiment, the I-CeuI may comprise the amino acid sequence of SEQ ID NO: 35, or variants thereof. In one embodiment, the I-CeuI may be encoded by a sequence of SEQ ID NO: 36, or variants thereof.

The skilled person will recognise that nucleic acid sequences encoding the endonuclease for degrading the chromosomal DNA, such as I-CeuI, may be codon-optimized for expression in a bacterial cell species, such as *Ralstonia* spp.

The endonuclease, such as I-CeuI, may comprise a modified/engineered (e.g. mutated) form of a wild-type endonuclease. The modification may comprise one or more mutations which enables the endonuclease to recognise and cut at different sequences relative to wild-type and/or have different activity to wild-type. The mutation may be in the active site responsible for recognition of the nucleic acid sequence. Advantageously, I-CeuI allows the degradation of most bacterial chromosomes as its activity creates double strand breaks in the 23S bacterial ribosomal RNA (rRNA) encoding-gene (rrl).

The endonuclease may be encoded on a nucleic acid, and the method may comprise the transformation of the bacterial cell with the nucleic acid encoding the endonuclease. In one embodiment, the endonuclease is encoded on a plasmid. Therefore, the method may comprise the transformation of the bacterial cell with a plasmid encoding the endonuclease.

Expression Control of the Endonuclease

Expression of the endonuclease, such as I-CeuI, may be under the control of an inducible promoter or repressible promoter. In one embodiment, the expression of the endonuclease, such as I-CeuI, may be under the control of a repressible-promoter. Preferably the expression of the endonuclease, such as I-CeuI, is under tight regulation, in which there is no or an undetectable level of basal expression of the endonuclease in the absence of induction or de-repression of the promoter.

The promoter for the endonuclease, such as I-CeuI, may be under the control of the Tetracycline repressor (TetR) gene. In an embodiment wherein the bacterial cell is *E. coli*, the promoter for the endonuclease, such as I-CeuI, may be under the control of the Tetracycline repressor gene (TetR) gene. The expression of the endonuclease, such as I-CeuI, may be induced by the provision of anyhydrotetracycline.

The promoter for the endonuclease, such as I-CeuI, may be under the control of EilR. The repressible-promoter may comprise an EilR binding site. In one embodiment, the repressible-promoter comprises the 'Jungle Express' (JEx) repressor system, for example as described in Ruegg et al. (Nature Communications volume 9, Article number: 3617 (2018)), which is herein incorporated by reference. A repressible-promoter comprising an EilR binding site, such as JEx, may be used in any bacterial cell. In another embodiment, a repressible-promoter comprising an EilR binding site, such as JEx, may be used in *Pseudomonas* spp. (e.g. *Pseudomonas putida*) and/or *Ralstonia* spp. (e.g. *Ralstonia eutropha*). In another embodiment, a repressible-promoter comprising an EilR binding site, such as JEx, may be used in *Escherichia* spp., such as *E. coli*.

Expressing the endonuclease in the bacterial cell may comprise exposing the bacterial cell to an inducer molecule. For example, where the promoter is under control of TetR, expression of the endonuclease, such as I-CeuI, may be induced by the provision of anyhydrotetracycline (ATc) as an inducer. In another example, where the promoter is under control of EilR, expression of the endonuclease, such as I-CeuI, may be induced by the provision of an EilR-binding molecule as an inducer. The EilR-binding molecule (i.e. inducer) may comprise a dye-molecule that is capable of binding to and antagonising EilR, such as crystal violet. The EilR-binding molecule (i.e. inducer) may comprise any one of crystal violet, malachite green, tetracycline and imidazolium-based ionic liquids such as imidazolium or pyridinium; or combinations thereof.

The creation of multiple DSBs is lethal to bacterial cells, therefore a strain encoding an endonuclease, such as I-CeuI, that recognises and cuts the cell's chromosomal DNA, cannot survive unless the expression of the endonuclease is under control. Therefore, the transformation and selection of bacterial cell transformants encoding the endonuclease (e.g. to clone/engineer a plasmid encoding the endonuclease, and/or to introduce a plasmid encoding the endonuclease for subsequent SimCell creation) requires the expression of the endonuclease, such as I-CeuI, to be controlled. Advantageously, the tight regulation of the expression of the endonuclease ensures that the cellular defences of various bacteria that may inactivate the SimCell-forming machinery are avoided. Such defences include inactivation by transposable elements or other mutations (base pair change, deletions) made by the cell to inactivate the endonuclease gene, such as the I-CeuI gene, as discussed in Fan et al. (2019. ACS Synthetic Biology 8:2141-2151), which is incorporated herein by reference. Without being bound by theory, it is understood that if the endonuclease is present in the cell, even at low levels, the defence mechanism can be triggered and the gene might be inactivated. By having tight control, the cell will not be alerted that it is hosting something toxic and so the integrity of the gene will be preserved.

Providing an Encoded Endonuclease for Transformation of the Bacterial Cell

The method may comprise the provision of the endonuclease encoded on a nucleic acid for transformation of the bacterial cell. The method may comprise the step of providing nucleic acid encoding the endonuclease by recombining the sequence encoding the endonuclease gene into the nucleic acid for transformation of the bacterial cell. The sequence encoding the endonuclease gene may be a PCR product, or a product of an excision from another nucleic acid, such as a cloning plasmid. Therefore, the sequence encoding the endonuclease gene may be generated by PCR from a donor nucleic acid template, or by excision from a donor nucleic acid, such as a cloning plasmid.

The sequence encoding the endonuclease gene for recombining into the nucleic acid for transformation of the bacterial cell may additionally encode the promoter for expression, such as the repressible-promoter or inducible promoter described herein. Alternatively, the promoter for expression, such as the repressible-promoter or inducible promoter described herein, may be provided in the nucleic acid for transformation of the bacterial cell (i.e. the endonuclease gene is recombined into a nucleic acid that carries the appropriate promoter for expression of the endonuclease gene). The skilled person will recognise that the promoter for expression of the endonuclease gene should be operably linked to the endonuclease gene in order to effect expression of the endonuclease (which may also be dependent on inducement or de-repression).

Endonuclease Control

For provision of the sequence encoding the endonuclease gene, for example as a PCR product using a donor template, or a product of an excision from a donor nucleic acid, such as a cloning plasmid, the donor nucleic acid may encode the sequence of the endonuclease gene. The donor nucleic acid may encode the sequence of the endonuclease gene in a form that cannot be expressed. For example, the endonuclease gene may be promoterless, or at least not under the control of a functional promoter. Additionally or alternatively, the expression of the endonuclease gene may be prevented by a secondary structure in the donor nucleic acid, such as a hairpin loop. Such a secondary structure (e.g. a hairpin loop) may be provided when a promoter is provided with the endonuclease gene in the donor nucleic acid. The hairpin loop may be provided by a reverse complementary sequence in the donor nucleic acid. The reverse complementary sequence in the donor nucleic acid may be reverse complementary to a sequence of the endonuclease gene and/or any associated promoter thereof, or to a sequence that is sufficiently close to the endonuclease gene and/or any associated promoter thereof, in order to prevent expression of the endonuclease gene. The hairpin loop may be arranged to form a hairpin loop in the endonuclease gene and/or any associated promoter thereof. In one embodiment, the secondary structure, such as the hairpin loop, is arranged to form a hairpin loop in the promoter of the endonuclease gene.

In one embodiment, expressing an endonuclease in the bacterial cell comprises the steps of:
i) providing a donor nucleic acid encoding the endonuclease gene, wherein the endonuclease gene is promoterless; or wherein the endonuclease gene is operably linked to a promoter, and the donor nucleic acid is further arranged to form a hairpin loop to prevent expression of the endonuclease;
ii) using the donor nucleic acid as a template to form PCR product encoding the endonuclease, and inserting the PCR product into a nucleic acid for transformation of the bacterial cell, wherein the endonuclease gene is inserted into a position such that it is under control of the inducible or repressible promoter; or
or recombining the endonuclease gene encoded on the donor nucleic acid with a nucleic acid for transformation of the bacterial cell, wherein the endonuclease gene is recombined into a position such that it is under control of the inducible or repressible promoter.

The skilled person will recognise that a secondary structure, such as a hairpin loop, can be created in a nucleic acid sequence by design of the sequence. A hairpin loop in double helix plasmids will be stable (i.e. hairpin loop formation is unlikely to occur). However, a hairpin loop may be formed in single stranded DNA or RNA, such that when transcription occurs, the hairpin loop can form to block further transcription or translation.

The reverse complementary sequence may be at least 6, 8, 10, 12 or 15 nucleotides in length. In another embodiment, the reverse complementary sequence may be about 10-1000 nucleotides in length. In another embodiment, the reverse complementary sequence may be about 10-500 nucleotides in length. In another embodiment, the reverse complementary sequence may be about 10-100 nucleotides in length. In another embodiment, the reverse complementary sequence may be about 10-50 nucleotides in length. In another embodiment, the reverse complementary sequence may be about 10-20 nucleotides in length. In another embodiment, the reverse complementary sequence may be about 15 nucleotides in length. The reverse complementary sequence may be sufficiently long to be specific in the location of the secondary structure formation.

The secondary structure, such as the hairpin loop, may disrupt the expression of the endonuclease for example by ensuring that the sequence of the endonuclease gene and/or promoter is not accessible to mRNA polymerase or other enzymes or co-factors that may be required for transcription. Advantageously, ensuring the endonuclease cannot be expressed from the donor nucleic acid, for example by a hairpin loop, can ensure that the endonuclease is not detrimental, such as fatal, to a cell carrying or cloning the donor nucleic acid. The donor copy of the endonuclease gene may not be expressed in the template in order to maintain its integrity and allow long-term storage.

The nucleic acid, such as the plasmid, encoding the endonuclease may also encode a selection marker. The selection marker may comprise an antibiotic resistance gene to enable the identification of cells successfully transformed with the nucleic acid, such as the plasmid.

Energy Pathway

In an embodiment, the bacterial cell is transformed with nucleic acid encoding enzymes of one or more biochemical energy pathways, or parts thereof, before the induction of expression of the endonuclease. In an alternative embodiment, the bacterial cell is transformed with nucleic acid encoding enzymes of one or more biochemical energy pathways, or parts thereof, after the induction of expression of the endonuclease, for example after induction of the expression is stopped.

The biochemical energy pathway may be involved in, and capable of, the production of ATP and NAD(H), for example by converting glucose to pyruvate. Additionally, the biochemical energy pathway may be involved in, and capable of, the production of one or more molecules of NADPH, $H^+$, GTP, and $FADH_2$. In one embodiment, the biochemical energy pathway is the glycolysis pathway. The enzymes of the glycolysis pathway may be encoded in the glycolysis pathway encoding-sequence identified herein in SEQ ID NO: 38, or a variant thereof. In another embodiment, the biochemical energy pathway is the pentose phosphate pathway. Alternatively, the biochemical energy pathway comprise a combination of the glycolysis and pentose phosphate pathways, or parts thereof. In one embodiment, at least part of the pentose phosphate pathway up to and including generation of Ru5P is provided.

The biochemical energy pathway may be an aerobic or anaerobic pathway. The biochemical energy pathway may be any pathway from a chemoautotroph or heterotroph that is capable of the production of ATP and NADH from sources of carbon, such as $CO_2$, carbohydrate and/or monosaccharides.

Therefore, in one embodiment, the bacterial cell is transformed with nucleic acid encoding one or more, or all, enzymes of the glycolysis pathway. In one embodiment, the bacterial cell is transformed with nucleic acid encoding the upper and/or lower catabolic pathways of glycolysis. The complete glycolysis pathway may be provided. The biochemical energy pathway may be provided by transformation of bacterial cell with nucleic acid comprising or consisting of the sequence of SEQ ID NO: 38.

Reference to a "part thereof" of a biochemical energy pathway is understood to mean that at least one, two, three, four, or more, enzymes that are critical for a biochemical energy pathway may be encoded or expressed. The skilled person will be familiar with biochemical energy pathways in bacteria, such as glycolysis, and the necessary components required for ATP and NAD(H) generation. Where a biochemical energy pathway, such as the glycolysis pathway, may classically comprise a number of enzymes, it will be recognised that some enzymes may not be critical for ATP and NAD(H) generation, or they may be exchanged with one or more alternative enzymes. Therefore, a biochemical energy pathway may be made up of any combination of enzymes arranged to generate at least ATP and NAD(H) from a carbon source. The enzymes in a biochemical energy pathway may also comprise membrane transporter proteins. Additionally or alternatively, the biochemical energy pathway may comprise the TCA cycle, a fermentation pathway, a respiration pathway, or parts thereof, or combinations thereof.

In one embodiment, the bacterial cell is transformed with nucleic acid encoding glyceraldehyde-3-phosphate dehydrogenase and/or phosphoglycerate kinase. The skilled person will recognise that glyceraldehyde-3-phosphate dehydrogenase and phosphoglycerate kinase are required to make NADH and ATP, respectively. Not every enzyme may be required where the pathway may be supplemented with one or more biochemical energy pathway intermediates for the enzymes of the bacterial cell to use.

In an embodiment, the bacterial cell may be provided with nucleic acid encoding one, two, three, four, five, six, seven, eight, nine or ten biochemical energy pathways, or parts thereof, or hybrid combinations thereof.

The enzymes of the one or more biochemical energy pathways may be heterologous to the bacterial cell. In one embodiment, the enzymes are recombinant. The nucleic acid encoding enzymes of one or more biochemical energy pathways, or parts thereof, may be plasmid. In one embodiment, the enzymes of the entire biochemical energy pathway are encoded on a single nucleic acid, such as a plasmid. In another embodiment, the enzymes of the entire biochemical energy pathway are encoded on two or more nucleic acids, such as two or more plasmids. The upper and lower catabolic pathways of glycolysis may be encoded on a single nucleic acid, which may be a plasmid. The upper and lower catabolic pathways of glycolysis may be encoded on separate nucleic acids, which may be plasmids. Where two or more nucleic acids are provided for encoding the enzymes of the one or more biochemical energy pathways, or parts thereof, the method may comprise transforming the bacterial cell with the two or more nucleic acids.

The expression of the biochemical energy pathway(s) may be regulated. For example, the expression of the biochemical energy pathway(s) may be under the control of an inducible or repressible promoter. In another embodiment, the expression of the biochemical energy pathway(s) may be constitutive. In particular, a constitutive promoter may be encoded for promoting the expression of the components/enzymes or operon of the biochemical energy pathway(s). The expression of the entire biochemical energy pathway may be under control of a single promoter.

In an embodiment, the expression of one or more biochemical energy pathways, or parts thereof is under the control of an inducible promoter, but may not be induced. In particular, the inducible promoter may have a "leaky" basal level of expression, which may be sufficient to provide energy to the SimCell.

In one embodiment, expression of the one or more biochemical energy pathways, or parts thereof, is under the control of the lac repressor (lacI). The LacI repressor may be used with a $P_{trc}$ promoter. Expression of a promoter under lacI repression may be induced by the provision of IPTG (isopropyl β-D-1-thiogalactopyranoside). However, in one embodiment, the expression of the one or more biochemical energy pathways, or parts thereof, is not induced by IPTG, and the SimCell relies on the non-induced (i.e. leaky) basal expression. The skilled person will recognise that the LacI repressor allows leaky expression due to poor binding kinetics. Equivalent inducible or repressible promoter systems may be used if they allow a basal (leaky) level of expression in the absence of an inducer. An inducible or repressible promoter systems may be used if it allows a basal level of expression in the absence of an inducer, and the basal level of expression is at least a 10-fold lower relative to induced expression in the presence of an inducer.

In another embodiment, expression of the one or more biochemical energy pathways, or parts thereof, is under the control of pBAD (the arabinose promoter). In another embodiment, the nucleic acid encoding one or more enzymes of the biochemical energy pathways, or parts thereof, comprises one or more sequences encoding pBAD.

Advantageously basal expression (so called "leaky" expression) of the one or more biochemical energy pathways, or parts thereof, can be relied upon for the provision of energy to the SimCell, without overloading the SimCell and inducing premature death, or lack of stability or longevity. Such "leaky" expression may be defined as the detection of expression of the molecule encoded by the nucleic acid in the absence of the inducer, and in which the expression detected is higher than a strain (such as E. coli K-12) without the nucleic acid.

The Simcell may be further augmented by the reintroduction of one or more other energy generating pathways (e.g. TCA, pentose phosphate, fermentation, respiration, light-energy pathways (e.g. utilising proteorhodopsin), DNA repairing pathways, ribosome regeneration pathways and nutrient supplementation, for example. In particular, the bacterial cell may be transformed with nucleic acid encoding enzymes of one or more other energy generating pathways, DNA repairing pathways, ribosome regeneration pathways. The simcell may be transformed with nucleic acid to express photoactive retinylidene proteins. Nutrient supplementation into the media may also be provided to improve the longevity/stability of the simcells. The media may be supplemented with one or more of nucleotides, amino acids, and cofactors.

Product for Expression

In one embodiment, the bacterial cell or the resulting chromosome-free bacterial cell (SimCell), is transformed with nucleic acid encoding a product for expression. The product may comprise a polypeptide, such as a peptide or a protein. In another embodiment, the product may comprise a nucleic acid, such as RNA or DNA. The RNA may comprise mRNA, miRNA, siRNA, tRNA or rRNA. The polypeptide may be a biologically active agent (e.g. a biologic). The polypeptide may be an enzyme. The polypeptide may be a drug, or pro-drug. Both polypeptides and nucleic acid products may be encoded. The product for expression may comprise an antibody, or antibody fragment, or mimetic thereof. The product for expression may comprise an immunogenic peptide or polypeptide, such as a vaccine for mammals. The product for expression may comprise a biological drug, such as a biological drug for cancer therapy or prevention. The product for expression may comprise insulin, for example for diabetes therapy.

The product for expression may comprise an enzyme catalyst that is capable of producing a biochemical, such as a therapeutic drug. A plurality of enzyme catalysts may be provided for expression such that a multi-step reaction can be provided to produce a biochemical. The therapeutic drug may comprise a cytotoxic drug, such as catechol. The product for expression may comprise SalA and/or SalR. The skilled person will recognise that when salicylic acid (Aspirin) is present it combines with SalR to yield an active form SalR*, which then initiates transcription of salA and salR (positive feedback). Then SalA or salicylate hydroxylase converts salicylic acid to catechol in the presence of NADH.

Additionally or alternatively, salicylate hydroxylase (salA) may be provided to produce chlorocatechol or hydroxyanthranilate.

In one embodiment, the bacterial cell or the resulting chromosome-free bacterial cell (SimCell), is transformed with nucleic acid encoding a product for replication, such as cloning. For example, the chromosome-free bacterial cell (SimCell) may be used for the production of plasmids, or viral nucleic acid, such as viral vectors. For example, the chromosome-free bacterial cell (SimCell) may be used for the production of DNA-vaccines or nucleic acid for gene therapy. In one embodiment, the bacterial cell or the resulting chromosome-free bacterial cell (SimCell), is transformed with nucleic acid encoding a virus particle (or parts thereof) and accompanying viral nucleic acid (or parts thereof). The virus may be a virus that is a eukaryote-based virus, such as a mammalian virus. The virus may be an attenuated or non-replicating virus. In one embodiment the product for expression may comprise a HPV vaccine, such as HPV polypeptides and/or nucleic acid encoding HPV genes. In another embodiment, the product for expression may comprise a phage, or parts thereof.

The product for expression may comprise a membrane polypeptide (i.e. a polypeptide comprising a hydrophobic domain arranged to be anchored in a membrane bilayer). The membrane polypeptide may be used for targeting the chromosome-free bacterial cell (SimCell), for example to certain tissues or cells in the body. Additionally or alternatively, the membrane polypeptide may be used as a surface marker to be able to locate the chromosome-free bacterial cell (SimCell).

Two or more products for expression or replication may be encoded on the nucleic acid or encoded on a plurality of nucleic acids for expression in the chromosome-free bacterial cell (SimCell). For example, a membrane polypeptide may be encoded and expressed in the SimCell for targeting the SimCell to specific cells or tissues, together with encoding and expressing a biologically active polypeptide.

The expression of the product for expression may be regulated. For example, the expression of the product for expression may be under the control of an inducible or repressible promoter. For example, the expression of the product for expression may under the control of the MphR regulation system that is inducible by erythromycin. In another embodiment, the expression of the product for expression may be constitutive. In particular, a constitutive promoter may be encoded for promoting the expression of the product for expression. In one embodiment, the expression of the product for expression may be controlled by a strong promoter, such as a viral promoter. The promoter may comprise CMV promoter, SV40. In one embodiment, the expression of the product for expression may be controlled by any of the promoters listed in Table 1, which are also described in Davis et al. (Nucleic Acids Research, 2011, Vol. 39, No. 3 1131-1141), which is incorporated herein by reference. In one embodiment, the promoter may comprise prod as described herein.

TABLE 1

| Promoter | -35 hexamer | -10 hexamer |
|----------|-------------|-------------|
| proA | tttacg | taggct |
| proB | tttacg | taatat |
| proC | tttacg | tatgat |
| proD | tttacg | tataat |
| pro1 | tttacg | gtatct |
| pro2 | gcggtg | tataat |
| pro3 | tttacg | gaggat |
| pro4 | tttacg | gatgat |
| pro5 | tttacg | taggat |

TABLE 1-continued

| Promoter | -35 hexamer | -10 hexamer |
|---|---|---|
| pro6 | tttacg | taaaat |
| j23113 | ctgatg | gattat |
| j23150 | tttacg | tattat |
| j23151 | ttgatg | acaatg |
| j23101 | tttaca | tattat |

In one embodiment, the product for expression comprises or consists of a nanobody, such as a surface-displayed nanobody. In one embodiment, the product for expression comprises or consists of a fusion protein comprising a surface-displayed nanobody and outer-membrane anchor protein.

The skilled person will recognise that a nanobody may also be known as "a single-domain antibody (sdAb)", which is an antibody fragment comprising or consisting of a single monomeric variable antibody domain. Like a whole antibody, it is able to bind selectively to a specific antigen, such as a cancer antigen.

The surface-displayed nanobody may be capable of binding to a specific peptide, polypeptide, glycoprotein or glycolipid, for example on a cell surface. The surface-displayed nanobody may have specific affinity for a peptide, polypeptide, glycoprotein or glycolipid, for example on a cell surface. The surface-displayed nanobody may be targeted to bind to a non-cell target, such as a virus particle, or sub-unit thereof.

The surface-displayed nanobody may be targeted to bind to a coronavirus, such as SARS-CoV-2. In a preferred embodiment, the surface-displayed nanobody may be targeted to bind to the spike protein receptor-binding domain (RBD) of SARS-CoV-2.

A cell to be targeted (also referred to herein as "the cell-target"), may be a prokaryote or eukaryote cell. The cell-target may be a cancer cell. In one embodiment, the cell to be targeted is a parasitic cell or cell of a parasitic organism. The cell may be a virus-infected cell.

The surface-displayed nanobody may be a cancer-cell targeting nanobody. In one embodiment, the surface-displayed nanobody is capable of binding to a cancer antigen on a cancer cell surface. The surface-displayed nanobody may have specific affinity for a cancer antigen on a cancer cell surface. The cancer antigen may be a peptide, polypeptide, glycoprotein or glycolipid, that is present on the surface of a cancer cell. The cancer antigen may be exclusively found on the cancer cell relative to an equivalent non-cancerous cell, or may be present at a higher level on the cancer cell relative to an equivalent non-cancerous cell. The cancer antigen may have a different structure relative to an equivalent molecule on a non-cancerous cell. In one embodiment, the cancer antigen is a colorectal cancer antigen.

The cancer antigen that is specifically bound by the surface-displayed nanobody may selected from carcinoembryonic antigen (CEA), CD19, CD20, HER2, PD-L1, alphafetoprotein, CA-125, and epithelial tumour antigen.

In one embodiment, the cancer antigen that is specifically bound by the surface-displayed nanobody is carcinoembryonic antigen.

The surface-displayed nanobody may comprise or consist of C17 or C43 described herein. In one embodiment, the surface-displayed nanobody comprises or consist of the sequence:

(C17)
(SEQ ID NO. 2)
EVQLVESGGGFVQAGESLTLSCTSSTLTFTPYRMAWYRQAPGKQRDLVA

DISSGDGRTTNYADFAKGRFTISRDNIKNTVFLRMTNLKPEDTAVYYCN

TFVSFVGIARSWGQGTQVTVSS,
or a variant thereof.

In another embodiment, the surface-displayed nanobody comprises or consist of the sequence:

(C43)
(SEQ ID NO. 3)
EVQLVESGGGLVQAGGSLTLSCTSSTLTFTPYRMGWYRQTPGKQRDLVA

DISPGDGSTKNYAGFAQGRFTISRDNIKNTVYLQMNDLKPEDTAVYYCN

TYVAFVGRARTWGQGTQVTVSS,
or a variant thereof.

The surface-displayed nanobody may comprise or consist of TY1, NB6, NIH112 or VE described herein. The surface-displayed nanobody may comprise or consist of a nanobody that competes for binding with any of the nanobodies TY1, NB6, NIH112 and VE. The surface-displayed nanobody may comprise or consist of a nanobody that binds to the same epitope as any of the nanobodies TY1, NB6, NIH112 and VE. The surface-displayed nanobody may comprise or consist of a nanobody that comprises the CDRs of any of the nanobodies TY1, NB6, NIH112 and VE. In another embodiment, the surface-displayed nanobody comprises or consist of the sequence:

(TY1)
(SEQ ID NO. 4)
QVQLVETGGGLVQPGGSLRLSCAASGFTFSSVYMNWVRQAPGKGPEWVS

RISPNSGNIGYTDSVKGRFTISRDNAKNTLYLQMNNLKPEDTALYYCAI

GLNLSSSSVRGQGTQVTVSS,
or a variant thereof.

(NB6)
(SEQ ID NO. 5)
QVQLVESGGGLVQAGGSLRLSCAASGYIFGRNAMGWYRQAPGKERELVA

GITRRGSITYYADSVKGRFTISRDNAKNTVYLQMNSLKPEDTAVYYCAA

DPASPAYGDYWGQGTQVTVSSHHHHHH,
or a variant thereof.

(NIH-112)
(SEQ ID NO. 6)
DVQLQESGGGLVQPGGSLRLSCAASGLTLDYYAIGWFRQAPGKEREGVS

CISSSDGSTYYADSVKGRFTTSRDNAKNTVYLQMNSLKPEDTAVYYCAA

VPSTYYSGTYYYTCHPGGMDYWGKGTQVTVSS,
or a variant thereof.

(VE)
(SEQ ID NO. 7)
QVQLVETGGGLVQPGGSLRLSCAASGFTFSSYAMGWARQVPGKGLEWVS

YIYSDGSTEYQDSVKGRFTISRDNAKSTVYLQMNSLKPEDTAVYYCATE

GSLGGWGRDFGSWGQGTQVTVSSG,
or a variant thereof.

The variant may be a functional variant having the same or similar binding function. The variant may be capable of specifically binding to the same target as the surface-displayed nanobody described herein. The variant may have at least 90%, 95%, 98% or 99% sequence identity to the nanobody sequence of SEQ ID NO: 2 or 3.

Behar et al. (FEBS J. 2009 July; 276 (14): 3881-93. doi: 10.1111/j.1742-4658.2009.07101.x. Epub 2009 Jun. 15.), which is herein incorporated by reference, describes llama single-domain antibodies (nanobodies), which may be used on the surface of the chromosome-free bacterial cell in accordance with the invention.

The nanobody sequence may be optimised for expression in the chromosome-free bacteria. The nanobody sequence may be codon optimised for bacterial expression.

The surface-displayed nanobody may be anchored to the outer membrane by a membrane anchor polypeptide, such as an integral membrane protein. In one embodiment, the membrane anchor polypeptide comprises a β-intimin domain, or a part thereof that is capable of membrane anchoring. The surface-displayed nanobody may be anchored to the outer membrane by a β-intimin N-terminus domain. The surface-displayed nanobody may be encoded and expressed as a fusion protein with the outer membrane by a membrane anchor polypeptide, such as β-intimin N-terminus domain. Piñero-Lambea et al (ACS Synth. Biol. 2015, 4, 4, 463-473, Publication Date: Jul. 21, 2014, which is herein incorporated by reference) describe membrane anchoring with synthetic adhesins which may be used in accordance with the invention to anchor the nanobody to the chromosome-free bacterial cell surface.

In one embodiment, the recombinant nucleic acid encoding the fusion protein comprising a nanobody and an outer-membrane anchor polypeptide may be separate from the recombinant nucleic acid encoding the enzymes of one or more biochemical energy pathways, or parts thereof, which provide the chromosome-free bacterial cell with energy. In an alternative embodiment, the fusion protein comprising a nanobody and an outer-membrane anchor polypeptide may be encoded on the same recombinant nucleic acid encoding the enzymes of one or more biochemical energy pathways, or parts thereof, which provide the chromosome-free bacterial cell with energy. In an embodiment wherein the fusion protein comprising a nanobody and an outer-membrane anchor polypeptide is encoded on the same recombinant nucleic acid encoding the enzymes of one or more biochemical energy pathways, or parts thereof, which provide the chromosome-free bacterial cell with energy, the expression may be controlled separately, for example by different promoters.

In one embodiment, the recombinant nucleic acid encoding the fusion protein comprising a nanobody and an outer-membrane anchor polypeptide is a bacterial expression plasmid comprising an F1 origin. The skilled person will recognise that F1 is a phage-derived ori that allows for the replication and packaging of ssDNA into phage particles.

The fusion protein comprising a nanobody and an outer-membrane anchor polypeptide may be under the control of a promoter as listed in Table 1 herein. The fusion protein comprising a nanobody and an outer-membrane anchor polypeptide may be under the control of a strong promoter, such as a proD promoter and/or a g10 ribosome binding site.

The proD promoter may comprise the sequence:
(SEQ ID NO. 8)
cacagctaacaccacgtcgtccctatctgctgccctaggtctatgagtg gttgctggataactttacgggcatgcataaggctcgtataatatattca gggagaccacaacggtttccctctacaaataattttgtttaactttt.

The g10 ribosome binding site may comprise the sequence:
(SEQ ID NO. 9)
ttaactttaagaaggagatatacat.

Killing and Control of Chromosome-Containing or Actively Dividing Bacterial Cells In an embodiment, the method may further comprise inducing the death (killing) of any bacterial cells in which the chromosomal DNA remains intact after step ii. In another embodiment, the method may further comprise inducing the death (killing) of any actively dividing bacterial cells. In an embodiment, the killing may comprise treatment of the bacterial cell with an agent capable of killing actively dividing cells, such as D-cycloserine. Suitably, the cell or population of cells may be treated with D-cycloserine between 16 and 24 hours after using an endonuclease. The skilled person will recognise that the agent capable of killing actively dividing cells, such as D-cycloserine, may be added at any time point, for example when the cell population reaches a desired concentration.

The agent capable of killing actively dividing bacterial cells, such as D-cycloserine, may be further dosed into the culture of chromosome-free bacterial cells to ensure that any actively dividing bacterial cells, or bacterial cells capable of actively dividing, are supressed or killed. In one embodiment, the agent capable of killing actively dividing bacterial cells, such as D-cycloserine, may be continuously or periodically dosed into the culture of chromosome-free bacterial cells to ensure that any actively dividing bacterial cells, or bacterial cells capable of actively dividing, are supressed or killed.

The agent capable of killing actively dividing bacterial cells may comprise an antibiotic capable of inhibiting bacterial cell-wall biosynthesis, such as D-cycloserine. The agent capable of killing actively dividing bacterial cells may comprise an antibiotic that is not a porin. The skilled person will be familiar with a range of known antibiotics that may be used to prevent the growth of, or kill, actively dividing bacterial cells.

The Bacterial Cell

The bacterial cell may comprise and suitable bacterial species, for example that has chromosomal DNA recognised and cut by the endonuclease. In one embodiment, the bacterial cell is selected from the bacterial species of *Escherichia* spp., *Pseudomonas* spp., and *Ralstonia* spp. In one embodiment, the bacterial cell is *Escherichia* spp. The *Escherichia* spp. may be *Escherichia coli*. In another embodiment, the bacterial cell is *Pseudomonas* spp. The *Pseudomonas* spp. may be *Pseudomonas putida*. In another embodiment, the bacterial cell is *Ralstonia* spp. The *Ralstonia* spp. may be *Ralstonia eutropha*.

In one embodiment, the method comprises the production of a population (i.e. a plurality) of chromosome-free bacterial cells. In particular a population of bacterial cells may be provided and converted to chromosome-free bacterial cells (SimCells) by the method herein.

The chromosomal DNA of a bacterial cell may be modified to express a marker, to allow successful identification of those cells or populations of cells which have successfully had their chromosomal DNA degraded. Incorporation of such a marker into the chromosomal DNA would also allow sorting of successfully induced SimCells, due to reduction in the expression of said marker. The skilled person will readily appreciate that many markers and classes of markers can be used for this purpose, and will easily be able to choose and genetically modify the bacterial cell to express the marker of choice. For example, the marker may be a visual marker such as a fluorescent marker, such as GFP, YPP, or mCherry. Alternatively, the marker may be a biochemical marker, such as an enzyme, which can be detected usual known assay methods.

The skilled person will appreciate that nucleic acid, such as plasmids, may be provided or transformed into the bacterial cell according to aspects of the invention in a number of ways. For example, heat-shock transformation or electroporation may be used to introduce nucleic acid, such as plasmids to bacterial cells.

Other Aspects

According to another aspect, the invention provides a chromosome-free bacterial cell having surface-displayed nanobodies produced by the method of the invention herein.

According to another aspect, the invention provides a chromosome-free bacterial cell produced by the method of the invention herein.

According to another aspect, the invention provides a chromosome-free bacterial cell, comprising:
  i) recombinant nucleic acid encoding an endonuclease, wherein the expression of the endonuclease is under control of an inducible or repressible promoter;
  ii) nucleic acid encoding enzymes of one or more biochemical energy pathways, or parts thereof, which provide the chromosome-free bacterial cell with energy; and
  iii) nucleic acid encoding a fusion protein comprising or consisting of a nanobody and an outer-membrane anchor polypeptide.

According to another aspect, the invention provides a chromosome-free bacterial cell, comprising:
  i) recombinant nucleic acid encoding an endonuclease, wherein the expression of the endonuclease is under control of an inducible or repressible promoter; and
  ii) nucleic acid encoding enzymes of one or more biochemical energy pathways, or parts thereof, which provide the chromosome-free bacterial cell with energy.

The chromosome-free bacterial cell may further comprise nucleic acid encoding a product for expression. The product for expression may be an enzyme, such as a prodrug-converting enzyme, for example, SalA. The chromosome-free bacterial cell may further comprise nucleic acid encoding a fusion protein comprising or consisting of a nanobody and an outer-membrane anchor polypeptide.

According to another aspect, the invention provides a composition comprising a population of chromosome-free bacterial cell according to the invention, or made according to the method of the invention.

The composition may be a pharmaceutical composition. The composition may comprise one or more pharmaceutically acceptable excipients. In one embodiment, the composition comprises buffer or saline. The composition may be sterile (i.e. free of living/replicating organisms).

According to another aspect, the invention provides a chromosome-free bacterial cell according to the invention, or a composition according to the invention, for use as a medicament.

According to another aspect, the invention provides a chromosome-free bacterial cell according to the invention, or a composition according to the invention, for use in treating or preventing a disease or condition in a subject.

According to another aspect, the invention provides a method of treatment or prevention of disease or condition, the method comprising the administration of the chromosome-free bacterial cell according to the invention, or a composition according to the invention to a subject in need thereof.

The subject may be a mammal and is preferably a human, but may alternatively be a monkey, ape, cat, dog, sheep, cow, horse, rabbit or rodent.

In one embodiment, the disease to be treated or prevented comprises a viral infection, such as HPV infection. In one embodiment the viral infection may comprise coronavirus infection, such as SARS-CoV-2 infection. In another embodiment, the disease to be treated or prevented comprises microbial infection, such as bacterial, viral, fungal, parasitic or protozoan infection. In another embodiment, the disease to be treated or prevented comprises cancer.

Advantageously, a HPV vaccine can prevent human papillomavirus (HPV) infection. HPV can help against cancer caused by HPV, including cervical cancer, mouth and throat (head and neck) cancer and some cancers of the anal and genital areas. It also helps protect against genital warts. SimCells according to the present invention can express and secrete the HPV peptides and activate human immune system.

In one embodiment, the disease to be treated or prevented comprises diabetes, for example where the product for expression is insulin.

The use as a medicament may be for treatment of cancer. In one embodiment, the cancer comprises lung cancer, such as A549 adenocarcinoma. In another embodiment, the cancer comprises brain cancer (e.g. glioblastoma), such as Mo59K glioblastoma. In another embodiment, the cancer comprises soft-tissue cancer, such as RD rhabdomyosarcoma. In one embodiment, the cancer comprises colorectal cancer.

The use as a medicament may be for treatment or prevention of viral infection, such as coronavirus infection.

According to another aspect, the invention provides the use of a chromosome-free bacterial cell having surface-displayed nanobodies according to the invention for targeting a cell, such as a cancer cell, for binding with the chromosome-free bacterial cell.

The cell may be targeted for diagnosis, such as using the chromosome-free bacterial cell as a marker for imaging.

The chromosome-free bacterial cell having surface-displayed nanobodies according to the invention may be used as a biosensor of an analyte. The analyte may be a cell, such as a cancer cell. The analyte/cells, such as cancer cells, may be targeted for agglutination by cross-linking the cells with the chromosome-free bacterial cells. In one embodiment, the analyte comprises a virus, such as coronavirus. The coronavirus may be SARS-CoV-2.

In another embodiment, cells, such as cancer cells, may be targeted for killing, for example by targeted drug delivery. For example, the chromosome-free bacterial cells may further comprise or express an enzyme, such as SalA, which can convert a pro-drug to a cytotoxic drug. For example, in the case of SalA, the prodrug may be aspirin which is converted to catechol, which is toxic to cells. The chromosome-free bacterial cells can be localised/targeted, for example to a cancer cell, by the surface anchored nanobody.

In one embodiment, the enzyme may be expressed in the bacterial cell prior to conversion into a chromosome-free bacterial cell. For example, prior to the chromosome degradation step.

According to another aspect, the invention provides a chromosome-free bacterial cell according to the invention, or a composition according to the invention, for use as a vaccine.

The vaccine may comprise a viral vaccine, such as HPV, or an anti-cancer vaccine.

According to another aspect, the invention provides the use of a chromosome-free bacterial cell according to the invention, or a composition according to the invention, as a biosensor and/or biocatalyst.

According to another aspect, the invention provides a method of producing a product (.e. a product for expression as described herein), and/or a biochemical, the method comprising use of the chromosome-free bacterial cell according to the invention, or a composition according to the invention, to express a product for expression, and optionally further produce a biochemical by using the product for expression as a biocatalyst.

The method of producing a product, and/or a biochemical may be in vitro or in vivo. The method of producing a product, and/or a biochemical may comprise incubating the chromosome-free bacterial cell according to the invention, or a composition according to the invention under conditions to promote expression of the product for expression. In an embodiment where the expression of the product for expression is regulated, the method may comprise the use of an inducer. For the production of a biochemical, a precursor or intermediate molecule may be provided for conversion to the biochemical. The skilled person will readily apply appropriate conditions, such as the appropriate temperature, gas, media, nutrients, energy sources, and carbon sources, for the Simcell(s) to be active and capable of product expression.

In an embodiment wherein the chromosome-free bacterial cell according to the invention, or a composition according to the invention is used as a biosensor, the chromosome-free bacterial cell(s) may be arranged to express a polypeptide or peptide capable of binding to a target molecule to be detected.

According to another aspect, the invention provides a nucleic acid encoding an endonuclease, wherein the expression of the endonuclease is under control of an inducible or repressible promoter.

The nucleic acid may comprise a reverse complementary sequence for forming a secondary structure, such as a hairpin loop, in the nucleic acid. The reverse complementary sequence may be reverse complementary to a sequence of the endonuclease and/or the promoter sequence. In one embodiment, the reverse complementary sequence is reverse complementary to a sequence of the promoter arranged to express the endonuclease. The nucleic acid may comprise the sequence of SEQ ID NO: 37 (pGeneArt-ICeuI), or a variant thereof.

The nucleic acid according to the invention may be a plasmid. The nucleic acid described herein may be DNA.

Variants, for example of I-CeuI of SEQ ID NO: 35, may comprise functional variants (i.e. having the same function).

Where reference is made to a variant polypeptide or nucleotide sequence, the skilled person will understand that one or more amino acid residue or nucleotide substitutions, deletions or additions, may be tolerated, optionally two substitutions may be tolerated in the sequence, such that it maintains its function. The skilled person will appreciate that 1, 2, 3, 4, 5 or more amino acid residues or nucleotides may be substituted, added or removed without affecting function References to sequence identity may be determined by BLAST sequence alignment (www.ncbi.nlm.nih.gov/BLAST/) using standard/default parameters. For example, the sequence may have 99% identity and still function according to the invention. In other embodiments, the sequence may have 98% identity and still function according to the invention. In another embodiment, the sequence may have 95% identity and still function according to the invention. In another embodiment, the sequence may have 90%, 85%, or 80% identity and still function according to the invention. In one embodiment, the variation and sequence identity may be according the full length sequence. In other embodiments, the variation may be limited to non-conserved sequences and/or sequences outside of active sites, such as binding domains. Therefore, an active site or binding site of a protein may be 100% identical, whereas the flanking sequences may comprise the stated variations in identity. Such variants may be termed "conserved active site variants".

Amino acid substitutions may be conservative substitutions. For example, a modified residue may comprise substantially similar properties as the wild-type substituted residue. For example, a substituted residue may comprise substantially similar or equal charge or hydrophobicity as the wild-type substituted residue. For example, a substituted residue may comprise substantially similar molecular weight or steric bulk as the wild-type substituted residue. With reference to "variant" nucleic acid sequences, the skilled person will appreciate that 1, 2, 3, 4, 5 or more codons may be substituted, added or removed without affecting function. For example, conservative substitutions may be considered.

The invention may also be described according to the following numbered paragraphs.

1. A method of producing a chromosome-free bacterial cell, comprising:
   i) degrading native chromosomal DNA in a bacterial cell by expressing an endonuclease in the bacterial cell that is capable of recognition and double-stranded cutting of the native chromosomal DNA, wherein the expression of the endonuclease is under control of an inducible or repressible promoter; and
   ii) transforming the bacterial cell with recombinant nucleic acid encoding enzymes of one or more biochemical energy pathways, or parts thereof, which provide the chromosome-free bacterial cell with energy.

2. The method according to paragraph 1, wherein the endonuclease for degrading the chromosomal DNA comprises a homing endonuclease.

3. The method according to any preceding paragraph, wherein the endonuclease for degrading the chromosomal DNA is I-CeuI, or a homologue thereof, or functional variant thereof.

4. The method according to any preceding paragraph, wherein the promoter for the endonuclease, such as I-CeuI, is under the control of TetR or EilR.

5. The method according to any preceding paragraph, wherein expressing the endonuclease in the bacterial cell comprises exposing the bacterial cell to an inducer molecule arranged to induce or de-repress the promoter of the endonuclease.

6. The method according to any preceding paragraph, wherein expressing an endonuclease in the bacterial cell comprises the steps of:
   i) providing a donor nucleic acid encoding the endonuclease gene, wherein the endonuclease gene is promoterless; or wherein the endonuclease gene is operably linked to a promoter, and the donor nucleic acid is further arranged to form a hairpin loop to prevent expression of the endonuclease;
   ii) using the donor nucleic acid as a template to form a PCR product encoding the endonuclease, and inserting the PCR product into a nucleic acid for transformation of the bacterial cell, wherein the endonuclease gene is inserted into a position such that it is under control of the inducible or repressible promoter; or or recombining the endonuclease gene encoded on the donor nucleic acid with a nucleic acid for transformation of the bacterial cell, wherein the endonuclease gene is recombined into a position such that it is under control of the inducible or repressible promoter.

7. The method according to any preceding paragraph, wherein the biochemical energy pathway is capable of the production of ATP and NAD(H).

8. The method according to any preceding paragraph, wherein the biochemical energy pathway is the glycolysis pathway, or part thereof.

9. The method according to any preceding paragraph, wherein the bacterial cell is transformed with nucleic acid encoding one or more, or all, enzymes of the glycolysis pathway.

10. The method according to any preceding paragraph, wherein the bacterial cell is transformed with nucleic acid encoding glyceraldehyde-3-phosphate dehydrogenase and/or phosphoglycerate kinase.

11. The method according to any preceding paragraph, wherein the expression of the biochemical energy pathway (s) is regulated under the control of an inducible or repressible promoter.

12. The method according to any preceding paragraph, wherein the bacterial cell or the resulting chromosome-free bacterial cell (SimCell), is transformed with nucleic acid encoding a product for expression.

13. The method according to paragraph 12, wherein the product comprises any one or more of a peptide, a protein, or a nucleic acid.

14. The method according to paragraph 12 or 13, wherein the product for expression comprises any one or more of a biological drug, a vaccine, an enzyme catalyst.

15. The method according to any preceding paragraph, wherein the method further comprises inducing the death (killing) of any bacterial cells in which the chromosomal DNA remains intact after step ii and/or any actively dividing bacterial cells.

16. The method according to any preceding paragraph, wherein the bacterial cell is selected from the bacterial species of *Escherichia* spp., *Pseudomonas* spp., and *Ralstonia* spp.

17. A chromosome-free bacterial cell produced by the method of any preceding paragraph.

18. A chromosome-free bacterial cell, comprising:
i) recombinant nucleic acid encoding an endonuclease, wherein the expression of the endonuclease is under control of an inducible or repressible promoter; and
ii) nucleic acid encoding enzymes of one or more biochemical energy pathways, or parts thereof, which provide the chromosome-free bacterial cell with energy;
optionally wherein the chromosome-free bacterial cell further comprises nucleic acid encoding a product for expression.

19. A composition comprising a population of chromosome-free bacterial cells according to paragraph 17 or 18, or made according to any of paragraphs 1-16.

20. A chromosome-free bacterial cell according to paragraph 17 or 18, or a composition according to paragraph 19, for use as a medicament or vaccine.

21. A chromosome-free bacterial cell according to paragraph 17 or 18, or a composition according to paragraph 19, for use in treating or preventing a disease or condition in a subject.

22. A method of treatment or prevention of disease or condition, the method comprising the administration of the chromosome-free bacterial cell according to paragraph 17 or 18, or a composition according to paragraph 19 to a subject in need thereof.

23. The chromosome-free bacterial cell or composition for the use according to any of paragraphs 20 or 21, or the method according to paragraph 22, wherein the disease to be treated or prevented comprises viral infection, diabetes or cancer.

24. Use of a chromosome-free bacterial cell according to paragraph 17 or 18, or a composition according to paragraph 19, as a biosensor and/or biocatalyst, or to produce a biochemical product.

25. A nucleic acid encoding a homing endonuclease, wherein
i) the expression of the endonuclease is under control of an inducible or repressible promoter; and/or
ii) the nucleic acid may comprise a reverse complementary sequence for forming a secondary structure, such as a hairpin loop, in the nucleic acid.

26. A method of producing a product and/or a biochemical, the method comprising use of the chromosome-free bacterial cell according to paragraph 17 or 18, or a composition according to paragraph 19, to express a product for expression, and optionally further produce a biochemical by using the product for expression as a biocatalyst.

The skilled person will appreciate that preferred features of any one embodiment and/or aspect of the invention may be applied to all other embodiments and/or aspects of the invention.

BRIEF DESCRIPTION OF THE FIGURES

FIGS. 1A-1B: The main features for the constructed SimCell characterized in this study.

FIG. 1A: To distinguish SimCells from normal cells, a strain with chromosomal expression of GFP controlled by the arabinose operon was used to indicate the integrity of the chromosome. Three additional plasmids are used to degrade the chromosome, reintroduce glycolysis, and produce protein (mCherry, unstable mCherry, or the ilux operon). FIG. 1B: For SimCell generation (chromosome degradation), pJKR-HTetR-ICeuI was constructed to put I-CeuI endonuclease production under control of the TetR regulation system which is inducible by ATc. To improve longevity, ATP and NADH were supplemented to cells via the glycolysis pathway carried by pSEVA224-GB3. The glycolysis pathway genes are controlled by the lac system inducible by IPTG. However, the I-CeuI and the glycolysis genes were not induced for the majority of experiments presented in this work. Finally, the strain contains a variation of pJKR-O-mphR which either produces mCherry, unstable mCherry, or luminescence depending on the application. This plasmid utilizes the MphR regulation system which is inducible by erythromycin.

FIG. 2A: Fluorescence microscopy images of a control strain (no I-CeuI) to show integrity of the GFP and mCherry biosensors. The parent strain (I-CeuI−) was not induced (left) induced for GFP expression (center) or induced for mCherry expression (right). FIG. 2B : FL1 (GFP) and FL3

(mCherry) channel histograms had distinct populations which were used to define no expression and GFP expression (SimCell identity gates) or mCherry expression (protein production) when two populations were not obvious in the experimental groups.

FIGS. 3A-3B: FL1 (GFP) and FL3 (mCherry) channel histograms of flow cytometry analyses and corresponding microscopy images.

FIG. 3A: The I-CeuI+ strain without the glycolysis pathway (pSEVA224-GB3) contained a mixed population of SimCells and normal cells. Based on the two somewhat distinct populations, about 91.32% of cells are SimCells (GFP−). Of the SimCell population, only 13.18% produced mCherry. FIG. 3B: In the I-CeuI+ strain with the glycolysis pathway (pSEVA224-GB3), about 94.36% of cells are SimCells (GFP−), a slightly higher proportion compared to the strain without glycolysis. Of the SimCell population, 56.20% produced mCherry, a large improvement compared to the strain without glycolysis.

Figure 4B:
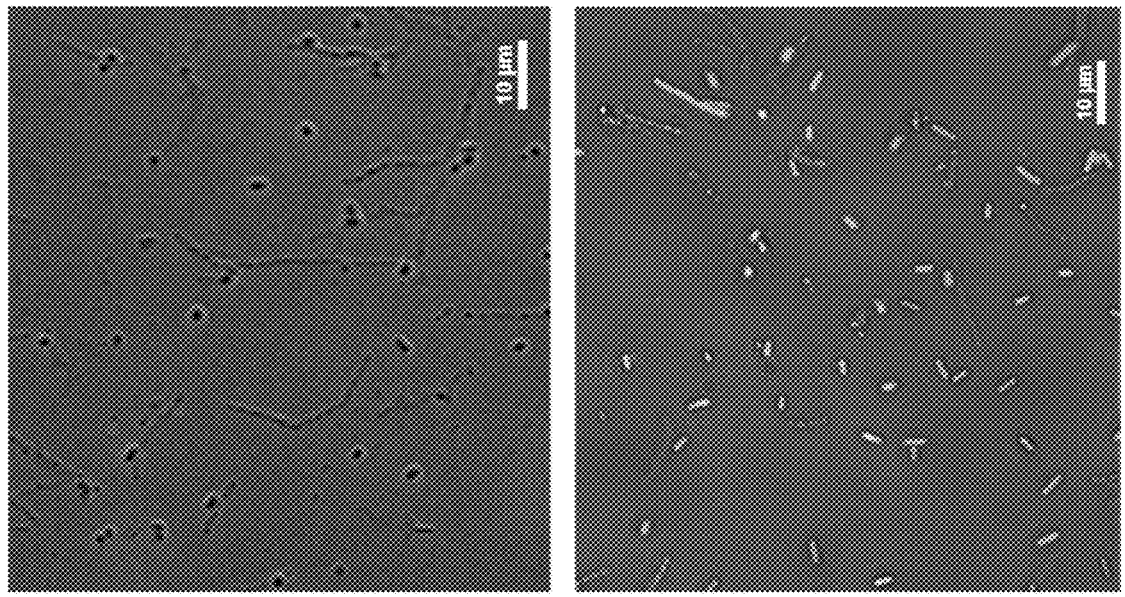
Figure 4A:
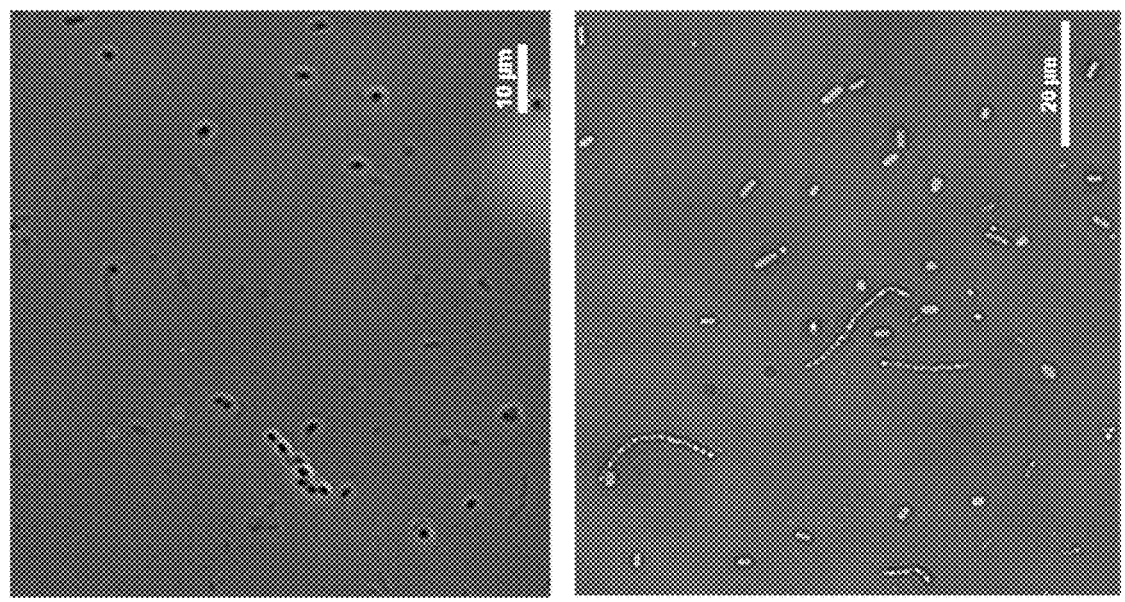

FIGS. 4A-4B: I-CeuI+ cultures were treated with the drug D-cycloserine to kill parent cells to yield a pure SimCell culture.

FIG. 4A: SimCell culture without glycolysis not induced (top) and induced (bottom) for GFP and mCherry production. FIG. 4B: SimCell culture with glycolysis not induced (top) and induced (bottom) for GFP and mCherry production. No cells fluoresced green which meant D-cycloserine was effective in killing parent cells and producing a pure SimCell culture. A higher proportion of SimCells (no GFP expression) expressed mCherry when supplemented with glycolysis (pSEVA224-GB3).

Figure 5:
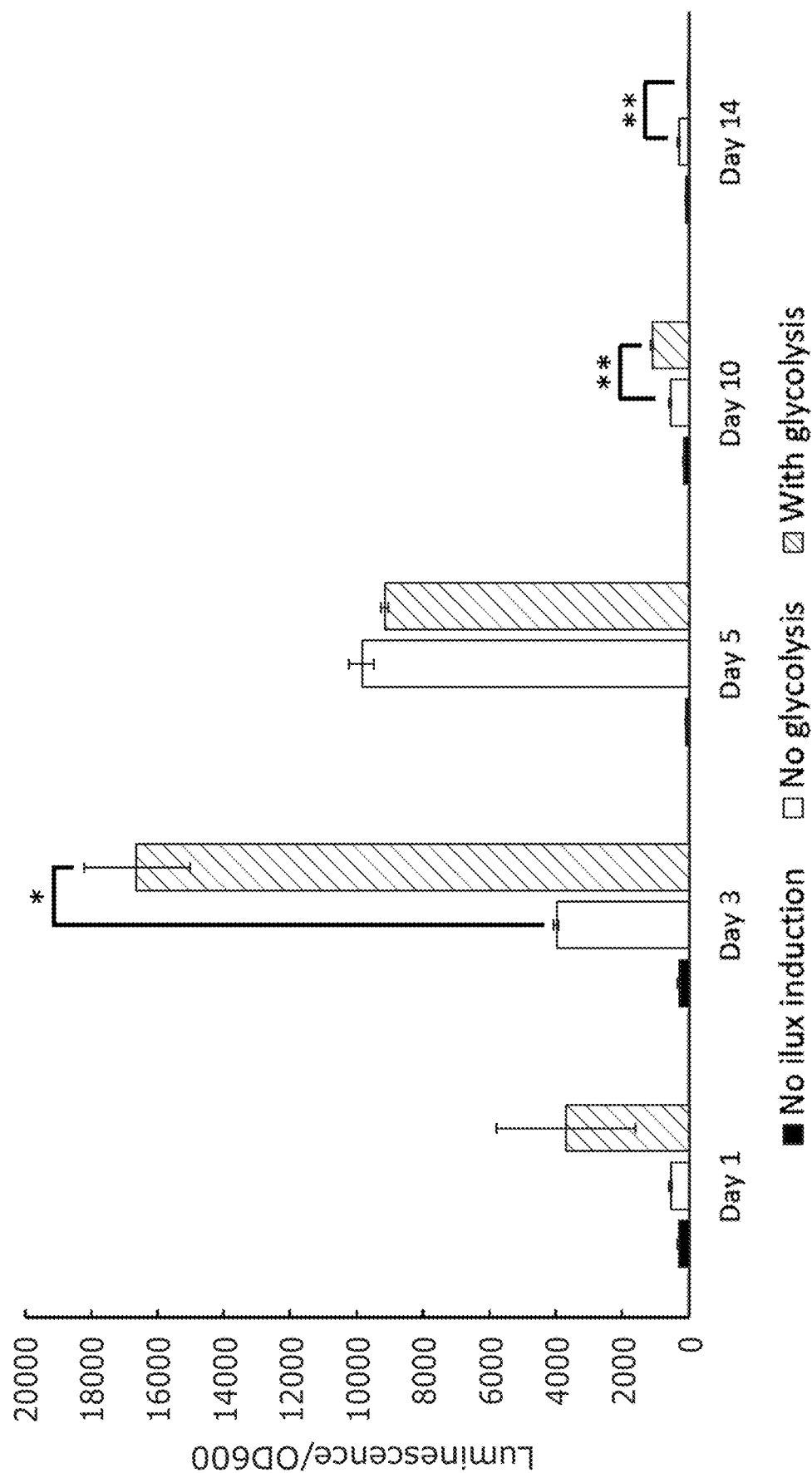

FIG. 5: The longevity of SimCells was based on the cellular availability of ATP/NADH. SimCells could produce luminescence for about 10 days, indicating they had sufficient energy currency to sustain functionality for a decent amount of time. The strain with the glycolysis pathway had a significant energy advantage over the strain without glycolysis in the early days. However, this difference in luminescence production leveled off after day 5. Unpaired (independent) t-tests were performed: * $p<0.005$, ** $p<0.001$ FIG. 6: Longevity of the cellular machinery within Sim Cells (protein synthesis, regulation, and degradation). Fluorescence detected from unstable mCherry stopped increasing after 10 days, which is likely the point where transcription and translation did not have enough energy to be operational. This corresponds to the availability of ATP as suggested by luminescence production (FIG. 3.20). SimCells had detectable levels of unstable mCherry for a long time (28 days) because the activity of proteases is ATP-dependent. Unpaired (independent) t-tests were performed: * $p<0.001$ FIG. 7: A graphical summary of changes in energy and metabolism in SimCells (I-CeuI+ strains). Elements in red (marked with *) indicate up-regulation of proteins while elements in blue indicate down-regulation of proteins. Cells favored sections of the glycolysis and pentose phosphate pathway that produced ATP/NADH, while the sections that consumed ATP were down-regulated. The TCA cycle was largely shut down. Fermentation and aerobic respiration regenerated $NAD^+$ to be fed back to the glycolysis pathway. The complexes that were up-regulated to generate the proton gradient are shown (other complexes were down-regulated). The resulting proton gradient should have driven ATP synthase to produce ATP for the energy-starved cell.

Figure 8:
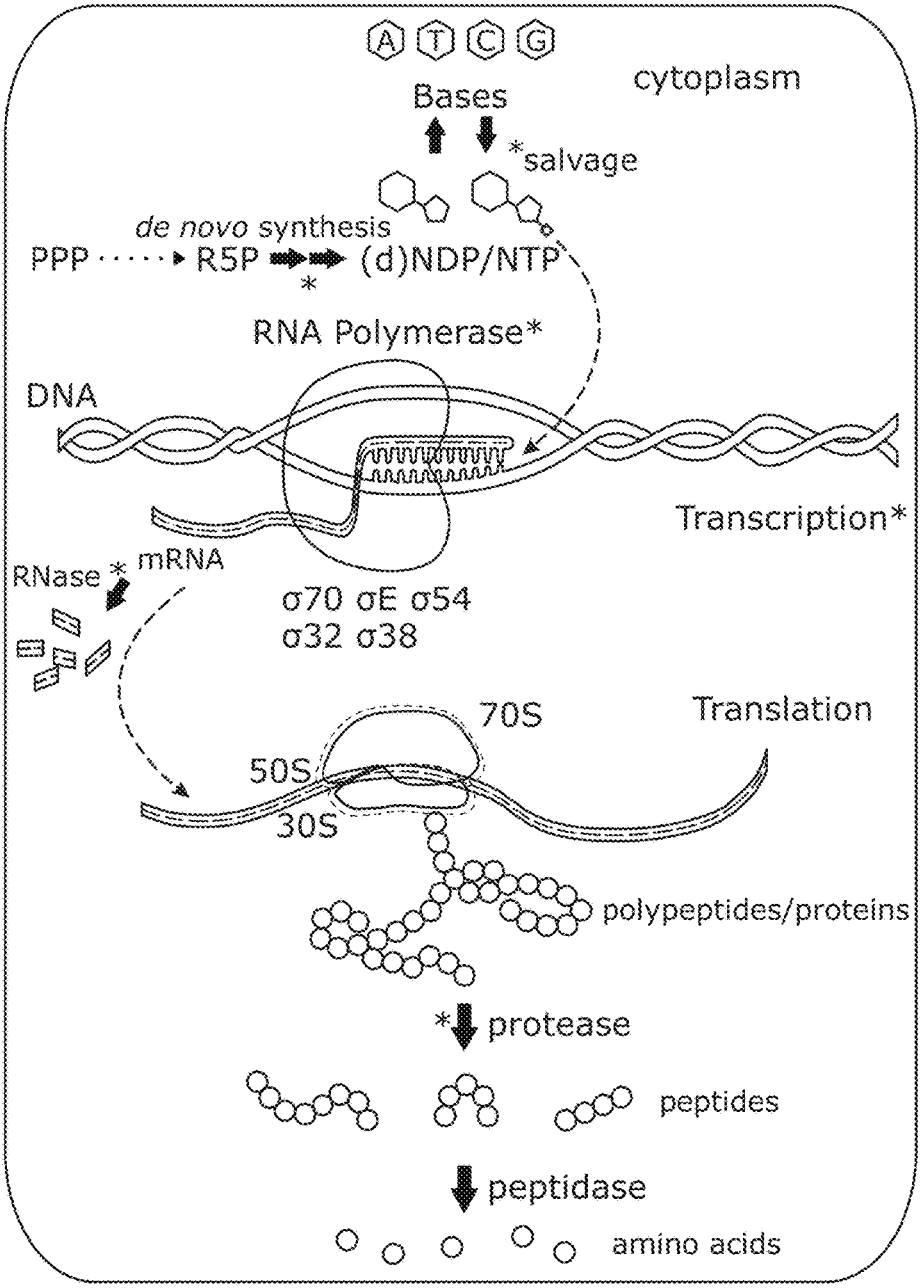

FIG. 8: A graphical summary of changes in DNA, RNA, and protein metabolism in SimCells (I-CeuI+ strains). Changes in protein abundance affected the transcription and translation apparatus. Elements in red (marked with *) indicate up-regulation of proteins while elements in blue indicate down-regulation of proteins. (Deoxy) nucleoside/nucleotide synthesis was promoted via the de novo synthesis and salvage pathways. Transcription was up-regulated in via RNA polymerase proteins and sigma factors associated with global transcription regulation. Although proteins associated with the 50S and 30S ribosomal subunits were abundant, 70S ribosome assembly was down-regulated. Cells were likely putting translation on hold until they encountered more favorable nutrient and energy conditions.

Figure 9:
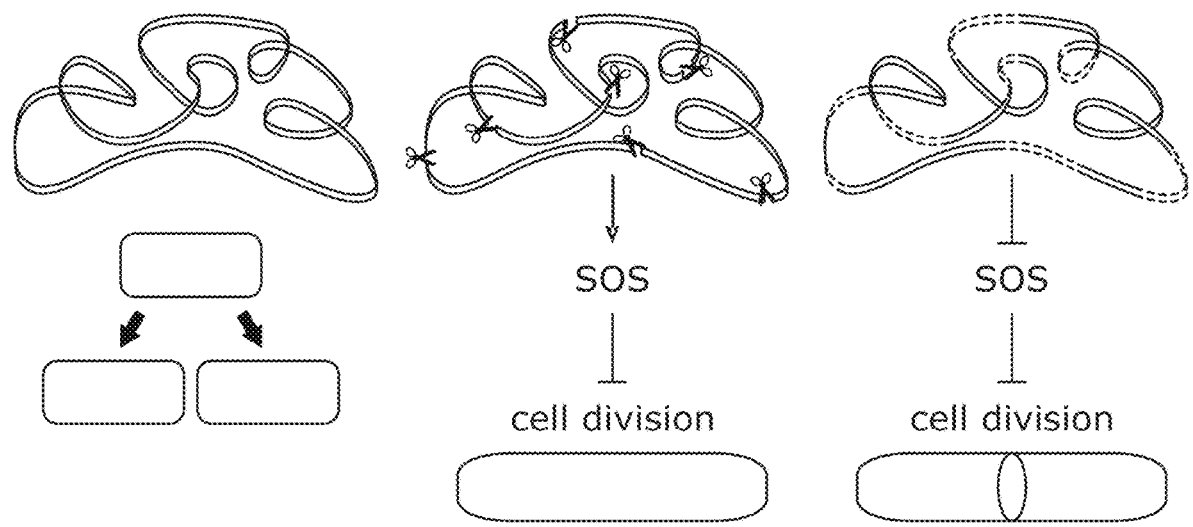

FIG. 9: A schematic of predicted events during SimCell generation in regards to SOS response and cell division. Proteins associated with DNA damage response changed their expression profile in I-CeuI+ strains compared to control groups. The cell is initially "normal" with an intact chromosome and undergoes normal cell division. When I-CeuI endonuclease causes DNA damage, and an SOS response is launched, resulting in the inhibition of cell division (down-regulation of FtsZ) and the elongation of the cell. As the chromosome degrades, SOS genes are down-regulated after attempted DNA repair. The activity of other cell division proteins such as ZapA and ZipA are slowly restored.

Figure 10:
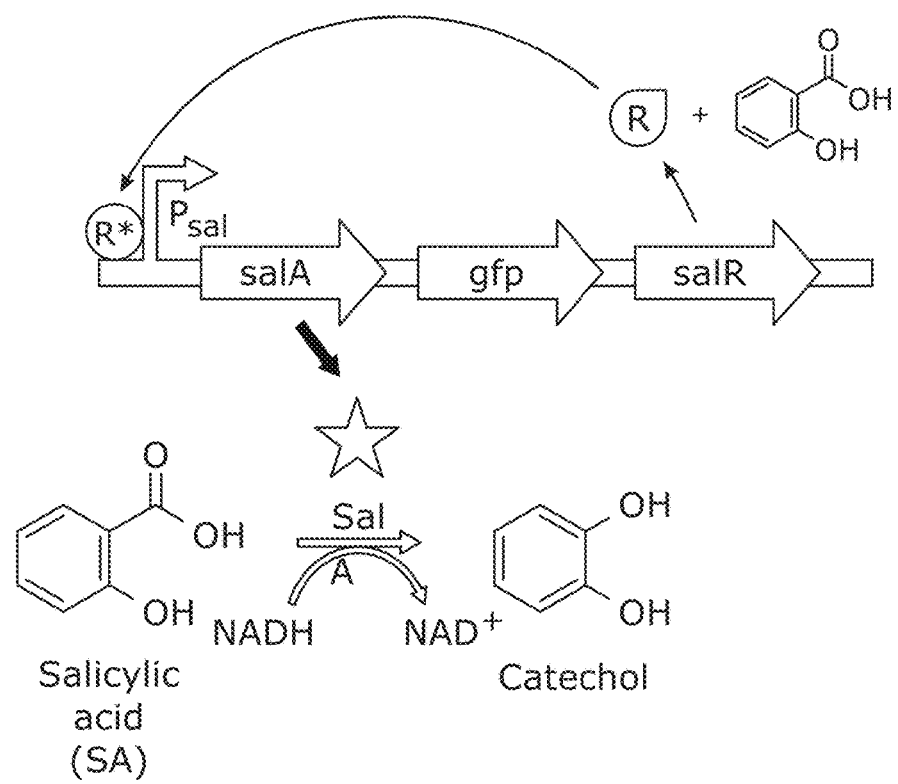

FIG. 10: Schematic of the genetic circuit in pSalAR-GFP that produces catechol from salicylic acid (SA). When SA is present it combines with SalR to yield an active form: SalR*, which then initiates transcription of salA and salR (positive feedback). Then SalA or salicylate hydroxylase converts SA to catechol in the presence of NADH. There is some leaky expression from $P_{sal}$, so basal levels of SalA and SalR are already present without induction.

Figure 11:
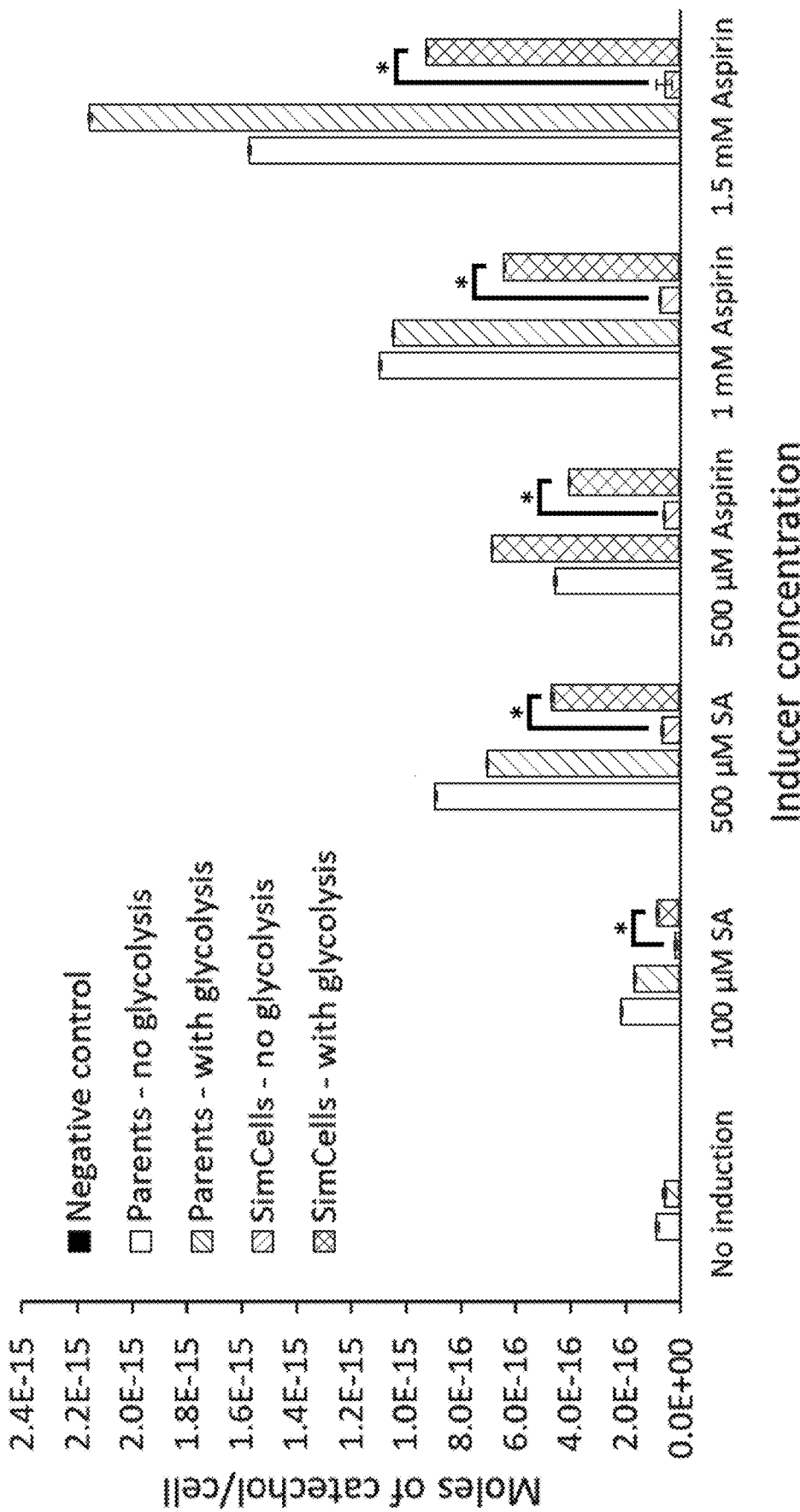

FIG. 11: Quantification of catechol produced by parent cells and Sim Cells using LC. Moles of catechol produced per cell by strains with pSalAR-GFP or pSalA_Km_xyIR (negative control, defective salA) were quantified after induction with different concentrations of SA and aspirin. Strains labelled 'no glycolysis' or 'with glycolysis' have pSEVA224 or pSEVA224-GB3, respectively. Strains labelled 'Parents' or 'SimCells' have pJKR-H-TetR or pJKR-HTetR-ICeuI, respectively. More catechol was produced with higher concentrations of inducer. In SimCells, the addition of the glycolysis pathway dramatically improved catechol production. An unpaired (independent) t-test was performed: * $p<0.001$.

Figure 12:
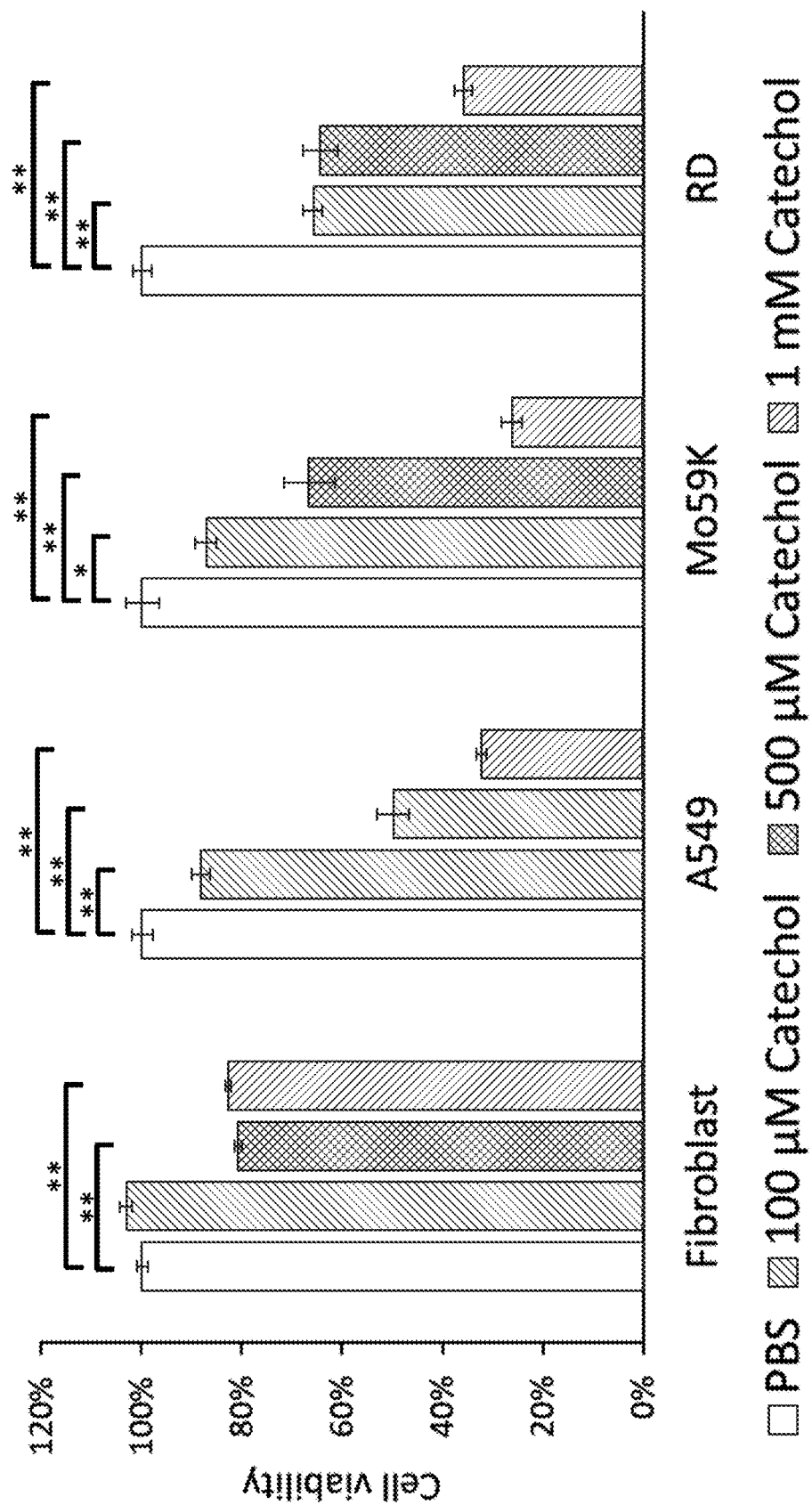

FIG. 12: Anti-cancer effect of catechol. Fibroblasts and cancer cell lines A549, Mo59K, and RD were treated with different concentrations of catechol (PBS was the control), which resulted in a significant decrease in cell viability of cancer cells. A paired (dependent) t-test was performed for cell viability assays: * $p<0.005$, ** $p<0.001$.

Figure 13:
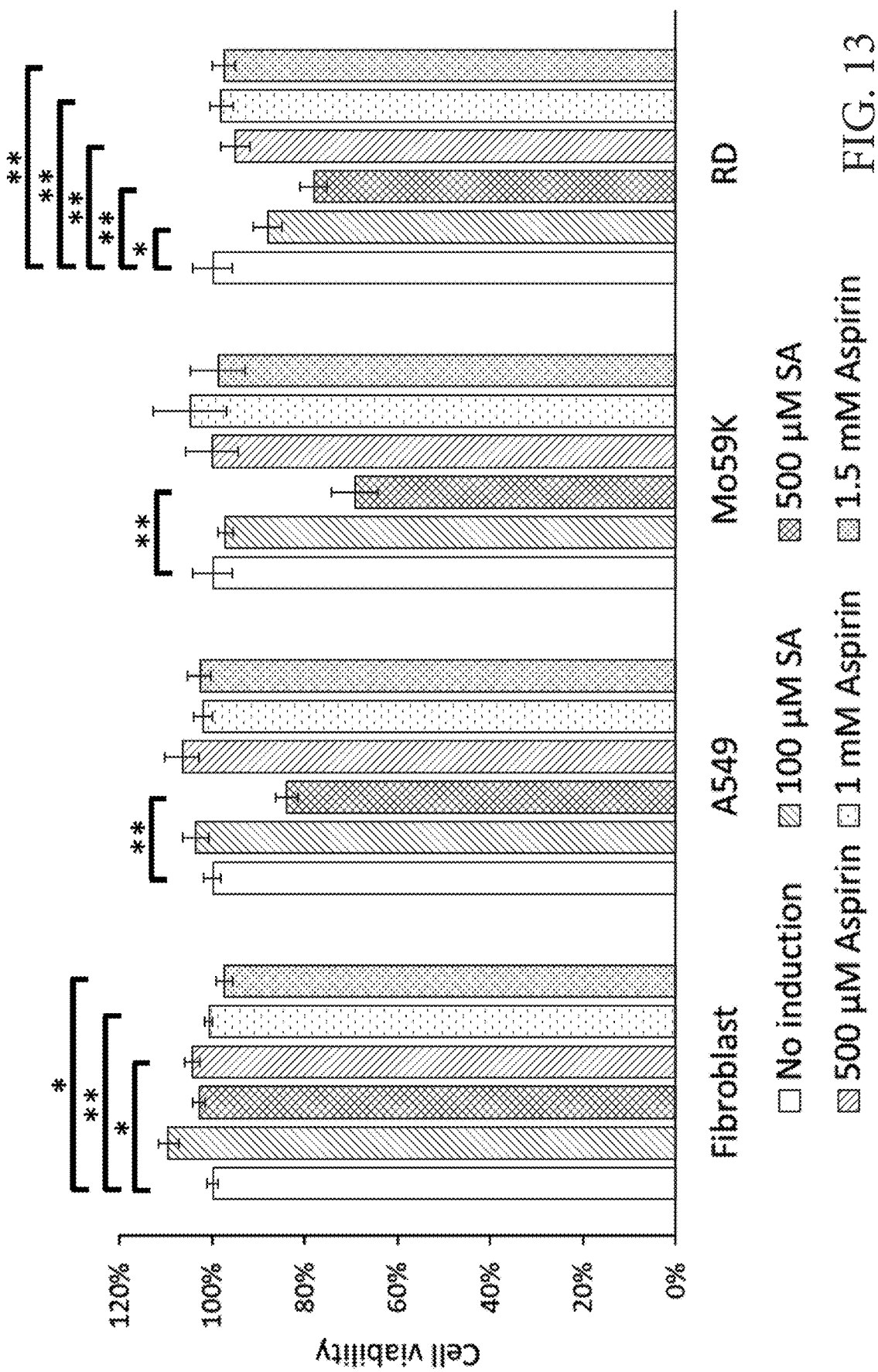

FIG. 13: Anti-cancer effect of catechol produced by SimCells. Fibroblasts and A549, Mo59K, and RD cancer cells were incubated with SimCells, D-cycloserine, and different concentrations of SA and aspirin to produce catechol. There was a significant decrease in cell viability when SimCells were induced to produce the anti-cancer drug catechol. SimCells induced with 500 µM SA resulted in the largest decrease in cancer cell viability. A paired t-test was performed for cell viability assays: * $p<0.05$, ** $p<0.005$.

Figure 14A:
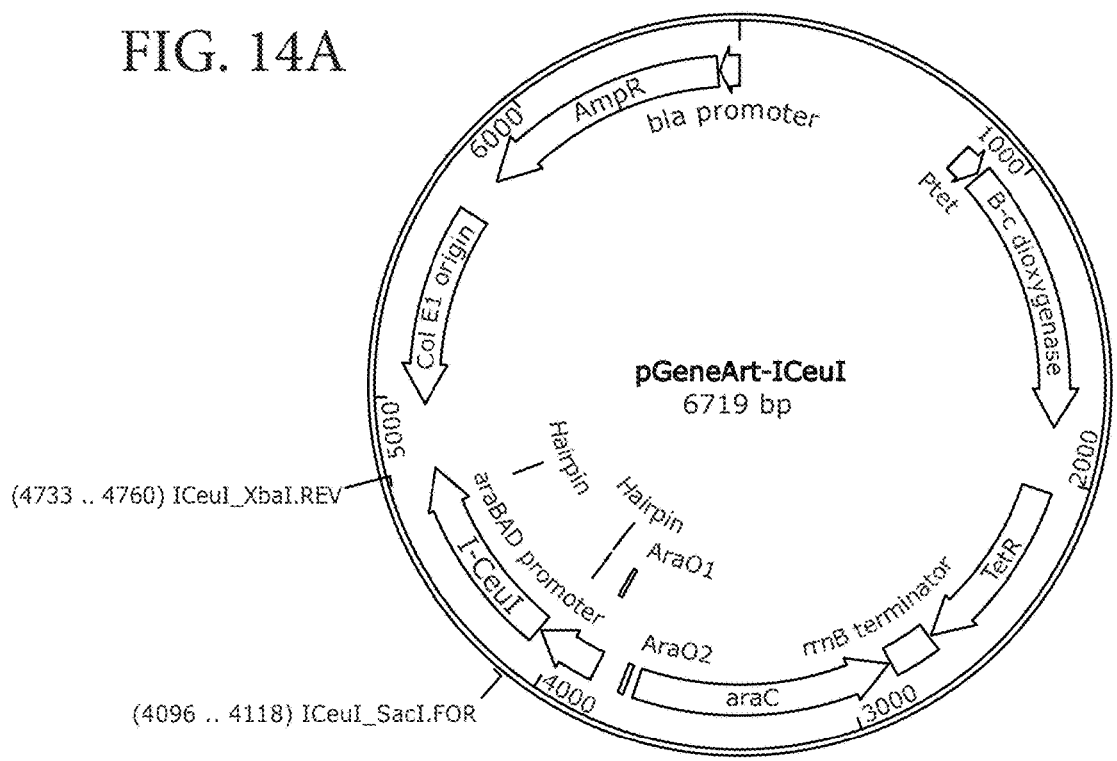

FIGS. 14A-14G: SnapGene maps of plasmids used in this study. FIG 14A, pGeneArt-ICeuI FIG. 14B, pJKR-HTetR-ICeuI FIG. 14C, pSEVA224-GB3 FIG. 14D, pJKR-O-mphR FIG. 14E, pJKR-OmphR-ilux FIG. 14F, pJKR-OmphR-ASV, FIG. 14G, pSalAR-GFP.

Figure 15B:
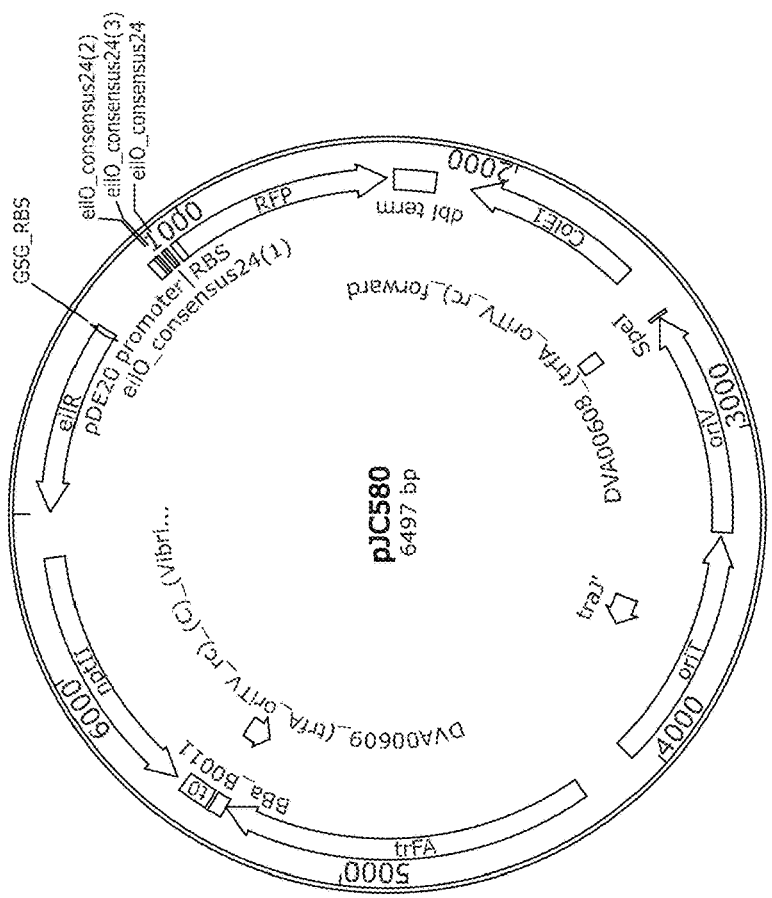
Figure 15A:
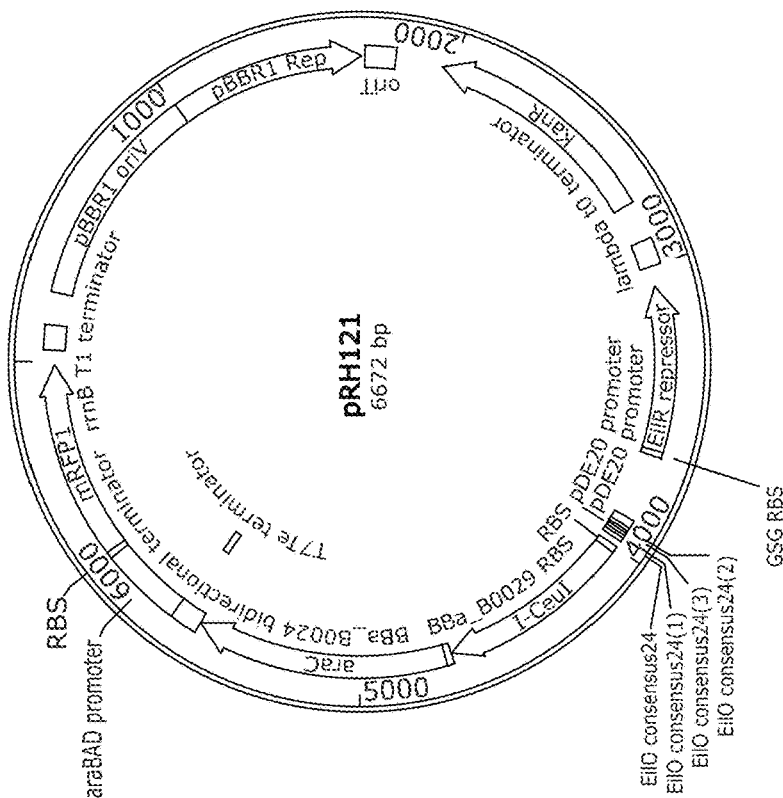

FIGS. 15A-15B: SnapGene maps of broad host-range SimCell-generating plasmids. FIG. 15A, pRH121 FIG. 15B, pJC580.

Figure 16:
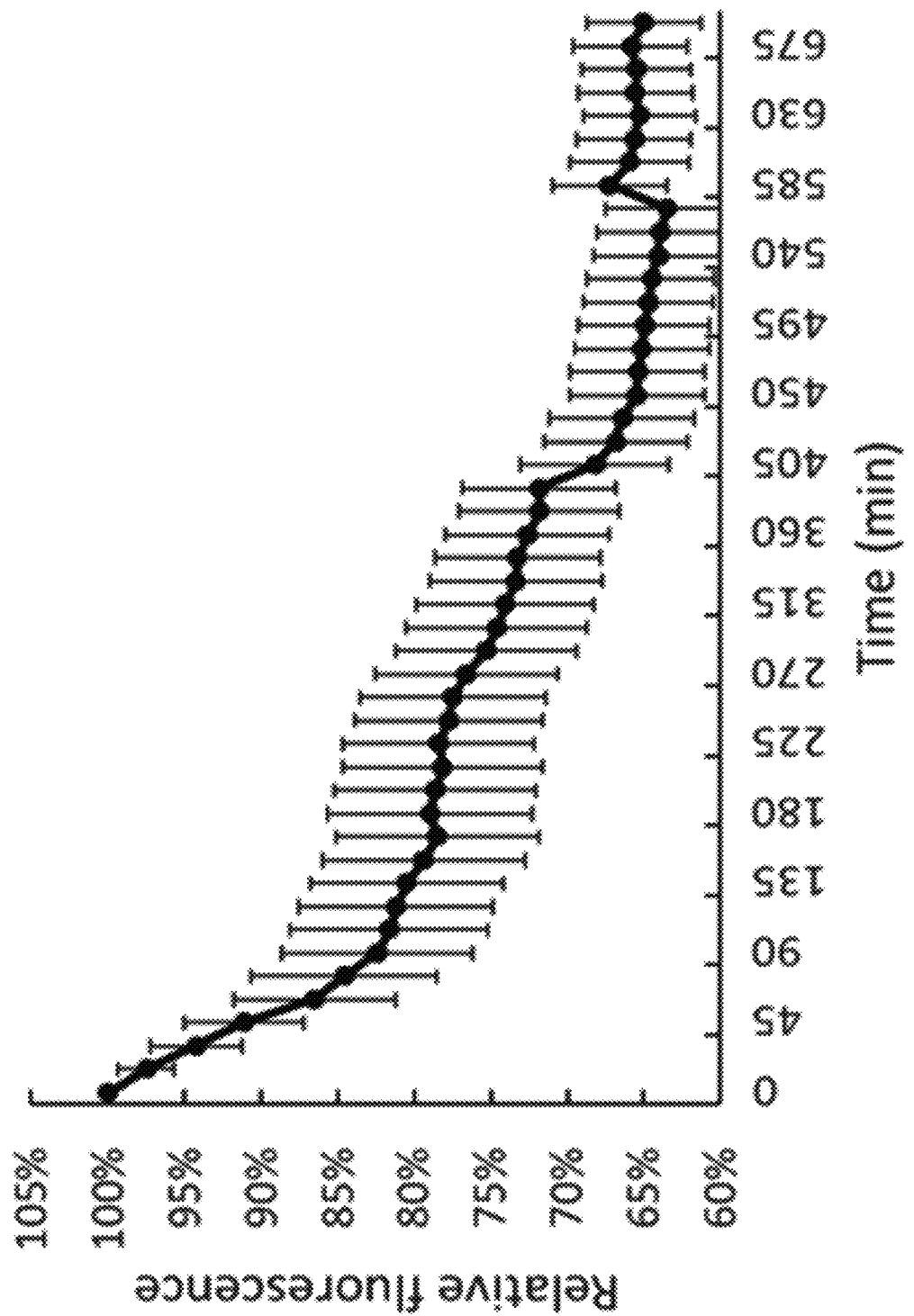

FIG. 16: Fluorescence produced by unstable mCherry with the ASV variant of the ssrA protease tag. After addition of this tag, mCherry has a half-life time of about 96 min.

Figure 17A:
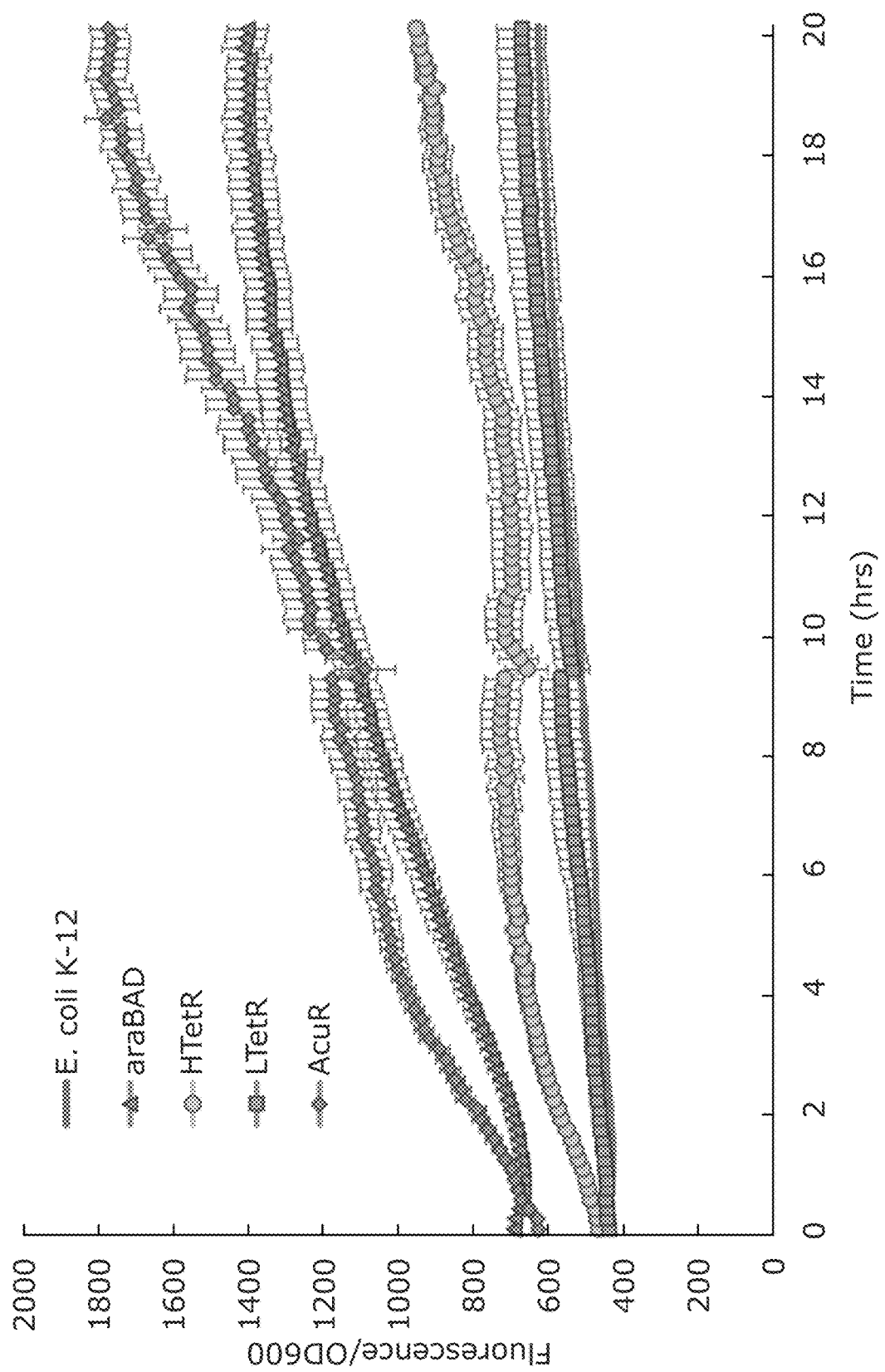
Figure 17B:
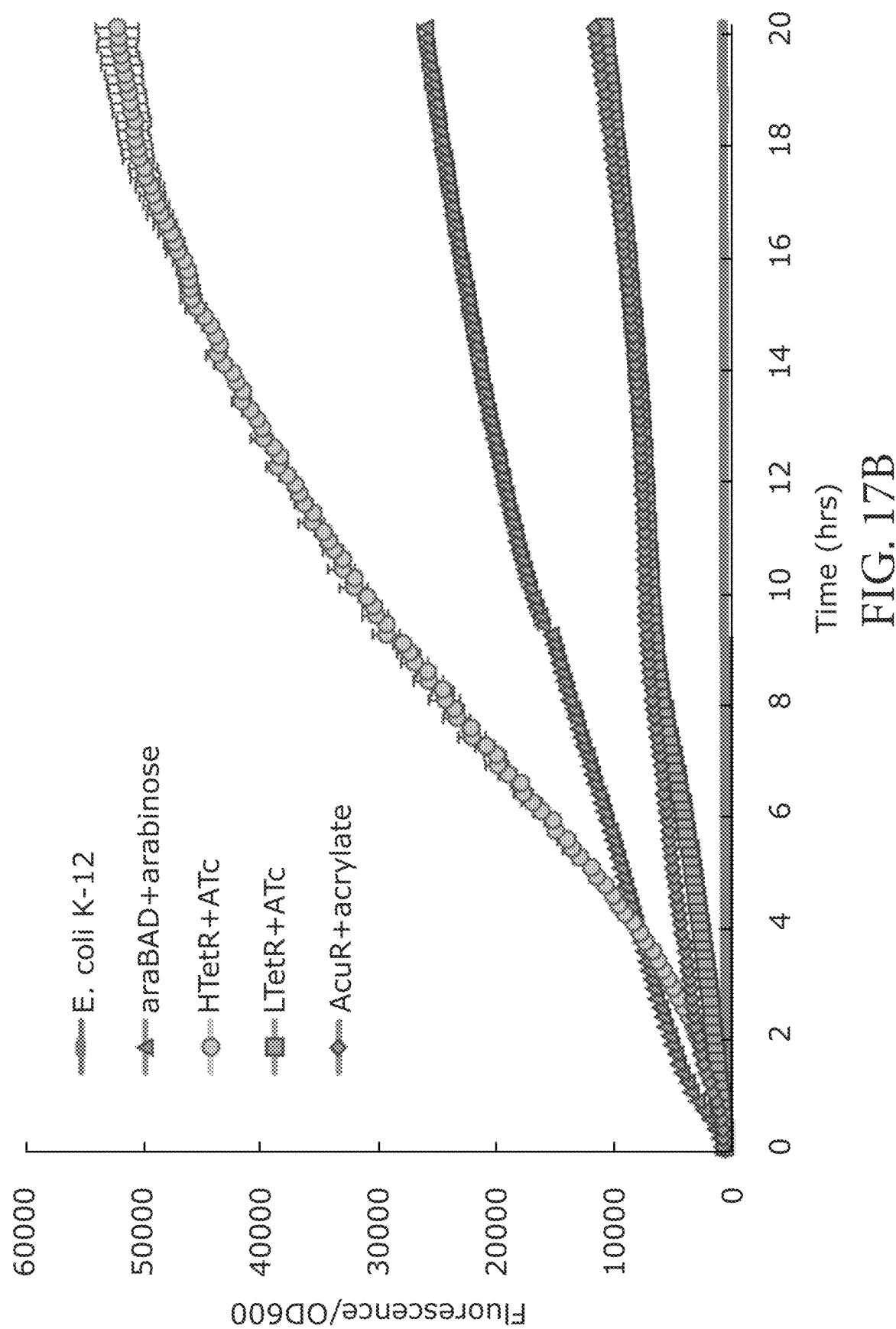
Figure 17C:
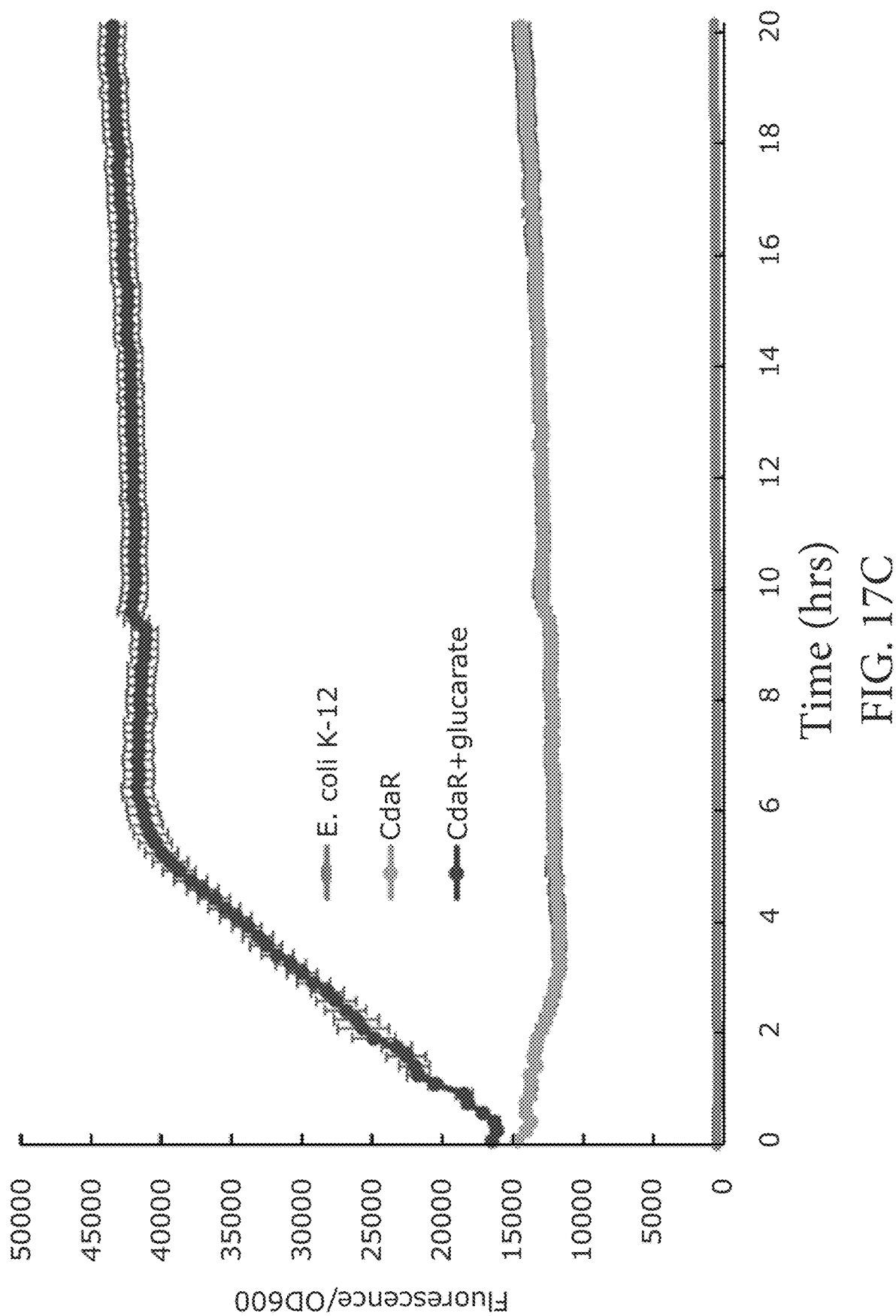
Figure 17D:
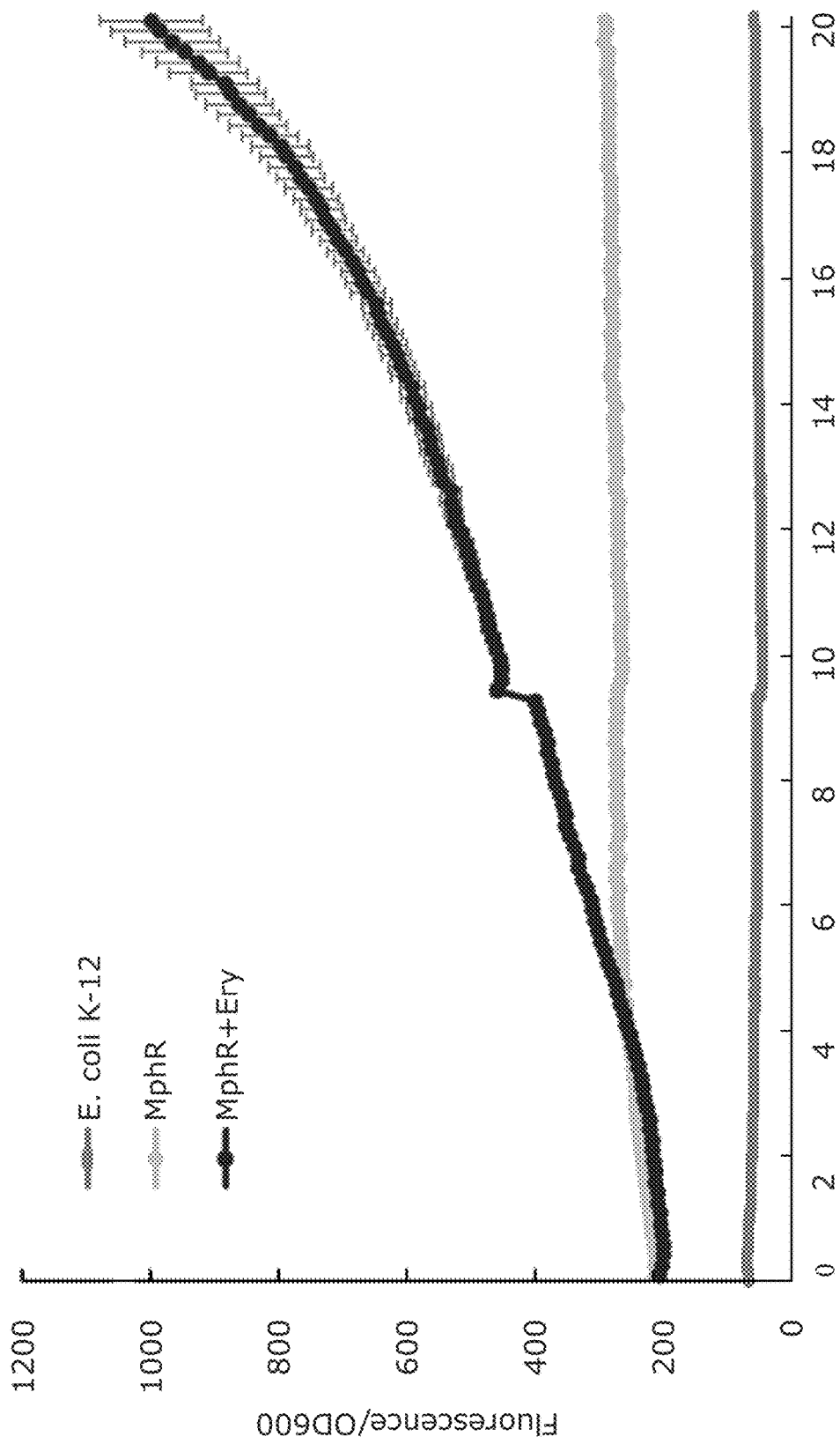

FIGS. 17A-17D: Induction dynamics of a collection of biosensors. The control strain E. coli K-12 (no plasmid) was used to as a baseline for no fluorescence. HTetR and LTetR refer to the copy number of the TetR plasmid (high and low, respectively). Fluorescence output was normalized with cell density $OD_{600}$. FIG. 17A The arabinose operon (araBAD), TetR, AcuR regulator systems were not induced to detect any leaky activity from the promoters. AcuR and araBAD had the leakiest expression, followed by HTetR and LTetR. FIG. 17B The arabinose operon (araBAD), TetR, AcuR regulator systems were induced for GFP production. HTetR produced high levels of GFP with low inducer concentration (1 µM ATc). FIG. 17C The expression profile for CdaR. This was plotted separately as CdaR had high levels of fluorescence without induction that obscured the differences between the other biosensors. FIG. 17D The expression profile for MphR, which produces m Cherry.

Figure 18A:
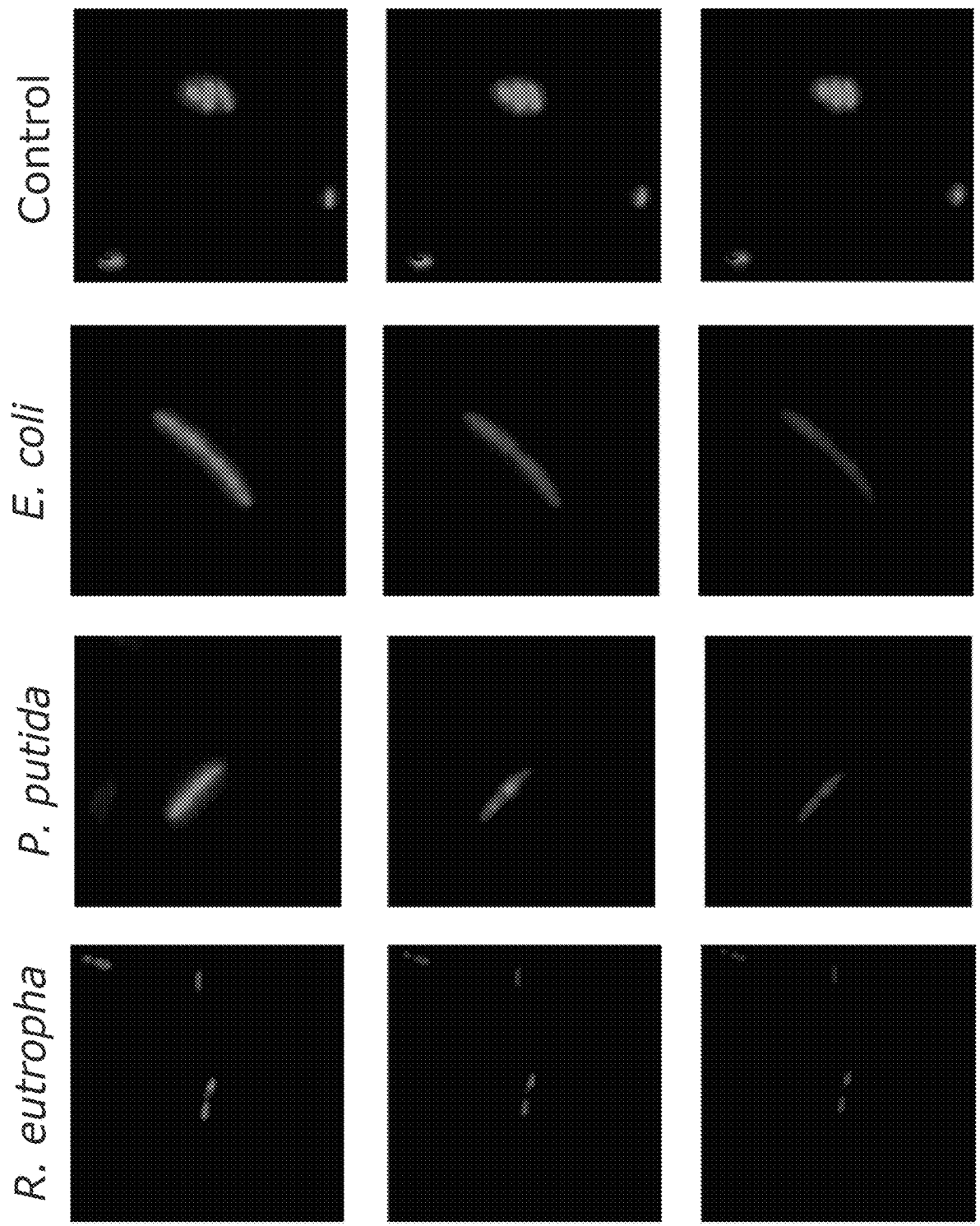
Figure 18B:
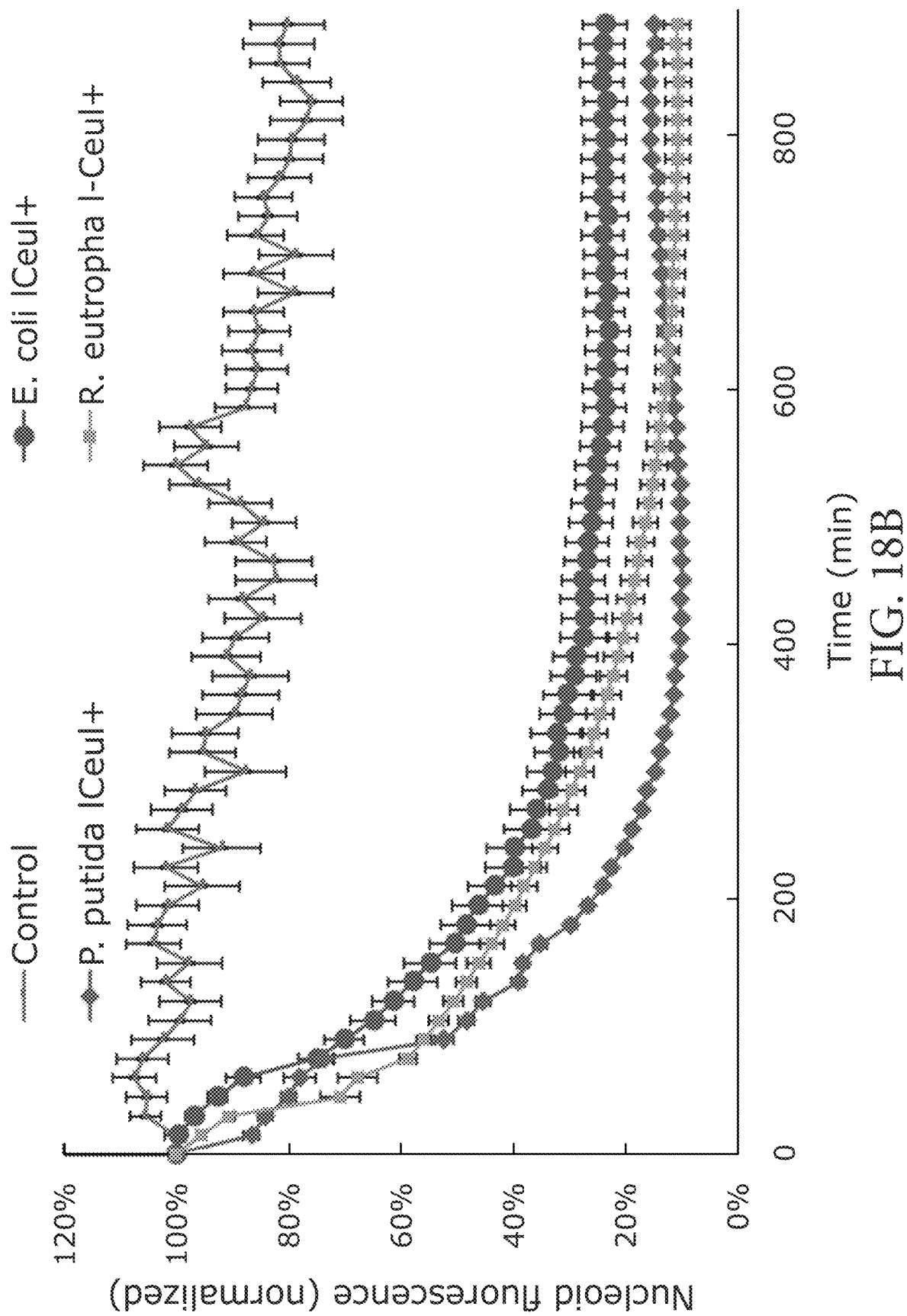

FIGS. 18A-18B: The fluorescence intensity of DAPI is lost over time after I-CeuI induction. The nucleoid DNA of strains were stained with DAPI. The E. coli, P. putida, and R. eutropha strains contain a plasmid with I-CeuI, while E. coli without I-CeuI acted as the control. FIG. 18A Screenshots of the time-lapse videos show the gradual decrease in fluorescence intensity of I-CeuI+ strains but not in the control (I-CeuI−). FIG. 18B Normalized fluorescence intensity of cells over time. Strains with I-CeuI+ show a rapid loss of DAPI while what little variation exhibited by the control (I-CeuI−) is likely due to noise.

Figure 19A:
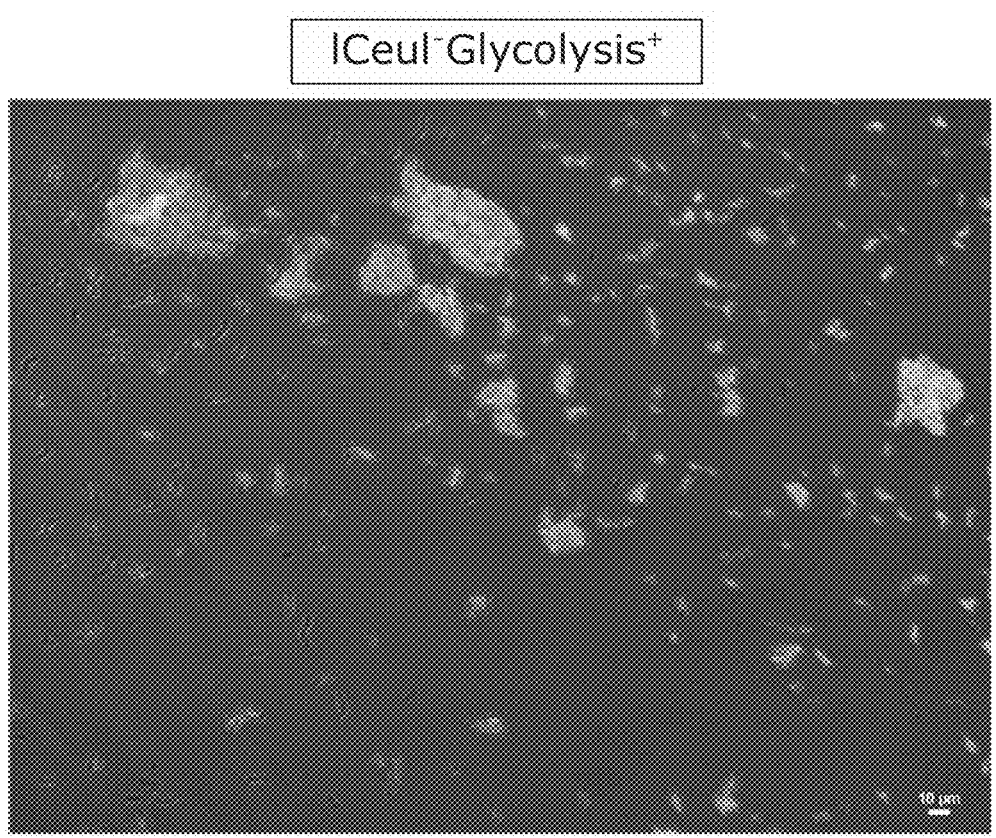
Figure 19B:
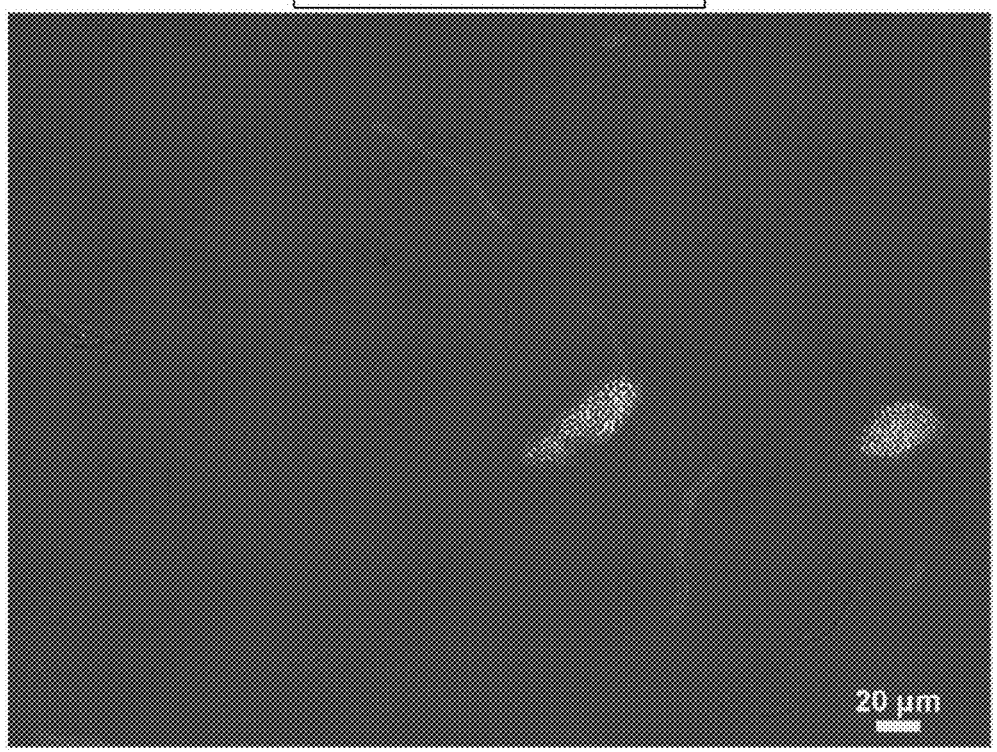

FIGS. 19A-19B: I-CeuI+ and ICeuI− strains with the glycolysis pathway grown overnight in agar. FIG. 19A In a culture with only normal cells (no I-CeuI), they readily formed colonies and produced both GFP and mCherry. FIG. 19B In an I-CeuI+ strain, a few remaining parent cells formed colonies and produced both GFP and mCherry, while the majority of cells did not form colonies, indicating that they were SimCells (non-replicative) that expressed mCherry and not GFP (chromosome-free).

Figure 20:
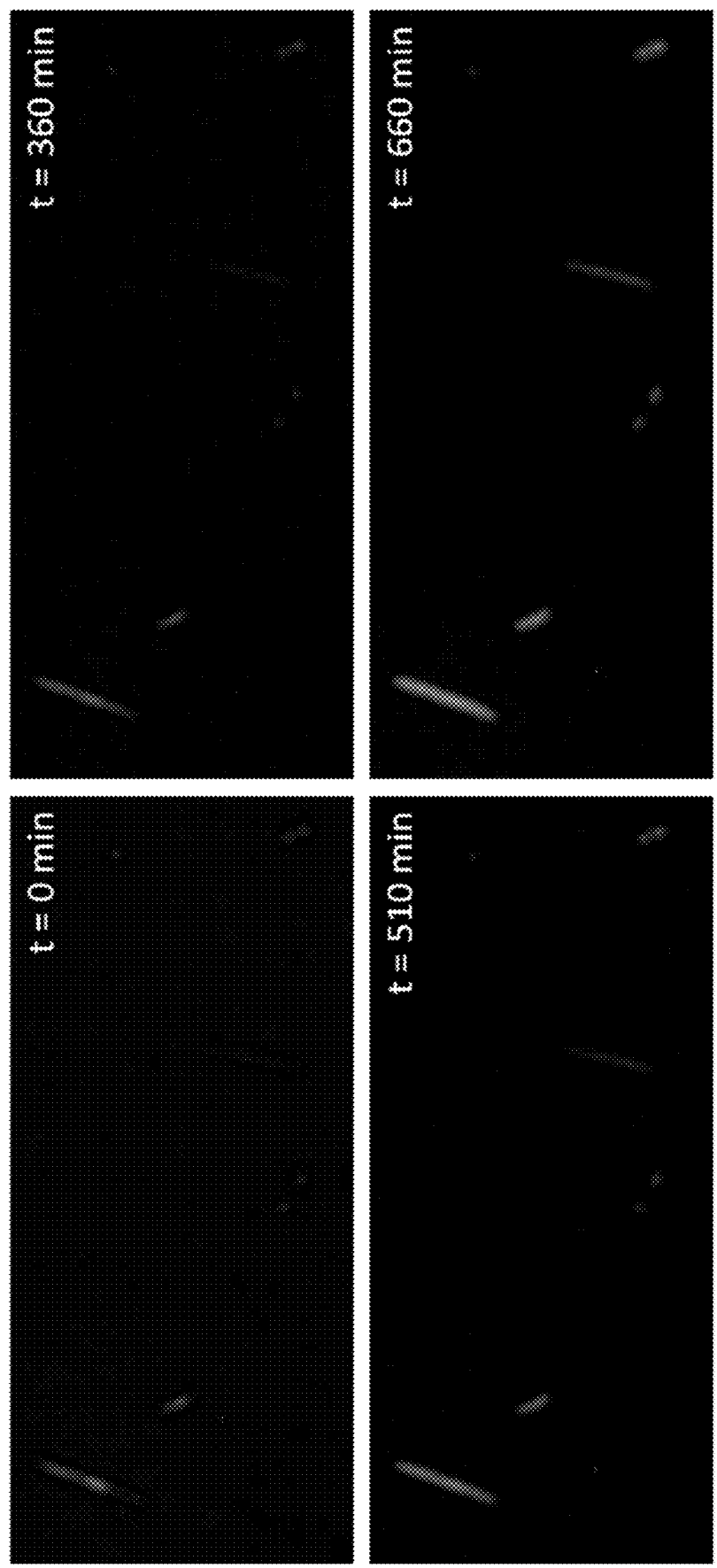

FIG. 20: Screenshots of a time-lapse video of an I-CeuI+ Glycolysis+ strain producing protein. Cells were stained with DAPI, which decreased in fluorescence as SimCells were generated. The chromosome-free SimCells then produced mCherry.

Figure 21A:
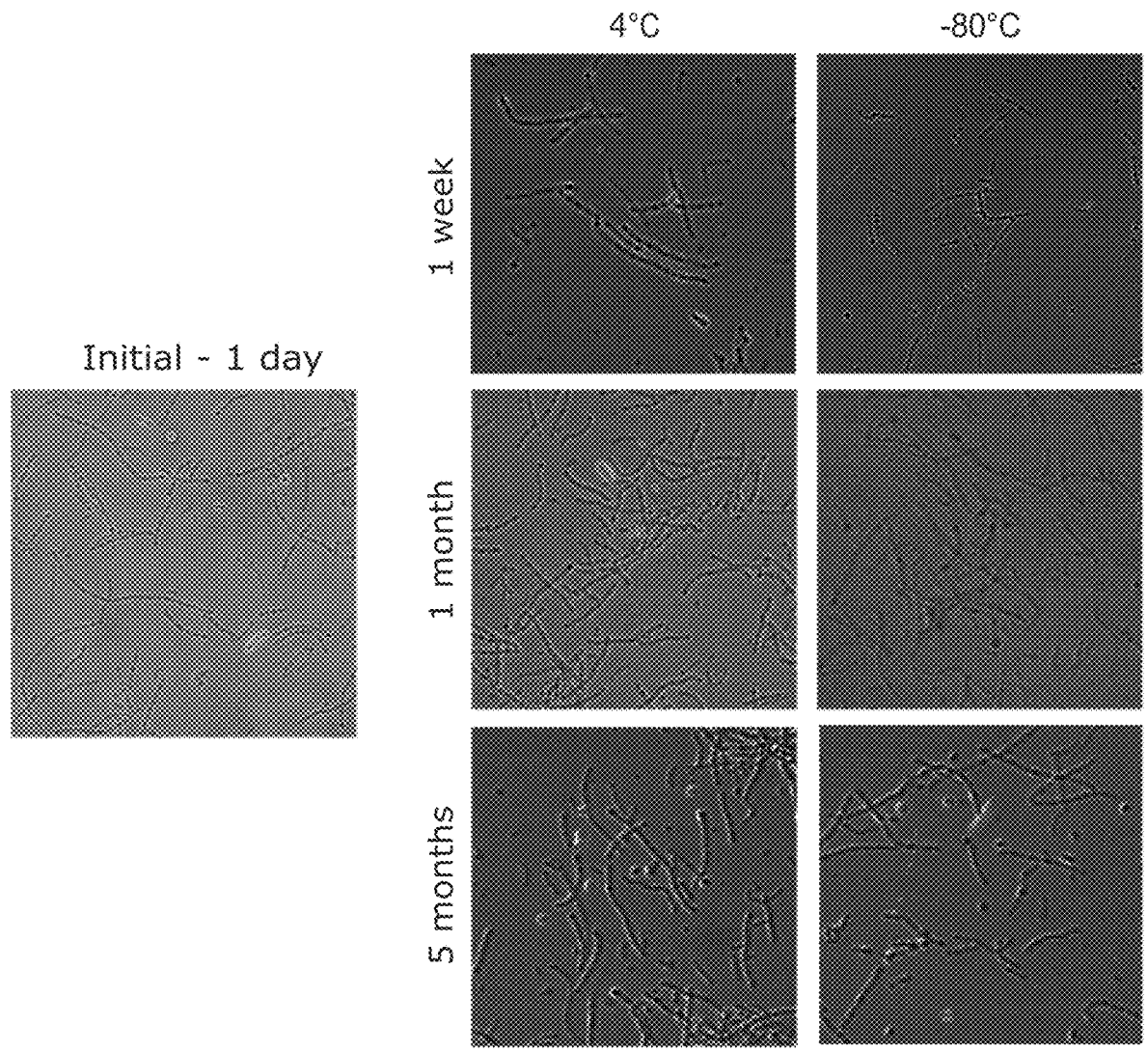
Figure 21B:
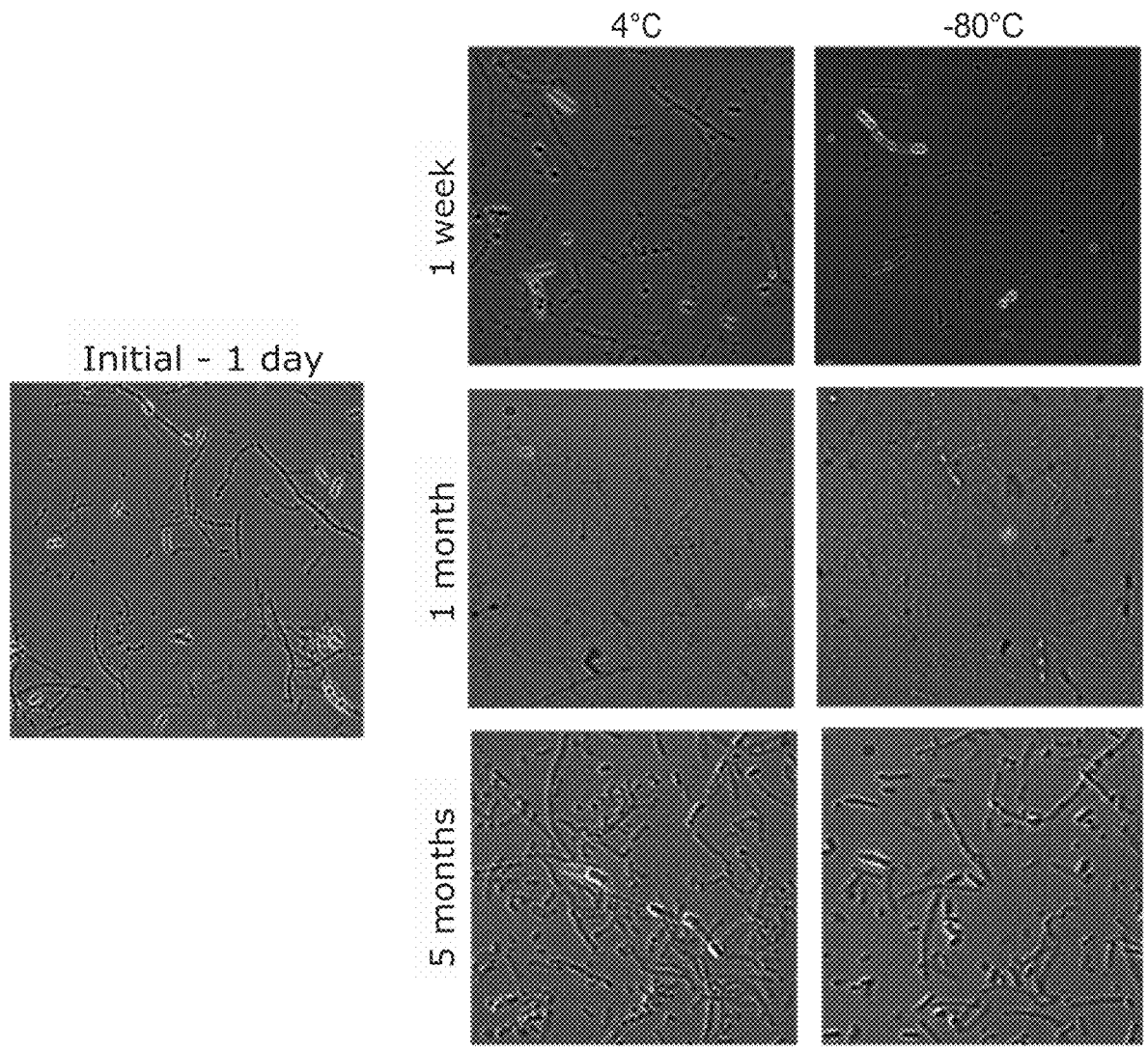
Figure 21C:
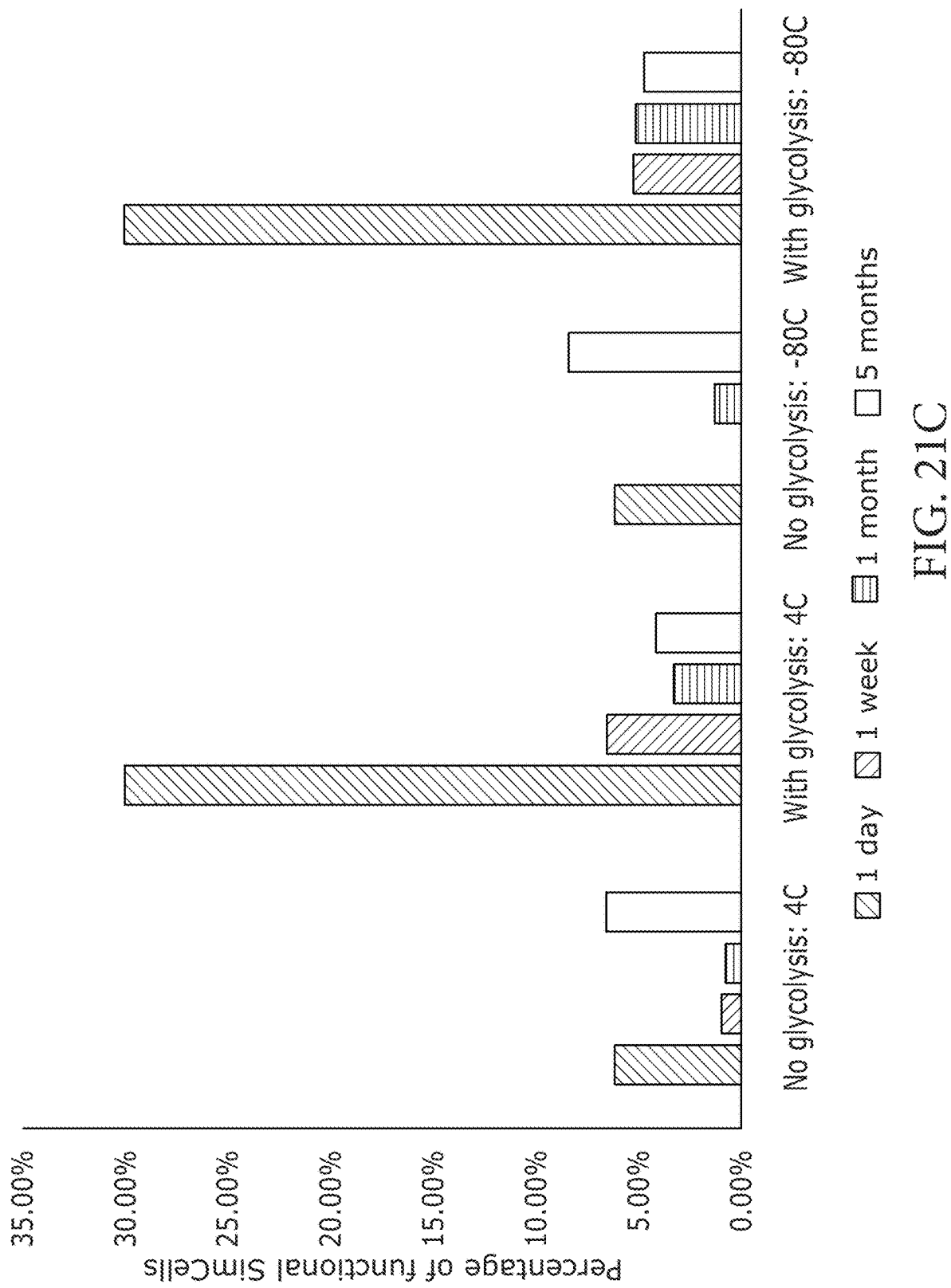

FIGS. 21A-21C: Shelf-life of purified SimCells stored at 4° C. and −80° C. Their functionality was tested after 1 day, 1 week, 1 month, and 5 months in storage. Storage at 4° C. seemed to have preserved metabolic activity of SimCells FIG. 12A without glycolysis or FIG. 21B with glycolysis, better than storage at −80° C. FIG. 21C Estimation of the proportion of functional SimCells based on microcopy images. Storage severely affected the number of SimCells that could produce mCherry.

Figure 22:
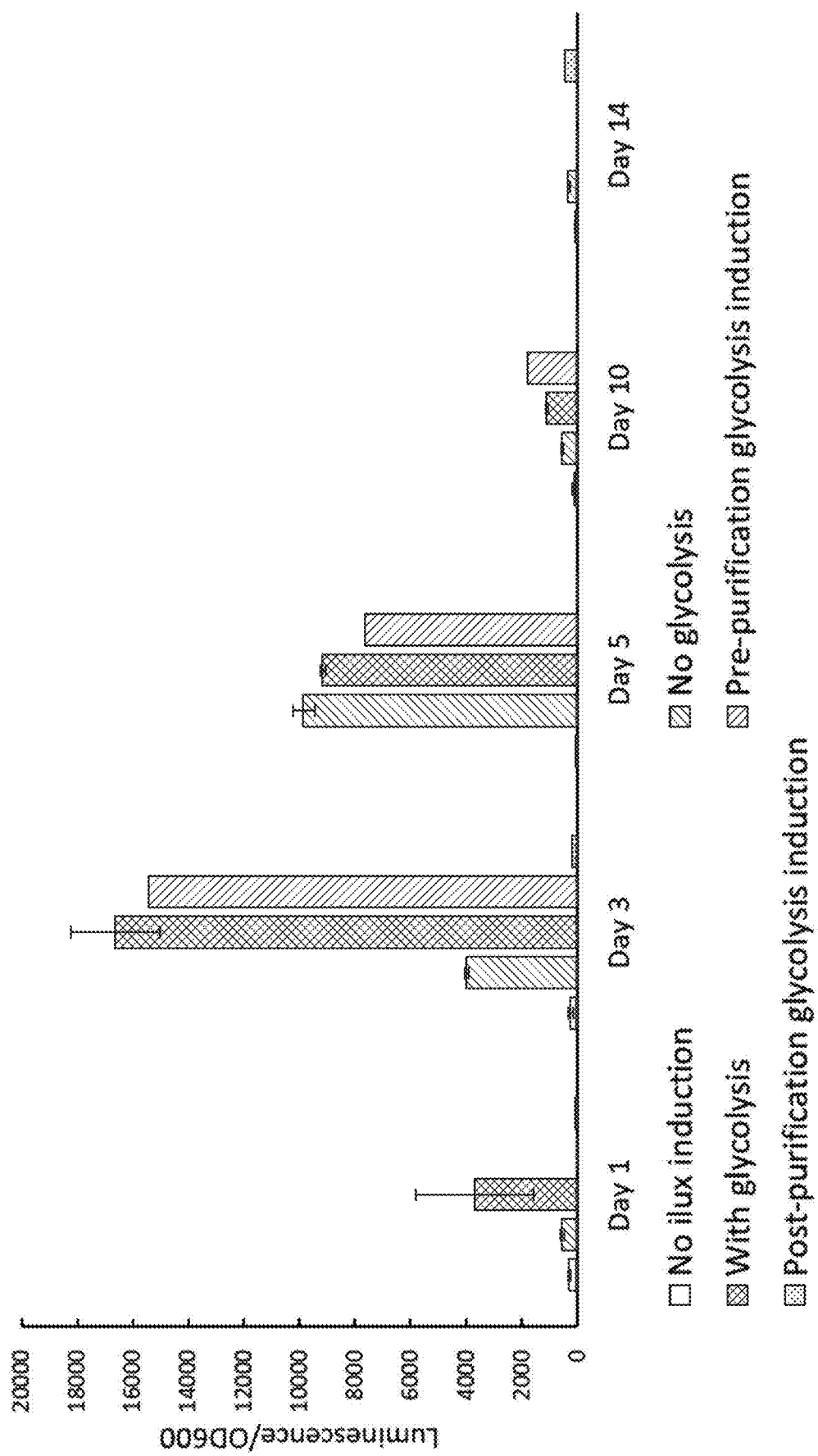

FIG. 22: Induction of the glycolysis pathway overwhelmed SimCells. In pre-purification glycolysis induction, IPTG and glucose were added to the overnight cultures which contained a mix of SimCells and parent cells. In post-purification glycolysis induction, IPTG and glucose were added to purified SimCell cultures. With pre-purification glycolysis induction SimCells could produce luminescence for about 10 days, but post-purification induced SimCells could not produce any luminescence.

Figure 23:
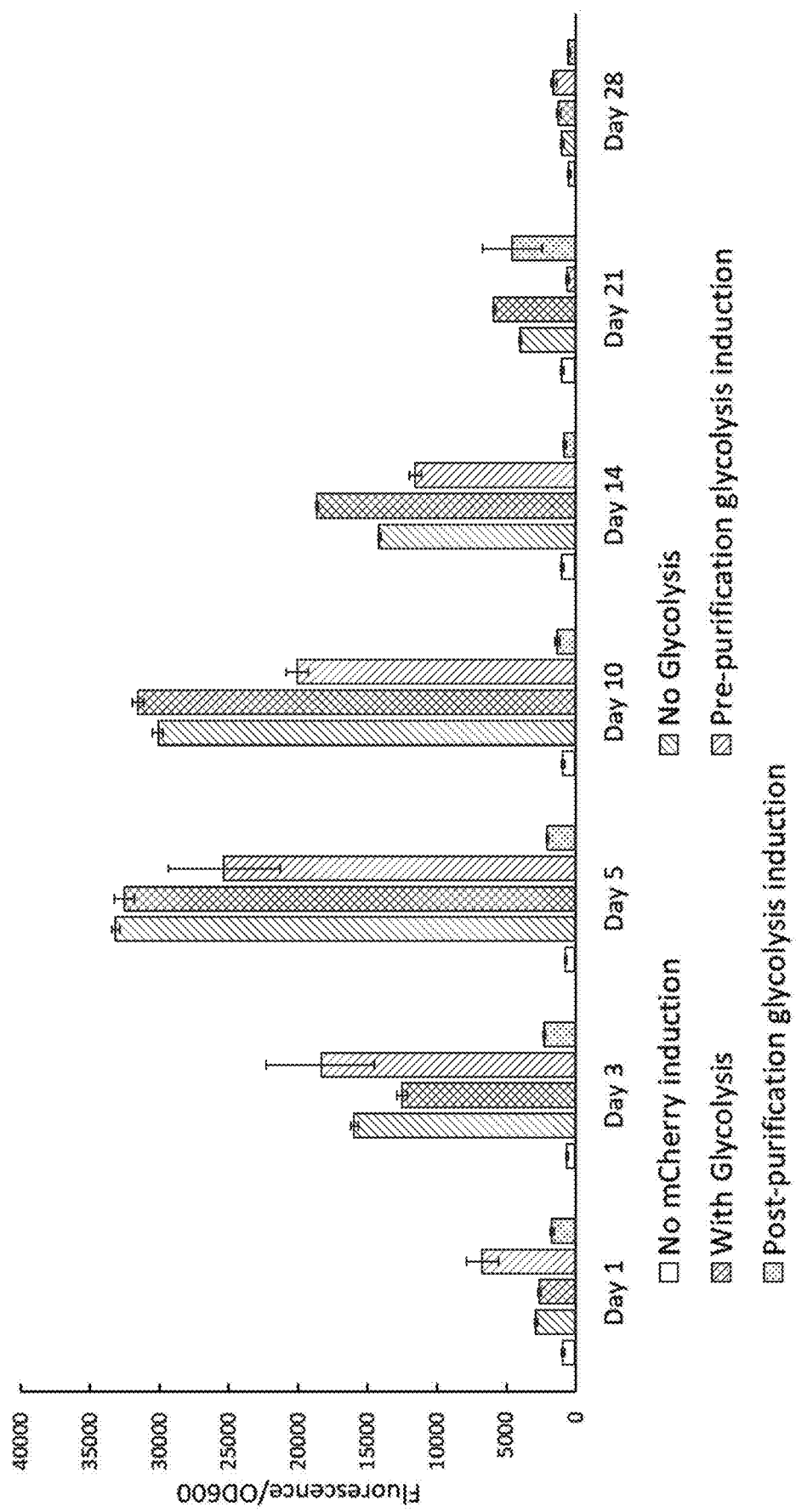

FIG. 23: Sim Cells struggled to produce m Cherry-ASV with induction of the glycolysis pathway. In pre-purification glycolysis induction, IPTG and glucose were added to the overnight cultures which contained a mix of SimCells and parent cells. In post-purification glycolysis induction, IPTG and glucose were added to purified SimCell cultures. With pre-purification glycolysis induction fluorescence detected from unstable mCherry stopped increasing after 5 days (likely the point where transcription and translation did not have enough energy to be operational). When a pure SimCell culture was made to produce more glycolytic proteins, insignificant amounts of mCherry was produced, as SimCells were overwhelmed by the energy cost of transcription and translation.

Figure 24A:
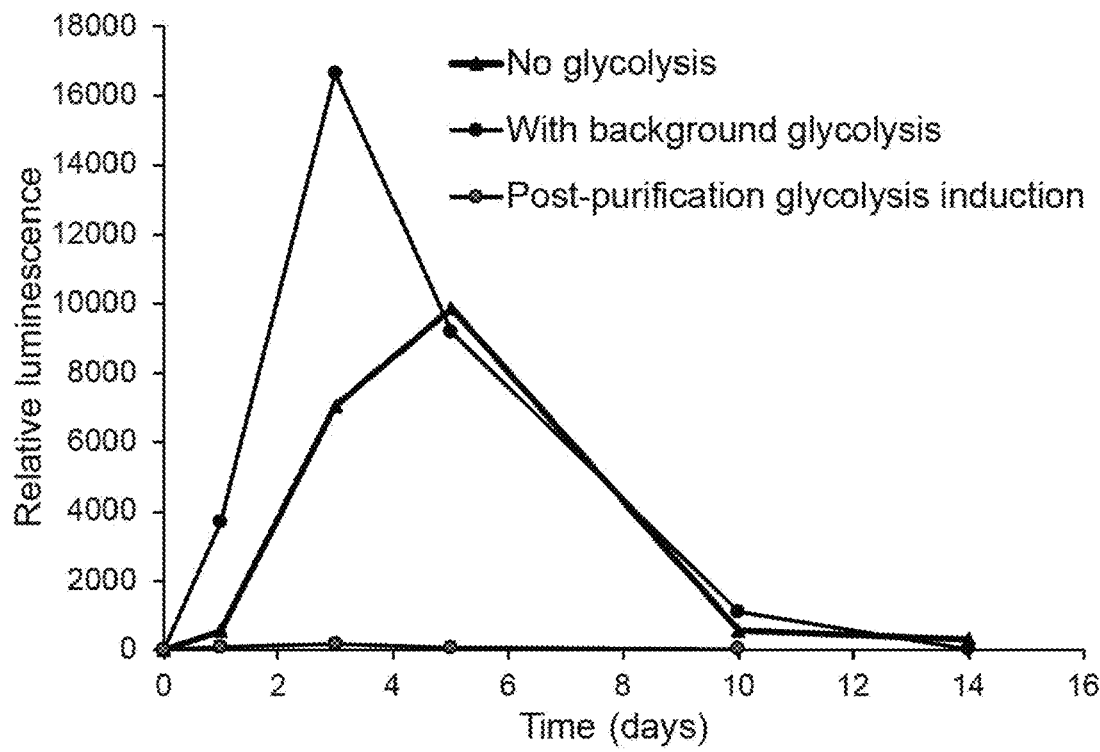
Figure 24B:
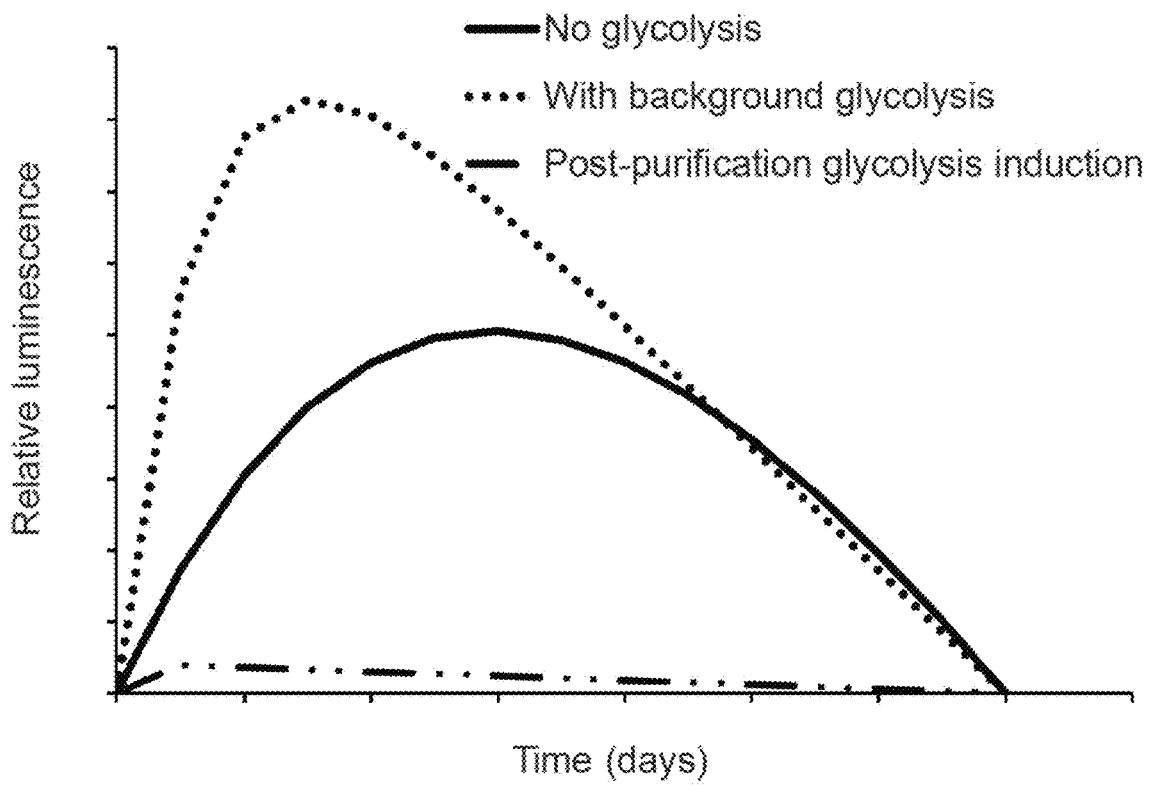

FIGS. 24A-24B: Mathematical model of luminescence production in SimCells. FIG. 24A Line graph representation of luminescence production data. FIG. 24B Graphical result of the mathematical model closely resembles with the trend of the experimental data for luminescence production over time. When the glycolysis pathway is induced, SimCells are overwhelmed by the additional energy burden so cannot produce luminescence. When glycolytic proteins are present at background levels there is added benefit in terms of better luminescence production when compared to SimCells without the glycolysis pathway. But this benefit eventually wears off after 5 days and the performance of SimCells background glycolysis and no glycolysis are comparable.

Figure 25A:
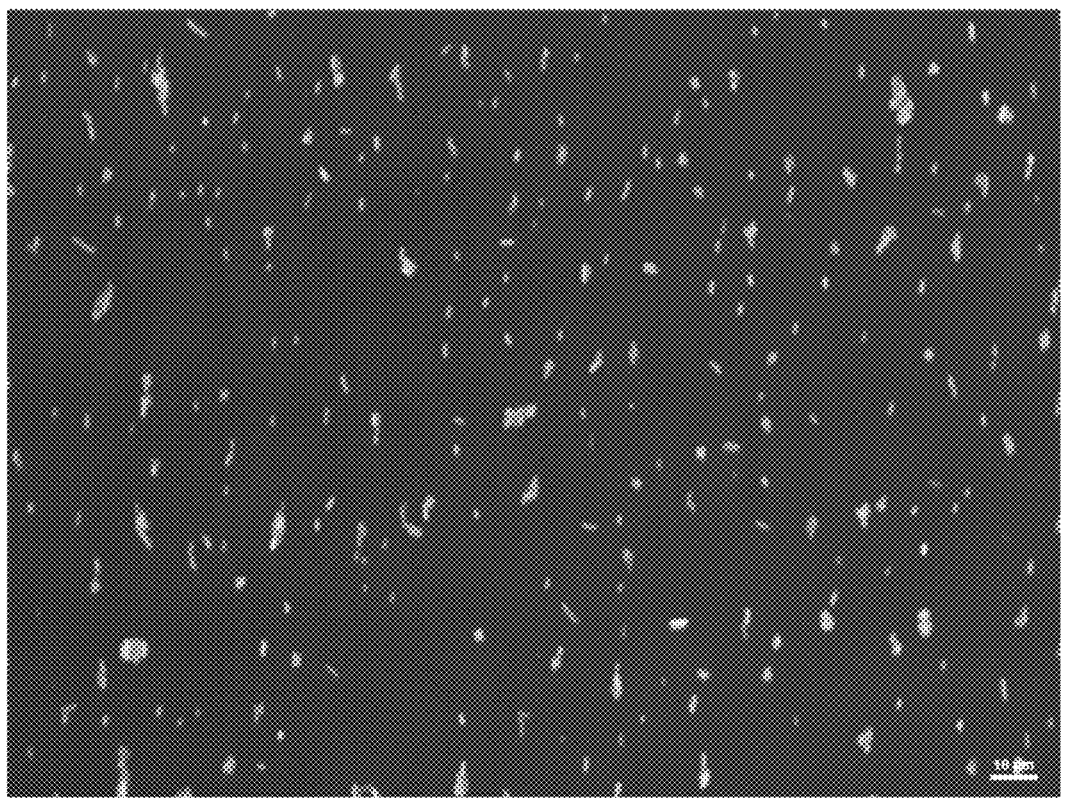
Figure 25B:
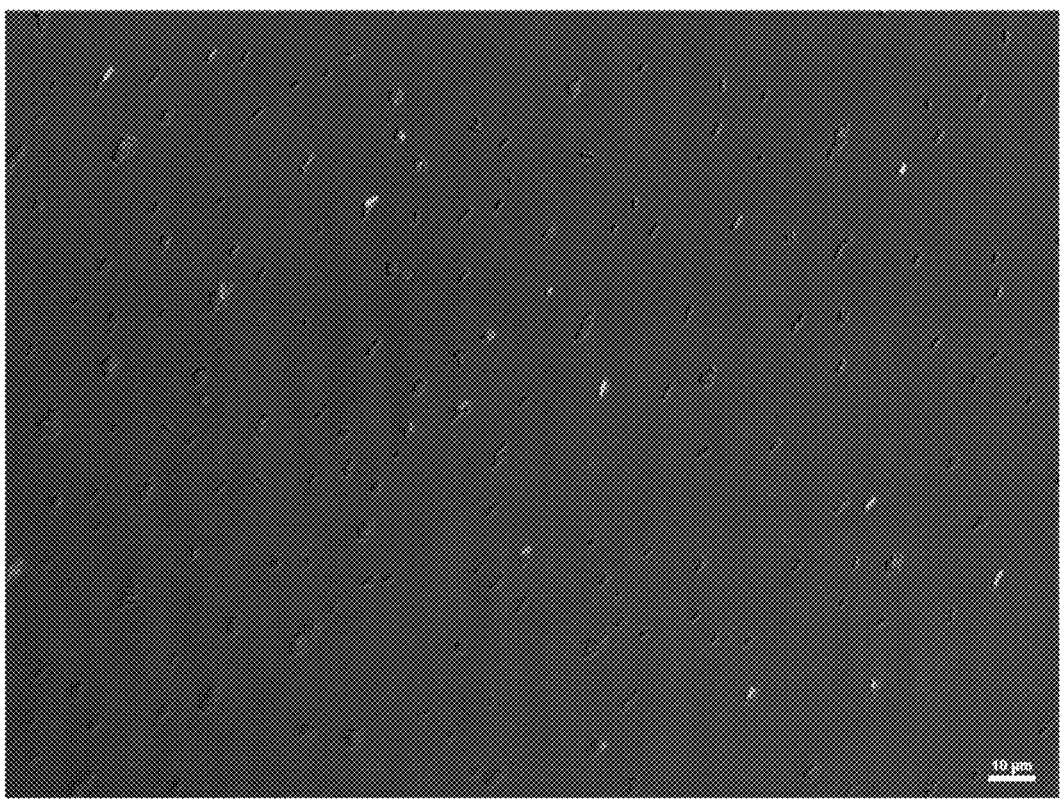

FIGS. 25A-25B: Integrity of the lac reporter system. The strain E. coli BW31005 with a chromosomal GFP reporter under control of the lac operon was FIG. 25A, induced and FIG. 25B, not induced with 1 mM IPTG for GFP expression. Without any induction, there was leaky expression of GFP due to the weak binding of the LacI repressor to the $P_{trc}$ promoter.

Figure 26A:
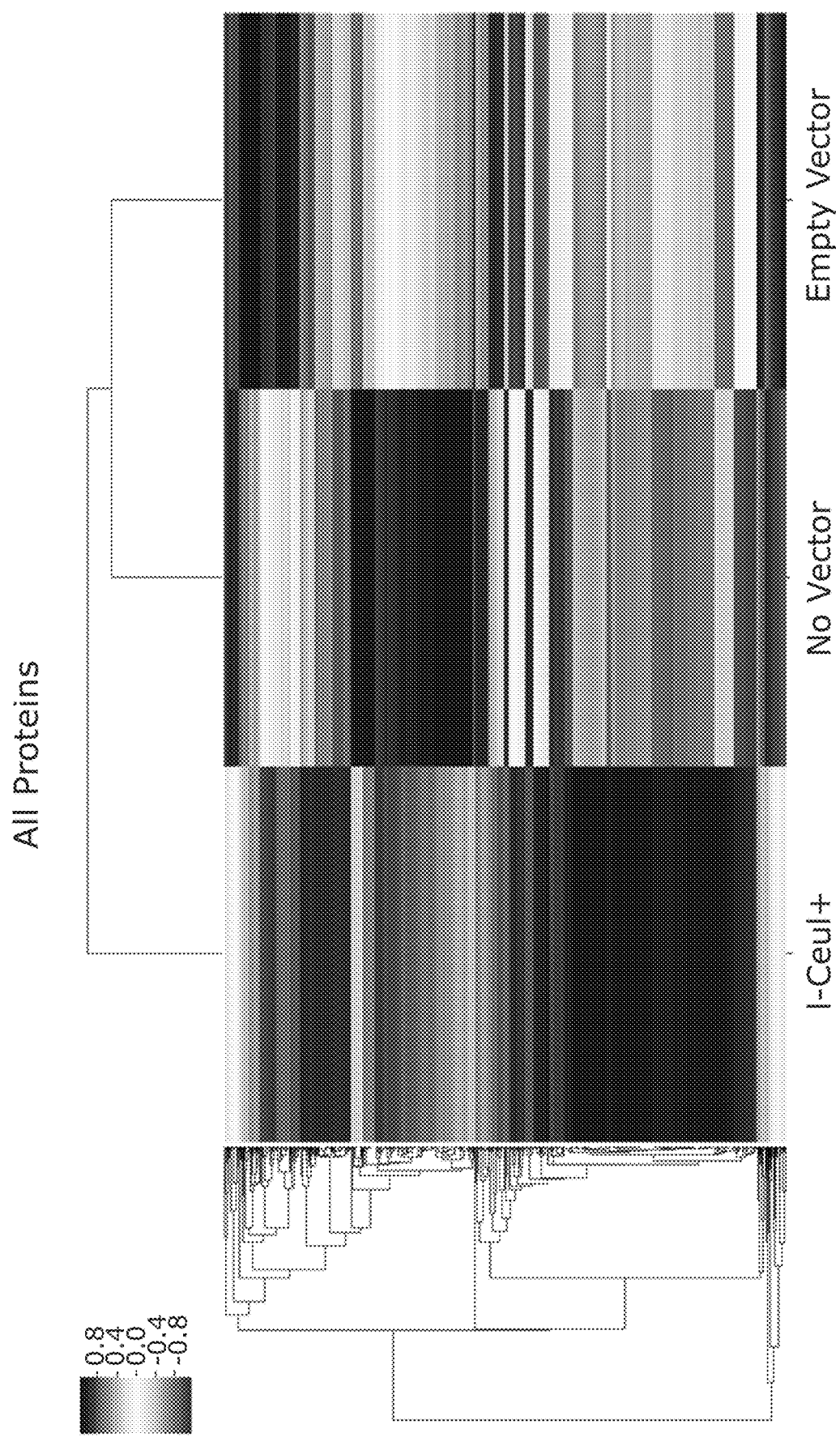
Figure 26B:
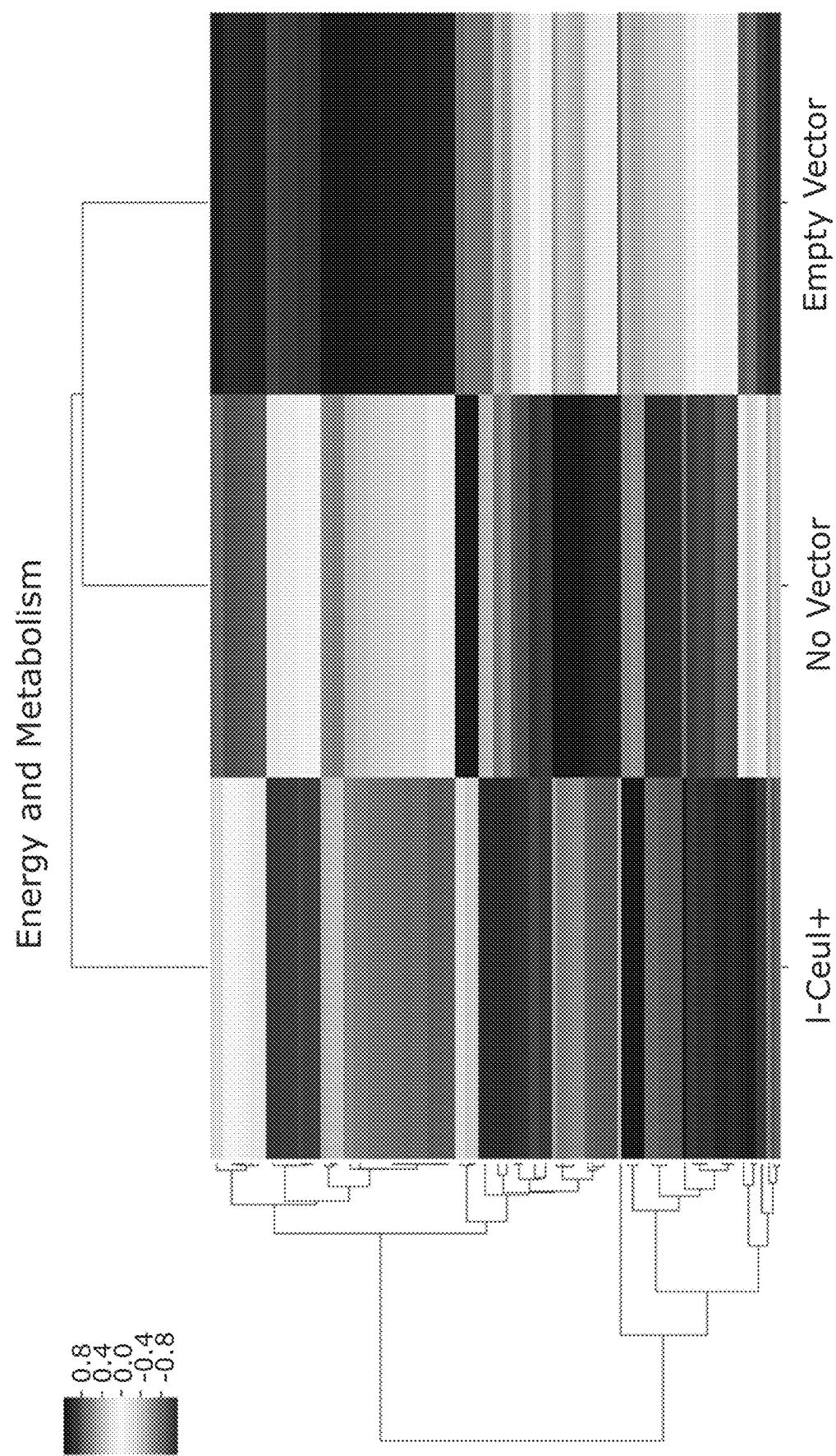
Figure 26C:
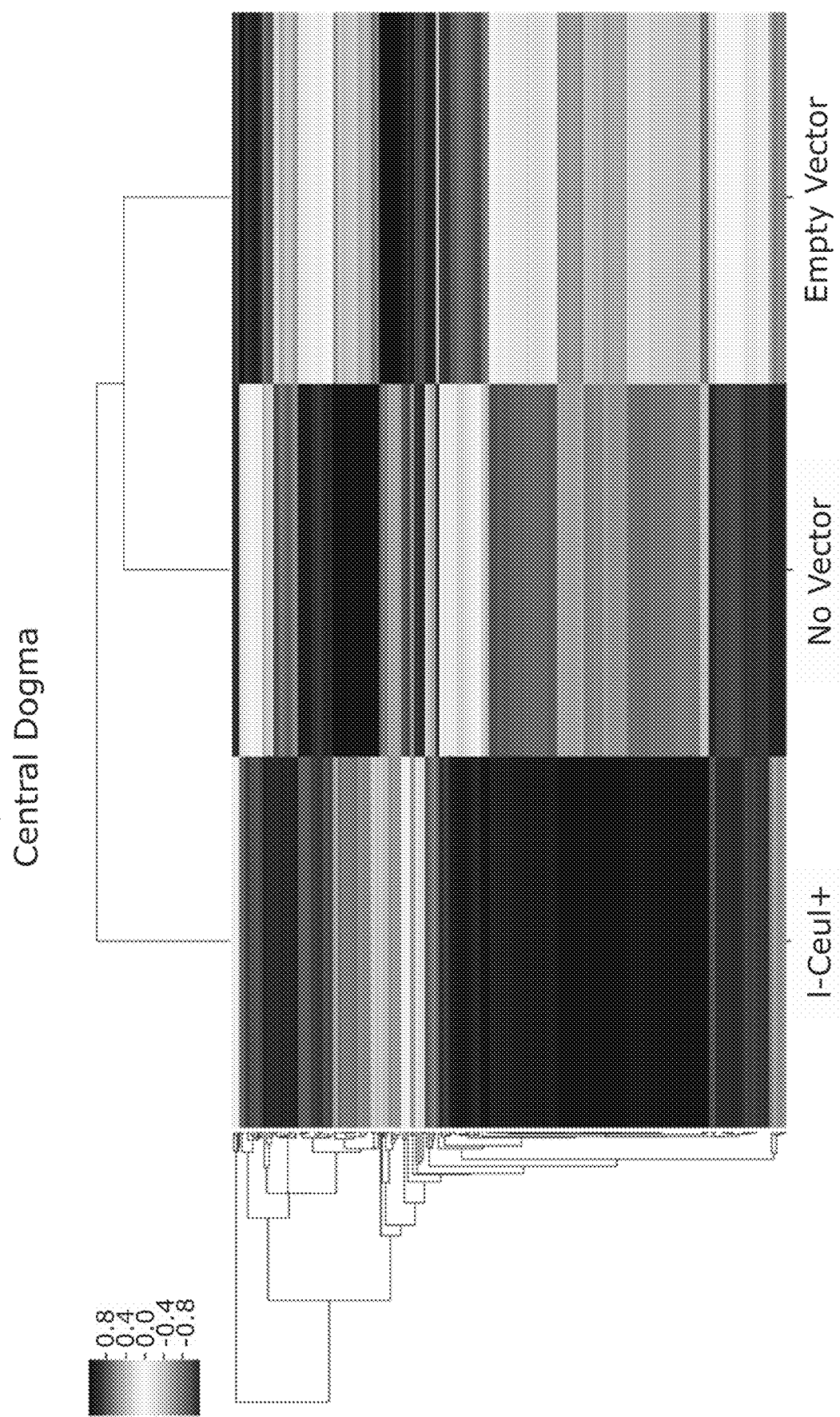
Figure 26D:
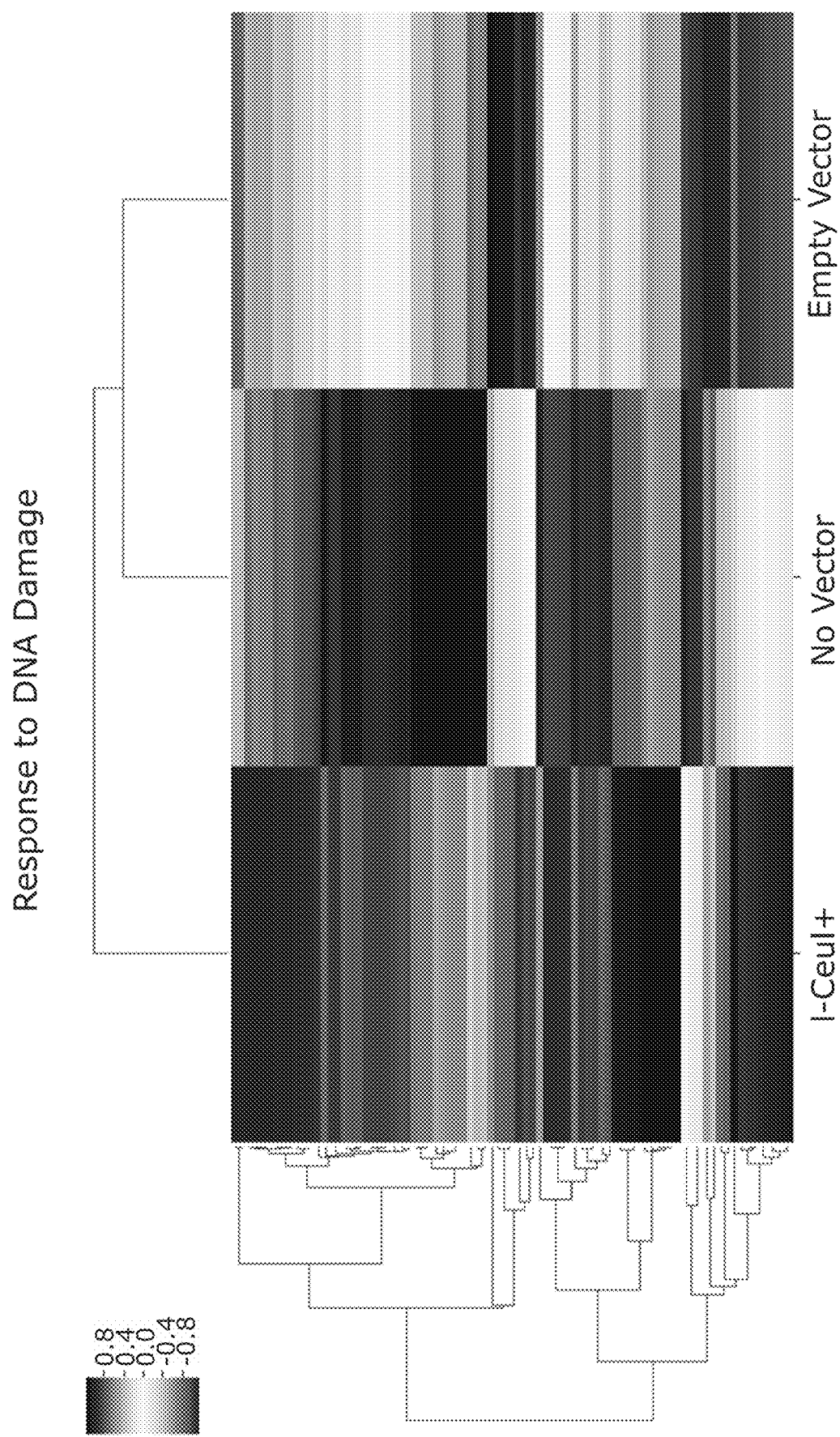
Figure 26E:
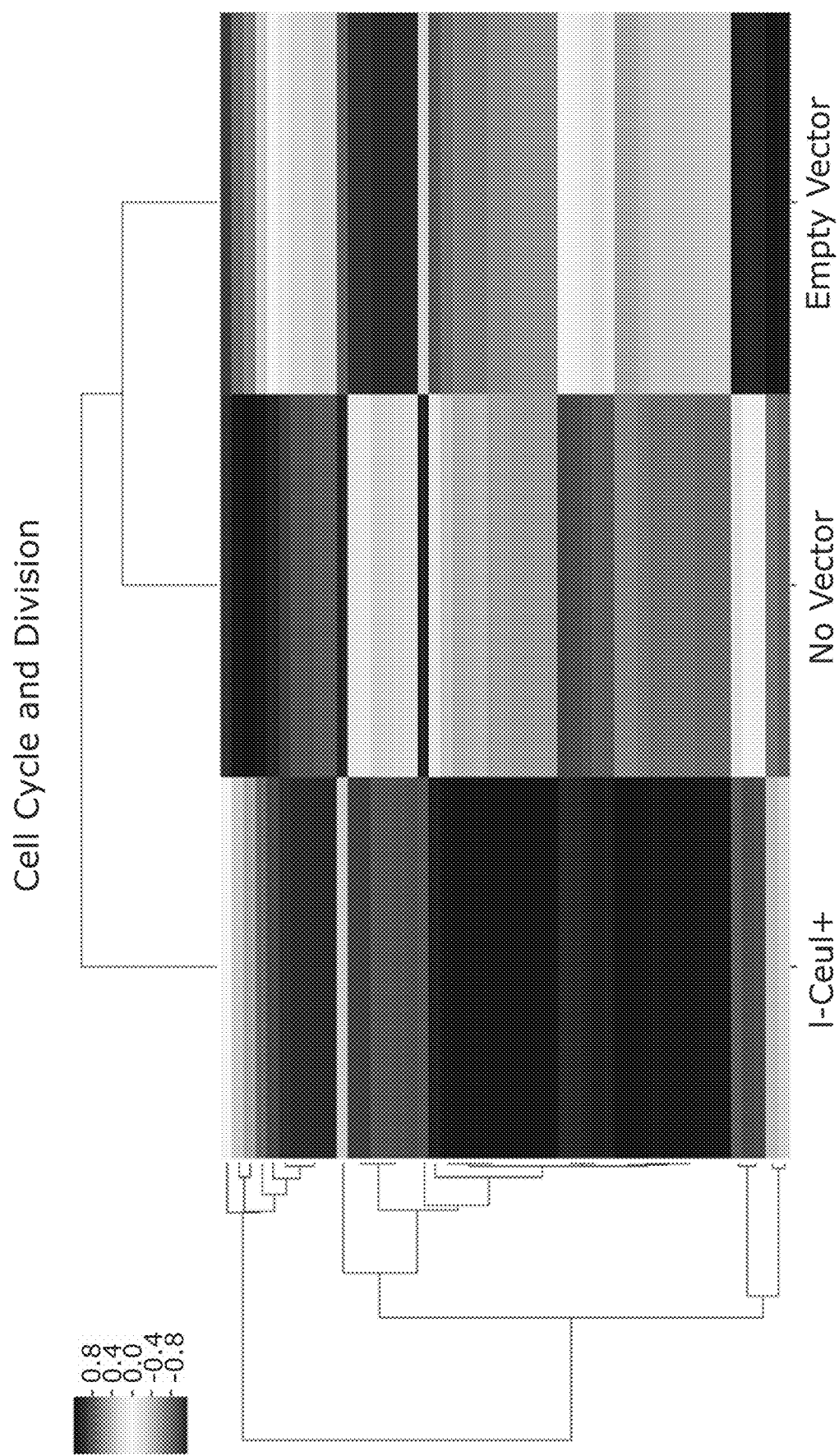

FIGS. 26A-26E: Dendrograms and their associated heatmaps of the relative protein abundance profile of DH5a strains. A cluster analysis was used and the data was row scaled. In the I-CeuI+ strain, the proteome had a distinct abundance profile when compared to the proteomes of the control strains (no vector, empty vector). FIG. 26A All proteins that were detected and identified. FIG. 26B Proteins associated with energy and metabolism. FIG. 26C Proteins associated with central dogma. FIG. 26D Proteins associated with DNA damage response. FIG. 26E Proteins associated with cell cycle and division.

Figure 27:
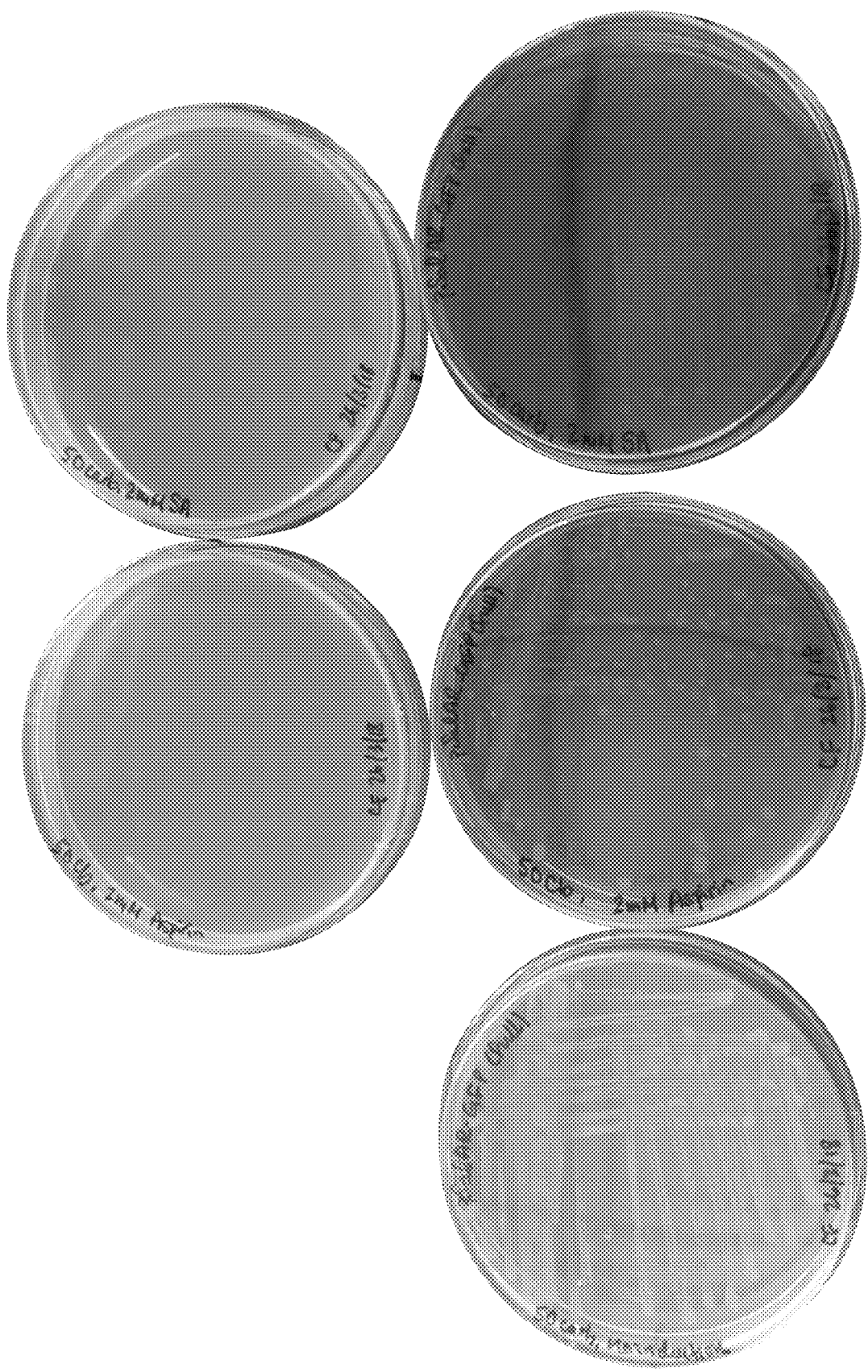

FIG. 27: Catechol production by E. coli. LB agar plates with aspirin and salicylic acid have no color (top), while catechol is distinctly brown (bottom). When E. coli with pSalAR-GFP was plated on agar with inducers aspirin (bottom middle) or salicylic acid (bottom right) catechol was produced and diffused out of the cell, tinting the agar brown. The plate with no inducer did not turn brown (bottom left).

Figure 28:
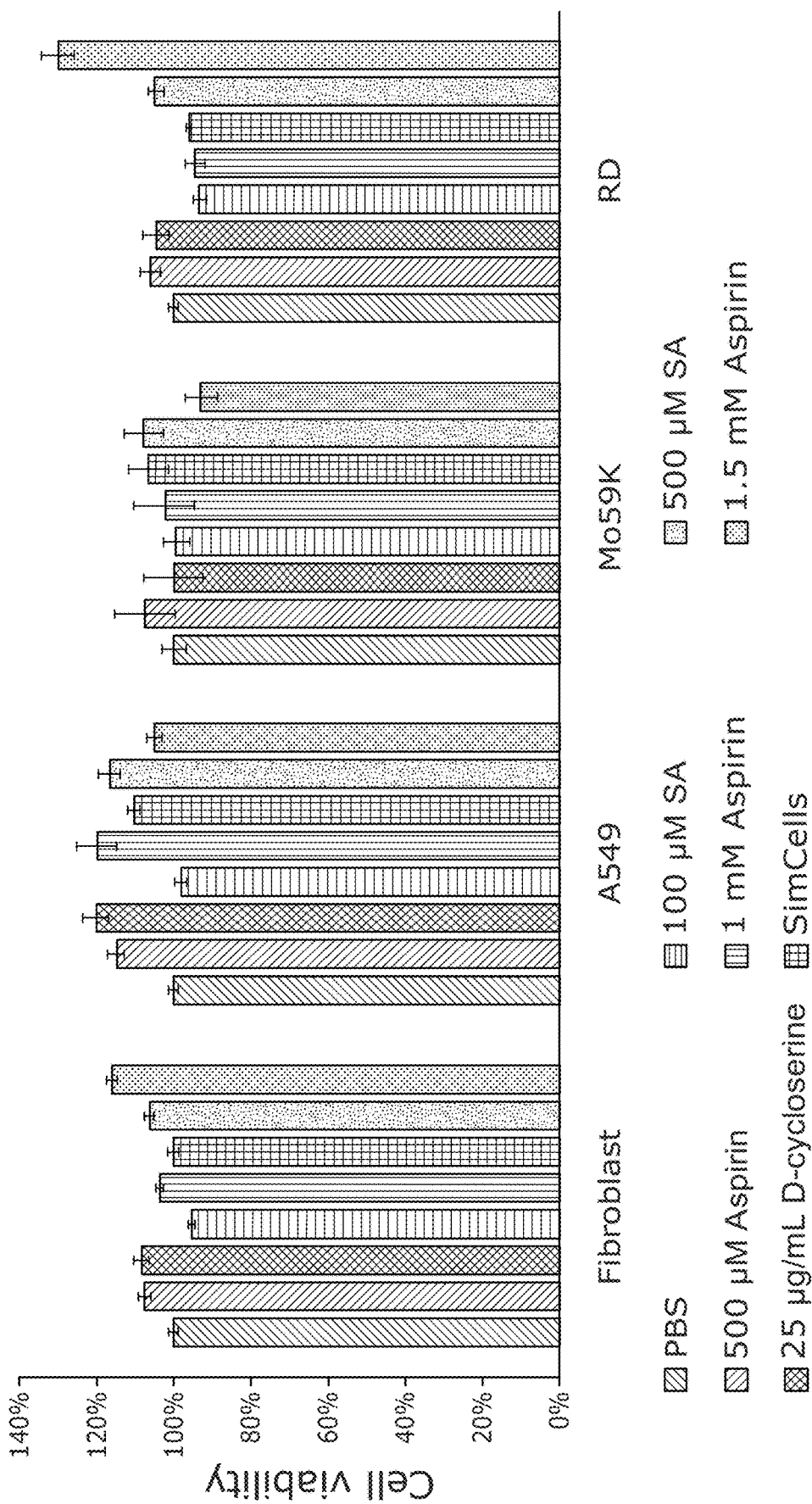

FIG. 28: Cell viability of fibroblasts; A549, Mo59K, and RD cancer cells treated with supplements. These mammalian cell lines were incubated with inducers salicylic acid (SA) or aspirin, D-cycloserine, or SimCells. PBS was used as a control. These additions had no adverse effects on the viability of the mammalian cell lines.

Figure 29A:
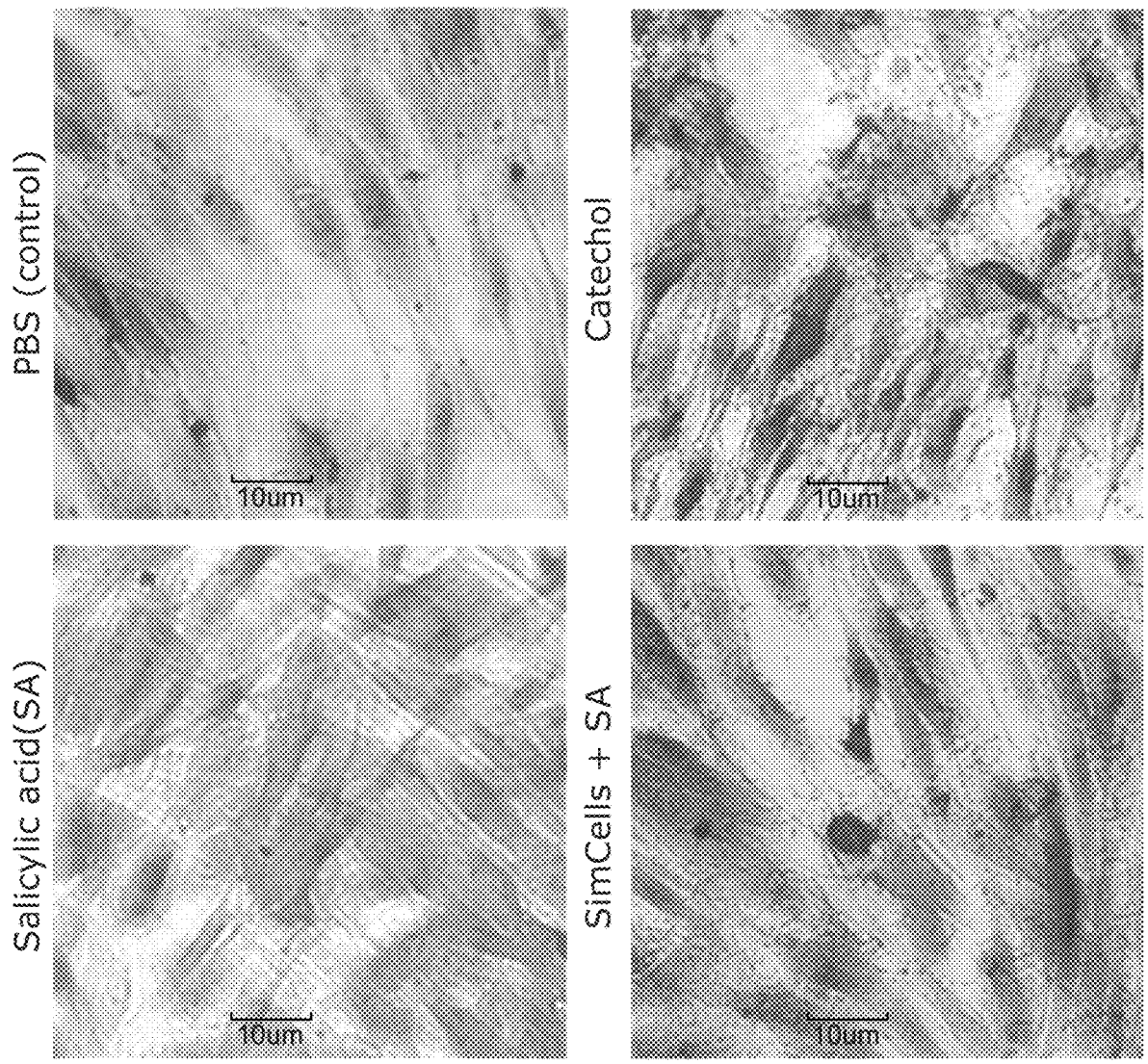
Figure 29B:
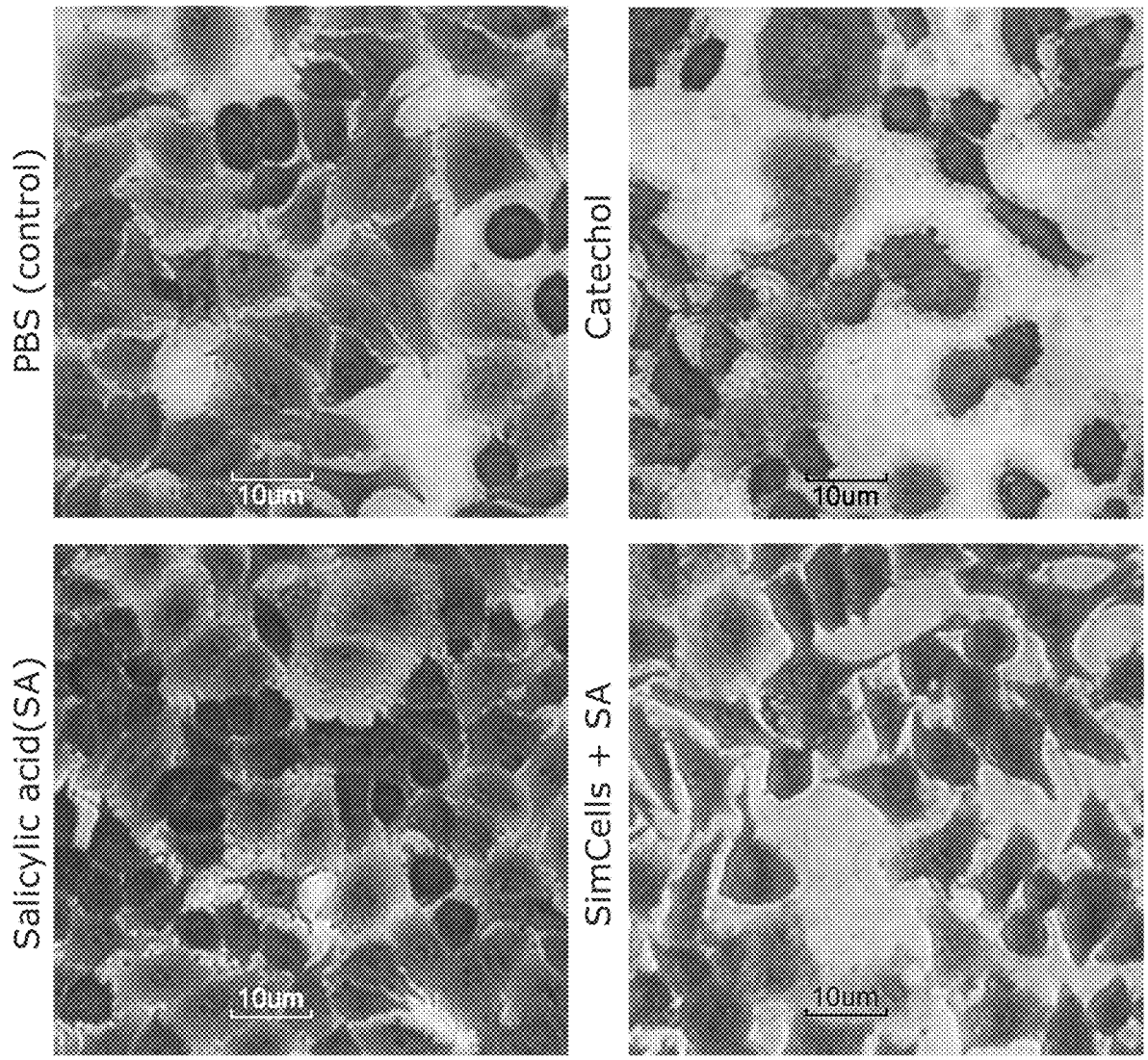
Figure 29C:
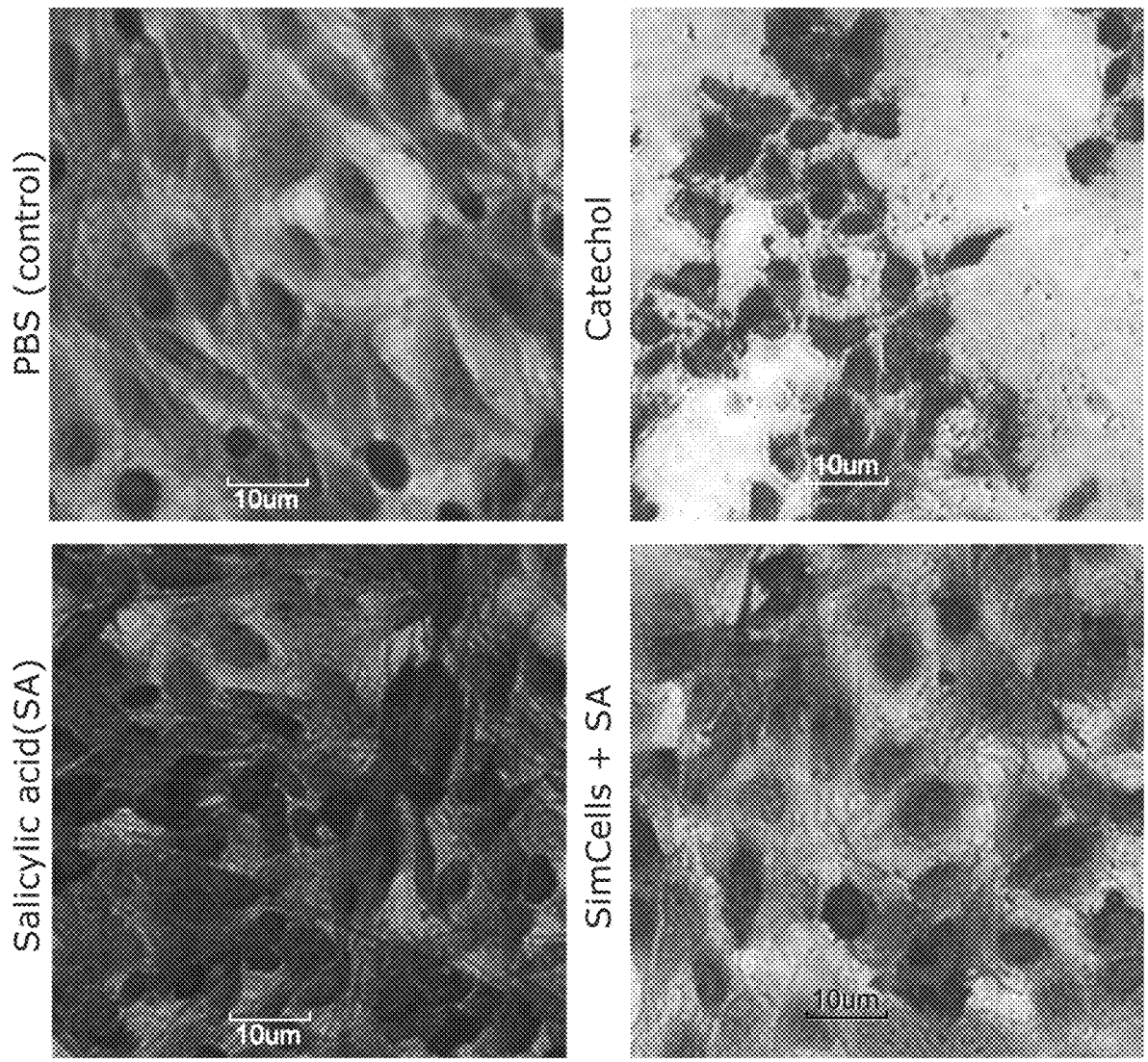
Figure 29D:
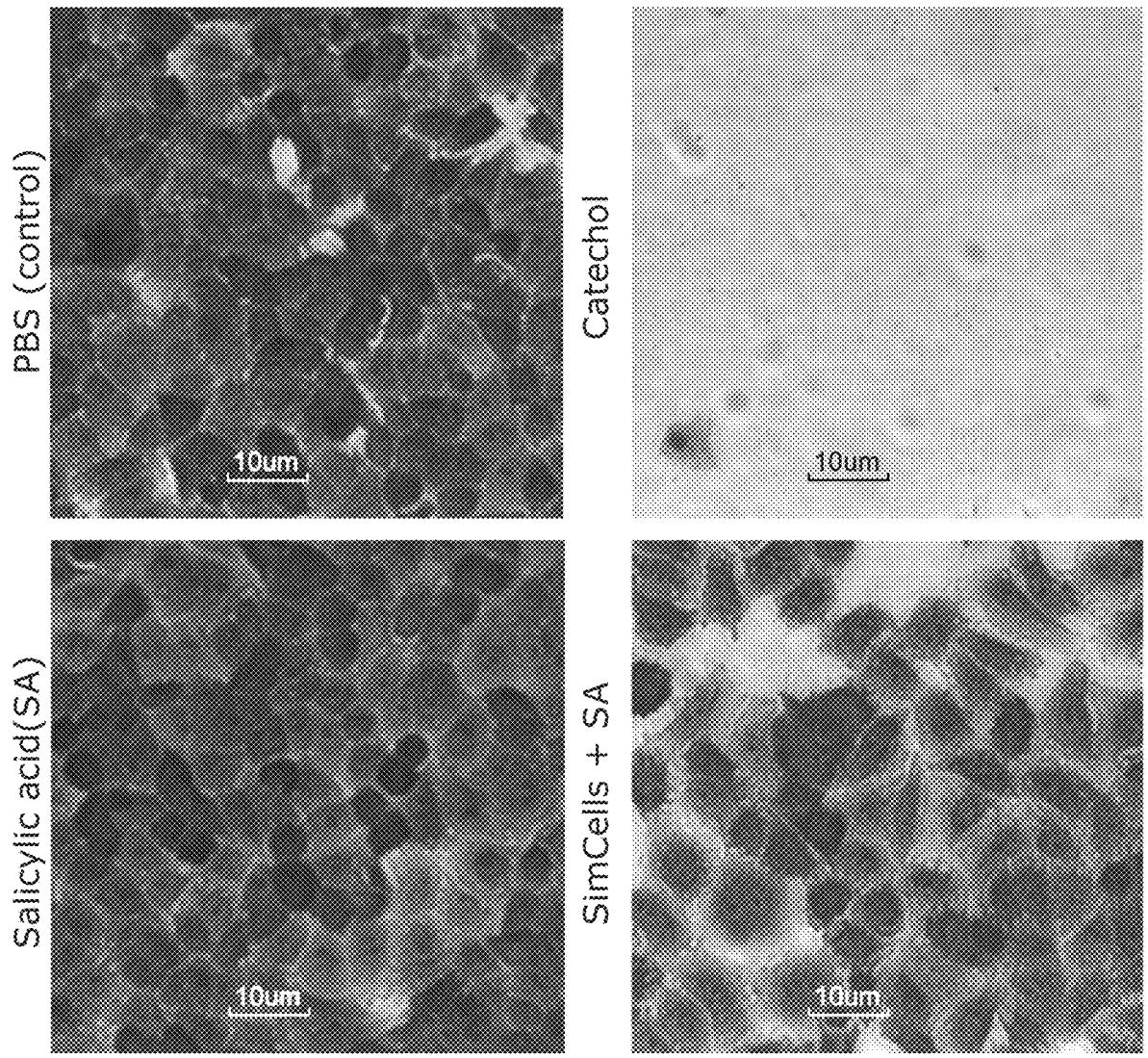

FIGS. 29A-29D: Brightfield images of cell lines stained with crystal violet during the cell viability assay. Cells were grown in media supplemented with PBS (control), 1 mM catechol, 500 µM salicylic acid (SA), or SimCells induced with 500 µM SA for catechol production. SA by itself had no adverse effect on cell lines. Catechol dramatically reduced cell viability of cancer cells and SimCells that synthesized catechol from SA also had some visible effect on cell viability of cancer cells. FIG. 29A, Fibroblasts FIG. 29B, A549 lung cancer cells FIG. 29C, Mo59K brain cancer cells and FIG. 29D, RD soft tissue cancer cells.

Figure 30:
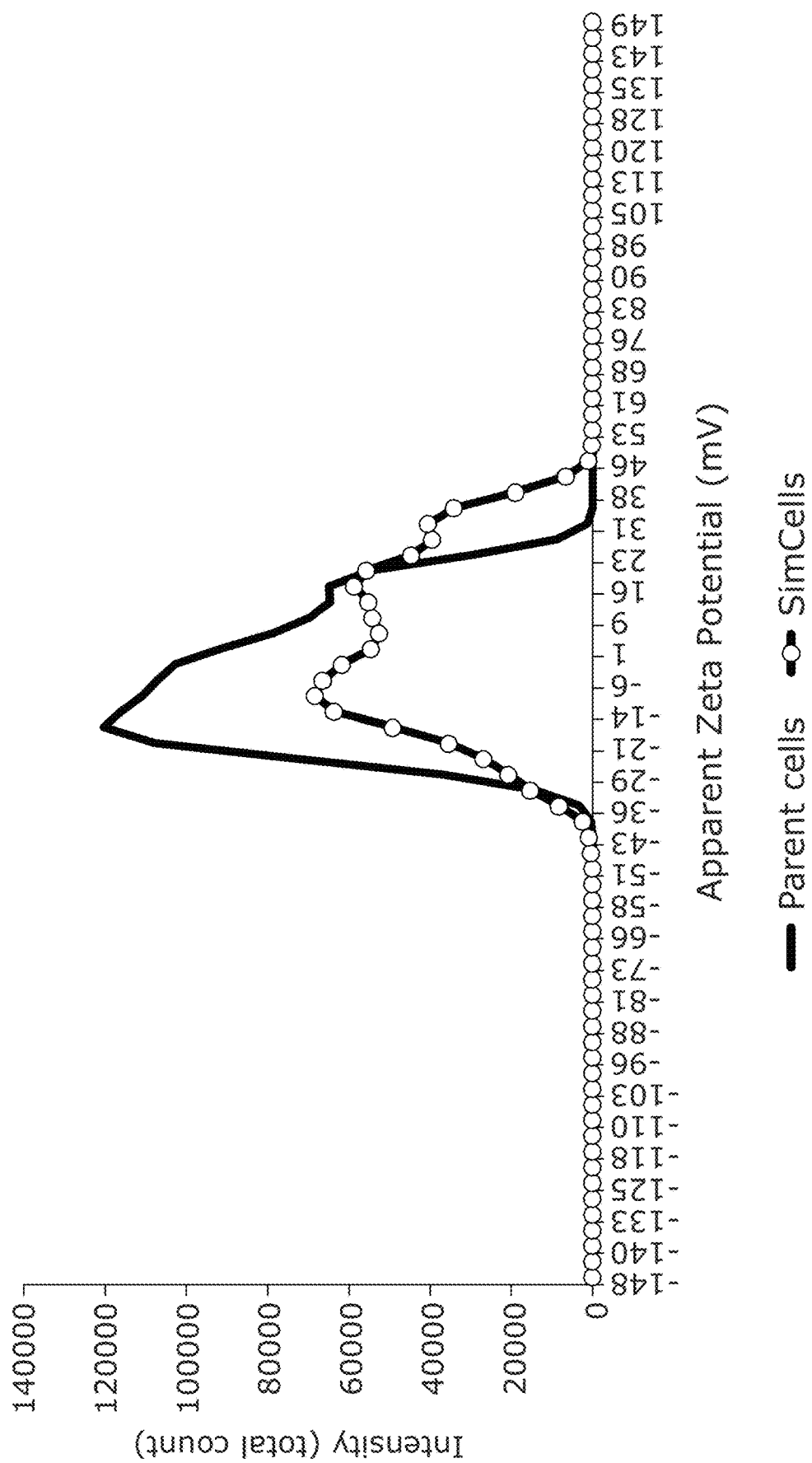

FIG. 30: Zeta potential distribution of parent cells and purified Sim Cells.

Figure 31A:
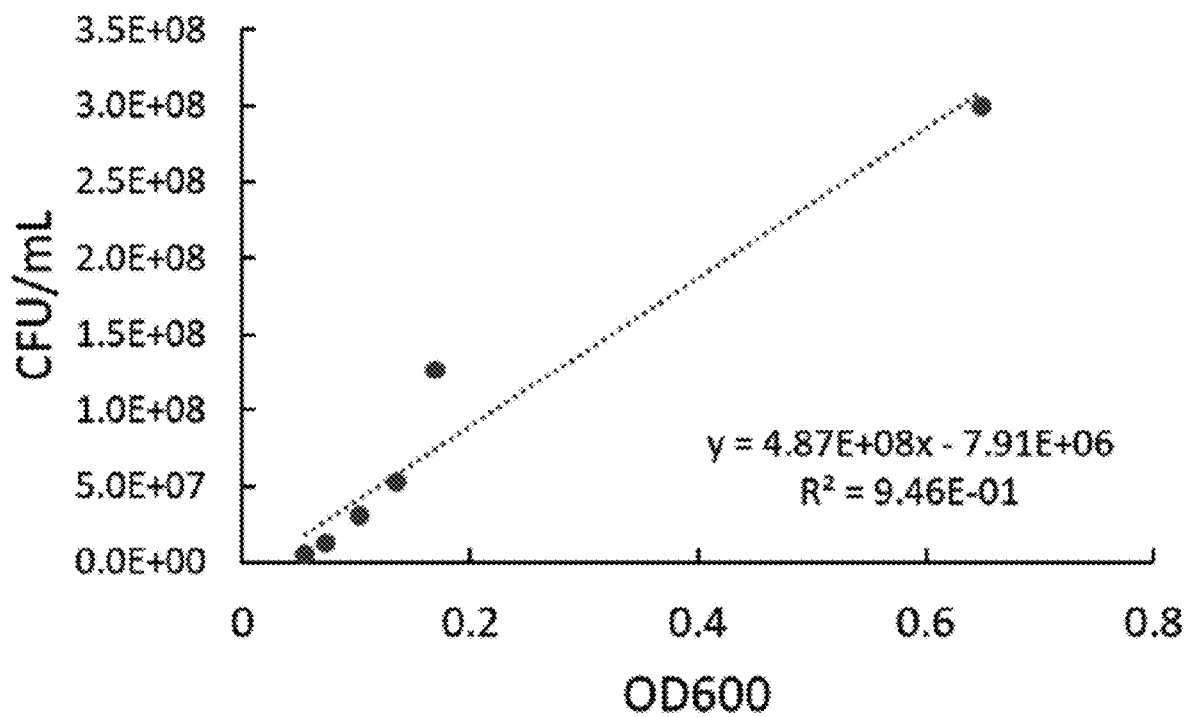
Figure 31B:
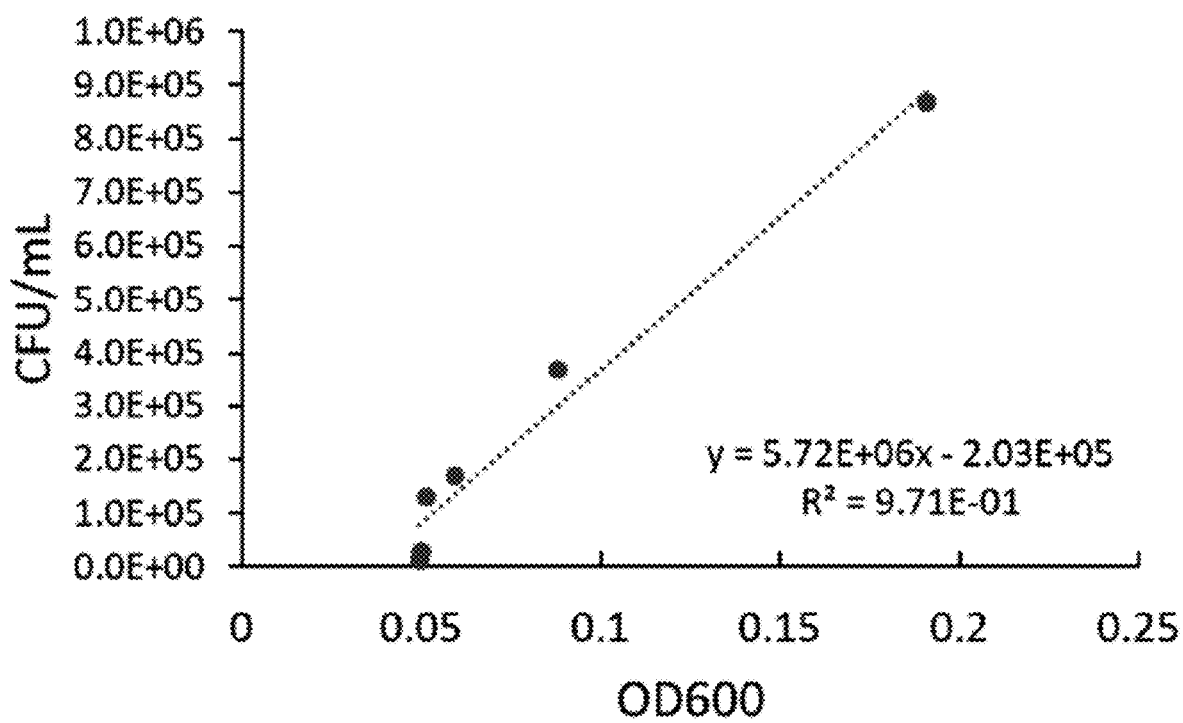

FIGS. 31A-31B: Relationship of OD600 and CFU/mL in FIG. 31A, *E. coli* strain without I-CeuI and FIG. 31B, with I-CeuI.

Figure 32C:
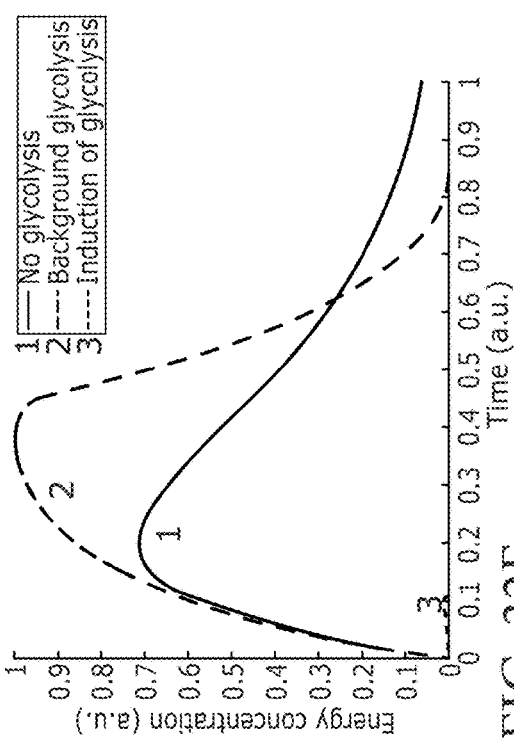
Figure 32D:
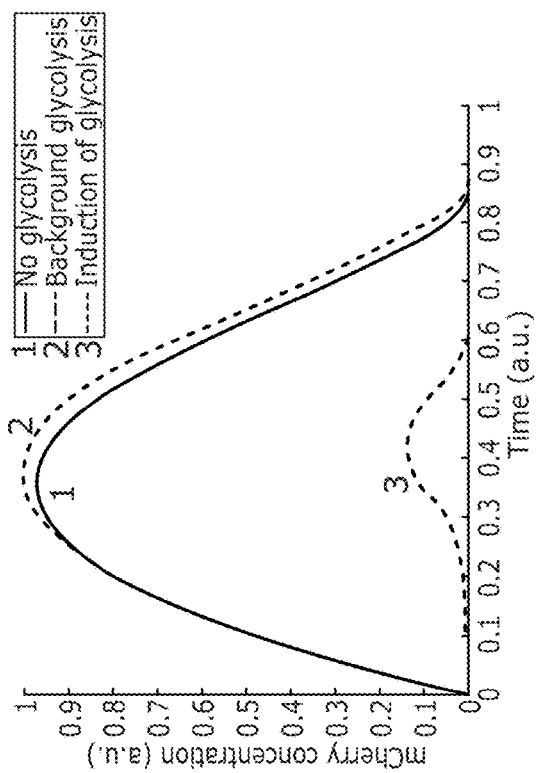
Figure 32E:
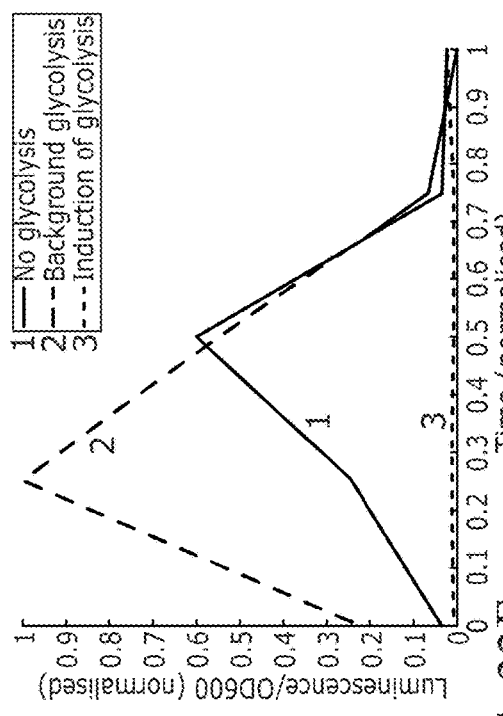
Figure 32F:
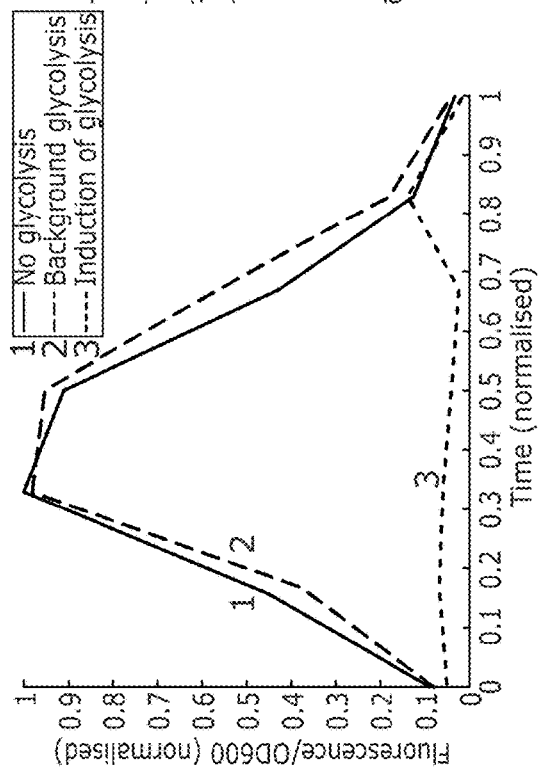

FIGS. 32A-32F: Mathematical model of luminescence production in SimCells. FIGS. 32A-B Schematic of experimental setup and concept of the model. The energy available in the cell is affected by the expression of the cargo genes and the transcription and translation machinery. The production of glycolytic proteins, especially when induced with IPTG, places a heavy metabolic load on these machinery. FIG. 32C Line graph representation of luminescence production data from FIG. 4a. FIG. 32D Graphical result of the mathematical model closely resembles with the trend of the experimental data for luminescence production over time. When the glycolysis pathway is induced, SimCells are overwhelmed by the additional energy burden so cannot produce luminescence. When glycolytic proteins are present at background levels there is added benefit in terms of better luminescence production when compared to SimCells without the glycolysis pathway. But this benefit eventually wears off after 5 days and the performance of SimCells background glycolysis and no glycolysis are comparable. FIG. 32E Line graph representation of fluorescence (mCherry-ASV) production data from FIG. 4B. FIG. 32F Graphical simulation of the model for mCherry-ASV production closely resembles the model. The advantage of the glycolysis pathway is less apparent, likely because mCherry-ASV is only one gene compared to the luxCDABE operon which consists of five genes. The model predicts induction of glycolysis will briefly yield a small increase in mCherry concentration, which was observed in the experiment. This is because a suitable concentration of glycolytic proteins will eventually be released but the transcription and translation machinery will have been worn out before the benefits of the glycolytic proteins will be realized.

Figure 33A:
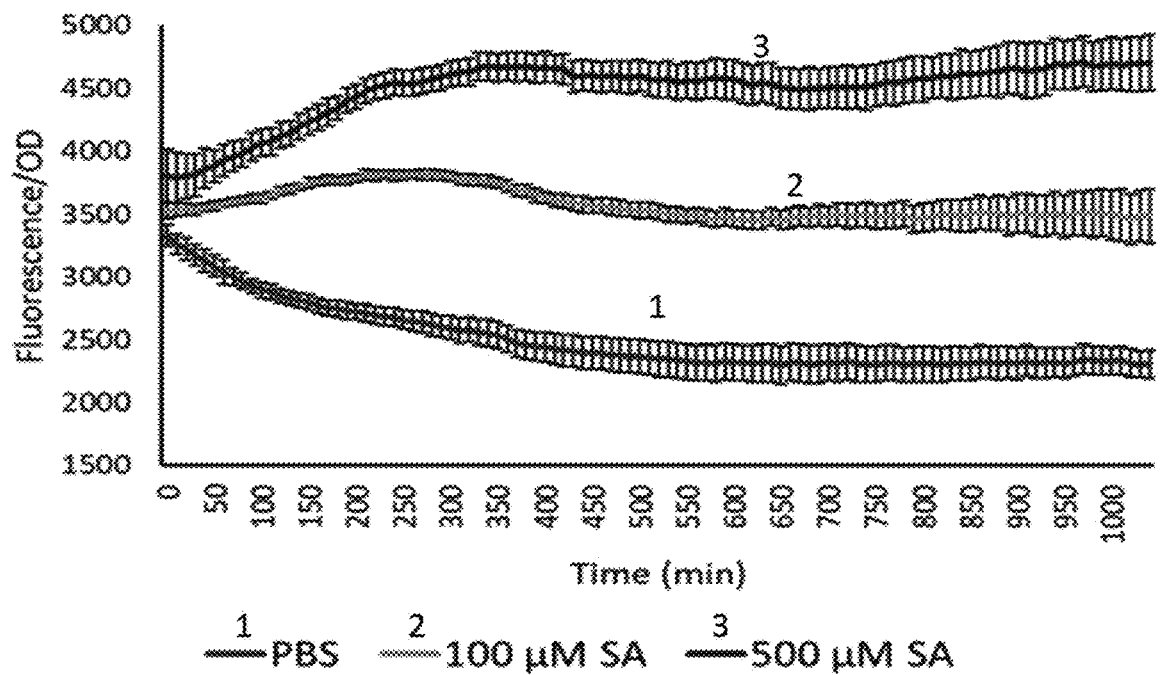
Figure 33B:
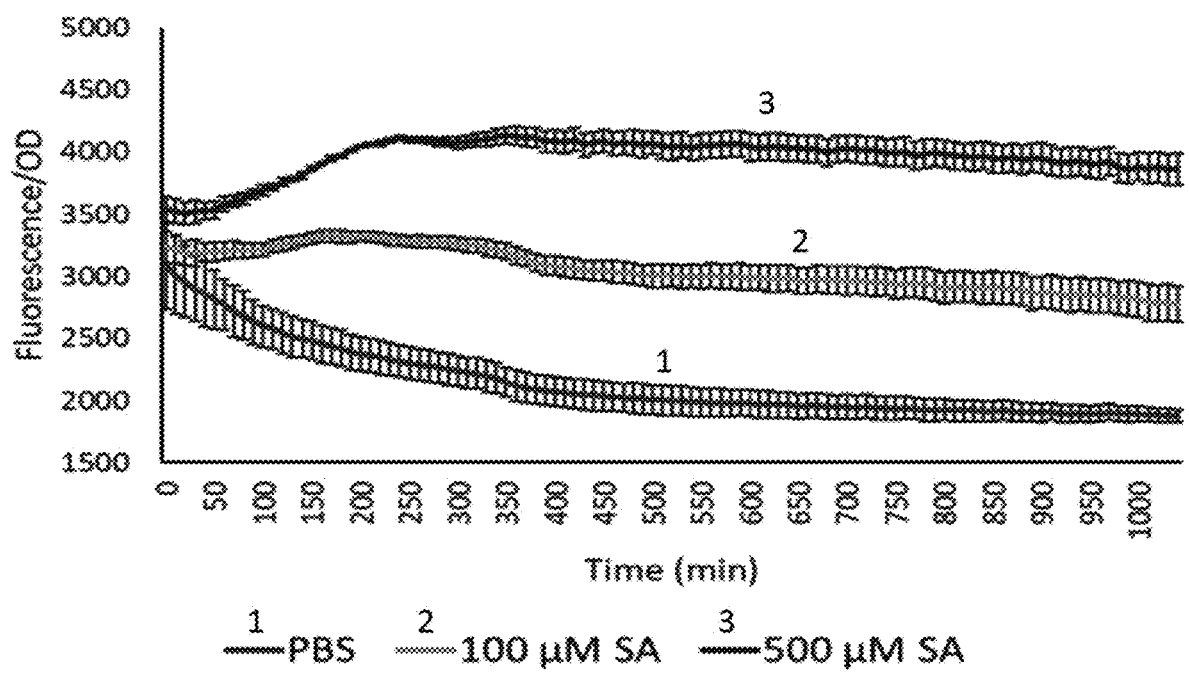
Figure 33C:
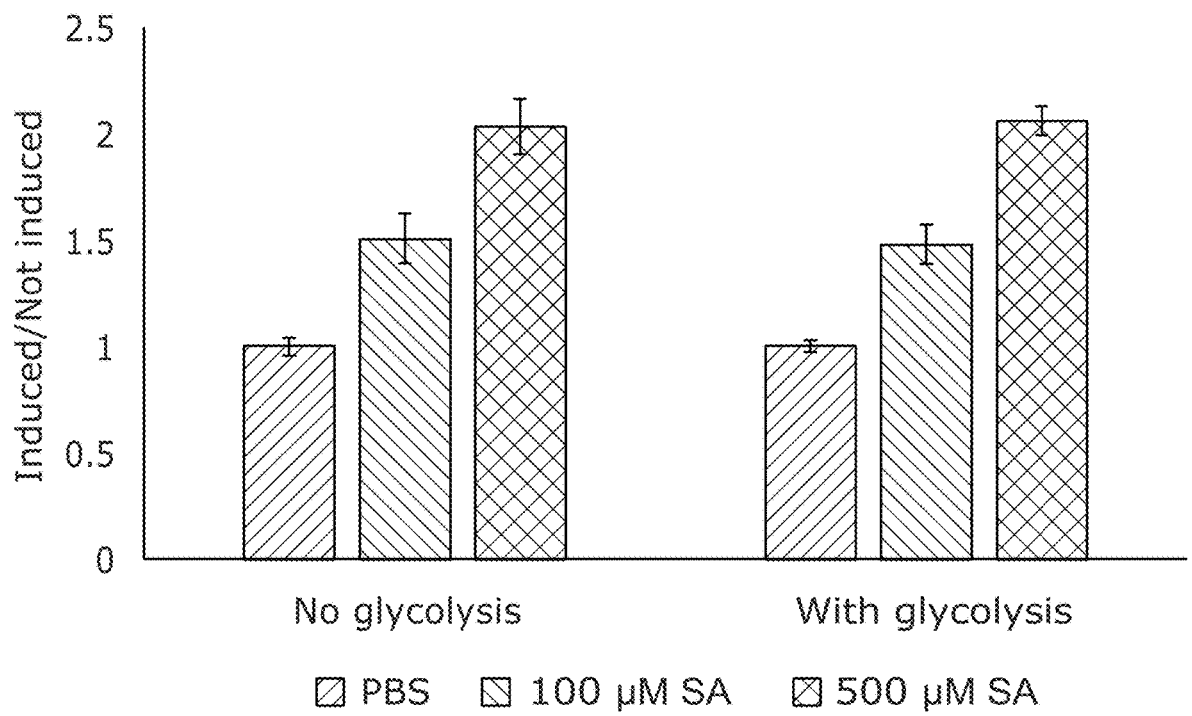
Figure 33D:
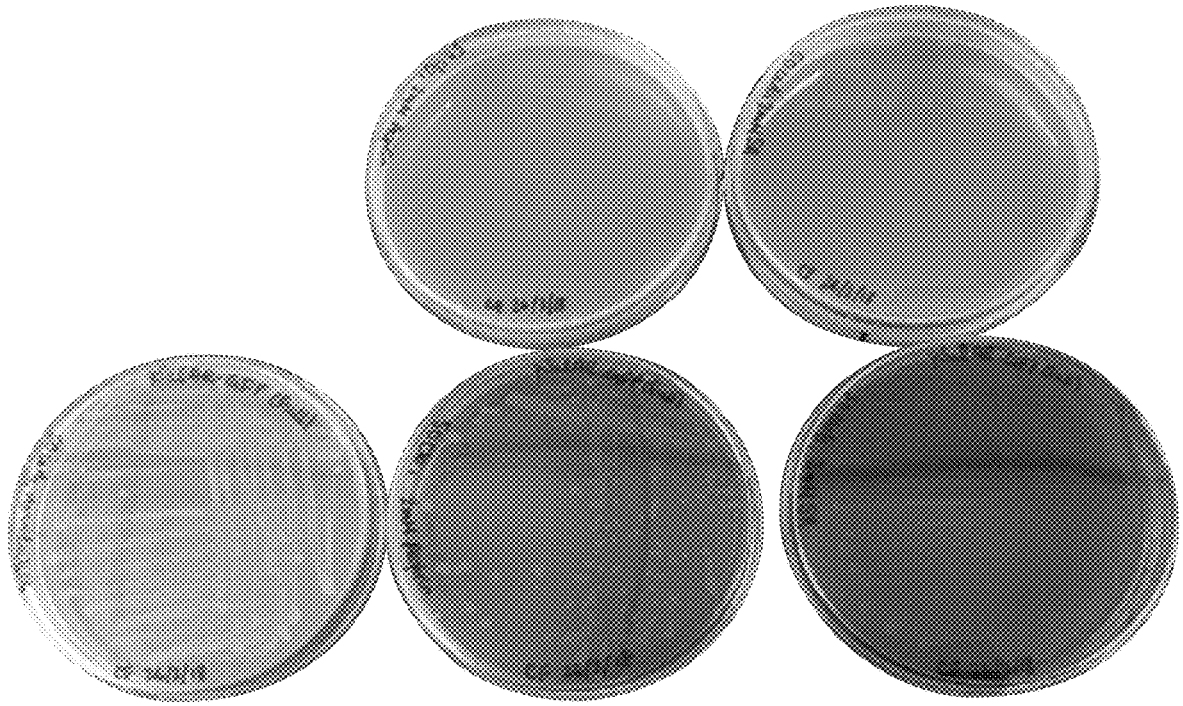
Figure 33E:
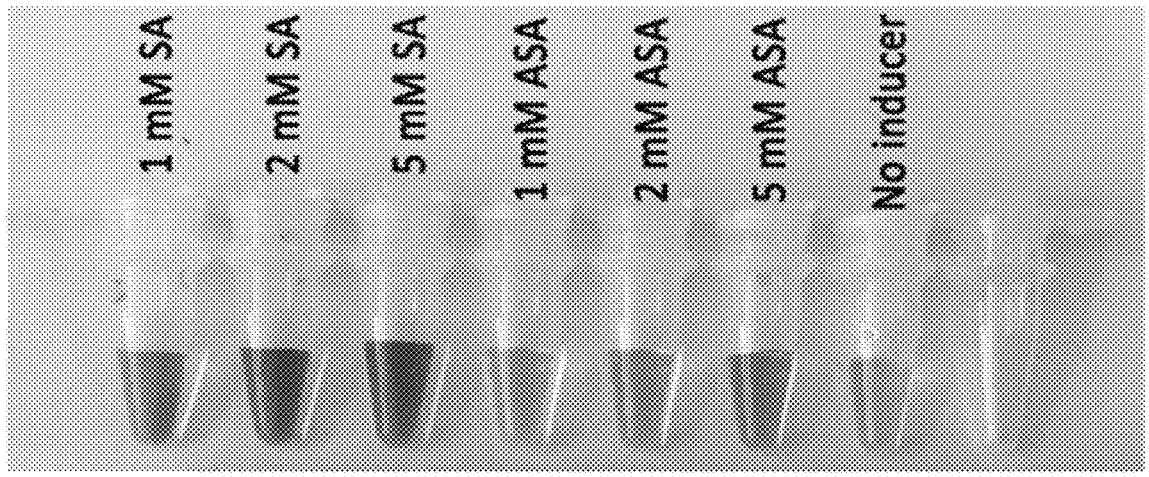

FIGS. 33A-33E: The levels of GFP over time after induction of the SalAR circuit can act as an indicator for the kinetics of catechol production. Production of GFP by parent cells with the pSalAR-GFP plasmid and FIG. 33A without an additional glycolysis pathway (pSEVA224) or FIG. 33B with an additional glycolysis pathway (pSEVA224-GB3). Parent cells exhibited a dosage-dependent response to SA induction. FIG. 33C Ratio of fluorescent output of induced cells versus cells not induced with SA. In parent cells GFP production increased by about 1.5 and 2-fold when induced with 100 μM and 500 μM SA, respectively. FIG. 33D Catechol production by *E. coli*. LB agar plates with aspirin and salicylic acid have no color (top), while catechol is distinctly brown (bottom). When *E. coli* with pSalAR-GFP was plated on agar with inducers 2 mM Aspirin (bottom middle) or 2 mM salicylic acid (bottom right) catechol was produced and diffused out of the cell, tinting the agar brown. The plate with no inducer did not turn brown (bottom left). FIG. 33E The color of the supernatant darkens as inducer concentration increases, indicating production and export of catechol. SA: salicylic acid, ASA: acetylsalicylic acid (aspirin). Data show means±SE, n=3.

Figure 34:
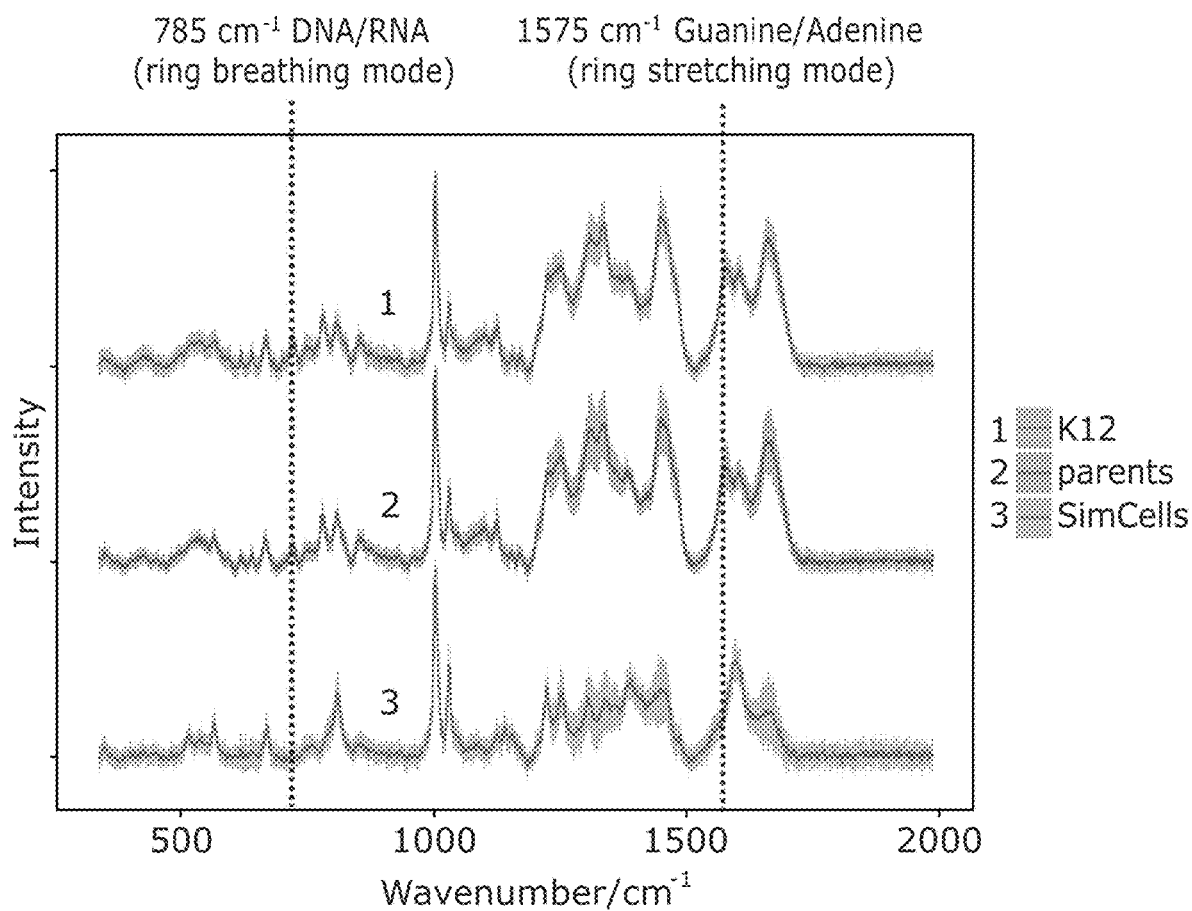

FIG. 34: Raman analysis of wildtype *E. coli* K12, parent cells and SimCells. Each spectrum represents an average of single-cell Raman spectra (SCRS) from 30 single cells, and the shaded area represents the standard deviation of SCRS. SimCells displayed significantly weaker signals for characteristic Raman bands for DNA than *E. coli* K12 or parent cells.

Figure 35:
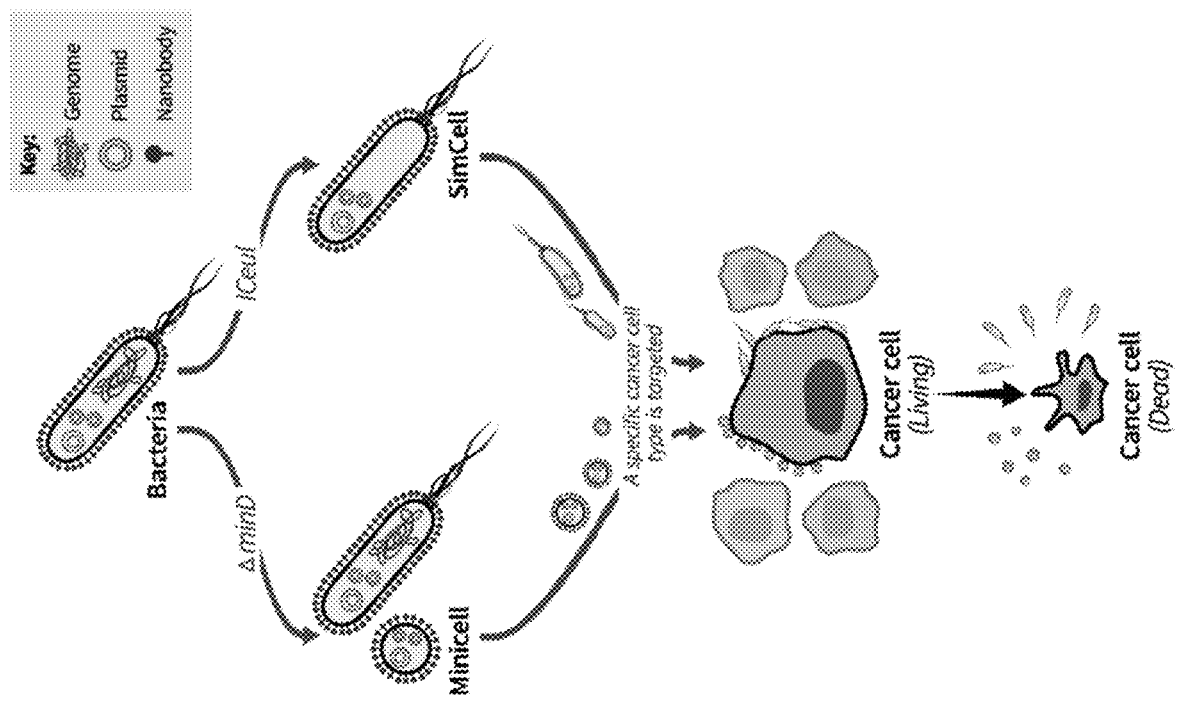

FIG. 35. An overview of the engineering of synthetic biology chasses, minicell and SimCell, for targeted cancer therapy. A surface-displayed nanobody confers binding specificity to a targeted cancer cell. minD mutation and ICeuI endonuclease expression induce the production of minicell and SimCell, respectively, which are both anucleate, non-replicating but metabolically active. Combined with a prodrug conversion genetic circuit or used as a stand-alone therapeutic, these synthetic biology chasses can be developed into a targeted cancer therapy for tumour clearance.

Figure 36B:
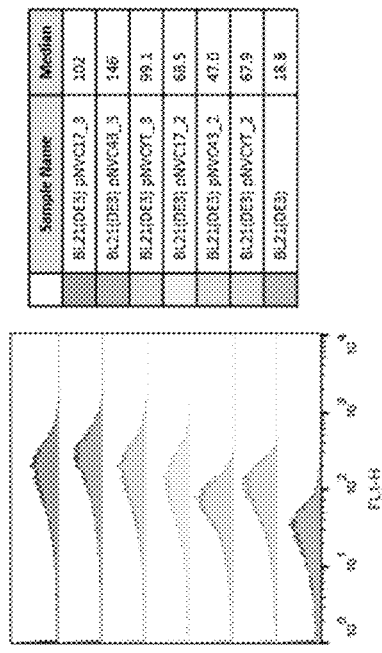
Figure 36A:
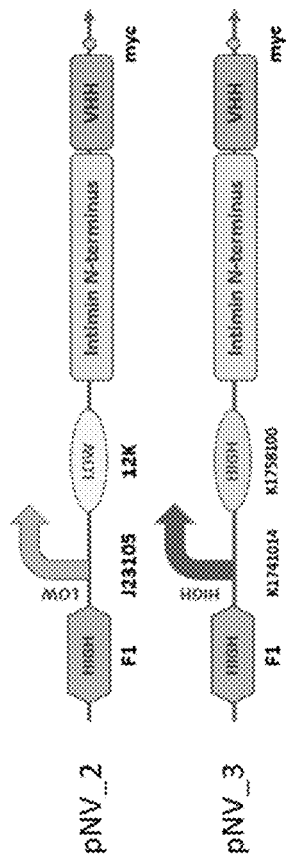
Figure 36C:
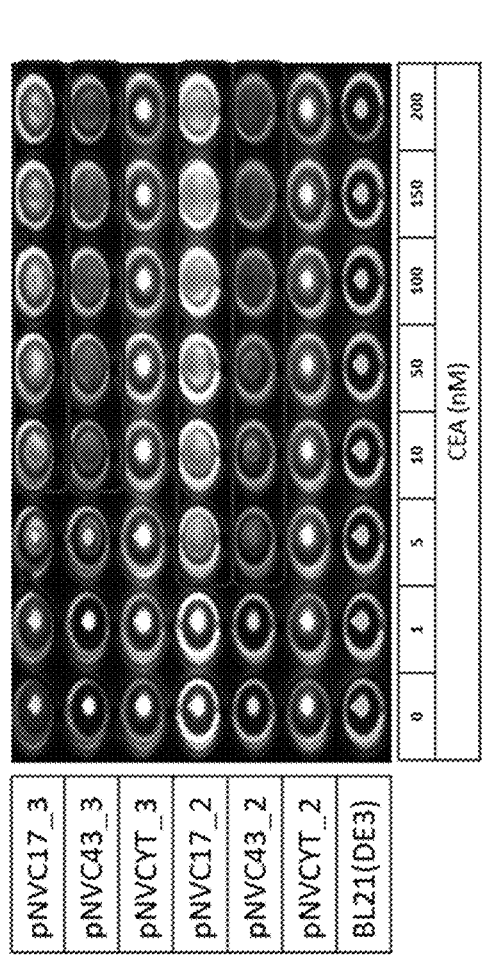

FIGS. 36A-36C. Engineered *E. coli* expressing nanobody through the surface display pNV system. FIG. 36A Schematic representation of pNV_2 with low expression profile and pNV_3 with high expression profile. F1 is a high copy number origin of replication; J23105 has low promoter activity whereas K1741014 has high promoter activity; 12k is a low strength RBS whereas K1758100 is a high strength RBS; Intimin is the outer membrane anchor; VHH is the nanobody used in this study, which includes anti-CEA, C17 and C43 and anti-spike protein, CYT; Myc is the tag used for flow cytometry analysis. FIG. 36B Flow cytometry analysis of engineered *E. coli* carrying pNV systems. Histograms indicate the fluorescence intensity of bacteria probed with primary anti-Myc antibody and secondary Alexa Fluor 488 antibody. The median fluorescence intensity of each sample is also presented. FIG. 36C Binding of engineered *E. coli* to CEA in a biological agglutination test. Binding between surface displayed nanobody and target antigen CEA results in agglutination (red box, clear suspension) while no binding results in a cell pellet. The image was taken using VersaDoc Imaging system under FITC channel.

Figures 37A, 37B:
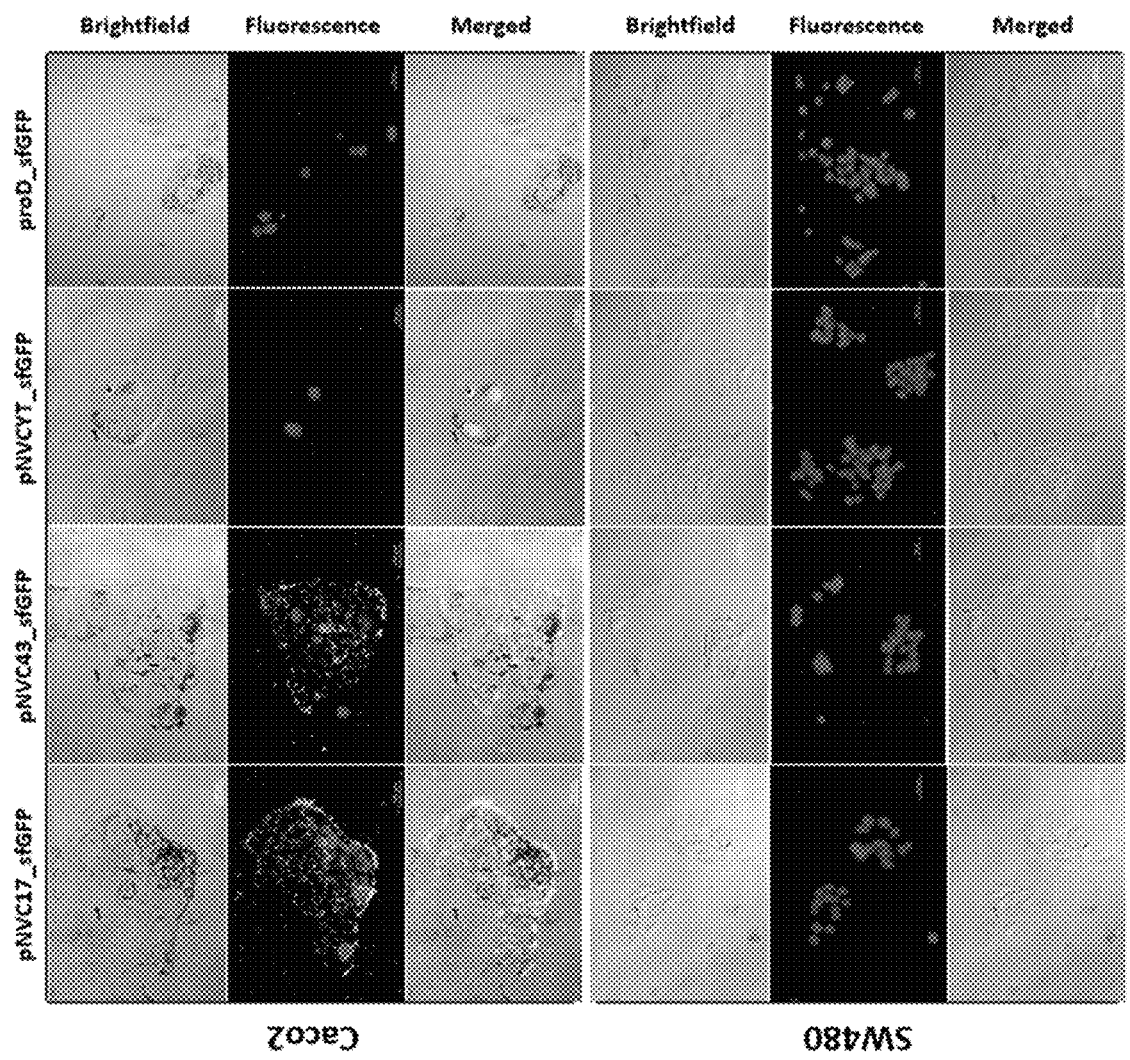

FIGS. 37A-37B. Specific adhesion of engineered *E. coli* to targeted cancer cell after 2 hours of incubation. Engineered *E. coli* carrying different pNV plasmids with sfGFP (green) were incubated with two different colorectal cancer cell lines: FIG. 37A Caco2, a high CEA expressing cell line and FIG. 37B SW480, a low CEA expressing cell line in which both are stained with Hoechst dye (blue). Microscopic images at different time points throughout the 8 hours incubation can be found in FIGS. 14A-14B, 15A-15B, and 16. Scale bar is 100 μm.

Figure 38B:
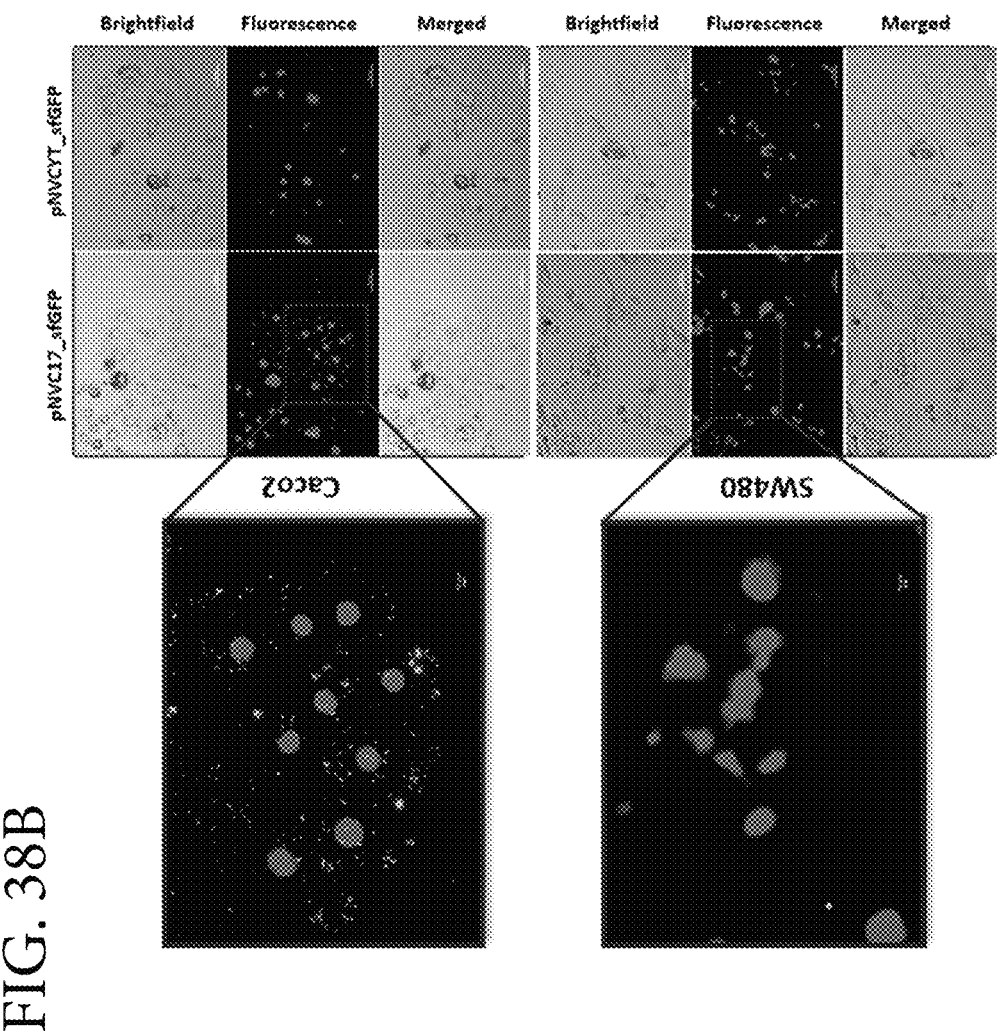
Figure 38A:
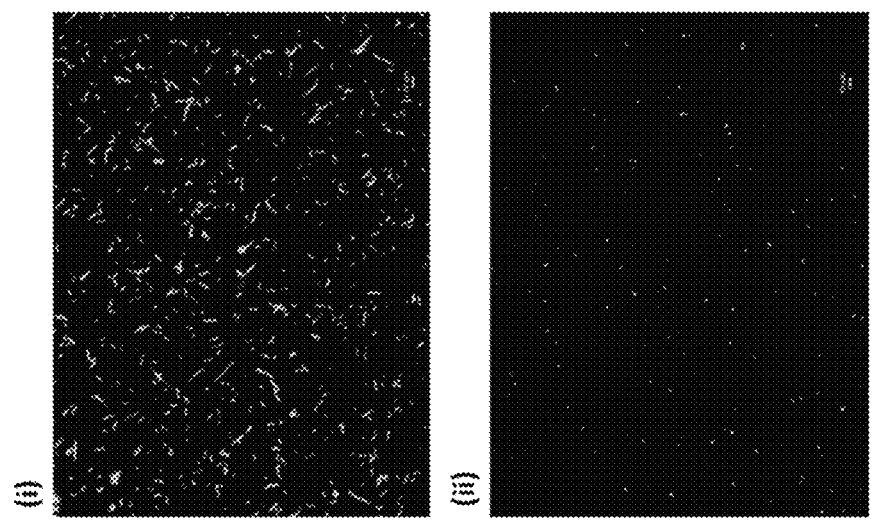

FIGS. 38A-38B. Engineering of *E. coli* minicells for specific cancer cells adhesion. FIG. 38A (i) Pre- and (ii) post-purification of pNVC17_sfGFP transformed *E. coli* minicells (green). Scale bar is 10 μm. FIG. 38B 2 hours incubation of pNVC17_sfGFP or pNVCYT_sfGFP transformed minicells with high CEA expressing Caco2 and low CEA expressing SW480. Red box shows the zoom in region using 20× magnification. Nuclei were stained with Hoechst dye (blue). Microscopic images at different time points throughout the 8 hours incubation can be found in FIGS. 18A-18B. Scale bar is 100 μm and 10 μm for zoom in region.

Figure 39B:
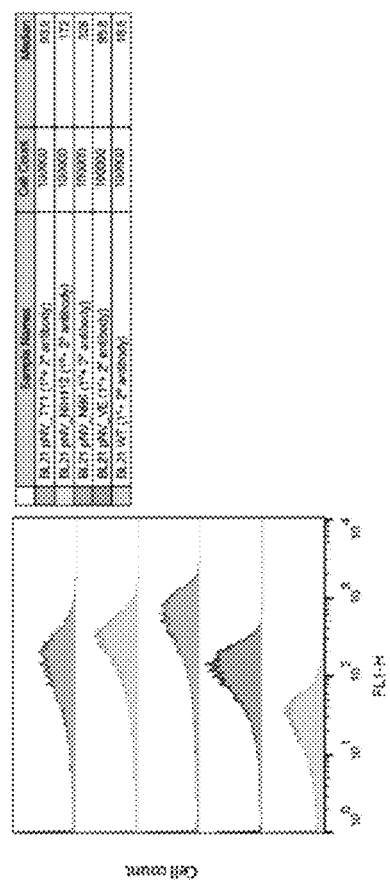
Figure 39A:
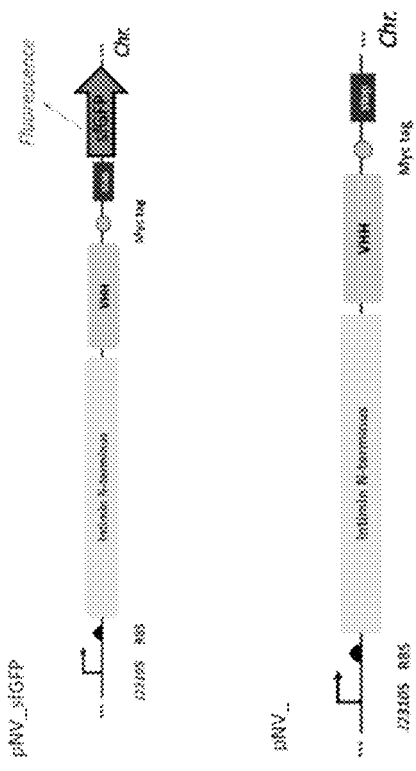

FIGS. 39A-39B. FIG. 39A Architectures of constructs used in this study pNV_sfGFP and pNV The Nanobody display system consists of Intimin, the outer membrane anchor; VHH is the nanobody used in this study: TY1, NIH-CoVnb-112, Nb6 bispecific VE for Sars-Cov-2 RBD and C17, which is anti-CEA. J23105 controls nanobody display system expression. Myc is the tag used for flow cytometry analysis. FIG. 39B Histograms of *E. coli* BL21 DE3 carrying pNV nanobody display system from flow cytometry. We treated the samples with both primary anti-Myc antibody and secondary Alexa Fluor 488 antibody. The X-axis denotes the FL1 channel (Alexa Fluor 488 antibody) relative to the count of cells on the y-axis. WT, wildtype, untransformed BL21 DE3 was used as a control. Fluorescent values were shown as a median.

FIGS. 40A-40B. FIG. 40A Cell agglutination test of nanobody expressing strains: (i) TY1,NB6 and NIH112 (ii) VE; pNV_c17 sfGFP as NC=negative control. Positive binding between displayed nanobodies and targeted antigen (Sars-Cov-2 RBD) is shown as a cloudy cell suspension, while no binding leads to a cell pellet. Red boxes indicate positive agglutination (cloudy cell suspension). The image was taken using the VersaDoc Imaging system under the FITC channel. FIG. 40B 830 pM of Sars-Cov-2 RBD was fixed at the bottom of the well. OD600=1 washed pNV_Nb6 sfGFP, and pNV_c17 sfGFP (NC) was added to the well and incubated for 1 hr at room temperature. The image was taken with a BioTek Cytation5 imaging reader using excitation/emission at wavelength 488/530 nm for sfGFP detection. We observed cell adhesion with RBD targeting pNV_Nb6 sfGFP only; NC did not show any cell adhesion to the Sars-Cov-2 RBD coated microplate.

Figure 41B:
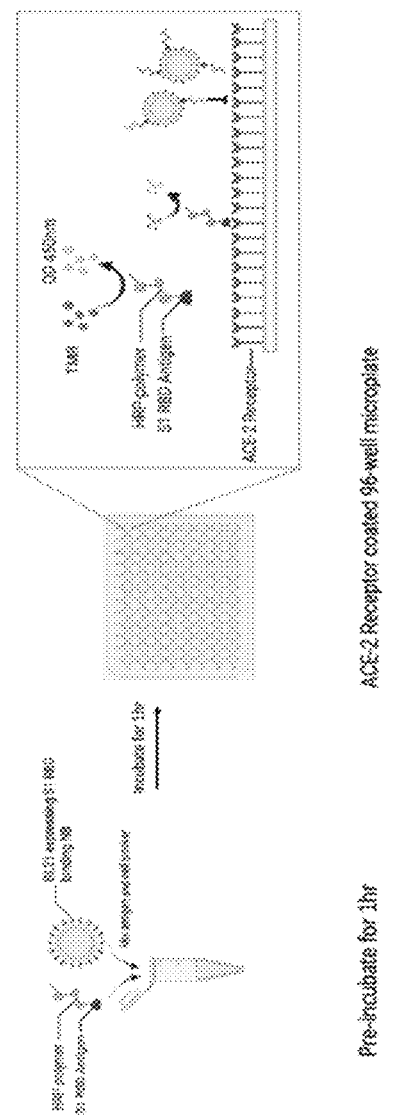
Figure 41A:
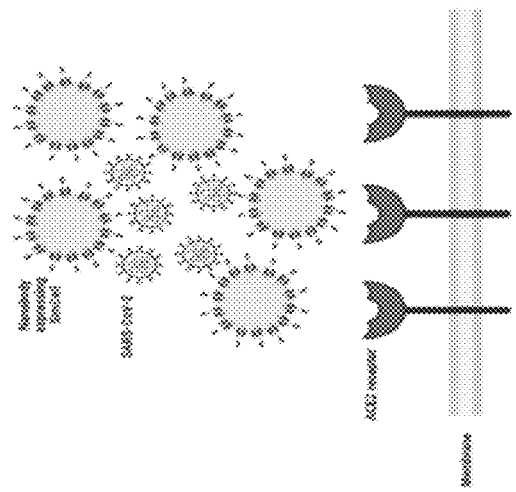

FIGS. 41A-41B. FIG. 41A is a schematic demonstration of nanobody expressing SimCell SARS-CoV-2 viral particle, blocking the interaction between spike RBD and human ACE2 to prevent infection. FIG. 41B a schematic of the workflow for the RBD-hACE2 protein-protein neutralisation assay. Purified nanobody-displaying SimCell was induced, purified and diluted to OD600=2 with 1×PBS. Diluted SimCells were pre-incubated with HRP-conjugated RBD for 1 hr statically at 37 C. The pre-incubation mixture was added to the ACE2 coated 96 well microplates. A colourimetric measurement was given as chromogenic substrate, 3,3',5,5'-tetramethylbenzidine (TMB) (Invitrogen) reacts with HRP on the RBD. Then, the stop solution was added to give a yellow colour which can be measured at 450 nm using a Tecan Spark plate reader. If OD450 nm reading is high, there is a high binding of HRP-RBD with the ACE2 on the plate, while no or low OD450 nm reading indicates no or low binding of HRP-RDB with ACE2 on the plate.

FIGS. 42A-42B. SimCell Neutralisation Assays FIG. 42A Neutralisation Assays with Wuhan variant RBD (i) with pNV_Nb6 sfGFP whole-cell and pNV_Nb6 sfGFP SimCell and (ii) pNV_VE sfGFP whole-cell and pNV_VE sfGFP SimCell; Neutralisation was compared with no binding and non-specific counterparts C17, shown as unspecific cell. Wuhan HRP-RBD concentrations: 0, 4.3, 5.4, 6.5, 8.1, 13, 16.2 and 32.4 nM were chosen. Both nanobody-displaying whole cells and purified SimCells were washed and diluted with 1×PBS. HRP-RBD pre-incubated with the washed cells for 1 hr at 37 C before adding into the ACE2 coated plate for 1 hr at room temperature. The microplate was washed five times with 1×PBST to remove unbound HRP-RBD. Adding an equal volume of TMB and stop sequentially to give an OD450 nm reading, indicating RBD-hACE2 binding. Percentage neutralisation was calculated and shown as bar charts. Error bars represent the standard deviation from three biological repeats (n=3). (b) Neutralisation Assays with South African variant RBD with pNV_Nb6 sfGFP whole-cell and bispecific pNV_VE sfGFP whole-cell; blocking efficiency was compared with no binding and non-specific counterparts C17, shown as the unspecific cell. South African variant HRP-RBD concentrations: 0, 4.3, 5.4, 6.5, 8.1, 13, 16.2 and 32.4 nM were chosen. Percentage neutralisation was calculated and shown as bar charts. Error bars represent the standard deviation from three biological repeats (n=3).

Figure 43A:
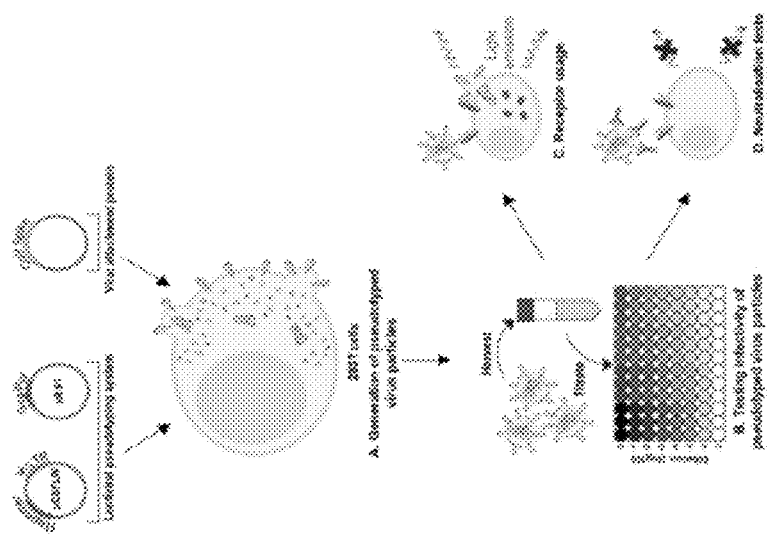
Figure 43B:
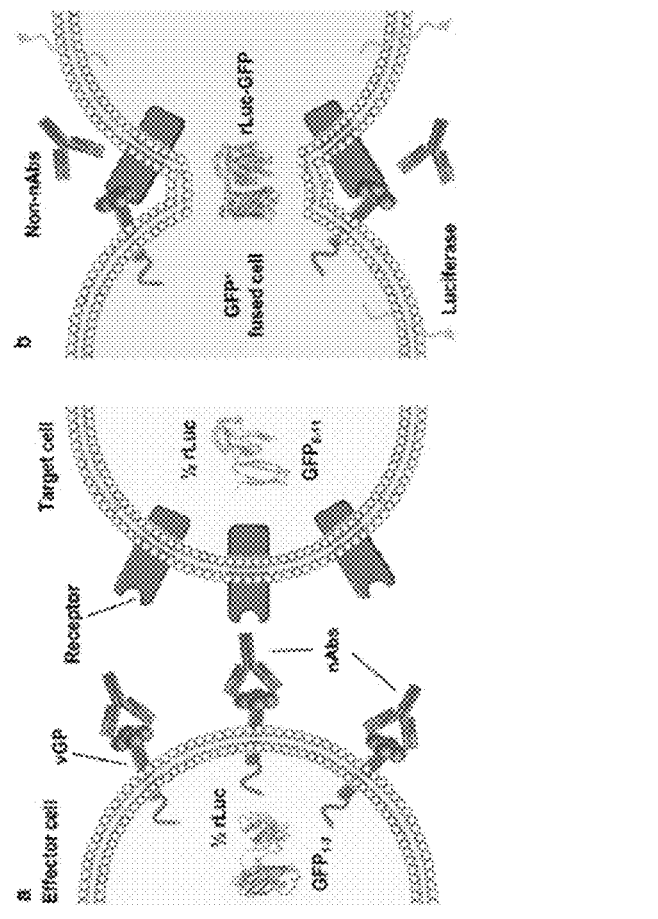

FIGS. 43A-43B. Schematic of generation and application of mVNT (FIG. 43A) and mFIT assays (FIG. 43B).

Figure 44:
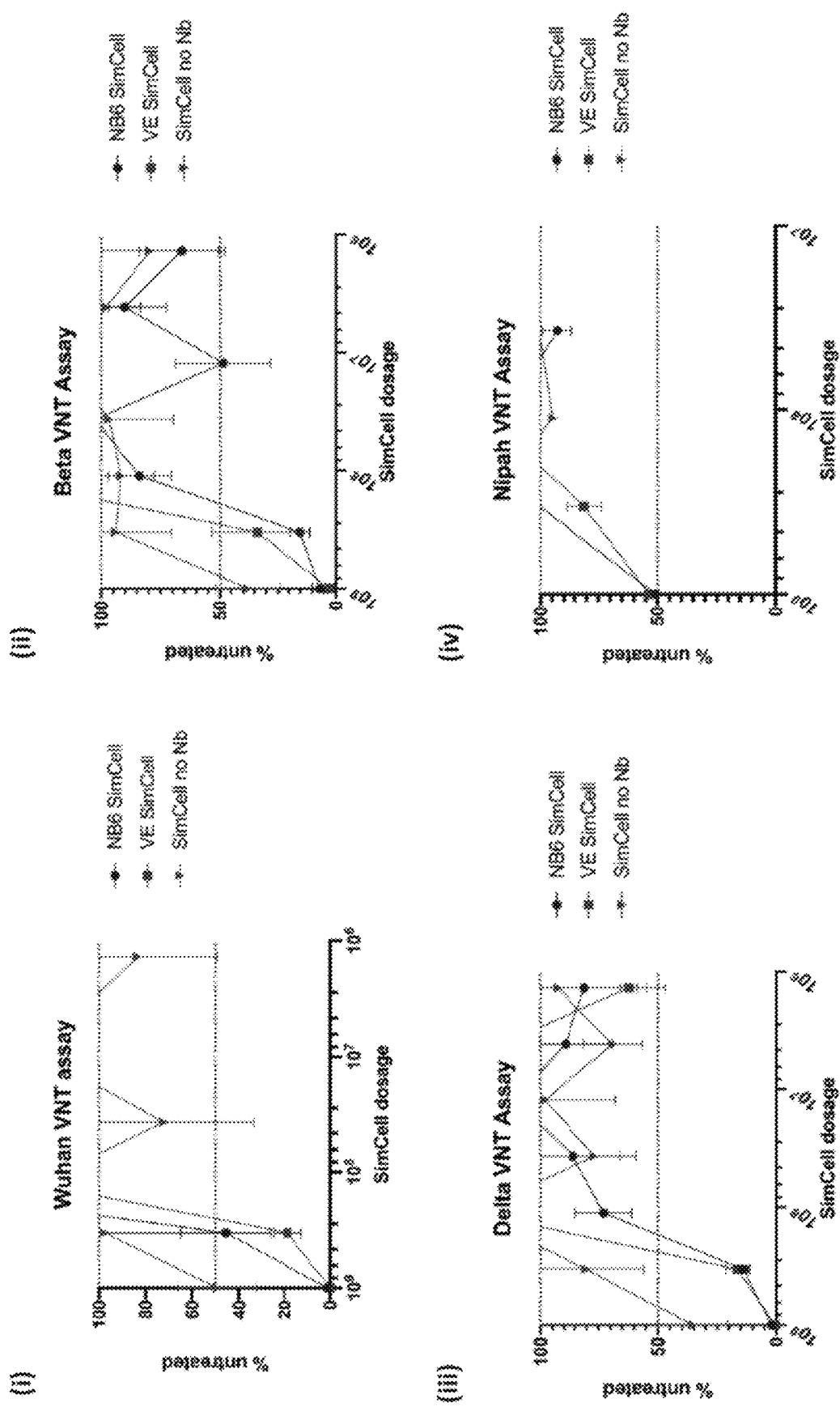

FIG. 44. Neutralization by SimCell displaying RBD neutralisation nanobodies in SARS-CoV-2 mVNT using SARS-CoV-2 viral pseudotypes (i) Wuhan variant, (ii) Beta variant and (iii) Delta variant. We used (iv) Nipah virus as the unspecific target control. Data are expressed as a percentage of the average luciferase readings seen in no SimCell/negative controls with 50 inhibition (IC50) and limit of detection (LoD) lines are indicated. Error bars represent the standard deviation from three biological repeats (n=3).

Figure 45:
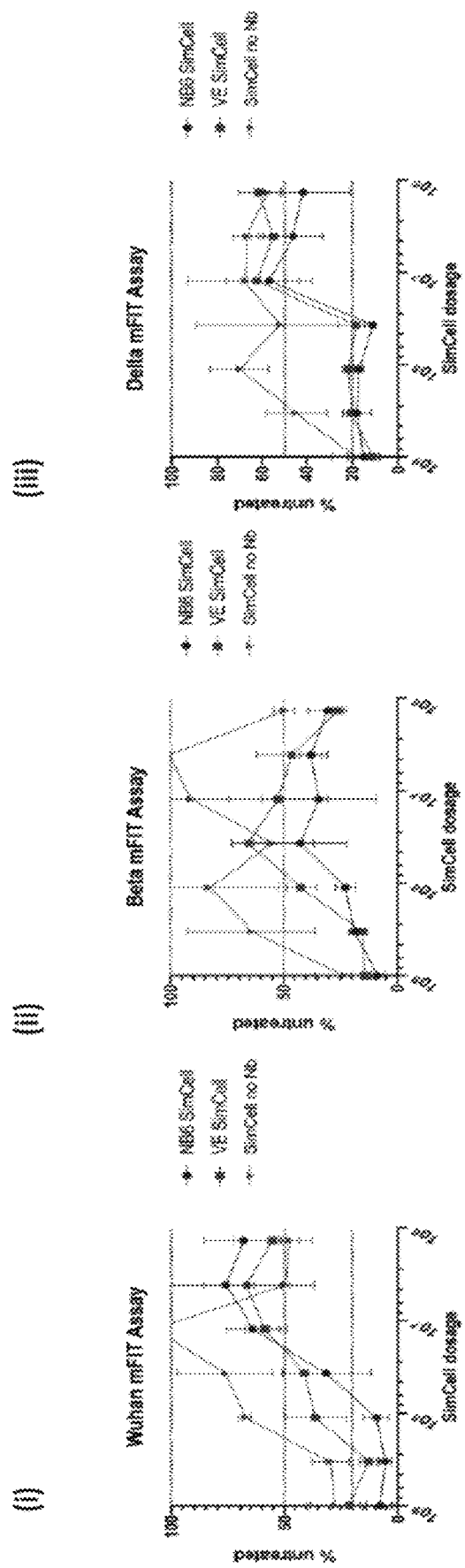

FIG. 45. Examining neutralization of fusion by SimCell displaying RBD neutralisation nanobodies in SARS-CoV-2 mFITs. HEK293T expressing (i) Wuhan variant, (ii) Beta variant and (iii) Delta variant glycoprotein were tested. Data are expressed as a percentage of the average luciferase readings seen in no SimCell/negative controls with 50 inhibition (IC50) and limit of detection (LoD) lines are indicated. Error bars represent the standard deviation from three biological repeats (n=3).

Figure 46A:
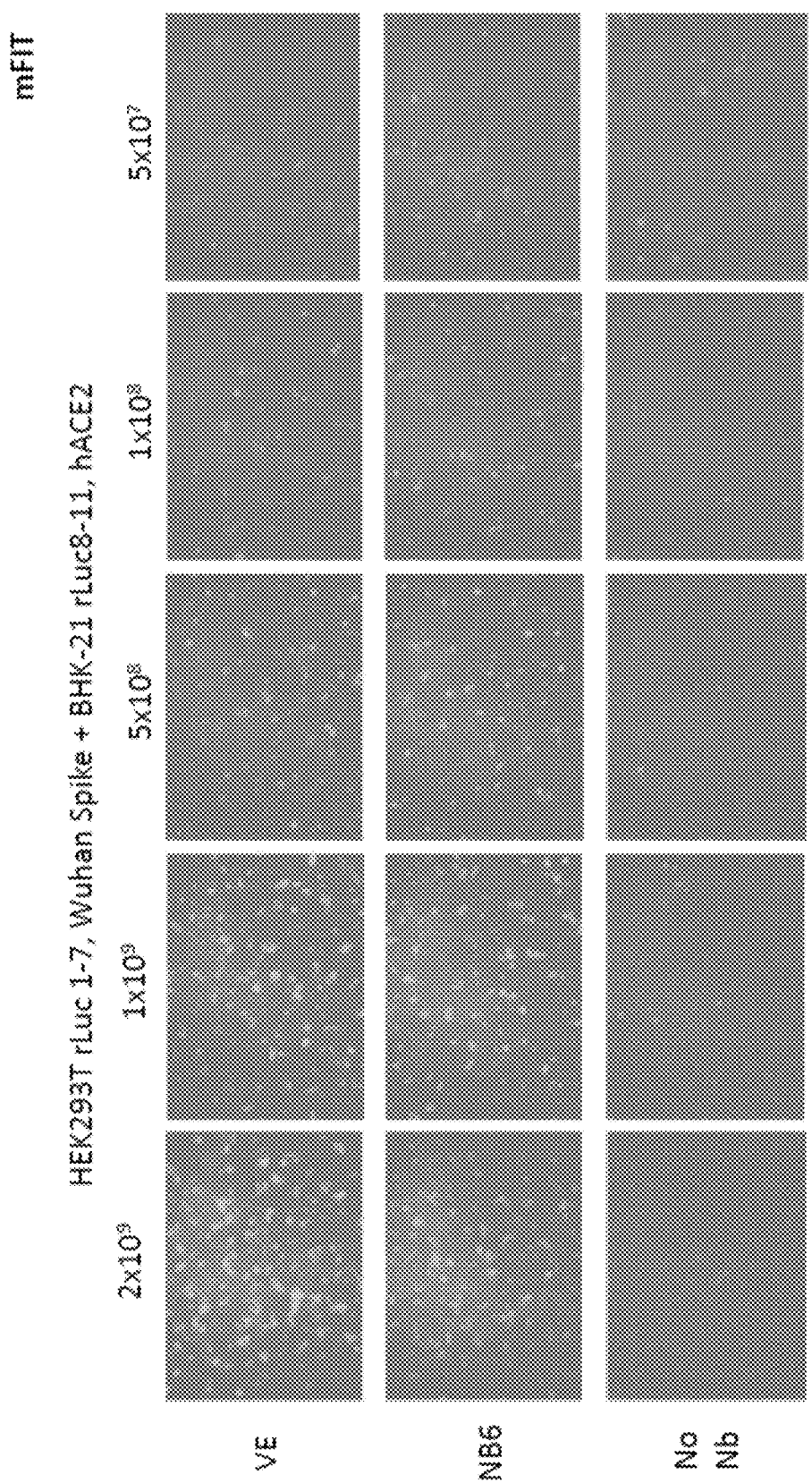
Figure 46B:
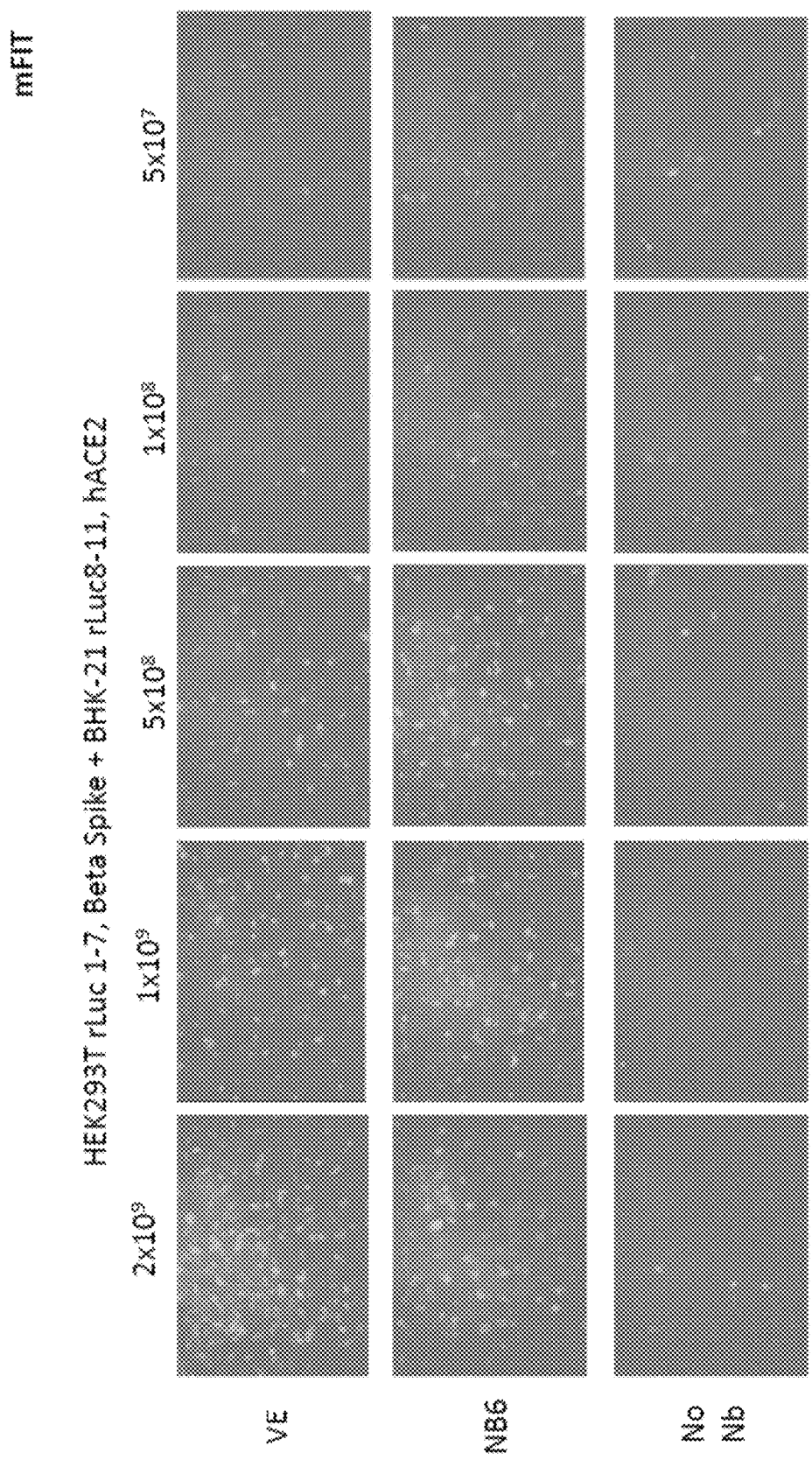
Figure 46C:
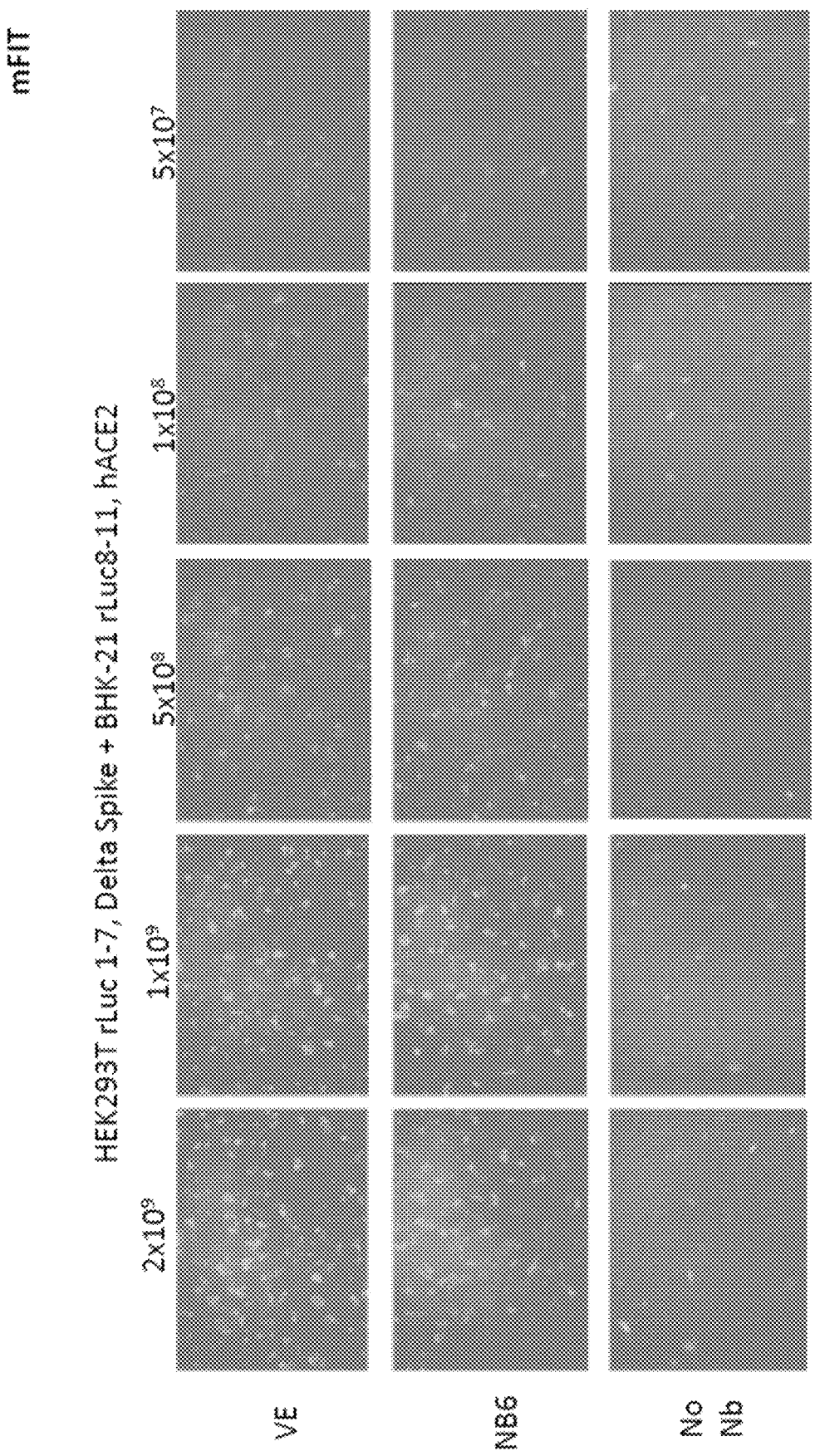

FIGS. 46A-46C. Incucyte microscopic images of SimCell in mFIT assay with HEK293T expressing SARS-CoV-2 glycoprotein FIG. 46A Wuhan FIG. 46B Beta and FIG. 46C Delta variants. A dilution series of SimCells were used and pictures were taken at 24 hrs of incubation.

EXAMPLE 1—BUILDING A FUNCTIONAL MINIMAL CELL FROM A CHROMOSOME-FREE CHASSIS

Summary

A new type of minimal cell called SimCells (simple cells) has been generated from *Escherichia coli*, *Pseudomonas putida* and *Ralstonia eutropha*, whose native chromosomes were removed by I-CeuI endonuclease-mediated double-stranded breaks (DSBs) and endogenous nucleases. We showed that the functional cellular machinery which remained in these chromosome-free SimCells were able to process various gene-circuits (e.g. MphR-erythromycin regulated mCherry and luxCDABE, the glycolysis pathway composed of 10 genes, and salicylic acid inducible salAR-gfp). Proteomics analysis showed the abundance of certain proteins were adjusted to maximize cellular resources which aided SimCells in maintaining core functions such as transcription and translation. The chromosome-free SimCells were functional for 10 continuous days and could be preserved for at least 5 months. It was observed that there was a delicate balance between energy generation and gene expression in SimCells and a mathematical model was developed to describe this trade-off. Finally, SimCells were used as a biocatalyst to produce catechol, a potent anti-cancer drug, from salicylic acid (a metabolite of Aspirin), which had therapeutic properties against lung (A549), brain (Mo59K), and soft-tissue (RD) cancer lines. This study shows that SimCells are a novel chassis that can be exploited to make valuable, natural products for safe delivery and application.

Introduction

Synthetic biology involves the application of engineering principles to design and build novel biological functions and systems with behaviour that can be predicted by modelling in silico. Thus, it is important that these novel circuits and systems perform with high reproducibility, reliability, and robustness. However, there is a conflict of interest between naturally evolved organisms and synthetic biology. The objective of living organisms is to survive, which is facilitated by adaptation and reproduction. The aim of synthetic biology is to engineer organisms to perform researcher-designed functions or tasks. This inherent conflict will jeopardise the performance of synthetic gene-circuits due to the unwieldy complexity and variability of cells, unpredictable gene expression and unwanted interference from native gene networks, and potential defensive disruption from transposable elements universally present in most organisms.

A radical bottom-up endeavour of synthetic biology is to build a cell from scratch. One strategy is to create protocells by assembling chemically synthesised lipid bilayer membranes and essential biomolecules (e.g. nucleic acids and enzymes). Another is to create a chromosome-free chassis using existing cells, and then introduce designed gene-circuits or an artificial chromosome (1-4). The latter strategy is able to reprogram existing organisms and replace native chromosomes while maintaining pre-existing cellular machineries (1-4). Genome transplantation involves carefully removing the genome from cell wall-free *Mycoplasma capricolum*, and re-introducing a designed genome using polyethylene glycol-mediated transformation (4). It is challenging to perform genome transplantation as only 1 in ~150,000 recipient cells could be transplanted in the most efficient experiments, and it is difficult to perform genome transplantation to other bacterial chassis. SimCells (simple cells) are chromosome-free cells (generated from bacteria) that contain designed gene-circuits or a mini-genome. Mini SimCells, which were generated from bacteria with abnormal cell division due to ΔminC/minD mutations, were able to express inducible gene-circuits on the plasmids (3, 5). However, not all bacteria can be engineered to make minicells, and the process of knocking out cell division genes on the genome can be troublesome. In addition, mini SimCells can sustain activity for only a short period of time (a few hours).

In this study, we demonstrated that a novel type of chromosome-free SimCells can be created from a variety of bacteria such as *Escherichia coli, Pseudomonas putida* and *Ralstonia eutropha* by inducible chromosomal degradation. This method could potentially convert almost all bacteria commonly used in synthetic biology into SimCells. The native chromosomes were removed by I-CeuI endonuclease-mediated double-stranded breaks (DSBs) and endogenous nucleases (6). SimCells had the capacity to express various gene-circuits (e.g. a set of 10 genes encoding the glycolysis pathway, erythromycin inducible mCherry and luxCDABE, and salicylic acid inducible salA-gfp-salR). This new type of SimCells was able to constantly maintain metabolic functionality, and the transcription and translation apparatus for about 10 days, and can be preserved at 4° C. or −80° C. for at least 5 months. A mathematical model was developed to describe the cost-benefit economy of gene expression, which could be a guide for establishing the ideal balance of ATP/NADH regeneration and the cost of making the proteins responsible for that regeneration. Additionally, proteomics analysis indicated that the SimCell proteome had changed to suit the needs of its cellular machinery. Finally, we demonstrated that SimCells can serve as a biocatalyst to convert salicylic acid, a metabolite of acetylsalicylic acid (Aspirin), which is a safe and commonly used medicine, into catechol. Catechol had potent cytotoxic properties against several malignant cancer cell lines that have low patient survival rates: A549 adenocarcinoma (lung cancer) (7), Mo59K glioblastoma (brain cancer) (8), and RD rhabdomyosarcoma (soft-tissue cancer) (9). SimCells are therefore useful as minimal cells to study fundamental questions about 'life' and useful as chassis cells for applications in healthcare, biomanufacturing, agriculture and the environment.

Materials and Methods

Bacterial Strains and Culture Conditions for Sim Cells

The strains and plasmids used in this study are listed in Table S1. The *E. coli* strain with a GFP expression circuit on the chromosome was a gift from Barry Wanner (CGSC BW31003) (10)[a]. Cultures were grown in LB media at 37° C. When appropriate, 25 µg/mL chloramphenicol, 50 µg/mL kanamycin, 50 µg/mL carbenicillin, 100 µg/mL spectinomycin, or 12.5 µg/mL tetracycline was added to maintain selection pressure.

For SimCell generation, strains containing the pJKR-H-TetR-ICeuI plasmid (FIG. 14B) were induced with 100 nM anhydrotetracycline (ATc). For SimCell verification, chromosomal expression of GFP was induced with 0.2% arabinose. For protein production, strains containing the pJKR-O-mphR plasmid (or a variation) was induced with 200 µM erythromycin. The original pJKR-O-mphR plasmid (FIG. 14D) was from George Church lab (Addgene plasmid #62570) (11)[a].

The glycolysis pathway was induced with 1 mM isopropyl β-D-1-thiogalactopyranoside (IPTG) and supplemented with 10 mM glucose. However, this was not done in the primary experiments shown in the main text as over-production of glycolytic proteins negatively affected cell performance (FIG. 23). It seemed the leaky expression of glycolytic proteins was the ideal balance of providing energy generation without excessive burden on translation and transcription. The leaky behavior of the lac expression system was validated (FIG. 22).

Purification of Sim Cells

A protocol for minimal cell purification from Heinemann and Ankenbauer was adapted for SimCell purification (12)[a]. Mixed cultures of SimCells and parent cells were treated with D-cycloserine to kill actively dividing cells. D-cycloserine was added at a concentration of 200 µg/mL and cells were left to incubate at 37° C. and shake for 1.5 hours before D-cycloserine was added again at the same concentration. After 24 hours of treatment with D-cycloserine, cells were spun down and washed twice with phosphate buffered saline (PBS). When pure SimCell cultures were induced for protein expression, 25 µg/mL D-cycloserine was added every two days to prevent parent cell growth but allow SimCells to be functional.

Quantification of Viable (Parent) Cell Populations

Cultures were normalized to have the same $OD_{600}$. Dilutions of cultures were spotted (10 µL in triplicate) onto LB agar plates with no antibiotics. Plates were incubated overnight at 37° C. and CFU/mL was calculated the following day.

Construction of Various Gene-Circuits and Plasmids

Primers used in this study are listed in Table S2.

Construction of Endonuclease Expression Plasmid

Figure 14B:
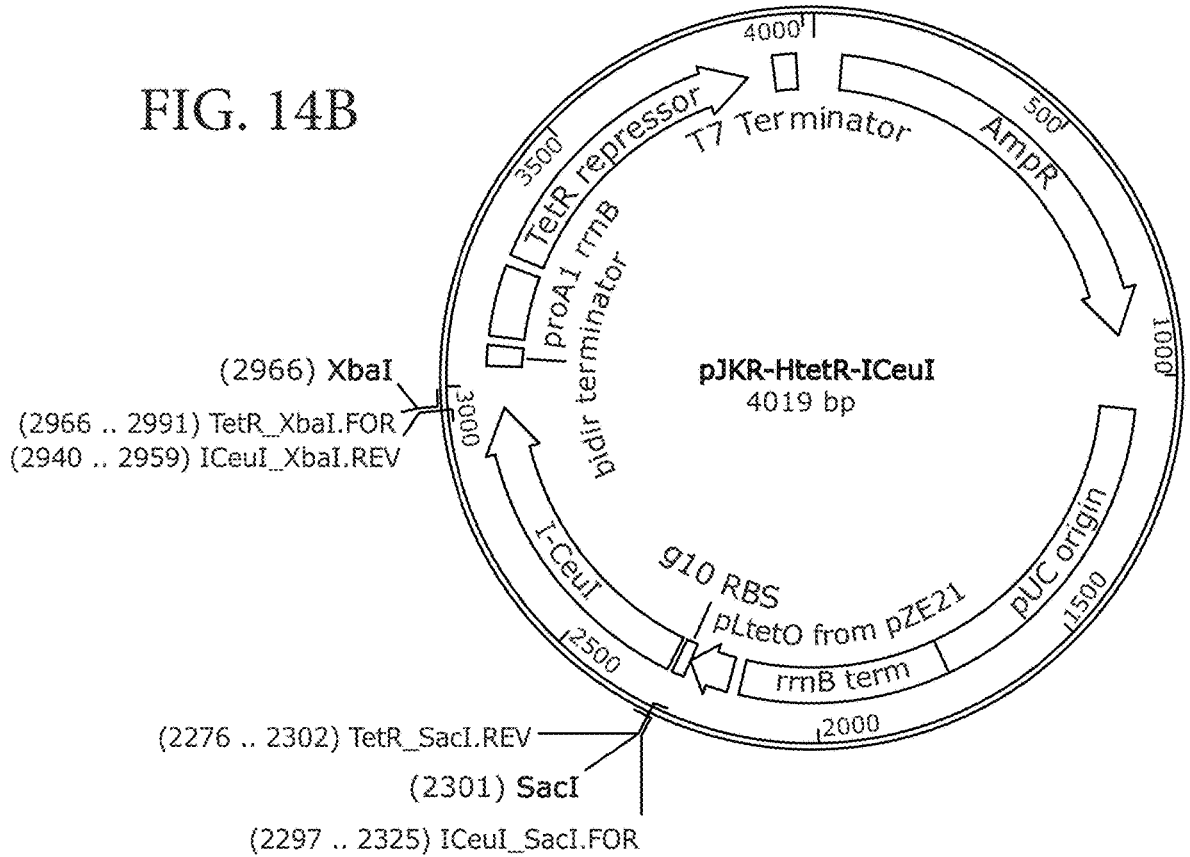

The I-CeuI endonuclease gene was synthesized by ThermoFisher Ltd (Gene Art) to yield pGeneArt-ICeuI (FIG. 14a). In pGeneArt-ICeuI, an extra 15 bp in the pBAD promoter region (13)[a] was added to form a hairpin loop with the corresponding reverse complementary sequence on the I-CeuI gene, effectively blocking gene expression and allowing synthesis. The pJKR-H-TetR plasmid, a gift from George Church (Addgene plasmid #62561) (11)[a] was used as the expression vector for I-CeuI endonuclease. The I-CeuI endonuclease gene was amplified with PCR using the primer pair ICeuI_SacI.FOR and ICeuI_XbaI.REV, while the vector backbone (native GFP was excluded) of pJKR-H-TetR was amplified with TetR_XbaI.FOR and TetR_SacI.REV. Products were digested with SacI and XbaI and stitched together with T4 DNA ligase (NEB) to construct the chromosomal degradation plasmid pJKR-HTetR-ICeuI (FIG. 14B).

Construction of Glycolysis Plasmid

The plasmids pSEVA224-GBI and pSEVA224-GBII, kindly provided by Victor de Lorenzo (14)[a], contain the upper and lower catabolic pathways of glycolysis respectively. The lower catabolic block from pSEVA224-GBII was moved into the multi-cloning site (BamHI and HindIII) on pSEVA224-GBI to yield pSEVA224-GB3 (FIG. 14C), and a complete glycolysis pathway.

Construction of Ilux Plasmid

Figure 14C:
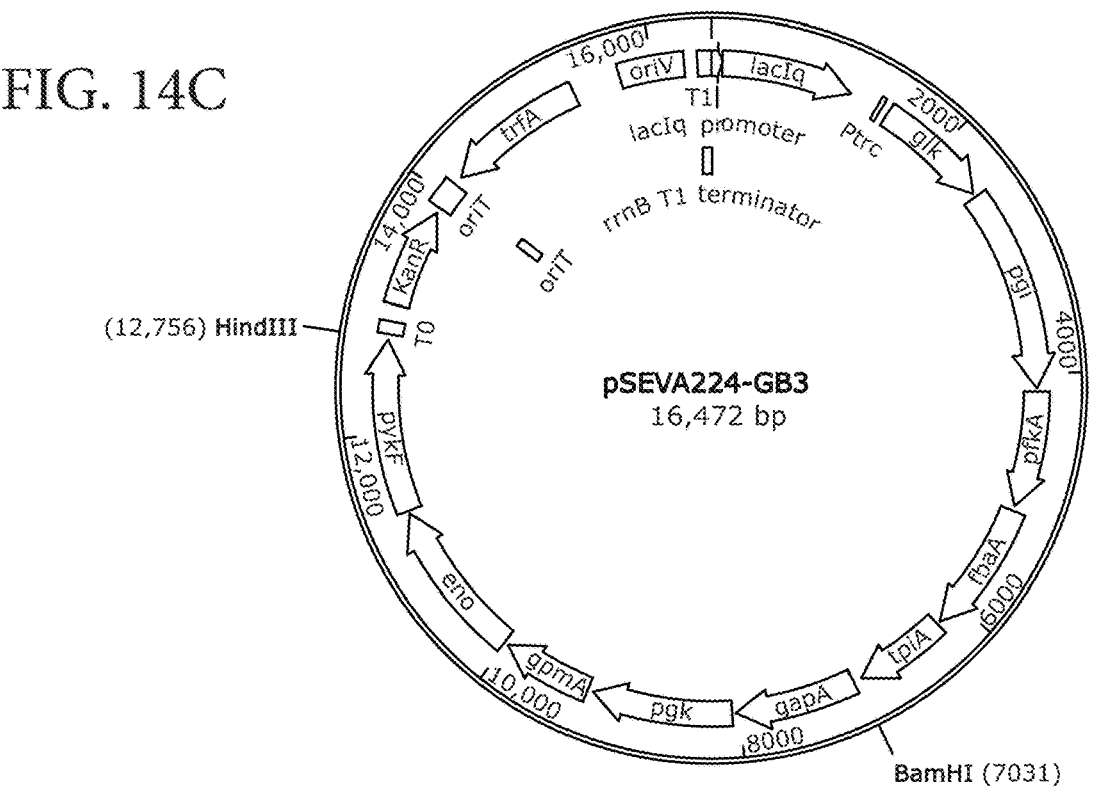
Figure 14D:
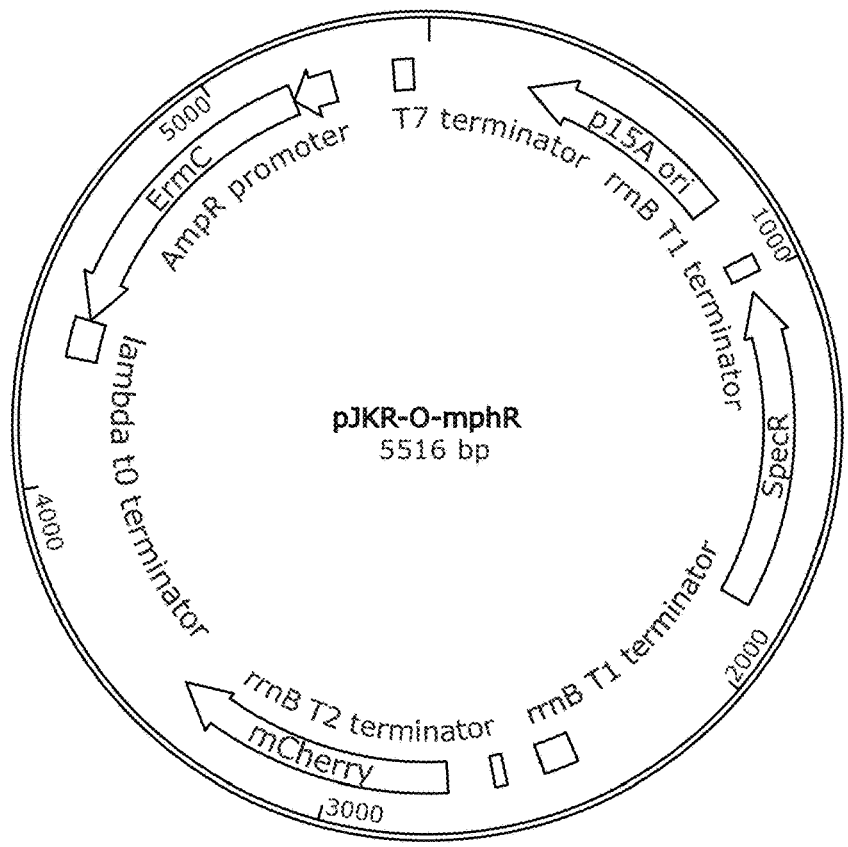
Figure 14E:
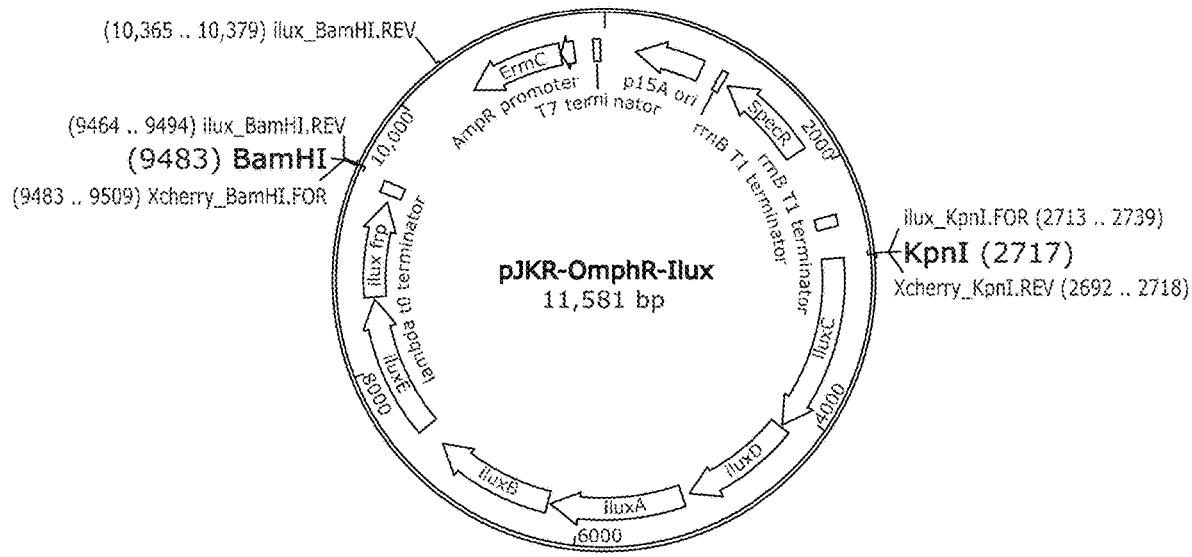
Figure 14F:
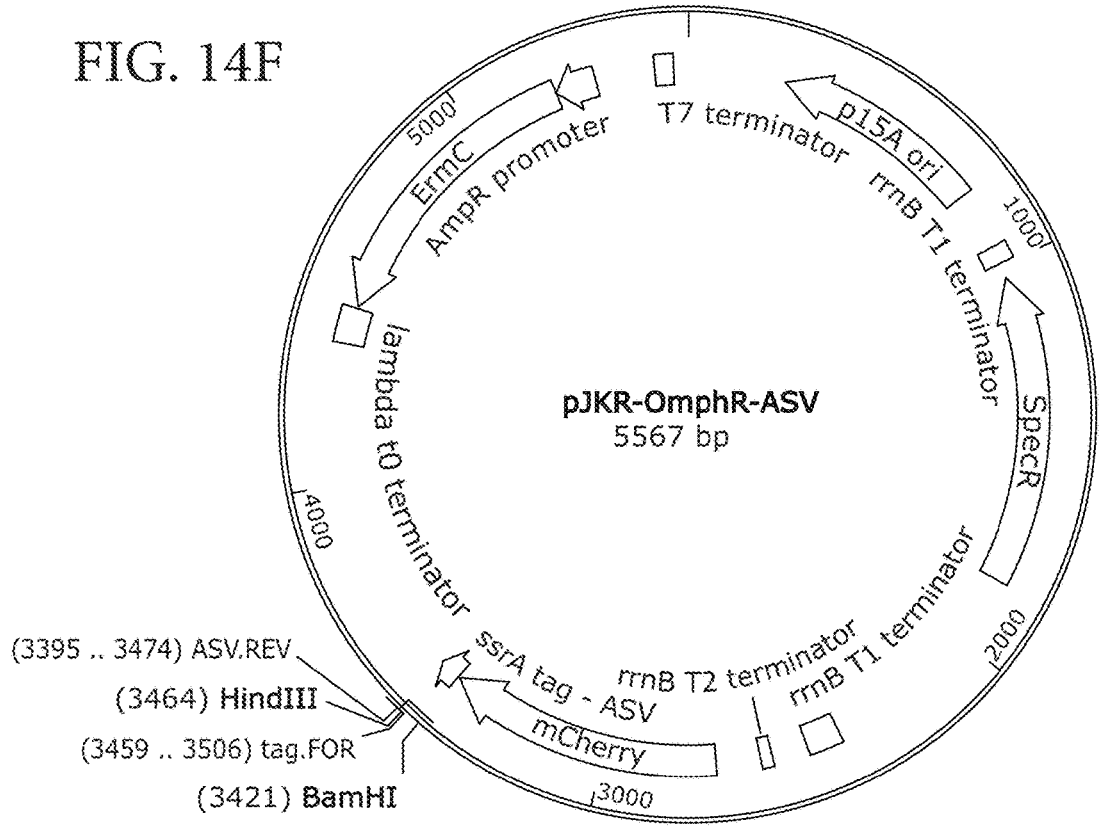
Figure 14G:
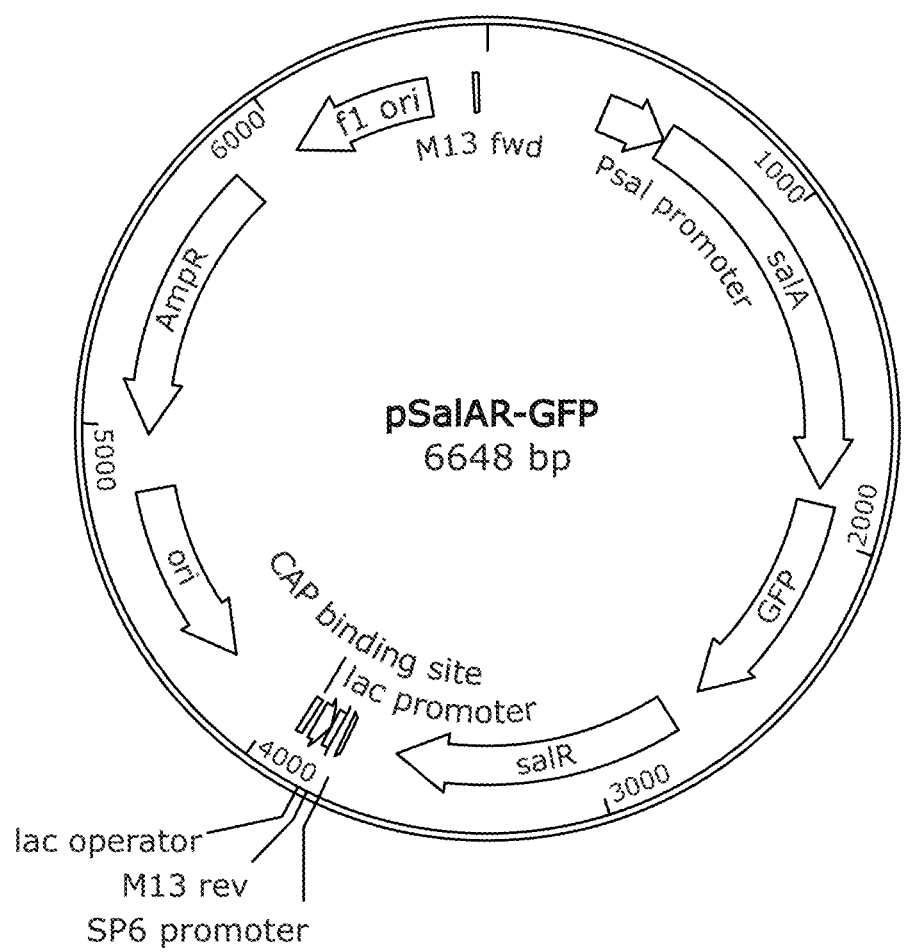

An improved version of the classic lux operon (sevenfold higher brightness) called ilux, was taken from pQE-ilux, a gift from Stefan Hell (15)[a]. The insert was amplified with the primer pair ilux_KpnI.FOR and ilux_BamHI.REV. The vector backbone of pJKR-O-mphR (FIG. 14D) was amplified with Xcherry_BamHI.FOR and Xcherry_KpnI.REV to exclude mCherry. The ilux insert and pJKR-O-mphR vector were digested with BamHI and KpnI and ligated to produce pJKR-OmphR-ilux (FIG. 14E).

Construction of Unstable mCherry

An ssrA protease tag with the ASV variant (16)[a] was added to the C-terminus end of the mCherry sequence in the pJKR-O-mphR plasmid. The entire pJKR-O-mphR plasmid was amplified with the primers tag. FOR and ASV.REV, which introduces the ASV ssrA tag. This pJKR-OmphR-ASV plasmid (FIG. 14F) now expresses an unstable version of mCherry.

Construction and Application of Broad Host-Range Sim-Cell-Generating Plasmids

To demonstrate SimCell formation in a wider array of organisms we constructed the plasmid pRH121 (FIG. 15A) via a HiFi Assembly approach, based on the pSEVA231 backbone kindly provided to us by Victor de Lorenzo (14)[a]. Primers for the amplification of the various parts of pRH121 are displayed in Table S2. Tight transcriptional control of I-CeuI was deemed mandatory to avoid the cellular defences of various bacteria that may inactivate the SimCell-forming machinery. The Jungle Express repressor system has been shown to provide exceptionally tight transcriptional control in several different species, including P. putida (17)[a]. This tight level of control was also witnessed in R. eutropha (FIGS. 18A-18B). Therefore, in pRH121 the EilR repressor and $P_{JExD}$ promoter from pJC580 (JBEI Part ID: JPUB_010723, FIG. 15B) governed the transcription of an I-CeuI gene that had been codon optimised for R. eutropha H16 (synthesized by Integrated DNA Technologies).

The final pRH121 plasmid was sequenced and transferred to both R. eutropha H16 and P. putida UWC1 by conjugation via the S17-1 E. coli donor. R. eutropha and P. putida cells containing pRH121 were then selected on LB plates containing 50 µg/mL kanamycin, and either 50 µg/mL gentamicin or 50 µg/mL rifampicin, respectively. I-CeuI expression was induced in both strains with 1 µM crystal violet.

Characterization of SimCell Populations

Flow cytometry analysis was done with an S3e Cell Sorter (Bio-Rad). The FL1 filter was used to detect fluorescence from GFP, which has an excitation/emission at wavelengths 488 nm/507 nm. The FL3 filter was used to detect fluorescence from mCherry, which has an excitation/emission at 587/610 nm.

Imaging

Cells were visualized with a Nikon Ti Eclipse. To visually compare SimCell versus parent cell growth, cells were fixed in agar containing 1.2% Noble Agar, 10× diluted LB media, 100 nM anhydrotetracycline (ATc), 0.2% arabinose and 200 µM erythromycin with the thickness of a coverslip on a glass slide. The slide was incubated overnight at room temperature and visualized the following day. To take the videos demonstrating SimCell synthesis of mCherry, cells were stained with 100 µM DAPI and fixed in the same agar with the same components except LB. Visualisation of SimCell formation from R. eutropha and P. putida containing pRH121 was conducted as described previously, but used 1 µM crystal violet to induce I-CeuI expression.

Longevity of Sim Cells

Purified SimCell cultures expressing luminescence (pJKR-OmphR-ilux) or an unstable mCherry variant (pJKR-OmphR-ASV) were kept in 50 mL Falcon tubes shaking at 100 rpm at 37° C. Every two days 25 µg/mL D-cycloserine was added to the cultures to maintain SimCell purity. At days 1, 3, 5, 10, 14, and 28, aliquots (200 µL, n=4) were taken and measured for luminescence or fluorescence production over 24 hours. The maximum reading during this period was recorded. OD600 was compared at t=0 and t=24 hours to see if there was an increase and therefore contamination by parent cells.

Sample Preparation for Proteomics and LC-MS/MS Analysis:

The E. coli DH5a pellets of the wildtype, with pLO11 and with pLO11-ICeuI, were resolubilized in a solution containing 8 mol/l urea (Merck, Darmstadt, Germany) and 2 mol/l thiourea (Merck, Darmstadt, Germany). Solubilised cells were disrupted by 5 cycles of freezing in liquid nitrogen and subsequent incubation at 30° C. for 10 min. Afterwards, medium intensity ultrasonic pulses were applied for 30 seconds. Cell fragments were removed by centrifugation at 20,000 g for 1 h at room temperature. The resulting supernatant was collected.

The final protein concentration was estimated by Bradford assay. Protein solutions containing 4 µg protein were incubated overnight with 160 ng Sequencing Grade Modified Trypsin (Promega, Madison, WI, USA). Incubation was stopped after 16 h by application of acetic acid (Carl Roth, Karlsruhe, Germany) to a final concentration of 1%.

The resulting peptides were purified using C18 PureSpeed LTS tips (Mettler-Toledo, Gießen, Germany) with 20 µl electric multichannel pipette (Mettler-Toledo, Gießen, Germany). After freeze-drying peptides were resolved in Buffer A consisting of 2% acetonitrile (J.T. Baker®, part of Fisher Scientific, Waltham, MA, USA), 0.1% acetic acid (Carl Roth, Karlsruhe, Germany) in water (J.T. Baker®, part of Fisher Scientific, Waltham, MA, USA), and subjected to LC-MS/MS analysis. To perform data independent acquisition (DIA) HRM peptide standard (Biognosys AG, Schlieren, Switzerland) was spiked in.

Data acquisition was done on a Q Exactive mass spectrometer (Thermo-Fisher Scientific, Idstein, Germany) in combination with an UltiMate 3000 RSLC (Thermo-Fisher Scientific, Idstein, Germany) and a Nanospray Flex Ion Source (Thermo-Fisher Scientific, Idstein, Germany). For the construction of the E. coli ion library, each sample was analysed in data-dependent acquisition (DDA) as well as in DIA mode.

Raw Data Analysis and Protein Identification

Spectronaut Pulsar X (v 12.0.20491.0.25470; Biognosys AG, Schlieren, Switzerland) was used to generate the E. coli DH5a ion library. Database was a FASTA file containing 4,288 identical proteins of E. coli DH5a (ISNDC; Date 2018

Nov. 9). Digestion rule was trypsin/P with a maximum of 2 allowed missed cleavages. No fixed modifications were set while Oxidation (M) was considered as variable modification. Only the 7-52 AA peptides were preselected and those with more than 6 transitions were finally considered for the library. The final *E. coli* library contained 24,246 peptides and 2,274 proteins, of which 1,228 were found in DIA dataset.

DIA raw data were analysed with Spectronaut Pulsar X (v 12.0.20491.0.25470; Biognosys AG, Schlieren, Switzerland). The generated raw data were further analysed in a R-environment (v 3.5.1). MS2-peak-areas were median normalized on replicate level and conditions were compared on peptide level using reproducibility-optimized peptide change averaging method (ROPECA) (18) [a]. Candidates with adjusted P-values (Benjamini and Hochberg)<0.05 and fold changes of +/−1.5 were considered as significantly changed. Mass spectrometry settings, mass windows for DIA analysis, and R packages used for analysis are listed in a related study (19)[a].

The heatmaps were generated using the seaborn Python data visualization library (20)[a]. For the dendrograms, correlation was used as the distance metric with single-linkage clustering. Protein abundances were row scaled to show the fold change.

Modelling Energy Consumption in SimCells with the Glycolysis Pathway

In SimCells which contain the glycolysis pathway, the overall energy E (molar) in the form of ATP and NADH used to drive protein production can be described as:

$$\frac{dE}{dt} = kX - \alpha E - \beta E \quad \text{(Equation 1)}$$

Where k ($t^{-1}$) is the energy E production rate by glycolysis, α ($t^{-1}$) is the energy consumption rate of protein production (which involves transcription and translation), β ($t^{-1}$) is the energy consumption rate of bioluminescence production, and X (molar) is the overall concentration of glycolytic proteins.

The analytical solution of Equation (1) is:

$$E(t) = \frac{kX}{\alpha + \beta}\left(1 - e^{-(\alpha+\beta)t}\right) \quad \text{(Equation 2)}$$

Given that $K_0$ ($t^{-1}$) is the initial energy E production rate via glycolysis, and γ is the overall aging/decay constant of the energy production system, the energy E production rate is:

$$k = K_0 - \gamma t \quad \text{(Equation 3)}$$

Thus the dynamic of energy E production can be described as $$E(t) = \frac{(K_0 - \gamma t)X}{\alpha + \beta}\left(1 - e^{-(\alpha+\beta)t}\right) \quad \text{(Equation 4)}$$

This equation can conceptually fit the pattern of the energy consumption dynamics in SimCells. The bioluminescence that is measured is βE.

Catechol Quantification Using Liquid Chromatography (LC)

Samples were analysed using liquid chromatography (Agilent 1120 Compact, California, US). The metabolite separation was achieved using a ZORBAZ Eclipse Plus C18 packed with 95 Å pore, 5 μm particle size and 4.5×150 mm column (Agilent, US). Elution was performed using isocratic mixture of water, methanol and acetic acid (690:280:30) as previously described by Sawyer and Kumar at 0.5 ml min-1 for 10 min (21)[a]. The oven temperature was 30° C. The injection volume was 5 μl. The UV detector was set to a wavelength of 275 nm for catechol detection. Data were collected at an acquisition rate of 5 Hz. Control, experimental samples and catechol standards were run sequentially for comparison (n=3). Parent cells and purified SimCells producing catechol were spun down at 10,000×g and the supernatant was analyzed for catechol concentration. OD600 was recorded to calculate the number of cells/mL and subsequently the moles of catechol produced per cell.

Cell Culture

The therapeutic effect of catechol was tested on rhabdomyosarcoma (RD) cancer cell line (ATCC no. CCL-136), glioblastoma (Mo59K) cancer cell lines (ATCC no. CRL-2365), and A549 lung cancer cell line (a gift from Len Seymour at the University of Oxford, UK). A fibroblast control cell line (Fibroblasts) was also used (a gift from Jo Poulton at the University of Oxford, UK). Cells were grown in DMEM (Dulbecco's Modified Eagle Medium)—high glucose supplemented with 10% FBS (fetal bovine serum), 2 mM L-Glutamine, 100 U/mL penicillin, and 0.1 mg/mL streptomycin. Cells were maintained at 37° C. in a 5% CO2 incubator and passaged whenever confluent (approximately every 5 days). When SimCells were applied to eukaryotic cells, 25 μg/mL D-cycloserine was also added to maintain SimCell purity.

Cell Viability Assay

Cells were seeded at a density of $1\times10^4$ cells/well in 96-well tissue culture-treated plates and incubated for 24 hours (n=6). Supplements (catechol, salicylic acid (SA), 25 μg/mL D-cycloserine, $10^5$ SimCells) were then added and cells were incubated for another 24 hours. Cells were washed twice with PBS then fixed with 1% glutaraldehyde for 30 min. Cells were then stained with 0.5% crystal violet solution for 1 hour, washed, and resolubilized with 1% SDS (sodium dodecyl sulfate) and 10% acetic acid. Absorbance was measured at 595 nm.

Results

Sim Cell Generation by Degradation of the Native Chromosome

SimCells were created by making several double-stranded breaks (DSBs) on the chromosome, which led to chromosomal DNA degradation facilitated by RecBCD helicase-nuclease and other endogenous nucleases (6) (22) (23). DSBs were made via I-CeuI endonuclease, which recognizes a specific 26-base pair sequence (5'-TAAC-TATAACGGTCCTAAGGTAGCGA-3' (SEQ ID NO: 1)) (24). This I-CeuI recognition sequence is naturally present in most bacterial genomes as it is encoded within the conserved rrl gene of 23S rRNA (25). Thus, depending on the copy number of 23S rRNA, I-CeuI endonuclease has multiple recognition sites in the genomes of bacteria (7, 6 and 3 sites in *Escherichia coli*, *Pseudomonas putida* and *Ralstonia eutropha* respectively). This particular endonuclease was therefore a strategic choice because this method enables a straightforward conversion of most bacteria to SimCells. In addition, there is a very low probability (1 in $4.5 \times 10^{15}$ bp sequences) that this 26-bp recognition sequence would appear in designed gene-circuits or mini-genomes.

The creation of multiple DSBs is lethal to bacterial cells, therefore a strain containing I-CeuI cannot survive unless the expression of I-CeuI is under very tight control. To choose the optimal gene-circuit to express I-CeuI endonuclease for chromosomal degradation, we screened a variety of tight regulatory systems (11) (17). The TetR family repressors TetR (pJKR-H-TetR) and EilR (pRH121) (Table S1) showed very low basal expression when not induced, but a high level of expression when induced (11) (17). Thus, the I-CeuI gene was placed under control of the anhydrotetracycline (ATc) and crystal violet inducible TetR and EilR gene-circuits (FIG. 14B, 15A and Table S1). The TetR system was used in *E. coli* and the EilR system (FIGS. 15A-15B and FIGS. 18A-18B) was used in *P. putida* and *R. eutropha*. When induced, I-CeuI made several DSBs in the chromosomes of these organisms. A DSB is usually repaired through homologous recombination with RecBCD and RecA. However, since I-CeuI simultaneously produced several unrepairable DSBs in the chromosome it resulted in instability and subsequent DNA breakdown by RecBCD and other nucleases (22, 26-29). Based on the gradual loss of DAPI, videos showed that the chromosomes were removed due to the chromosome cutting activity of multiple DSBs and degradation by nucleases (FIGS. 18A-18B and 20). These chromosome-free cells have now become 'simple cells' or SimCells. A control strain that lacked I-CeuI expression preserved the chromosome and did not lose the blue fluorescence of DAPI (FIGS. 18A-18B). It has been reported that it takes about 180 min to degrade the chromosome of *E. coli* with a single I-SceI DSB. The multiple DSBs created by I-CeuI likely caused chromosomal degradation in a shorter period of time. Additionally, the successful degradation of the chromosomes of *E. coli, P. putida*, and *R. eutropha* (FIGS. 18A-18B and 20) validates the SimCell-generation method as being a universal approach for the production of chromosome-free cells from different bacterial genera.

Functionality and Longevity Design for Characterisation of SimCells

The constructed SimCell needed to possess and demonstrate several properties to validate its identity and functionality. FIG. 14A is an overview of the elements contained in a parent *E. coli* cell before it becomes a SimCell and FIG. 14B details the attributes of each plasmid. The functions of the three plasmids are controllable chromosome cutting (pJKR-HTetR-ICeuI), ATP and NADH regeneration (pSEVA224-GB3), and cargo expression (pJKR-OmphR-X). To confirm that the cell is chromosome-free, the parent strain contains a chromosomal GFP marker controlled by an arabinose promoter. Parent cells that still have their chromosomes will produce GFP, while the chromosome-free SimCells are unable to produce GFP when induced with arabinose.

Pilot studies indicated that an energy regeneration feature was necessary for sufficient functionality in SimCells. Therefore a gene cluster encoding the entire glycolysis pathway, which produces ATP and NADH, was introduced to the SimCells. The gene cluster contains 10 genes under control of IPTG-inducible promoter $P_{trc}$ (14) on the plasmid pSEVA224-GB3 (FIG. 14C). The cargo expression plasmid inside the SimCells differed depending on the proof-of-concept experiment being conducted but they all were controlled by a tight MphR regulation system encoded by pJKR-O-mphR to produce some product in response to erythromycin induction. The cargo carried on pJKR-OmphR-X was either mCherry (FIG. 14D), an unstable variant of mCherry (FIG. 14F), or the ilux operon (FIG. 14E). The former established functionality and the latter two elucidated the longevity of SimCells.

The three plasmids (pJKR-HTetR-ICeuI for chromosomal degradation, pSEVA224-GB3 for energy regeneration, and pJKR-OmphR-X for protein production) were transferred to the parent *E. coli* strain BW31003 before I-CeuI was induced to generate SimCells. The strains without I-CeuI and/or the glycolysis pathway, and contain only the vector backbones (pSEVA224 and pJKR-H-TetR) acted as the control groups in this study.

Quantification of SimCell Generation Efficiency

The efficiency and efficacy of I-CeuI endonuclease in generating SimCells was characterized using cell viability and flow cytometry to estimate the proportion of SimCells in a mixed population after I-CeuI endonuclease activity. As SimCells no longer contain the chromosome and thus, cannot replicate, cultures were plated to see how many parent *E. coli* cells remained in the population by counting the colony forming units (CFU) (Table 2). The strains with the I-CeuI gene had CFU/mL of about two magnitudes lower compared to its corresponding control strain (no I-CeuI). This indicated that I-CeuI endonuclease indeed had an effect on cell viability as the chromosomes would have been degraded (FIGS. 18A-18B and 20). Based on these results, induced I-CeuI cultures still contained about 1.4% and 3.8% parent cells without and with the glycolysis plasmid, respectively.

Figure 2A:
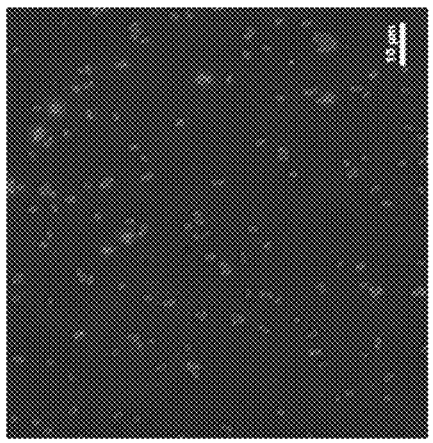
FIGS. 2A-2B: Control strains were used to define the expression boundaries of GFP and mCherry.
Figure 2A:
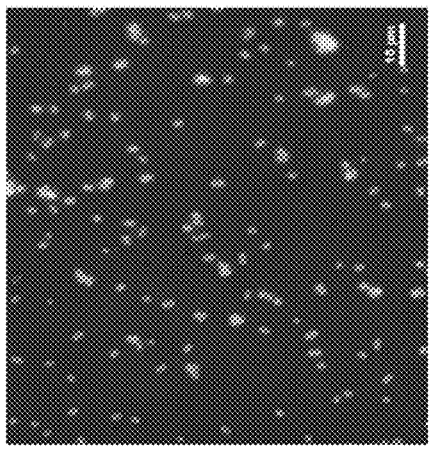
Figure 2A:
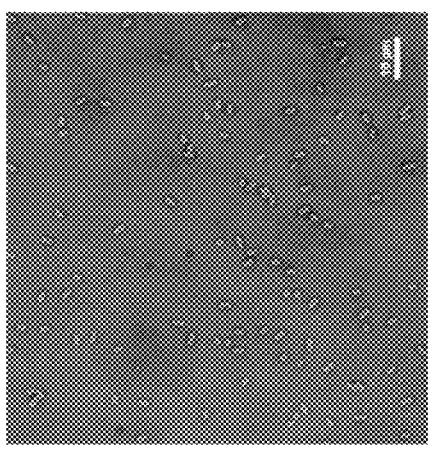
Figure 2B:
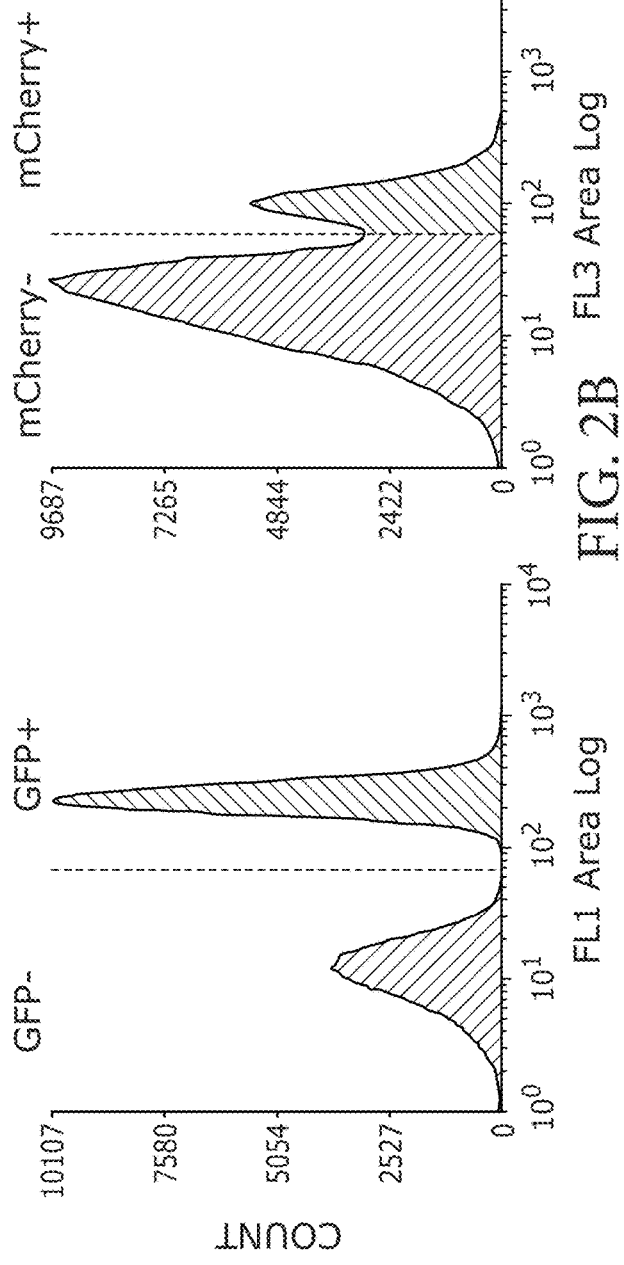

Flow cytometry was used to quantify chromosome-free SimCells using the arabinose inducible gfp circuit on the chromosome of parent cells. Control cell cultures (no I-CeuI) with and without arabinose or erythromycin induction were mixed to define GFP or mCherry expression boundaries when there were not distinct populations (FIG. 2B). Fluorescence microscopy showed that both the AraC and MphR regulation systems were tight and no leaky expression was observed from uninduced *E. coli*. When induced, there is clear and obvious expression of GFP and mCherry (FIG. 2A). Based on flow cytometry analysis, the majority of the I-CeuI-induced culture were SimCells: 91.32% of the population in strains without glycolysis and 94.36% with glycolysis (FIGS. 3A-3B). Assuming the rest are parent cells (8.68% and 5.64% respectively), estimations of the parent cell population remaining in I-CeuI-induced cultures were slightly higher with flow cytometry versus cell plating experiments. This discrepancy could be due to ambiguity of GFP expression as determined by flow cytometry.

It was unexpected to observe this relatively small proportion of parent cells remaining in an induced I-CeuI population as the 7 DSBs made on the *E. coli* chromosome should have been very destructive. However, the bacteria were still able to deploy their arsenal of survival strategies to deactivate the I-CeuI gene, thereby restoring growth fitness and accounted for the existence of parent cells, this phenomenon is explored further in another study (19). These results remind us the cell has sophisticated evolutionary tools to combat attempts to engineer it. It also reinforces the idea that there is a need for a stable and robust chassis cell for synthetic biology. By lacking a genome, SimCells address this need as they avoid the possibility of genetic drift and evolvability.

Expression of Designed Gene-Circuits by Sim Cells

Once it was established that chromosome-free SimCells could be generated, we sought to prove our premise that plasmid DNA or mini-genomes could prompt SimCells to express designed gene-circuits. Flow cytometry was also used to determine the population of SimCells that were expressing mCherry (pJKR-O-mphR). As done previously, a control strain (no I-CeuI) was either not induced or induced for mCherry expression to define expression boundaries when distinct populations were not observed (FIG. 2B). Using the previously established GFP expression gates, the SimCell population (no GFP) was isolated. Of the SimCell population, it was estimated only 13.18% of those without glycolysis were producing mCherry, but this proportion considerably increased to 56.20% with the reintroduction of glycolysis (ATP and NADH generation) (FIGS. 3A-3B). This large improvement in SimCell performance shows that it is important to reintroduce metabolic pathways, such as glycolysis, to provide ATP and NADH for cellular processes to function.

FIGS. 3A and 3B also show fluorescence microscopy images of strains with I-CeuI induced for GFP and mCherry expression. Cells that are expressing GFP still have an intact chromosome so thus, are not SimCells. Cells that are only fluorescing red are SimCells that are producing mCherry. The results from flow cytometry and fluorescent microscopy images are consistent, indicating that SimCells with pSEVA224-GB3 (encoding glycolysis pathway mediated ATP and NADH regeneration) enhances functionality (FIGS. 3A-3B and FIGS. 4A-4B). There are more SimCells producing mCherry as glycolysis was able to regenerate ATP and NADH. These images (FIGS. 3A-3B) also show that flow cytometry could be used to estimate the proportion of SimCell production and quantify the efficiency of an inducible gene-circuit in SimCells. To confirm that these red-only cells are non-replicating SimCells expressing protein, cells were fixed in LB agar with the inducers arabinose and erythromycin and allowed to grow overnight. The control strain (no I-CeuI) (FIG. 19A) grew colonies that dominated the agar and there was expression of both GFP and mCherry. In contrast, a strain with I-CeuI (FIG. 19B) contained SimCells which have lost the ability to replicate. While there were a few parent cells that avoided chromosomal degradation and replicated to form colonies that expressed GFP and mCherry, there were more singular SimCells that were only expressing mCherry. This showed that cells that were not expressing GFP are chromosome-free, non-replicating cells. FIG. 20 shows the progression of SimCell generation and subsequent protein production. Cells containing chromosomal DNA were stained with DAPI and fixed on agar containing I-CeuI endonuclease, GFP, and mCherry inducers. As a SimCell was being generated, it would lose its blue fluorescence as the chromosomal DNA degraded into nucleotides. The newly transformed SimCell would then start producing red fluorescence (mCherry) (FIG. 20). These observations demonstrated that SimCells were indeed producing mCherry and that mCherry was not an artefact from synthesis performed by the parent cell.

In summary, these results show that the chromosome-free SimCells could still produce protein when instructed by a gene-circuit; and this activity can be enhanced by reintroducing the glycolysis pathway to regenerate ATP and NADH.

Purification of Sim Cells

As shown by the flow cytometry and cell plating experiments, there was not a 100% generation efficiency of SimCells after I-CeuI endonuclease activity. In order to elucidate distinct features and characteristics of SimCells they needed to be purified from parent cells. D-cycloserine has previously been used to purify minimal cell cultures and so it was evaluated for its efficacy in killing actively dividing parent cells that remained in the SimCell population. Table 3 shows the CFU/mL of strains over time after application of D-cycloserine at time 0 and 1.5 hours. In the presence of D-cycloserine actively dividing cells will not survive as cell wall biosynthesis is inhibited, which means the cell wall cannot sustain increasing cellular volume, resulting in osmotic lysis. Although the drug was unable to kill all the cells in the control strain, in an I-CeuIt strain, parent cells were effectively eliminated, yielding a pure SimCell culture. This can also be seen in FIG. 3 where no cells are expressing GFP, indicating that they lack a chromosome and are thus SimCells. As SimCells were purified first and then induced for mCherry expression, these results are also evidence that SimCells produced protein and it was not residual expression from parent cells. These images also highlight the benefit of glycolysis as it allowed more SimCells to produce mCherry (FIG. 4B).

Further optimization of D-cycloserine concentration ensured pure SimCell populations in the following experiments, and excluded the contribution made by remaining parent cells in SimCell populations. After a screen of D-cycloserine concentrations, 25 µg/mL was determined to be the point where parent cells were killed in the culture evidenced by little to no increase in OD (Table S3) but also permitted protein production or other activities in SimCells. By using D-cycloserine which targets active, parent cells, we were able to distinguish activity from SimCells on a larger, culture-level scale for further characterization.

Shelf-Life of Sim Cells

In order to establish the applicability of SimCells, it was necessary to characterize how long they could be maintained in storage. SimCells were purified using D-cycloserine from strains containing the mCherry expression plasmid and with or without the pSEVA224-GB3 plasmid encoding the glycolysis pathway. Aliquots were then stored at either 4° C. or –80° C. At 1 week, 1 month, and 5 months after storage, SimCells were induced for mCherry production. FIG. 8 has images showing that SimCells can be preserved for at least 5 months. As expected, more SimCells can produce mCherry with pSEVA224-GB3 than those without, although the number of SimCells that can produce mCherry decreased after they were stored. In general, it seemed that SimCells preserved at 4° C. performed better than those stored at –80° C. in terms of inducible mCherry expression from pJKR-O-mphR. There is some evidence that suggests storage at sub-zero temperatures and subsequent thawing can cause "metabolic injury" to cells and affect growth kinetics. In the case of SimCells, it is likely that at 4° C. cellular processes were quiescent rather than shut down at –80° C. and thus, cells were more readily reactivated and recovered.

Longevity of SimCells

Another requirement for SimCell application to industries such as medicine or the environment is the longevity of the chassis cell. Potential applications such as bioremediation, biosensors, or drug delivery would require SimCells to remain active for several days, weeks, or months. We considered longevity as the energy available to cells in the form of ATP and NAD (P) H as well as the functionality of cell transcription and translation machinery. To characterize the longevity of energy reserves, the production of luminescence by purified SimCells via the ilux operon was used as an indicator. This is because ATP and/or NADH are needed to facilitate the conversion of FMNH2 and —CHO to FMN and —COOH by luciferase (luxAB) to produce light (30), and the levels of ATP and NAD (P) H drop rapidly in dying cells (31). Thus, the ilux operon was integrated into the pJKR-O-mphR plasmid (FIG. 14E) and introduced to Sim-Cells. Luminescence was induced and its production was tracked in SimCells over time (FIG. 5). The activity reached the highest point around day 3 but decreased thereafter. Sim Cells seemed to lose access to an energy source around day 10, and only background levels of luminescence were detected by day 14. Interestingly, the performance of Sim-Cells with the glycolysis pathway was only better than those without on days 1, 3, and 10. It could be that the enzymes needed for glycolysis remained in suitable concentrations before SimCells were generated. Therefore, even without the glycolysis plasmid, SimCells could still produce comparable levels of luminescence. It is likely that with the glycolysis plasmid, the higher than average concentration of enzymes allowed an initial burst of increased activity (as seen from day 1 to 3), but this benefit to cells was eventually lost as the cost of making the 10 proteins in the glycolysis pathway conferred a significant energy burden. This pattern of behaviour was also described by our mathematical model (FIG. 11).

Figure 6:
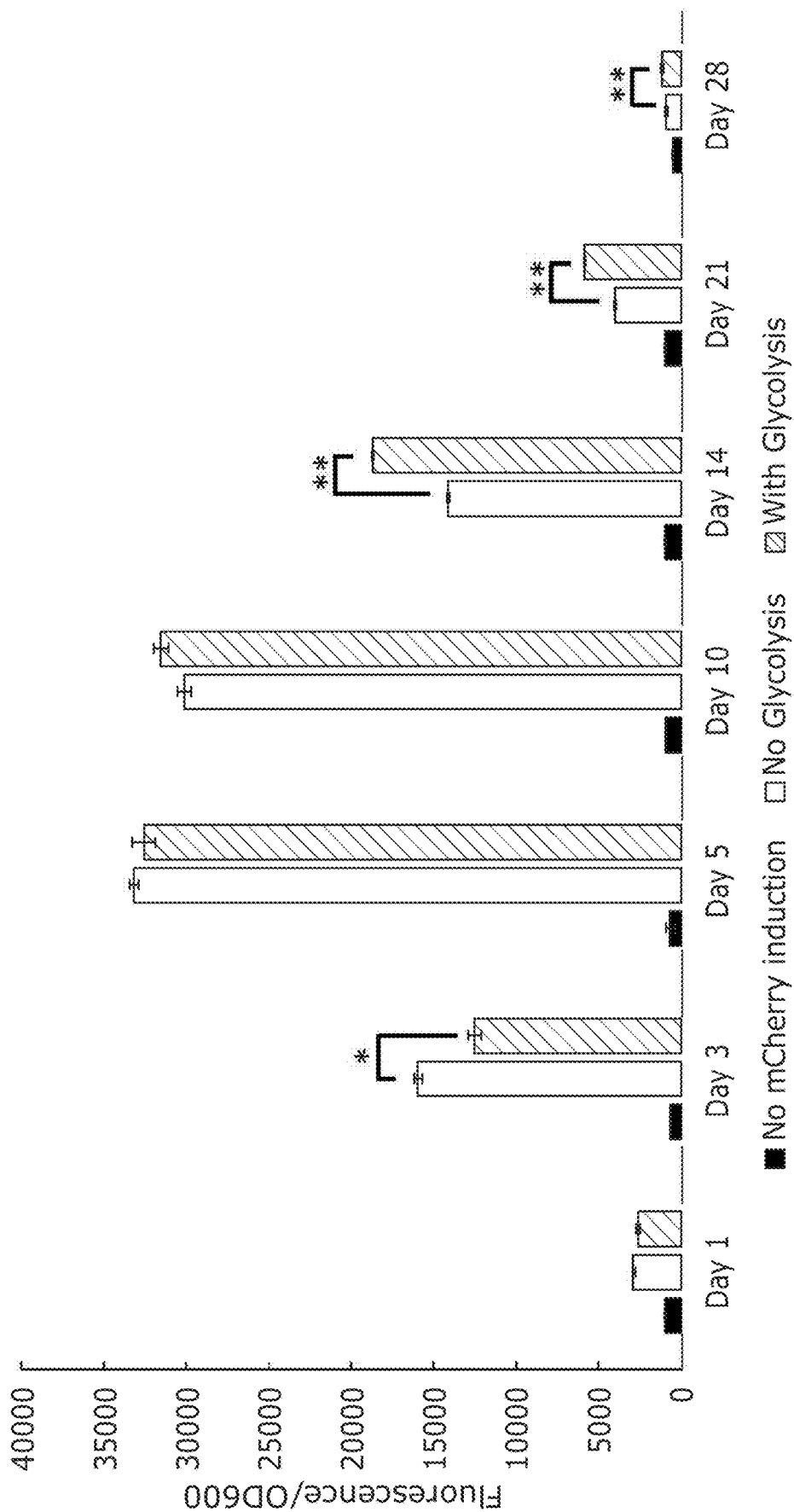

Transcription and translation take up a large part of the cell's energy budget and are important indicators of cellular machinery and protein processes (synthesis, regulation, and degradation), so it is important to evaluate how long the SimCell is able to maintain these processes. To estimate the longevity of the transcription and translation apparatus, as well as the function of degradation enzymes in SimCells, an unstable version of mCherry was created and used as the indicator. Normal mCherry is very stable so the ASV variant of the ssrA protease tag (VSAAYNEDNAAPR (SEQ ID NO: 10)) (16) was fused to the mCherry gene, which created an mCherry targeted for degradation and thus possessed a shorter half-life time. The mCherry-asv reporter gene served as an indication that the major players in protein metabolism such as RNA polymerases, ribosomes, and proteases were still active. FIG. 6 shows mCherry-ASV expression over time by purified SimCells with or without glycolysis. Levels of fluorescence reached its highest around day 5 and started to decrease around day 14 and only background levels of fluorescence were detected after 28 days. The benefit of reintroducing glycolysis is not obvious from these results. The simultaneous activity of synthesis and degradation makes it difficult to discern a clear contribution made by the reintroduced glycolysis pathway. The protein metabolism machinery seemingly lasted longer than the ATP available in the cell (FIG. 5), but we must also consider the fact that the ClpXP and ClpAP proteases which degrade the ssrA-tagged mCherry require ATP to function. Therefore the point at which fluorescence levels no longer increase (day 5-10) is likely when the protein machinery started to lose functionality.

In essence, SimCells have a longevity of about 10-14 days in terms of cellular machinery for the expression of gene-circuits and energy required for these processes. Therefore, SimCells could be robust enough to remain active and functional for most intended applications. It is possible for this time to be augmented by the reintroduction of other energy generating pathways, DNA repairing, ribosome regeneration, and nutrient supplementation.

The Trade-Off Between Energy Generation and the Cost of Gene Expression

The metabolic pathway of glycolysis is able to generate ATP and NADH, but the expression of glycolytic genes is also costly and consumes ATP and NADH. Hence, there is a delicate balance between energy generation and gene expression. A mathematical model was developed to simulate this trade-off (FIGS. 24A-24B). The 10 genes that encode the glycolysis pathway are controlled by a $P_{trc}$ promoter and the LacI repressor, which has leaky expression due to the poor binding kinetics of LacI (FIGS. 25A-25B). The overexpression of glycolysis by IPTG induction in SimCells was so costly and energy-consuming that SimCells were unable to allocate resources to express other genes such as the ilux operon or mCherry (FIGS. 24A-24B). In contrast, leaky expression or IPTG induction of glycolytic genes in parent cells can assist ilux and mCherry production in SimCells in the first 3 days. However, this benefit is lost after 3 days due to the cost of making glycolytic proteins and the performance is similar to SimCells that did not contain the glycolysis pathway (FIGS. 4-6). The mathematical simulation also conceptually supports this observation (FIGS. 24A-24B).

Proteomics Revealed Changes in Global Regulation of Proteins in Sim Cells

Protein regulation is responsible for ensuring certain proteins are made to meet intracellular demands and adapt to changing environments while down-regulating the activity of unnecessary proteins. In the case of I-CeuI endonuclease causing DNA damage, there would surely be a change in intracellular demands; and the consequences of I-CeuI endonuclease activity would not limited to chromosomal degradation. Hence, a proteomics analysis was done in a related study (19) to investigate the changes in protein abundances after I-CeuI endonuclease activity. The strain E. coli DH5α with no vector and DH5α with an empty vector backbone were used as control groups, and DH5α with the I-CeuI gene was designated as the experimental, SimCell condition. A cluster analysis was done to generate a dendrogram and its corresponding heatmap (FIG. 26A) to compare the protein abundances across the different conditions after row scaling. It is visually apparent that the protein expression profile of the I-CeuI+ culture is not only distinct, it is almost opposite to the control groups.

Figure 7:
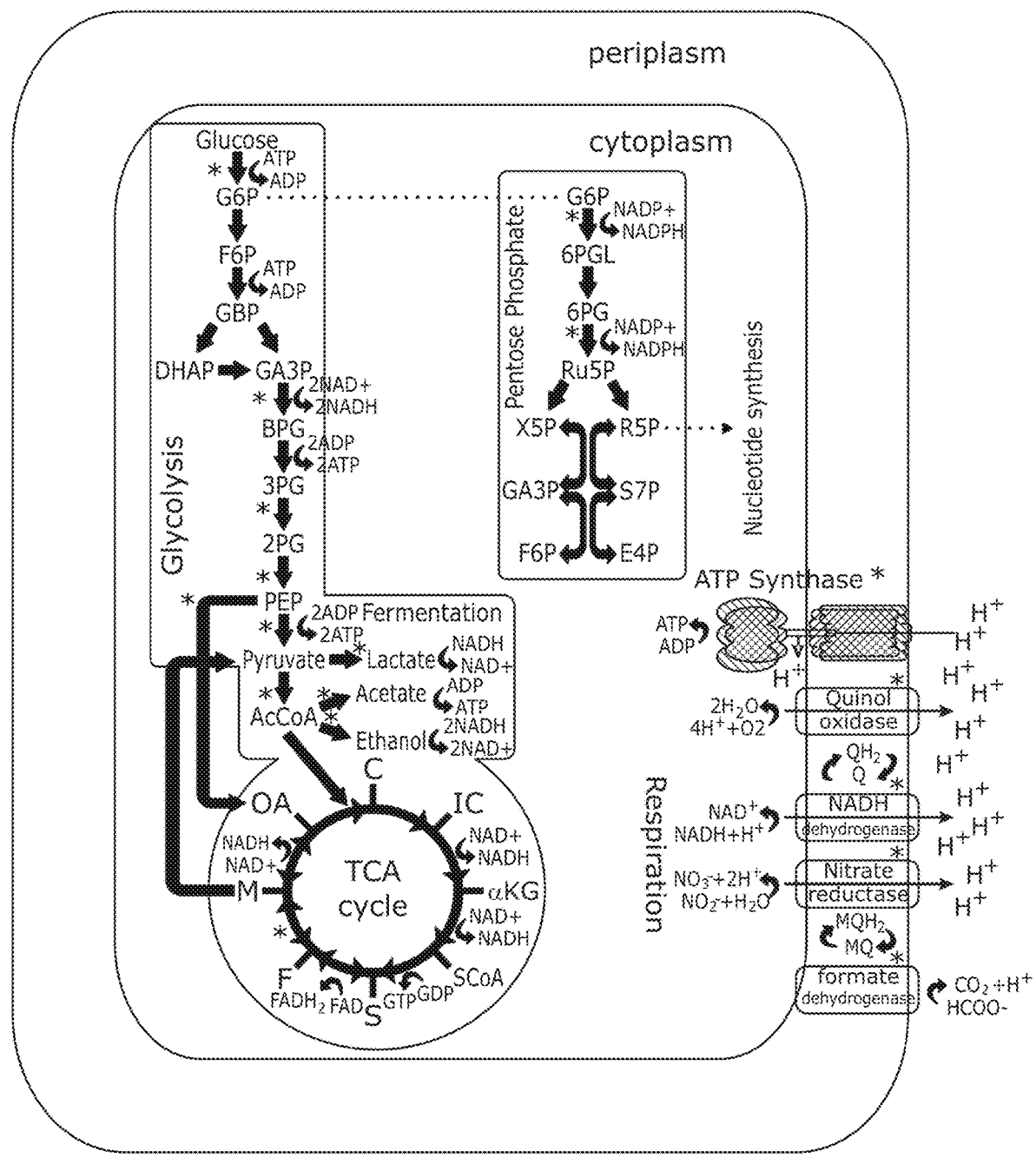

When we dissected the results of specific cellular processes, the same trend of distinct I-CeuI protein expression profiles was observed. In terms of energy and metabolism (FIG. 26B), a SimCell-induced population up- or down-regulated certain genes to maximize cellular resources to make ATP (energy currency) during a state of energy starvation. Sections of the glycolysis and pentose phosphate pathways that generated ATP and NADH were up-regulated, while sections that consumed ATP were down-regulated (FIG. 7). The TCA cycle was largely shut down, as it is likely the cost outweighed the benefits of running a large pathway when there are simpler alternatives. The activity of fumarase (interconversion of fumarate and malate) was the only section of the TCA cycle that was upregulated and the reason or potential benefit of this is unknown as malate dehydrogenase (malate to pyruvate) was less abundant in SimCells. The cofactor $NAD^+$ needed to be regenerated to sustain the glycolysis pathway and it seemed that SimCells favoured fermentation and a small part of aerobic respiration (NADH dehydrogenase) to accomplish this. The parts of aerobic and anaerobic respiration that are shown in FIG. 7 are the only complexes that were up-regulated. These complexes were probably enough to generate an adequate proton gradient to run ATP synthase and produce sufficient ATP. This enhanced carbon metabolic response to energy starvation was also observed in other studies where the cell experienced DNA damage and launched a stress response (32). With the deletion of the chromosome, we reduced the functional space of the cell's metabolic network (33), which resulted in a less complex interactome (the whole set of molecular interactions) and streamlining of the cellular processes in SimCells.

In terms of processes that fall under the umbrella of "central dogma", namely transcription and translation, SimCells again show a very distinct regulation of these and of general metabolism (FIG. 26C and 8). The production (and preservation) of deoxynucleotides and ribonucleotides was prioritized through the de novo synthesis and salvage pathways. Overall, transcription was promoted as proteins associated with RNA polymerase and sigma factors ($\sigma^{70}$ and $\sigma^{54}$) were in high abundance, but it seemed that translation was halted. Even though proteomics indicated proteins associated with ribosomal subunits 50S and 30S were abundant, the assembly of the 70S complex was down-regulated. It is unusual for cells to have high rates of transcription with low translation, as the former is energetically costly (34). However, ribosomes can enter a state of hibernation when the cell experiences nutrient deprivation as well as harsh and variable conditions. SimCells could be primed for protein synthesis and further energy expenditure once they encounter more favourable conditions.

The most obvious phenotypic effect caused by I-CeuI is the presence of longer cells, indicating a change in the normal process of cell division (FIGS. 9 and 26E). A typical $E.\ coli$ is about 2 μm in length but strains with I-CeuI have produced cells that can be 20 μm or longer (FIGS. 3A-3B, 4A-4B, and 19A-19B). These filamentous cells have been observed before in cells that have launched an SOS response due to DNA damage (FIG. 26D) as essential genes for cell division are often shut down by SOS genes. However, the SOS response is subsequently silenced after attempted DNA repair. FIGS. 26A-26E postulate the chronological behaviour of the SOS response in a cell experiencing DNA damage by I-CeuI endonuclease and how it affects aspects of cell division. When I-CeuI endonuclease makes DSBs, the cell launches an SOS response. SOS genes down-regulate proteins such as FtsZ (observed by proteomics), which is a major player in septal ring formation and cell division, causing cells to elongate. When attempted DNA repairs are made, certain cell division genes are turned back on and we can sometimes observe cells that have several septal rings (FIGS. 4A-4B). However, due to the lack of a chromosome the cell is unable to complete division. Other studies have observed that when FtsZ is down-regulated or mutated in parent cells, cells can reach up to 750 μM in length and are still metabolically competent and will synthesize DNA. This preservation of functionality is also supported by our results as the longer SimCells could still produce mCherry (FIGS. 3A-3B, 4A-4B, and 19A-19B). A comparative study of *mycoplasma* proteomes showed that cell division proteins are not part of the core proteome (35). This is an indication that the cell division mechanism has more plasticity than other pathways and is not essential for cellular function.

The degradation of the chromosome caused by DSBs made by I-CeuI endonuclease launched a dramatic cellular response that affected processes such as cell division, protein metabolism, and ATP generation. Proteomics analysis indicated which processes were prioritized, kept on standby, or shut down and which cellular machineries were present in SimCells, providing essential information for the design of cargo gene-circuits or mini-genomes.

Sim Cells as a Biocatalyst to Make Anti-Cancer Drug Catechol from Aspirin

Catechol (1,2-dihydroxybenzene) is a naturally occurring compound in fruits and vegetables and a moiety of caffeic acid and catechin (tea). Catechol has previously been shown to have cytotoxic effects by inducing apoptosis in lung and brain cancer cell lines. Taking advantage of the anti-cancer properties of catechol, SimCells were used to convert salicylic acid (SA) into catechol and export this product to kill cancer cells (FIGS. 10 and 27).

The plasmid pSalAR-GFP contains a positive autoregulation gene-circuit, which produces SalA (salicylate hydroxylase) and SalR when induced by SA (FIG. 10). SalR is a transcriptional regulatory protein that transitions to its active form in the presence of SA and acts as an activator for its own promoter $P_{sal}$, effectively forming a positive feedback loop (FIG. 10). SalA catalyzes the conversion of SA to catechol by consuming NADH (FIG. 10). This plasmid was transferred to $E.\ coli$ parent cells and SimCells (later purified) with and without the glycolysis pathway (pSEVA224-GB3). LC analysis (FIG. 11) showed a dramatic increase in catechol production by parent cells and SimCells when induced with higher concentrations of SA. This was due to the positive feedback nature of the gene-circuit. SimCells were able to make decent amounts of catechol with the glycolysis pathway when induced with 500 μM SA (FIG. 11). The significant improvement of catechol production with glycolysis can be attributed to the reaction's dependency on NADH. It suggests that the glycolysis pathway made a large contribution to the conversion of SA to catechol. Given that the SimCell population was $1\times10^7$ cells/ml, SimCells produced about $4\times10^{-14}$ moles catechol per cell over 12 hours from 500 μM SA. This amount of catechol being produced in the small volume of a bacterial cell (about 1 μm$^3$) would have had a high local concentration of catechol, which subsequently diffused out of the SimCell into the surrounding media (FIG. 27). If SimCells could attach to cancer cells, the local concentration would be sufficiently high enough to inhibit cancer cells.

Screens showed that catechol significantly decreased the viability of A549 (lung), Mo59K (brain) and RD (soft-tissue) cancer cell lines at concentrations as low as 100 μM but had less of an adverse effect against normal cells like fibroblasts (FIG. 12). Additionally, SA (the substrate) and D-cycloserine (to maintain SimCell purity) did not cause cell death (FIG. 28), which means a decrease in cell viability would be attributed to the cytotoxic effects of catechol. These cell lines were incubated with SimCells containing the glycolysis pathway and pSalAR-GFP plasmids in various SA concentrations. SimCells induced with 500 μM SA for catechol production significantly lowered the cell viability of all cancer cell lines but did not kill fibroblasts (non-cancerous cells) (FIGS. 13 and 29A-29D). These results demonstrated that SimCells were able to act as biocatalysts to produce catechol which was cytotoxic against cancer cells but did not kill non-cancerous cells. SimCells have advantage over traditional bacterial therapy in medicine, because they are inducible, functional and controllable (non-replicating minimal cells). Future work can be done to optimize this system by expressing carcinoembryonic antigen (CEA) on the surface of SimCells (surface display). This will allow SimCells to specifically target cancer cells (36) and deliver high concentrations of catechol locally, which should result in an enhanced killing effect.

Discussion

The classic minimal cell is a living cell that only contains the minimal number of components necessary for replication and metabolism. In this work, we created and characterized a different type of minimal cell called SimCells or 'simple cells', with the intention of applying it as a chassis for reprogramming microorganisms. We developed a potentially universal technology to create chromosome-free and reprogrammable SimCells from almost all bacterial genera. These SimCells are able to host and express designed gene-circuits. A SimCell can be seen as a simplified cellular bio-robot: its 'hardware' includes the intact cell membrane and the protein and molecular toolkit (e.g. electron chain transport, transcription, translation), which enables the functionality of cellular machinery; and its 'software' is engineered DNA or mini-genomes that perform instructed functions (3). The hardware can be optimised by designing or selecting parent cells with desirable phenotypic attributes. The absence of the native genome enables SimCells to dedicate most of their energy and resources to the designated tasks programmed by plasmids or mini-genomes without interference from unwanted pathways and networks. Sim-Cells are biochemically active, designable and simplified agents, which can be used to understand the functional machinery of cells. They are also chassis cells which can host a mini-genome containing a core genetic operating system that can be manipulated in a predictive manner and execute pre-defined functions. Additionally, SimCells are unable to replicate due to the absence of the chromosome, which could be advantageous for biocontainment and alleviate the concerns of uncontrollable genetically engineered microorganisms.

Compared to minimal cells made using top-down methods, the SimCell in this study is an abstract and even simpler minimal cell, as it merely contained functional gene-circuits instead of an intact minimal genome. SimCells were readily created by removal of the chromosome by exploiting the combined activity of I-CeuI endonuclease-mediated DSBs and RecBCD-mediated DNA degradation (FIGS. 18A-18B and 20). The zeta potential of SimCells was slightly more positively-charged than parent cells (FIG. 30), which is additional evidence to support that the SimCells have lost the negatively-charged chromosome. This SimCell generation method is advantageous because it can be applicable to bacteria other than *E. coli* (such as *P. putida* and *R. eutropha* in this study) as the I-CeuI recognition sequence is present in 23S rRNA, and thus, occurs several times in the bacterial genome. Studies usually observe chromosomal degradation in recA mutants as RecA plays a vital role in DSB repair. However, as we generated several DSBs the RecA proteins were probably unable to halt chromosomal degradation by RecBCD. The end products of RecBCD chromosome degradation are 4-6 mer single-stranded fragments, which were likely converted to mononucleotides by other cellular nucleases, such as ExoI, ExoVII, and RecJ. These dNTPs from RecBCD reaction do not seem to interfere with the expression of gene-circuits. We then showed that when instructed by plasmid DNA, SimCells are able to produce protein. This activity was improved after the glycolysis genes were restored in cells, with about 56% of SimCells being metabolically active. SimCells can sustain constant functionality for about 10 days until they expend their energy currency. SimCells can also address some of the biocontainment concerns often faced by genetically modified organisms as they have lost the ability to replicate.

Researchers often face unexpected difficulties during genetic manipulation as parent cells have an intricate network of pathways that may not be compatible with the engineered system. In a SimCell, there is no longer the capacity for genetic evolution to interfere with recombinant pathways and proteins. Therefore, a SimCell possesses living and non-living properties that make it a semi-artificial cell and allows us to utilize it as a chassis for engineering but also as a model platform for the study of fundamental life processes.

Unlike protocells that are liposomes or vesicles, the SimCell retains its original bacterial cell membrane. This membrane houses many vital functions: sensing of environmental signals, generation of ATP via proton gradients created by the electron transport chain, and transportation of nutrients into the cell and waste out of the cell. SimCells are also more robust than protocells because even though gene networks were eliminated, cellular machineries and the proteome remained intact and active. SimCells can therefore respond to challenges to cellular function more effectively, as it retains adaptive biological components. For instance, ATP/NAD(H) production was prioritized by up-regulation of the productive sections of glycolysis, the pentose phosphate pathway, fermentation, and respiration. These pathways were also identified as being part of the core proteomes of three mycoplasma species (35). Mycoplasma is often considered to be predictive of minimal cell requirements due to its small genome size. Our results support that certain metabolic pathways and machineries (e.g. transcription and translation) are preferentially up-regulated to ensure cell survival and function. The proteomics analysis gives us an indication of what would be sensible to include on an artificial chromosome to reintroduce beneficial processes to extend cell endurance (e.g. glycolysis as in this study) but exclude less effective ones (e.g. the TCA cycle). In this way, SimCells can be modularly altered to suit the needs of the application. SimCells were also able to act as biocatalysts to produce catechol from a metabolite of Aspirin, which had therapeutic effects against several malignant cancer cell lines. This shows that SimCells can also be utilized as chassis cells by taking advantage of its biological (transcription and translation) and artificial (non-replicating) properties. SimCells can negate the stagnant progress (due to biocontainment concerns) in engineering bacteria to address challenges in medicine or environmental remediation.

The creation of SimCells has provided us insights into what are the minimal requirements of "life", which is one of the core values of creating minimal cells. Their simplicity (non-existent genome) should allow for more predictive manipulations and their underlying complexity (remaining proteome) should provide robustness. Moreover, as they are functional (able to produce proteins), this activity can be designed and tuned. The chromosome-free SimCell will be a universal platform for reprogramming bacterial cells and will drive advancements in cell design and the creation of synthetic cells.

REFERENCES

1. Benner, S. A. & Sismour, A. M. Synthetic biology. Nat Rev Genet 6, 533-543 (2005).
2. Danchin, A. Scaling up synthetic biology: Do not forget the chassis. FEBS Lett 586, 2129-2137 (2012).
3. Kwok, R. Five hard truths for synthetic biology. Nature 463, 288-290 (2010).
4. Fan, C. et al. Defensive Function of Transposable Elements in Bacteria. ACS Synth Biol (2019).
5. Blain, J. C. & Szostak, J. W. Progress Toward Synthetic Cells, in Annu Rev Biochem, Vol. 83. (ed. R. D. Kornberg) 615-640 (2014).
6. Noireaux, V. & Libchaber, A. A vesicle bioreactor as a step toward an artificial cell assembly. Proc Natl Acad Sci USA 101, 17669-17674 (2004).

7. Szostak, J. W., Bartel, D. P. & Luisi, P. L. Synthesizing life. Nature 409, 387-390 (2001).
8. Gibson, D. G. et al. Creation of a Bacterial Cell Controlled by a Chemically Synthesized Genome. Science 329, 52-56 (2010).
9. Hutchison, C. A. et al. Design and synthesis of a minimal bacterial genome. Science 351 (2016).
10. Rampley, C. P. N. et al. Development of SimCells as a novel chassis for functional biosensors. Sci Rep 7 (2017).
11. Lartigue, C. et al. Genome transplantation in bacteria: Changing one species to another. Science 317, 632-638 (2007).
12. Chen, J. X. et al. Development of Aspirin-Inducible Biosensors in Escherichia coli and SimCells. Appl Environ Microbiol 85 (2019).
13. Lesterlin, C., Ball, G., Schermelleh, L. & Sherratt, D. J. RecA bundles mediate homology pairing between distant sisters during DNA break repair. Nature 506, 249-+ (2014).
14. Dela Cruz, C. S., Tanoue, L. T. & Matthay, R. A. Lung cancer: epidemiology, etiology, and prevention. Clin Chest Med 32, 605-644 (2011).
15. Stupp, R. et al. Radiotherapy plus concomitant and adjuvant temozolomide for glioblastoma. New Engl J Med 352, 987-996 (2005).
16. Ognjanovic, S., Linabery, A. M., Charbonneau, B. & Ross, J. A. Trends in childhood rhabdomyosarcoma incidence and survival in the United States, 1975-2005. Cancer 115, 4218-4226 (2009).
17. Ahrenholtz, I., Lorenz, M. G. & Wackernagel, W. A conditional suicide system in Escherichia coli based on the intracellular degradation of DNA. Appl Environ Microbiol 60, 3746-3751 (1994).
18. Wang, J., Chen, R. & Julin, D. A. A single nuclease active site of the Escherichia coli RecBCD enzyme catalyzes single-stranded DNA degradation in both directions. J Biol Chem 275, 507-513 (2000).
19. Liu, S. L., Hessel, A. & Sanderson, K. E. Genomic mapping with I-Ceu I, an intron-encoded endonuclease specific for genes for ribosomal RNA, in Salmonella spp., Escherichia coli, and other bacteria. Proc Natl Acad Sci USA 90, 6874-6878 (1993).
20. Liu, S. L. & Sanderson, K. E. I-CeuI reveals conservation of the genome of independent strains of Salmonella typhimurium. J Bacteriol 177, 3355-3357 (1995).
21. Rogers, J. K. et al. Synthetic biosensors for precise gene control and real-time monitoring of metabolites. Nucleic Acids Res 43, 7648-7660 (2015).
22. Ruegg, T. L. et al. Jungle Express is a versatile repressor system for tight transcriptional control. Nat Commun 9 (2018).
24. Clark, A. J., Chamberlin, M., Boyce, R. P. & Howard-Flanders, P. Abnormal metabolic response to ultraviolet light of a recombination deficient mutant of Escherichia coli K12. J Mol Biol 19, 442-454 (1966).
25. Willetts, N. S. & Clark, A. J. Characteristics of some multiply recombination-deficient strains of Escherichia coli. J Bacteriol 100, 231-239 (1969).
26. Krasin, F. & Hutchinson, F. Repair of DNA double-strand breaks in Escherichia coli, which requires recA function and the presence of a duplicate genome. J Mol Biol 116, 81-98 (1977).
27. Brcic-Kostic, K. et al. Interaction of RecBCD enzyme with DNA damaged by gamma radiation. Mol Gen Genet 228, 136-142 (1991).
28. Sanchez-Pascuala, A., de Lorenzo, V. & Nikel, P. I. Refactoring the Embden-Meyerhof-Parnas Pathway as a Whole of Portable GlucoBricks for Implantation of Glycolytic Modules in Gram-Negative Bacteria. ACS Synth Biol 6, 793-805 (2017).
37. Meighen, E. A. Molecular biology of bacterial bioluminescence. Microbiol Rev 55, 123-142 (1991).
38. Kaskova, Z. M., Tsarkova, A. S. & Yampolsky, I. V. 1001 lights: luciferins, luciferases, their mechanisms of action and applications in chemical analysis, biology and medicine. Chem Soc Rev 45, 6048-6077 (2016).
40. Andersen, J. B. et al. New unstable variants of green fluorescent protein for studies of transient gene expression in bacteria. Appl Environ Microbiol 64, 2240-2246 (1998).
44. Yang, J. H. et al. A White-Box Machine Learning Approach for Revealing Antibiotic Mechanisms of Action. Cell 177, 1649-1661 e1649 (2019).
45. Trinh, C. T., Unrean, P. & Srienc, F. Minimal Escherichia coli cell for the most efficient production of ethanol from hexoses and pentoses. Appl Environ Microbiol 74, 3634-3643 (2008).
46. Hausser, J., Mayo, A., Keren, L. & Alon, U. Central dogma rates and the trade-off between precision and economy in gene expression. Nat Commun 10, 68 (2019).
52. Fisunov, G. Y. et al. Core proteome of the minimal cell: comparative proteomics of three mollicute species. PloS One 6, e21964 (2011).
59. Ricci-Vitiani, L. et al. Identification and expansion of human colon-cancer-initiating cells. Nature 445, 111-115 (2007).
1. Gibson D G, Glass J I, Lartigue C, Noskov V N, Chuang R Y, Algire M A, et al. Creation of a Bacterial Cell Controlled by a Chemically Synthesized Genome. Science. 2010; 329 (5987): 52-6.
2. Hutchison C A, Chuang R Y, Noskov V N, Assad-Garcia N, Deerinck T J, Ellisman M H, et al. Design and synthesis of a minimal bacterial genome. Science. 2016; 351 (6280).
3. Rampley C P N, Davison P A, Qian P, Preston G M, Hunter C N, Thompson I P, et al. Development of SimCells as a novel chassis for functional biosensors. Sci Rep. 2017; 7.
4. Lartigue C, Glass J I, Alperovich N, Pieper R, Parmar P P, Hutchison C A, et al. Genome transplantation in bacteria: Changing one species to another. Science. 2007; 317 (5838): 632-8.
5. Chen J X, Steel H, Wu Y H, Wang Y, Xu J B, Rampley C P N, et al. Development of Aspirin-Inducible Biosensors in Escherichia coli and SimCells. Appl Environ Microbiol. 2019; 85 (6).
6. Lesterlin C, Ball G, Schermelleh L, Sherratt D J. RecA bundles mediate homology pairing between distant sisters during DNA break repair. Nature. 2014; 506 (7487): 249-+.
7. Dela Cruz C S, Tanoue L T, Matthay R A. Lung cancer: epidemiology, etiology, and prevention. Clinics in chest medicine. 2011; 32 (4): 605-44.
8. Stupp R, Mason W P, van den Bent M J, Weller M, Fisher B, Taphoorn M J, et al. Radiotherapy plus concomitant and adjuvant temozolomide for glioblastoma. The New England journal of medicine. 2005; 352 (10): 987-96.
9. Ognjanovic S, Linabery A M, Charbonneau B, Ross J A. Trends in childhood rhabdomyosarcoma incidence and survival in the United States, 1975-2005. Cancer. 2009; 115 (18): 4218-26.

10. Zhou L, Zhang K, Wanner B L. Chromosomal expression of foreign and native genes from regulatable promoters in *Escherichia coli*. Methods Mol Biol. 2004; 267:123-34.
11. Rogers J K, Guzman C D, Taylor N D, Raman S, Anderson K, Church G M. Synthetic biosensors for precise gene control and real-time monitoring of metabolites. Nucleic acids research. 2015; 43 (15): 7648-60.
12. Heinemann J A, Ankenbauer R G. Retrotransfer of IncP plasmid R751 from *Escherichia coli* maxicells: evidence for the genetic sufficiency of self-transferable plasmids for bacterial conjugation. Molecular microbiology. 1993; 10 (1): 57-62.
13. Crameri A, Whitehorn E A, Tate E, Stemmer W P. Improved green fluorescent protein by molecular evolution using DNA shuffling. Nat Biotechnol. 1996; 14 (3): 315-9.
14. Sanchez-Pascuala A, de Lorenzo V, Nikel P I. Refactoring the Embden-Meyerhof-Parnas Pathway as a Whole of Portable GlucoBricks for Implantation of Glycolytic Modules in Gram-Negative Bacteria. ACS synthetic biology. 2017; 6 (5): 793-805.
15. Gregor C, Gwosch K C, Sahl S J, Hell S W. Strongly enhanced bacterial bioluminescence with the ilux operon for single-cell imaging. Proceedings of the National Academy of Sciences of the United States of America. 2018; 115 (5): 962-7.
16. Andersen J B, Sternberg C, Poulsen L K, Bjorn S P, Givskov M, Molin S. New unstable variants of green fluorescent protein for studies of transient gene expression in bacteria. Appl Environ Microbiol. 1998; 64 (6): 2240-6.
17. Ruegg T L, Pereira J H, Chen J C, DeGiovanni A, Novichkov P, Mutalik V K, et al. Jungle Express is a versatile repressor system for tight transcriptional control. Nat Commun. 2018; 9.
18. Suomi T, Seyednasrollah F, Jaakkola M K, Faux T, Elo L L. ROTS: An R package for reproducibility-optimized statistical testing. PLOS Comput Biol. 2017; 13 (5): e1005562.
19. Fan C, Wu Y, Decker C M, Rohani R, Salazar M G, Ye H, et al. Defensive Function of Transposable Elements in Bacteria. ACS Synth Biol. 2019.
20. Waskom M, Botvinnik O, O'Kane D, Hobson P, Lukauskas S, Gemperline D C, et al. mwaskom/seaborn: v0.8.1 (September 2017). 2017.
21 Sawyer M, Kumar V. A rapid high-performance liquid chromatographic method for the simultaneous quantitation of aspirin, salicylic acid, and caffeine in effervescent tablets. Journal of chromatographic science. 2003; 41 (8): 393-7.
22. Ahrenholtz I, Lorenz M G, Wackernagel W. A conditional suicide system in *Escherichia coli* based on the intracellular degradation of DNA. Appl Environ Microbiol. 1994; 60 (10): 3746-51.
23. Wang J, Chen R, Julin D A. A single nuclease active site of the *Escherichia coli* RecBCD enzyme catalyzes single-stranded DNA degradation in both directions. J Biol Chem. 2000; 275 (1): 507-13.
24. Liu S L, Hessel A, Sanderson K E. Genomic mapping with I-Ceu I, an intron-encoded endonuclease specific for genes for ribosomal RNA, in *Salmonella* spp., *Escherichia coli*, and other bacteria. Proc Natl Acad Sci USA. 1993; 90 (14): 6874-8.
25. Liu S L, Sanderson K E. I-CeuI reveals conservation of the genome of independent strains of *Salmonella typhimurium*. Journal of bacteriology. 1995; 177 (11): 3355-7.
26. Clark A J, Chamberlin M, Boyce R P, Howard-Flanders P. Abnormal metabolic response to ultraviolet light of a recombination deficient mutant of *Escherichia coli* K12. Journal of molecular biology. 1966; 19 (2): 442-54.
27. Willetts N S, Clark A J. Characteristics of some multiply recombination-deficient strains of *Escherichia coli*. Journal of bacteriology. 1969; 100 (1): 231-9.
28. Krasin F, Hutchinson F. Repair of DNA double-strand breaks in *Escherichia coli*, which requires recA function and the presence of a duplicate genome. Journal of molecular biology. 1977; 116 (1): 81-98.
29. Brcic-Kostic K, Salaj-Smic E, Marsic N, Kajic S, Stojiljkovic I, Trgovcevic Z. Interaction of RecBCD enzyme with DNA damaged by gamma radiation. Mol Gen Genet. 1991; 228 (1-2): 136-42.
30. Meighen E A. Molecular biology of bacterial bioluminescence. Microbiol Rev. 1991; 55 (1): 123-42.
31. Kaskova Z M, Tsarkova A S, Yampolsky I V. 1001 lights: luciferins, luciferases, their mechanisms of action and applications in chemical analysis, biology and medicine. Chemical Society reviews. 2016; 45 (21): 6048-77.
32. Yang J H, Wright S N, Hamblin M, McCloskey D, Alcantar M A, Schrubbers L, et al. A White-Box Machine Learning Approach for Revealing Antibiotic Mechanisms of Action. Cell. 2019; 177 (6): 1649-61 e9.
33 Trinh C T, Unrean P, Srienc F. Minimal *Escherichia coli* cell for the most efficient production of ethanol from hexoses and pentoses. Appl Environ Microbiol. 2008; 74 (12): 3634-43.
34. Hausser J, Mayo A, Keren L, Alon U. Central dogma rates and the trade-off between precision and economy in gene expression. Nat Commun. 2019; 10 (1): 68.
35. Fisunov G Y, Alexeev D G, Bazaleev N A, Ladygina V G, Galyamina M A, Kondratov I G, et al. Core proteome of the minimal cell: comparative proteomics of three mollicute species. PloS one. 2011; 6 (7): e21964.
36. Ricci-Vitiani L, Lombardi D G, Pilozzi E, Biffoni M, Todaro M, Peschle C, et al. Identification and expansion of human colon-cancer-initiating cells. Nature. 2007; 445 (7123): 111-5.
37. Gregor C, Gwosch K C, Sahl S J, Hell S W. Strongly enhanced bacterial bioluminescence with the ilux operon for single-cell imaging. Proceedings of the National Academy of Sciences of the United States of America. 2018; 115 (5): 962-7.
38. Silva-Rocha R, Martinez-Garcia E, Calles B, Chavarria M, Arce-Rodriguez A, de las Heras A, et al. The Standard European Vector Architecture (SEVA): a coherent platform for the analysis and deployment of complex prokaryotic phenotypes. Nucleic acids research. 2013; 41 (D1): D666-D75.
39. Ruegg T L, Pereira J H, Chen J C, DeGiovanni A, Novichkov P, Mutalik V K, et al. Jungle Express is a versatile repressor system for tight transcriptional control. Nature Communications. 2018; 9.
40. Huang W E, Wang H, Zheng H, Huang L, Singer A C, Thompson I, et al. Chromosomally located gene fusions constructed in *Acinetobacter* sp. ADP1 for the detection of salicylate. Environmental microbiology. 2005; 7 (9): 1339-48.
41. Huang W E, Singer A C, Spiers A J, Preston G M, Whiteley A S. Characterizing the regulation of the Pu promoter in *Acinetobacter* baylyi ADP1. Environmental microbiology. 2008; 10 (7): 1668-80.

TABLE 2

Overnight cultures of strains with or without the I-CeuI endonuclease gene and with or without the glycolysis pathway (pSEVA224-GB3) were plated out to count the CFU/mL and quantify the number of normal cells remaining in the population. The dilutions that were plated out were normalized to have the same $OD_{600}$. Strains with I-CeuI had about 100× less colonies than those without I-CeuI, demonstrating the adverse effect of I-CeuI on cell viability due to chromosome degradation.

| Strain | CFU/mL |
|---|---|
| ICeuI$^+$ Glycolysis$^-$ | $2.67 \times 10^6$ |
| ICeuI$^-$ Glycolysis$^-$ | $1.87 \times 10^8$ |
| ICeurI$^+$ Glycolysis$^+$ | $5.58 \times 10^6$ |
| ICeuI$^-$ Glycolysis$^+$ | $1.46 \times 10^8$ |

TABLE 3

Cultures were treated with 200 μg/mL D-cycloserine at time 0 and 1.5 hours to kill normal cells to yield a pure SimCell culture. Plate counts over time estimated the CFU/mL and efficacy of the drug. D-cycloserine effectively kills normal cells in strains with I-CeuI, indicating that it is an effective drug.

| Time (hr) | ICeuI$^-$ Glycolysis$^-$ | ICeuI$^+$ Glycolysis$^-$ | ICeuI$^-$ Glycolysis$^+$ | ICeuI$^+$ Glycolysis$^+$ |
|---|---|---|---|---|
| 0 | $1.8 \times 10^9$ | $3.5 \times 10^5$ | $1.0 \times 10^9$ | $3.08 \times 10^5$ |
| 1.5 | $1.1 \times 10^9$ | $4.1 \times 10^3$ | $6.9 \times 10^8$ | $2.7 \times 10^3$ |
| 5 | $1.3 \times 10^7$ | $7.2 \times 10^2$ | $4 \times 10^7$ | $7.5 \times 10^2$ |
| 24 | $1.6 \times 10^7$ | 0 | $8.3 \times 10^4$ | 0 |

TABLE S1

A list of strains and plasmids used in this study.

| Bacterial strains or plasmids Strains | Genotype, description | Reference or source |
|---|---|---|
| *Escherichia coli* K12 BW31003 | F-, Δ(araD-araB)567, ΔlacZ4787(::rrnB-3), λ-, att80(CmR)::KZ28araBp-GFP, Δ(rhaD-rhaB)568, hsdR514 | Coli Genetic Stock Center (CGSC) (10)$^a$ |
| ICeuI+ Glycolysis+ | *E. coli*: pJKR-O-mphR + pJKR-HTetR-ICeuI + pSEVA224-GB3 | This study |
| ICeuI+ Glycolysis− | *E. coli*: pJKR-O-mphR + pJKR-HTetR-ICeuI + pSEVA224 | This study |
| ICeuI− Glycolysis+ | *E. coli*: pJKR-O-mphR + pJKR-H-TetR+ pSEVA224-GB3 | This study |
| ICeuI− Glycolysis− | *E. coli*: pJKR-O-mphR + pJKR-H-TetR + pSEVA224-GB3 | This study |
| *R. eutropha* H16 | Wildtype strain, Gen$^R$ (also *Cupriavidus necator* H16) | A gift from Oliver Lenz at Technische Universitaet Berlin |
| H16ICeuI | *R. eutropha* H16: pRH121 | This study |
| *P. putida* UWC1 | Rif$^R$ variant of *P. putida* KT2440 | Lab collection |
| UWC1 ICeuI | *P. putida* UWC1: pRH121 | This study |
| Plasmids | | |
| pJKR-H-TetR | Plasmid with GFP production controlled by TetR | (11)$^a$ |
| pJKR-HTetR-ICeuI | Plasmid with I-CeuI endonuclease controlled by TetR | This study |
| pJKR-O-mphR | Plasmid with mCherry production controlled by MphR | (11)$^a$ |
| pSEVA224 | Empty vector on which the other glycolysis plasmids on based on | (14)$^a$ |
| pSEVA224-GBI | Plasmid with upper glycolysis catabolic pathway (glk, pgi, pfkA, fbaA, tpiA) | (14)$^a$ |
| pSEVA224-GBII | Plasmid with lower glycolysis catabolic pathway (gapA, pgk, gpmA, eno, pykF) | (14)$^a$ |
| pSEVA224-GB3 | Plasmid with entire glycolysis pathway | This study |
| pQE-ilux | Plasmid with ilux under constitutive expression | (37)$^a$ |
| pJKR-OmphR-ilux | Plasmid with ilux production controlled by MphR | This study |
| pJKR-OmphR-ASV | Plasmid with an ASV ssrA tag at the end of mCherry, half-life mCherry production is controlled by MphR | This study |
| pSEVA231 | Empty vector backbone with broad host-range origin of replication (pBBR1), origin of transfer (oriT), Km$^R$ | (38)$^a$ |
| pJC580 | Source of $P_{JExD}$ Jungle Express promoter and EilR transcriptional repressor, ColE1, RK2, Km$^R$ | Joint Bioenergy Institute (JBEI) and (39)$^a$ |
| pLO11 | Source of araC and $P_{araBAD}$, RK2, Tc$^R$ | A gift from Oliver Lenz at Technische Universitaet Berlin |
| pRH121 | pSEVA231 backbone with ICeuI endonuclease (codon-optimised for *R. eutropha* H16) and araC under the control of $P_{JExD}$, BBa_B0024 transcriptional terminator, mrfp1 under the control of $P_{araBAD}$ | This study |

TABLE S1-continued

A list of strains and plasmids used in this study.

| Bacterial strains or plasmids Strains | Genotype, description | Reference or source |
| --- | --- | --- |
| pSalAR-GFP | pGEM-T backbone with salA, gfp, and salR under control of $P_{sal}$, $Tc^R$ | Lab collection (40)[a] |
| pSalA_Km_xylR | Defective version of salA due to an insertion of a kanamycin resistance marker | Lab collection (41)[a] |

TABLE S2

Primers used in this study.

| Oligo name | Oligo sequence (5'→3') | Part |
| --- | --- | --- |
| ICeuI_SacI.FOR | CATTAGGAGCTCATGTCAAACTTTATACTTAAACC (SEQ ID NO: 11) | I-CeuI |
| ICeuI_XbaI.REV | CATTAGTCTAGACTACTTTATACCTTTTTTAT (SEQ ID NO: 12) | |
| TetR_XbaI.FOR | CATTAGTCTAGACATAACCCTAATGAGTGAGC (SEQ ID NO: 13) | pJKR-H-TetR backbone |
| TetR_SacI.REV | CATTAGGAGCTCatgtatatctccttcttaaag (SEQ ID NO: 14) | |
| ilux_KpnI.FOR | CATTAGGGTACCATGACTAAAAAAATTTCATTC (SEQ ID NO: 15) | ilux operon |
| ilux_BamHI.REV | CATTAGGGATCCGCTAGCTTGGATTCTCACC (SEQ ID NO: 16) | |
| Xcherry_BamHI.FOR | CATTAGGGATCCctaatgagtgagctaacttac (SEQ ID NO: 17) | pJKR-O-mphR backbone |
| Xcherry_KpnI.REV | CATTAGGGTACCatgtatatctccttcttaaag (SEQ ID NO: 18) | |
| tag.FOR | TTAATAAGCTTGAGAGCtaatgagtgagctaacttacattaattgcgt (SEQ ID NO: 19) | ASV ssrA tag |
| ASV.REV | CTCTCAAGCTTATTAAACTGATGCAGCGTAGTTTTCGTCGTTTGCTGCGGATCCcttgtacagctcgtccatgccgccgg (SEQ ID NO: 20) | |

Construction of pRH121 via HiFi Assembly

| Oligo name | Oligo sequence (5'→3') | Part |
| --- | --- | --- |
| oligoRH1211_for | Ctcctgtgtgaaattgttatccgc (SEQ ID NO: 21) | pSEVA231 backbone |
| oligoRH1211_rev | acctgcaggcatgcaagc (SEQ ID NO: 22) | |
| oligoRH1212_for | Aagcttgcatgcctgcaggtgacgtcttacgaaaataactc (SEQ ID NO: 23) | EilR-$P_{JExD}$ |
| oligoRH1212_rev | Taaagttaaaagatcttttgaattcaaagttg (SEQ ID NO: 24) | |
| oligoRH1213_for | Caaaagatcttttaactttaagaaggagatatacatg (SEQ ID NO: 25) | I-CeuI |
| oligoRH1213_rev | Ctagtaggtttcctgtgtgaactactttataccttttttataattacgag (SEQ ID NO: 26) | |
| oligoRH1214_for | Tataaagtagttcacacaggaaacctactagatggctgaagcgcaaaatg (SEQ ID NO: 27) | araC |
| oligoRH1214_rev | Tttattattttttatgacaacttgacggc (SEQ ID NO: 28) | |
| oligoRH1215_for | Agttgtcataaaaataataaaaagccggattaataatctg (SEQ ID NO: 29) | BBa_B0024 terminator |
| oligoRH1215_rev | Ttggtttctttcacactggctcaccttc (SEQ ID NO: 30) | |
| oligoRH1216_for | Gccagtgtgaaagaaaccaattgtccatattg (SEQ ID NO: 31) | $P_{araBAD}$ promoter |
| oligoRH1216_rev | Ccttcttaaaatggagaaacagtagagag (SEQ ID NO: 32) | |
| oligoRH1217_for | Gtttctccattttaagaaggagatatacatatggcg (SEQ ID NO: 33) | mrfp1 |
| oligoRH1217_rev | Ataacaatttcacacaggagcctaggatgggcccttaagcaccggtggagtg (SEQ ID NO: 34) | |

TABLE S3

Change in OD over time of SimCell populations used in longevity experiments.

| Day | ilux glycolysis− | ilux glycolysis+ | mCherry glycolysis− | mCherry glycolysis+ |
| --- | --- | --- | --- | --- |
| 1 | −0.281 | −0.178 | 0.035 | 0.056 |
| 3 | −0.114 | −0.082 | 0.079 | 0.102 |
| 5 | −0.078 | 0.027 | −0.153 | −0.093 |
| 10 | −0.046 | 0.064 | 0.122 | 0.116 |
| 14 | 0.029 | *0.092 | 0.035 | 0.061 |
| 21 | — | — | **0.152 | −0.005 |
| 28 | — | — | 0.141 | 0.110 |

Among luminescence readings the highest OD change ever recorded is 0.092 for ilux glycolysis+ on Day 14, which is an estimated increase of $6.46 \times 10^4$ cells in a 200 µL well (FIG. 31B). The average OD for the replicates is 1.76, or about $1.70 \times 10^8$ cells per well (FIG. 31A). This means there was a 3.80% increase in the number of cells, which contributed a negligible 1.50 luminescence units out of a total of 39.5 luminescence units.

Among mCherry readings the highest OD change ever recorded is 0.152 for mCherry glycolysis-on Day 21, which is an estimated increase of $1.33 \times 10^5$ cells in a 200 µL well (FIG. 31B). The average OD for replicates is 1.87, or about $1.81 \times 10^8$ cells per well (FIG. 31A). This means there was a 7.37% increase in the number of cells, which contributed a negligible 550 fluorescence units out of a total of 7470 fluorescence units.

TABLE S3

Chromosomal degradation rates of *E. coli*, *P. putida*, and *R. eutropha*.

| Strain | Genome size (Mbp) | No. of restriction sites | Total degradation time (min) | Degradation rate (bp/sec) |
|---|---|---|---|---|
| *E. coli* I-CeuI+ | 4.6 | 7 | 645 | 200 |
| *P. putida* I-CeuI+ | 6.1 | 6 | 450 | 225 |
| *R. eutropha* I-CeuI+ | 7.4 | 3 | 840 | 147 |

```
SEQUENCES:
I-CeuI (CAA78934.1) amino acid sequence (SEQ ID NO: 35):
MSNFILKPGEKLPQDKLEELKKINDAVKKTKNFSKYLIDLRKLFQIDEVQVTSESK

LFLAGFLEGEASLNISTKKLATSKFGLVVDPEFNVTQHVNGVKVLYLALEVFKTG

RIRHKSGSNATLVLTIDNRQSLEEKVIPFYEQYVVAFSSPEKVKRVANFKALLELF

NNDAHQDLEQLVNKILPIWDQMRKQQGQSNEGFPNLEAAQDFARNYKKGIK

DNA sequence encoding I-CeuI (CAA78934.1) (SEQ ID NO: 36):
ATGTCAAACTTTATACTTAAACCGGGCGAAAAACTACCCCAAGACAAACTAG

AAGAATTAAAAAAAATTAATGATGCTGTTAAAAAAACGAAAAATTTCTCAAA

ATACTTGATTGACTTAAGAAAACTTTTTCAAATTGACGAAGTCCAAGTAACTT

CTGAATCAAAACTCTTTTTAGCTGGTTTTTTAGAAGGTGAAGCTTCTCTAAAT

ATTAGCACTAAAAAGCTCGCTACTTCTAAATTTGGTTTGGTGGTTGATCCTGA

ATTCAATGTGACTCAACATGTCAATGGGGTTAAAGTGCTTTATTTAGCATTAG

AAGTATTTAAAACAGGGCGTATTCGTCATAAAAGTGGTAGTAATGCAACTTTA

GTTTTAACTATTGACAATCGTCAAAGTTTGGAAGAAAAAGTAATTCCTTTTTA

TGAACAATATGTTGTTGCCTTCAGTTCTCCAGAAAAAGTCAAACGTGTAGCTA

ATTTTAAAGCTTTGTTAGAATTATTTAATAATGACGCTCACCAAGATTTAGAA

CAATTGGTAAACAAAATCCTACCAATTTGGGATCAAATGCGTAAACAACAAG

GACAAAGTAACGAAGGCTTTCCTAATTTAGAAGCAGCTCAAGACTTTGCTCGT

AATTATAAAAAAGGTATAAAGTAG pGeneArt-ICeuI sequence (SEQ ID NO: 37) (the I-CeuI sequence
is highlighted in bold and underline):
GCTAATAACAGGCCTGCTGGTAATCGCAGGCCTTTTTATTTGGTGTATTTAGA

AAAATAAACAAATAGGGGTTCCGCGCACATTTCCCCGAAAAGTGCCACCTAA

ATTGTAAGCGTTAATATTTTGTTAAAATTCGCGTTAAATTTTTGTTAAATCAGC

TCATTTTTTAACCAATAGGCCGAAATCGGCAAAATCCCTTATAAATCAAAAGA

ATAGACCGAGATAGGGTTGAGTGGCCGCTACAGGGCGCTCCCATTCGCCATTC

AGGCTGCGCAACTGTTGGGAAGGGCGTTTCGGTGCGGGCCTCTTCGCTATTAC

GCCAGCTGGCGAAAGGGGGATGTGCTGCAAGGCGATTAAGTTGGGTAACGCC

AGGGTTTTCCCAGTCACGACGTTGTAAAACGACGGCCAGTGAGCGCGACGTA

ATACGACTCACTATAGGGCGAATTGTAGGCGGAAGGCCGTCAAGGCCGCATC

ACAGCTAACACCACGTCGTCCCTATCTGCTGCCCTAGGTCTATGAGTGGTTGC
```

-continued

```
TGGATAACTTTACGGGCATGCATAAGGCTCGTAGGCTATATTCAGGGAGACC

ACAACGGTTTCCCTCTACAAATAATTTTGTTTAACTTTGAAATAAGGAGGTAA

TACAAGGTACCGCGGCCGCTGCCTGGCGGCAGTAGCGCGGTGGTCCCACCTG

ACCCCATGCCGAACTCAGAAGTGAAACGCCGTAGCGCCGATGGTAGTGTGGG

GTCTCCCCATGCGAGAGTAGGGAACTGCCAGGCATCAAATAAAACGAAAGGC

TCAGTCGAAAGACTGGGCCTTAGATCTTCGAGTCCCTATCAGTGATAGAGATT

GACATCCCTATCAGTGATAGAGATACTGAGCACATCAGCAGGACGCACTGAC

CGAATTCATTAAAGAGCTCATGGGTGGCTTGATGTTAATTGATTGGTGTGCTT

TAGCATTGGTTGTGTTTATTGGTTTGCCACATGGTGCCTTAGATGCTGCTATTT

CTTTTTCAATGATTTCTTCAGCAAAGAGAATTGCTAGATTAGCAGGAATACTA

TTAATTTACCTGTTGTTAGCAACCGCATTTTTTTAATTTGGTATCAATTACCA

GCATTTTCTCTTCTTATTTTTCTTTTGATAAGCATAATCCATTTTGGAATGGCT

GATTTCAATGCATCCCCAAGTAAACTTAAGTGGCCTCATATTATTGCACATGG

CGGCGTTGTTACTGTTTGGTTGCCGCTTATCCAAAAAAATGAAGTTACGAAGC

TATTTTCAATATTAACAAATGGTCCAACTCCCATTTTATGGGACATACTATTG

ATATTTTTTTATGTTGGAGCATAGGAGTATGTCTTCATACCTATGAAACTTTA

CGTTCTAAACATTATAATATCGCCTTTGAACTTATTGGATTAATTTTTCTAGCC

TGGTATGCACCCCCACTCGTTACTTTTGCCACATACTTCTGCTTTATCCACAGC

AGACGTCACTTTAGTTTTGTTTGGAAACAGTTACAGCATATGAGTTCAAAAAA

AATGATGATAGGTAGTGCCATTATTTTATCTTGTACGAGCTGGTTGATAGGCG

GAGGAATATATTTTTTCCTCAATTCGAAAATGATTGCCAGTGAAGCTGCTTTA

CAAACTGTCTTTATTGGTCTTGCAGCTTTAACAGTTCCTCACATGATACTTATC

GACTTTATATTTAGACCACACTCTTCCAGAATTAAAATCAAAAATAAGGGCGA

GCTTGAAGGTAAGCCTATCCCTAACCCTCTCCTCGGTCTCGATTCTACGCGTA

CCGGTCATCATCACCATCACCATTGACTCGAGAAATATAATGACCCTCTTGAT

AACCCAAGAGGGCATTTTTTAACTAGTCACAGCTAACACCACGTCGTCCCTAT

CTGCTGCCCTAGGTCTATGAGTGGTTGCTGGATAACTTTACGGGCATGCATAA

GGCTCGTAGGCTATATTCAGGGAGACCACAACGGTTTCCCTCTACAAATAATT

TTGTTTAACTTTGAAATAAGGAGGTAATACAAATGTCTCGTTTAGATAAAAGT

AAAGTGATTAACAGCGCATTAGAGCTGCTTAATGAGGTCGGAATCGAAGGTT

TAACAACCCGTAAACTCGCCCAGAAGCTAGGTGTAGAGCAGCCTACATTGTA

TTGGCATGTAAAAAATAAGCGGGCTTTGCTCGACGCCTTAGCCATTGAGATGT

TAGATAGGCACCATACTCACTTTTGCCCTTTAGAAGGGGAAAGCTGGCAAGAT

TTTTTACGTAATAACGCTAAAAGTTTTAGATGTGCTTTACTAAGTCATCGCGA

TGGAGCAAAAGTACATTTAGGTACACGGCCTACAGAAAAACAGTATGAAACT

CTCGAAAATCAATTAGCCTTTTTATGCCAACAAGGTTTTTCACTAGAGAATGC

ATTATATGCACTCAGCGCTGTGGGCATTTTACTTTAGGTTGCGTATTGGAAG

ATCAAGAGCATCAAGTCGCTAAAGAAGAAAGGGAAACACCTACTACTGATAG

TATGCCGCCATTATTACGACAAGCTATCGAATTATTTGATCACCAAGGTGCAG

AGCCAGCCTTCTTATTCGGCCTTGAATTGATCATATGCGGATTAGAAAAACAA
```

-continued

CTTAAATGTGAAAGTGGGTCTTAATGGCCATGCCTGGCGGCAGTAGCGCGGT

GGTCCCACCTGACCCCATGCCGAACTCAGAAGTGAAACGCCGTAGCGCCGAT

GGTAGTGTGGGGTCTCCCCATGCGAGAGTAGGGAACTGCCAGGCATCAAATA

AAACGAAAGGCTCAGTCGAAAGACTGGGCCTTGCTAGCTTATGACAACTTGA

CGGCTACATCATTCACTTTTTCTTCACAACCGGCACGGAACTCGCTCGGGCTG

GCCCCGGTGCATTTTTTAAATACCCGCGAGAAATAGAGTTGATCGTCAAACC

AACATTGCGACCGACGGTGGCGATAGGCATCCGGGTGGTGCTCAAAAGCAGC

TTCGCCTGGCTGATACGTTGGTCCTCGCGCCAGCTTAAGACGCTAATCCCTAA

CTGCTGGCGGAAAAGATGTGACAGACGCGACGGCGACAAGCAAACATGCTGT

GCGACGCTGGCGATATCAAAATTGCTGTCTGCCAGGTGATCGCTGATGTACTG

ACAAGCCTCGCGTACCCGATTATCCATCGGTGGATGGAGCGACTCGTTAATCG

CTTCCATGCGCCGCAGTAACAATTGCTCAAGCAGATTTATCGCCAGCAGCTCC

GAATAGCGCCCTTCCCCTTGCCCGGCGTTAATGATTTGCCCAAACAGGTCGCT

GAAATGCGGCTGGTGCGCTTCATCCGGGCGAAAGAACCCCGTATTGGCAAAT

ATTGACGGCCAGTTAAGCCATTCATGCCAGTAGGCGCGCGGACGAAAGTAAA

CCCACTGGTGATACCATTCGCGAGCCTCCGGATGACGACCGTAGTGATGAATC

TCTCCTGGCGGGAACAGCAAAATATCACCCGGTCGGCAAACAAATTCTCGTCC

CTGATTTTTCACCACCCCCTGACCGCGAATGGTGAGATTGAGAATATAACCTT

TCATTCCCAGCGGTCGGTCGATAAAAAAATCGAGATAACCGTTGGCCTCAATC

GGCGTTAAACCCGCCACCAGATGGGCATTAAACGAGTATCCCGGCAGCAGGG

GATCATTTTGCGCTTCAGCCATACTTTTCATACTCCCGCCATTCAGAGAAGAA

ACCAATTGTCCATATTGCATCAGACATTGCCGTCACTGCGTCTTTTACTGGCTC

TTCTCGCTAACCAAACCGGTAACCCCGCTTATTAAAAGCATTCTGTAACAAAG

CGGGACCAAAGCCATGACAAAAACGCGTAACAAAAGTGTCTATAATCACGGC

AGAAAAGTCCACATTGATTATTTGCACGGCGTCACACTTTGCTATGCCATAGC

ATTTTTATCCATAAGATTAGCGGATCCTACCTGACGCTTTTTATCGCAACTCTC

TACTGTTTCTCCATACCCGTTTTTTTGGGCTAGAAATAATTTTGTTTAACTTTA

AGAAGGAGATATACATACCCAGTACT<u>ATGTCAAACTTTATACTTAAACCGG</u>

<u>GCGAAAAACTACCCCAAGACAAACTAGAAGAATTAAAAAAAATTAATGAT</u>

<u>GCTGTTAAAAAAACGAAAAATTTCTCAAAATACTTGATTGACTTAAGAAA</u>

<u>ACTTTTTCAAATTGACGAAGTCCAAGTAACTTCTGAATCAAAACTCTTTTT</u>

<u>AGCTGGTTTTTTAGAAGGTGAAGCTTCTCTAAATATTAGCACTAAAAAGC</u>

<u>TCGCTACTTCTAAATTTGGTTTGGTGGTTGATCCTGAATTCAATGTGACTC</u>

<u>AACATGTCAATGGGGTTAAAGTGCTTTATTTAGCATTAGAAGTATTTAAA</u>

<u>ACAGGGCGTATTCGTCATAAAAGTGGTAGTAATGCAACTTTAGTTTTAAC</u>

<u>TATTGACAATCGTCAAAGTTTGGAAGAAAAGTAATTCCTTTTTATGAAC</u>

<u>AATATGTTGTTGCCTTCAGTTCTCCAGAAAAAGTCAAACGTGTAGCTAAT</u>

<u>TTTAAAGCTTTGTTAGAATTATTTAATAATGACGCTCACCAAGATTTAGAA</u>

<u>CAATTGGTAAACAAAATCCTACCAATTTGGGATCAAATGCGTAAACAACA</u>

<u>AGGACAAAGTAACGAAGGCTTTCCTAATTTAGAAGCAGCTCAAGACTTTG</u>

<u>CTCGTAATTATAAAAAAGGTATAAAGTAG</u>CTAGACTGGGCCTCATGGGCC

```
TTCCGCCTATCACTGCCCGCTTTCCAGTCGGGAAACCTGTCGTGCCAGCTGCA

TTAACATGGTCATAGCTGTTTCCTTGCGTATTGGGCGCTCTCCGCTTCCTCGCT

CACTGACTCGCTGCGCTCGGTCGTTCGGGTAAAGCCTGGGGTGCCTAAATAAA

ACGAAAGGCCCAGTCTTCCGACTGAGCCTTTCGTTTTATTGAGCAAAAGGCCA

GCAAAAGGCCAGGAACCGTAAAAAGGCCGCGTTGCTGGCGTTTTTCCATAGG

CTCCGCCCCCCTGACGAGCATCACAAAAATCGACGCTCAAGTCAGAGGTGGC

GAAACCCGACAGGACTATAAAGATACCAGGCGTTTCCCCCTGGAAGCTCCCT

CGTGCGCTCTCCTGTTCCGACCCTGCCGCTTACCGGATACCTGTCCGCCTTTCT

CCCTTCGGGAAGCGTGGCGCTTTCTCATAGCTCACGCTGTAGGTATCTCAGTT

CGGTGTAGGTCGTTCGCTCCAAGCTGGGCTGTGTGCACGAACCCCCCGTTCAG

CCCGACCGCTGCGCCTTATCCGGTAACTATCGTCTTGAGTCCAACCCGGTAAG

ACACGACTTATCGCCACTGGCAGCAGCCACTGGTAACAGGATTAGCAGAGCG

AGGTATGTAGGCGGTGCTACAGAGTTCTTGAAGTGGTGGCCTAACTACGGCTA

CACTAGAAGAACAGTATTTGGTATCTGCGCTCTGCTGAAGCCAGTTACCTTCG

GAAAAAGAGTTGGTAGCTCTTGATCCGGCAAACAAACCACCGCTGGTAGCGG

TGGTTTTTTTGTTTGCAAGCAGCAGATTACGCGCAGAAAAAAAGGATCTCAAG

AAGATCCTTTGATCTTTTCTACGGGGTCTGACGCTCAGTGGAACGAAAACTCA

CGTTAAGGGATTTTGGTCATGAGATTATCAAAAAGGATCTTCACCTAGATCCT

TTTAAATTAAAAATGAAGTTTTAAATCAATCTAAAGTATATATGAGTAAACTT

GGTCTGACAGTTACCAATGCTTAATCAGTGAGGCACCTATCTCAGCGATCTGT

CTATTTCGTTCATCCATAGTTGCCTGACTCCCCGTCGTGTAGATAACTACGATA

CGGGAGGGCTTACCATCTGGCCCCAGTGCTGCAATGATACCGCGAGAACCAC

GCTCACCGGCTCCAGATTTATCAGCAATAAACCAGCCAGCCGGAAGGGCCGA

GCGCAGAAGTGGTCCTGCAACTTTATCCGCCTCCATCCAGTCTATTAATTGTT

GCCGGGAAGCTAGAGTAAGTAGTTCGCCAGTTAATAGTTTGCGCAACGTTGTT

GCCATTGCTACAGGCATCGTGGTGTCACGCTCGTCGTTTGGTATGGCTTCATT

CAGCTCCGGTTCCCAACGATCAAGGCGAGTTACATGATCCCCCATGTTGTGCA

AAAAAGCGGTTAGCTCCTTCGGTCCTCCGATCGTTGTCAGAAGTAAGTTGGCC

GCAGTGTTATCACTCATGGTTATGGCAGCACTGCATAATTCTCTTACTGTCAT

GCCATCCGTAAGATGCTTTTCTGTGACTGGTGAGTACTCAACCAAGTCATTCT

GAGAATAGTGTATGCGGCGACCGAGTTGCTCTTGCCCGGCGTCAATACGGGA

TAATACCGCGCCACATAGCAGAACTTTAAAAGTGCTCATCATTGGAAAACGTT

CTTCGGGGCGAAAACTCTCAAGGATCTTACCGCTGTTGAGATCCAGTTCGATG

TAACCCACTCGTGCACCCAACTGATCTTCAGCATCTTTTACTTTCACCAGCGTT

TCTGGGTGAGCAAAAACAGGAAGGCAAAATGCCGCAAAAAAGGGAATAAGG

GCGACACGGAAATGTTGAATACTCATACTCTTCCTTTTTCAATATTATTGAAG

CATTTATCAGGGTTATTGTCTCATGAGCGGATACATATTTGAA
``` pSEVA224-GB3 sequence (SEQ ID NO: 38) (the glycolysis
pathway sequences are highlighted in bold and underline):
TTAATTAATTGACACCATCGAATGGTGCAAAACCTTTCGCGGTATGGCATGAT

AGCGCCCGGAAGAGAGTCAATTCAGGGTGGTGAATGTGAAACCAGTAACGTT

ATACGATGTCGCAGAGTATGCCGGTGTCTCTTATCAGACCGTTTCCCGCGTGG

TGAACCAGGCCAGCCACGTTTCTGCGAAAACGCGGGAAAAAGTGGAAGCGGC

GATGGCGGAGCTGAATTACATTCCCAACCGCGTGGCACAACAACTGGCGGGC

AAACAGTCGTTGCTGATTGGCGTTGCCACCTCCAGTCTGGCCCTGCACGCGCC

GTCGCAAATTGTCGCGGCGATTAAATCTCGCGCCGATCAACTGGGTGCCAGCG

TGGTGGTGTCGATGGTAGAACGAAGCGGCGTCGAAGCCTGTAAAGCGGCGGT

GCACAATCTTCTCGCGCAACGCGTCAGTGGGCTGATCATTAACTATCCGCTGG

ATGACCAGGATGCCATTGCTGTGGAAGCTGCCTGCACTAATGTTCCGGCGTTA

TTTCTTGATGTCTCTGACCAGACACCCATCAACAGTATTATTTTCTCCCATGAA

GACGGTACGCGACTGGGCGTGGAGCATCTGGTCGCATTGGGTCACCAGCAAA

TCGCGCTGTTAGCGGGCCCATTAAGTTCTGTCTCGGCGCGTCTGCGTCTGGCT

GGCTGGCATAAATATCTCACTCGCAATCAAATTCAGCCGATAGCGGAACGGG

AAGGCGACTGGAGTGCCATGTCCGGTTTTCAACAAACCATGCAAATGCTGAA

TGAGGGCATCGTTCCCACTGCGATGCTGGTTGCCAACGATCAGATGGCGCTGG

GCGCAATGCGCGCCATTACCGAGTCCGGGCTGCGCGTTGGTGCGGATATCTCG

GTAGTGGGATACGACGATACCGAAGACAGCTCATGTTATATCCCGCCGTTAAC

CACCATCAAACAGGATTTTCGCCTGCTGGGGCAAACCAGCGTGGACCGCTTGC

TGCAACTCTCTCAGGGCCAGGCGGTGAAGGGCAATCAGCTGTTGCCCGTCTCA

CTGGTGAAAAGAAAAACCACCCTGGCGCCCAATACGCAAACCGCCTCTCCCC

GCGCGTTGGCCGATTCATTAATGCAGCTGGCACGACAGGTTTCCCGACTGGAA

AGCGGGCAGTGAGCGCAACGCAATTAATGTAAGTTAGCGCGAATTGATCTGG

TTTGACAGCTTATCATCGACTGCACGGTGCACCAATGCTTCTGGCGTCAGGCA

GCCATCGGAAGCTGTGGTATGGCTGTGCAGGTCGTAAATCACTGCATAATTCG

TGTCGCTCAAGGCGCACTCCCGTTCTGGATAATGTTTTTTGCGCCGACATCAT

AACGGTTCTGGCAAATATTCTGAAATGAGCTGTTGACAATTAATCATCCGGCT

CGTATAATGTGTGGAATTGTGAGCGGATAACAATTTCACACCCTAGGAGGAG

GAAAAACAT<ins>ATGACAAAGTATGCATTAGTCGGTGATGTGGGCGGCACCAA</ins>

<ins>CGCACGTCTTGCTCTGTGTGATATTGCCAGTGGTGAAATCTCGCAGGCTA</ins>

<ins>AGACCTATTCAGGGCTTGATTACCCCAGCCTCGAAGCGGTCATTCGCGTT</ins>

<ins>TATCTTGAAGAACATAAGGTCGAGGTGAAAGACGGCTGTATTGCCATCGC</ins>

<ins>TTGCCCAATTACCGGTGACTGGGTGGCGATGACCAACCATACCTGGGCGT</ins>

<ins>TCTCAATTGCCGAAATGAAAAAGAATCTCGGTTTTAGCCATCTGGAAATT</ins>

<ins>ATTAACGATTTTACCGCTGTATCGATGGCGATCCCGATGCTGAAAAAAGA</ins>

<ins>GCATCTGATTCAGTTTGGTGGCGCAGAACCGGTCGAAGGTAAGCCTATTG</ins>

<ins>CGGTTTACGGTGCCGGAACGGGGCTTGGGGTTGCGCATCTGGTCCATGT</ins>

<ins>CGATAAGCGTTGGGTTAGCTTGCCAGGCGAAGGCGGTCACGTAGATTTT</ins>

GCGCCGAATAGTGAAGAAGAGGCCATTATCCTCGAAATATTGCGTGCGG

-continued

```
AAATTGGTCATGTTTCGGCGGAGCGCGTGCTTTCTGGCCCTGGGCTGGTG
AATTTGTATCGCGCAATTGTGAAAGCTGACAACCGCCTGCCAGAAAATCT
CAAGCCAAAAGATATTACCGAACGCGCGCTGGCTGACAGCTGCACCGATT
GCCGCCGCGCATTGTCGCTGTTTTGCGTCATTATGGGCCGTTTTGGCGGC
AATCTGGCGCTCAATCTCGGGACATTTGGCGGCGTGTTTATTGCGGGCGG
TATCGTGCCGCGCTTCCTTGAGTTCTTCAAAGCCTCCGGTTTCCGTGCCG
CATTTGAAGATAAAGGGCGCTTTAAAGAATATGTCCATGATATTCCGGTG
TATCTCATCGTCCATGACAATCCGGGCCTTCTCGGTTCCGGTGCACATTT
ACGCCAGACCTTAGGTCACATTCTGTAAGAATTCAGGAGGAAAAACATAT
GAAAAACATCAATCCAACGCAGACCGCTGCCTGGCAGGCACTACAGAAA
CACTTCGATGAAATGAAAGACGTTACGATCGCCGATCTTTTTGCTAAAGA
CGGCGATCGTTTTTCTAAGTTCTCCGCAACCTTCGACGATCAGATGCTGG
TGGATTACTCCAAAAACCGCATCACTGAAGAGACGCTGGCGAAATTACAG
GATCTGGCGAAAGAGTGCGATCTGGCGGGCGCGATTAAGTCGATGTTCT
CTGGCGAGAAGATCAACCGCACTGAAAACCGCGCCGTGCTGCACGTAGC
GCTGCGTAACCGTAGCAATACCCCGATTTTGGTTGATGGCAAAGACGTAA
TGCCGGAAGTCAACGCGGTGCTGGAGAAGATGAAAACCTTCTCAGAAGC
GATTATTTCCGGTGAGTGGAAAGGTTATACCGGCAAAGCAATCACTGACG
TAGTGAACATCGGGATCGGCGGTTCTGACCTCGGCCCATACATGGTGACC
GAAGCTCTGCGTCCGTACAAAAAACCACCTGAACATGCACTTTGTTTCTAA
CGTCGATGGGACTCACATCGCGGAAGTGCTGAAAAAAGTAAACCCGGAA
ACCACGCTGTTCTTGGTAGCATCTAAAACCTTCACCACTCAGGAAACTAT
GACCAACGCCCATAGCGCGCGTGACTGGTTCCTGAAAGCGGCAGGTGAT
GAAAAACACGTTGCAAAACACTTTGCGGCGCTTTCCACCAATGCCAAAGC
CGTTGGCGAGTTTGGTATTGATACTGCCAACATGTTCGAGTTCTGGGACT
GGGTTGGCGGCCGTTACTCTTTGTGGTCAGCGATTGGCCTGTCGATTGTT
CTCTCCATCGGCTTTGATAACTTCGTTGAACTGCTTTCCGGCGCACACGC
GATGGACAAGCATTTCTCCACCACGCCTGCCGAGAAAAACCTGCCTGTAC
TGCTGGCGCTGATTGGCATCTGGTACAACAATTTCTTTGGTGCGGAAACT
GAAGCGATTCTGCCGTATGACCAGTATATGCACCGTTTCGCGGCGTACTT
CCAGCAGGGCAATATGGAGTCCAACGGTAAGTATGTTGACCGTAACGGT
AACGTTGTGGATTACCAGACTGGCCCGATTATCTGGGGTGAACCAGGCAC
TAACGGTCAGCACGCGTTCTACCAGCTGATCCACCAGGGAACCAAAATGG
TGCCGTGCGATTTCATCGCTCCGGCTATCACCCATAACCCGCTCTCTGAT
CATCACCAGAAACTGCTGTCTAACTTCTTCGCCCAGACCGAAGCGCTGGC
GTTTGGTAAATCCCGCGAAGTAGTTGAGCAGGAATATCGTGATCAGGGTA
AAGATCCGGCAACGCTTGACTACGTGGTGCCGTTCAAAGTATTCGAAGGT
AACCGCCCGACCAACTCCATCCTGCTGCGTGAAATCACTCCGTTCAGCCT
GGGTGCGTTGATTGCGCTGTATGAGCACAAAATCTTTACTCAGGGCGTGA
TCCTGAACATCTTCACCTTCGACCAGTGGGGCGTGGAACTGGGTAAACAG
CTGGCGAACCGTATTCTGCCAGAGCTGAAAGATGATAAAGAAATCAGCAG
```

-continued

CCACGATAGCTCGACCAATGGTCTGATTAACCGCTATAAAGCGTGGCGCG

GTTAAGAGCTCAGGAGGAAAAACATATGATTAAGAAAATCGGTGTGTTGA

CAAGCGGCGGTGATGCGCCAGGCATGAACGCCGCAATTCGCGGGGTTGT

TCGTTCTGCGCTGACAGAAGGTCTGGAAGTAATGGGTATTTATGACGGCT

ATCTGGGTCTGTATGAAGACCGTATGGTACAGCTAGACCGTTACAGCGTG

TCTGACATGATCAACCGTGGCGGTACGTTCCTCGGTTCTGCGCGTTTCCC

GGAGTTCCGCGACGAAAACATCCGCGCCGTGGCTATCGAAAACCTGAAA

AAACGTGGTATCGACGCGCTGGTGGTTATCGGCGGTGACGGTTCCTACAT

GGGTGCAATGCGTCTGACCGAAATGGGCTTCCCGTGCATCGGTCTGCCG

GGCACTATCGACAACGACATCAAAGGCACTGACTACACTATCGGTTTCTT

CACTGCGCTGAGCACCGTTGTAGAAGCGATCGACCGTCTGCGTGACACCT

CTTCTTCTCACCAGCGTATTTCCGTGGTGGAAGTGATGGGCCGTTATTGT

GGAGATCTGACGTTGGCTGCGGCCATTGCCGGTGGCTGTGAATTTGTTGT

GGTTCCGGAAGTTGAATTTAGCCGTGAAGACCTGGTAAACGAAATCAAAG

CGGGTATCGCGAAAGGTAAAAAACACGCGATCGTGGCGATTACCGAACA

TATGTGTGATGTTGACGAACTGGCGCATTTCATCGAGAAAGAAACCGGTC

GTGAAACCCGCGCAACTGTGCTGGGCCACATCCAGCGCGGTGGTTCTCC

GGTGCCTTACGACCGTATTCTGGCTTCCCGTATGGGCGCTTACGCTATCG

ATCTGCTGCTGGCAGGTTACGGCGGTCGTTGTGTAGGTATCCAGAACGAA

CAGCTGGTTCACCACGACATCATCGACGCTATCGAAAACATGAAGCGTCC

GTTCAAAGGTGACTGGCTGGACTGCGCGAAAAAACTGTATTAAGGTACCA

GGAGGAAAAACATATGTCTAAGATTTTTGATTTCGTAAAACCTGGCGTAA

TCACTGGTGATGACGTACAGAAAGTTTTCCAGGTAGCAAAAGAAAACAAC

TTCGCACTGCCAGCAGTAAACTGCGTCGGTACTGACTCCATCAACGCCGT

ACTGGAAACCGCTGCTAAAGTTAAAGCGCCGGTTATCGTTCAGTTCTCCA

ACGGTGGTGCTTCCTTTATCGCTGGTAAAGGCGTGAAATCTGACGTTCCG

CAGGGTGCTGCTATCCTGGGCGCGATCTCTGGTGCGCATCACGTTCACCA

GATGGCTGAACATTATGGTGTTCCGGTTATCCTGCACACTGACCACTGCG

CGAAGAAACTGCTGCCGTGGATCGACGGTCTGTTGGACGCGGGTGAAAA

ACACTTCGCAGCTACCGGTAAGCCGCTGTTCTCTTCTCACATGATCGACC

TGTCTGAAGAATCTCTGCAAGAGAACATCGAAATCTGCTCTAAATACCTG

GAGCGCATGTCCAAAATCGGCATGACTCTGGAAATCGAACTGGGTTGCAC

CGGTGGTGAAGAAGACGGCGTGGACAACAGCCACATGGACGCTTCTGCA

CTGTACACCCAGCCGGAAGACGTTGATTACGCATACACCGAACTGAGCAA

AATCAGCCCGCGTTTCACCATCGCAGCGTCCTTCGGTAACGTACACGGTG

TTTACAAGCCGGGTAACGTGGTTCTGACTCCGACCATCCTGCGTGATTCT

CAGGAATATGTTTCCAAGAAACACAACCTGCCGCACAACAGCCTGAACTT

CGTATTCCACGGTGGTTCCGGTTCTACTGCTCAGGAAATCAAAGACTCCG

TAAGCTACGGCGTAGTAAAAATGAACATCGATACCGATACCCAGTGGGCA

ACCTGGGAAGGCGTTCTGAACTACTACAAAGCTAACGAAGCGTATCTGCA

-continued

```
AGGTCAGCTGGGTAACCCGAAAGGCGAAGATCAGCCGAACAAGAAATAC

TACGATCCGCGCGTATGGCTGCGTGCCGGTCAGACTTCGATGATCGCTCG

TCTGGAGAAAGCATTCCAGGAACTGAACGCGATCGACGTTCTGTAACCCG

GGAGGAGGAAAAACATATGCGACATCCTTTAGTGATGGGTAACTGGAAA

CTGAACGGCAGCCGCCACATGGTTCACGAGCTGGTTTCTAACCTGCGTAA

AGAGCTGGCAGGTGTTGCTGGCTGTGCGGTTGCAATCGCACCACCGGAA

ATGTATATCGATATGGCGAAGCGCGAAGCTGAAGGCAGCCACATCATGCT

GGGTGCGCAAAACGTGGACCTGAACCTGTCCGGCGCATTCACCGGTGAA

ACCTCTGCTGCTATGCTGAAAGACATCGGCGCACAGTACATCATCATCGG

TCACTCTGAACGTCGTACTTACCACAAAGAATCTGACGAACTGATCGCGA

AAAAATTCGCGGTGCTGAAAGAGCAGGGCCTGACTCCGGTTCTGTGCATC

GGTGAAACCGAAGCTGAAAATGAAGCGGGCAAAACTGAAGAAGTTTGCG

CACGTCAGATCGACGCGGTACTGAAAACTCAGGGTGCTGCGGCATTCGA

AGGTGCGGTTATCGCTTACGAACCTGTATGGGCAATCGGTACTGGCAAAT

CTGCAACTCCGGCTCAGGCACAGGCTGTTCACAAATTCATCCGTGACCAC

ATCGCTAAAGTTGACGCTAACATCGCTGAACAAGTGATCATTCAGTACGG

CGGCTCTGTAAACGCGTCTAACGCAGCTGAACTGTTTGCTCAGCCGGATA

TCGACGGCGCGCTGGTTGGTGGTGCTTCTCTGAAAGCTGACGCCTTCGCA

GTAATCGTTAAAGCAGCTGAAGCGGCTAAACAGGCTTAAGCTAGGCCGC

GGCCGCGCGAATTCGAGCTCGGTACCCGGGGATCCAGGAGGAAAAACAT

ATGACTATCAAAGTAGGTATCAACGGTTTTGGCCGTATCGGTCGCATTGT

TTTCCGTGCTGCTCAGAAACGTTCTGACATCGAGATCGTTGCAATCAACG

ACCTGTTAGACGCTGATTACATGGCATACATGCTGAAATATGACTCCACT

CACGGTCGTTTCGACGGCACCGTTGAAGTGAAAGACGGTCATCTGATCGT

TAACGGTAAAAAAATCCGTGTTACCGCTGAACGTGATCCGGCTAACCTGA

AATGGGACGAAGTTGGTGTTGACGTTGTCGCTGAAGCAACTGGTCTGTTC

CTGACTGACGAAACTGCTCGTAAACACATCACCGCTGGTGCGAAGAAAGT

GGTTATGACTGGTCCGTCTAAAGACAACACTCCGATGTTCGTTAAAGGCG

CTAACTTCGACAAATATGCTGGCCAGGACATCGTTTCCAACGCTTCCTGC

ACCACCAACTGCCTGGCTCCGCTGGCTAAAGTTATCAACGATAACTTCGG

CATCATCGAAGGTCTGATGACCACCGTTCACGCTACTACCGCTACTCAGA

AAACCGTTGATGGCCCGTCTCACAAAGACTGGCGCGGCGGCCGCGGCGC

TTCCCAGAACATCATCCCGTCCTCTACCGGTGCTGCTAAAGCTGTAGGTA

AAGTACTGCCAGAACTGAATGGCAAACTGACTGGTATGGCGTTCCGCGTT

CCGACCCCGAACGTATCTGTAGTTGACCTGACCGTTCGTCTGGAAAAAGC

TGCAACTTACGAGCAGATCAAAGCTGCCGTTAAAGCTGCTGCTGAAGGCG

AAATGAAAGGCGTTCTGGGCTACACCGAAGATGACGTAGTATCTACCGAT

TTCAACGGCGAAGTTTGCACTTCCGTGTTCGATGCTAAAGCTGGTATCGC

TCTGAACGACAACTTCGTGAAACTGGTATCCTGGTACGACAACGAAACCG

GTTACTCCAACAAAGTTCTGGACCTGATCGCTCACATCTCCAAATAATCT

AGAAGGAGGAAAAACATATGTCTGTAATTAAGATGACCGATCTGGATCTT
```

-continued

GCTGGGAAACGTGTATTCATCCGTGCGGATCTGAACGTACCAGTAAAAGA

CGGGAAAGTAACCAGCGACGCGCGTATCCGTGCTTCTCTGCCGACCATC

GAACTGGCCCTGAAACAAGGCGCAAAAGTGATGGTAACTTCCCACCTGG

GTCGTCCTACCGAAGGCGAATACAACGAAGAGTTCTCTCTGCTGCCGGTT

GTTAACTACCTGAAAGACAAACTGTCTAACCCGGTTCGTCTGGTTAAAGA

TTACCTCGACGGCGTTGACGTTGCTGAAGGTGAACTGGTTGTTCTGGAAA

ACGTTCGCTTCAACAAAGGCGAGAAGAAAGACGACGAAACCCTGTCCAA

AAAATACGCTGCACTGTGTGACGTGTTCGTAATGGACGCATTCGGTACTG

CTCACCGCGCGCAGGCTTCTACTCACGGTATCGGTAAATTCGCTGACGTT

GCGTGCGCAGGCCCGCTGCTGGCAGCTGAACTGGACGCGCTGGGTAAAG

CACTGAAAGAACCTGCTCGCCCGATGGTGGCTATCGTTGGTGGTTCTAAA

GTATCTACCAAACTGACCGTTCTGGACTCCCTGTCTAAAATCGCTGACCA

GCTGATTGTTGGTGGTGGTATCGCTAACACCTTTATCGCGGCACAAGGCC

ACGATGTGGGTAAATCCCTGTACGAAGCTGACCTGGTTGACGAAGCTAAA

CGTCTGCTGACCACCTGCAACATCCCGGTTCCGTCTGATGTTCGCGTAGC

AACCGAGTTCTCTGAAACTGCACCGGCTACCCTGAAATCTGTTAACGATG

TGAAAGCTGACGAGCAGATCCTGGATATCGGTGATGCTTCCGCTCAGGAA

CTGGCTGAAATCCTGAAGAATGCGAAAACCATTCTGTGGAACGGTCCGGT

TGGCGTGTTCGAATTTCCGAACTTCCGCAAAGGTACTGAAATCGTGGCTA

ACGCTATCGCAGACAGCGAAGCGTTCTCCATCGCTGGCGGCGGCGACAC

TCTGGCAGCAATCGACCTGTTCGGCATTGCTGACAAAATCTCCTACATCT

CCACTGGCGGCGGCGCATTCCTCGAGTTCGTGGAAGGTAAAGTACTGCC

TGCGGTAGCAATGCTCGAAGAACGCGCTAAGAAGTAAGTCGACAGGAGG

AAAAACATATGGCTGTAACTAAGCTGGTTCTGGTTCGTCATGGCGAAAGT

CAGTGGAACAAAGAAAACCGTTTCACCGGTTGGTACGACGTGGATCTGTC

TGAGAAAGGCGTAAGCGAAGCAAAAGCAGCAGGTAAGCTGCTGAAAGAG

GAAGGTTACAGCTTTGACTTTGCTTACACTTCTGTGCTGAAACGCGCTAT

CCATACCCTGTGGAATGTGCTGGACGAACTGGATCAGGCATGGCTGCCC

GTTGAGAAATCCTGGAAACTGAACGAACGTCACTACGGTGCGTTGCAGG

GTCTGAACAAAGCGGAAACTGCTGAAAAGTATGGCGACGAGCAGGTGAA

ACAGTGGCGTCGTGGTTTTGCAGTGACTCCGCCGGAACTGACTAAAGATG

ATGAGCGTTATCCGGGTCACGATCCGCGTTACGCGAAACTGAGCGAGAA

AGAACTGCCGCTGACGGAAAGCCTGGCGCTGACCATTGACCGCGTGATC

CCTTACTGGAATGAAACTATTCTGCCGCGTATGAAGAGCGGTGAGCGCGT

GATCATCGCTGCACACGGTAACTCTTTACGTGCGCTGGTGAAATATCTTG

ATAACATGAGCGAAGAAGAGATTCTTGAGCTTAATATCCCGACTGGCGTG

CCGCTGGTGTATGAGTTCGACGAGAATTTCAAACCGCTGAAACGCTATTA

TCTGGGTAATGCTGACGAGATCGCAGCGAAAGCAGCGGCGGTTGCAAAC

CAGGGTAAAGCGAAGTAACTGCAGAGGAGGAAAAACATATGTCCAAAAT

CGTAAAAATCATCGGTCGTGAAATCATCGACTCCCGTGGTAACCCGACTG

-continued

```
TTGAAGCCGAAGTACATCTGGAAGGTGGTTTCGTCGGTATGGCAGCTGCT
CCGTCAGGTGCTTCTACTGGTTCCCGTGAAGCTCTGGAACTGCGCGATGG
CGACAAATCCCGTTTCCTGGGTAAAGGCGTAACCAAAGCTGTTGCTGCGG
TAAACGGCCCGATCGCTCAGGCGCTGATTGGCAAAGATGCTAAAGATCA
GGCTGGCATTGACAAGATCATGATCGACCTGGACGGCACCGAAAACAAA
TCCAAATTCGGCGCGAACGCAATCCTGGCTGTATCTCTGGCTAACGCCAA
AGCTGCTGCTGCTGCAAAAGGTATGCCGCTGTACGAGCACATCGCTGAAC
TGAACGGTACTCCGGGCAAATACTCTATGCCGGTTCCGATGATGAACATC
ATCAACGGTGGTGAGCACGCTGACAACAACGTTGATATCCAGGAATTTAT
GATTCAGCCGGTTGGCGCGAAAACTGTGAAAGAAGCCATCCGCATGGGT
TCTGAAGTTTTCCATCACCTGGCAAAAGTTCTGAAAGCGAAAGGCATGAA
CACTGCTGTTGGTGACGAAGGTGGCTATGCGCCGAACCTGGGTTCCAAC
GCTGAAGCTCTGGCTGTTATCGCTGAAGCTGTTAAAGCTGCTGGTTATGA
ACTGGGCAAAGACATCACTTTGGCGATGGACTGCGCAGCTTCTGAGTTCT
ACAAAGATGGTAAATACGTTCTGGCTGGCGAAGGCAACAAAGCGTTCACC
TCTGAAGAGTTCACTCACTTCCTGGAAGAACTGACCAAACAGTACCCGAT
CGTTTCTATCGAAGACGGTCTGGACGAATCTGACTGGGACGGTTTCGCAT
ACCAGACCAAAGTTCTGGGCGACAAAATCCAGCTGGTTGGTGACGACCT
GTTCGTAACCAACACCAAGATCCTGAAAGAAGGTATCGAAAAAGGTATCG
CTAACTCCATCCTGATCAAATTCAACCAGATCGGTTCTCTGACCGAAACT
CTGGCTGCAATCAAGATGGCGAAAGATGCAGGCTACACTGCTGTTATCTC
TCACCGTTCTGGCGAAACTGAAGACGCTACCATCGCAGACCTGGCTGTTG
GTACTGCTGCTGGCCAGATCAAAACTGGTTCTATGAGCCGTTCTGACCGT
GTTGCTAAATACAACCAGCTGATTCGTATCGAAGAAGCTCTGGGCGAAAA
AGCACCGTACAACGGTCGTAAAGAAATCAAAGGCCAGGCATAAGCATGC
AGGAGGAAAAACATATGAAAAAGACCAAAATTGTTTGCACCATCGGACCG
AAAACCGAATCTGAAGAGATGTTAGCTAAAATGCTGGACGCTGGCATGAA
CGTTATGCGTCTGAACTTCTCTCATGGTGACTATGCAGAACACGGTCAGC
GCATTCAGAATCTGCGCAACGTGATGAGCAAAACTGGTAAAACCGCCGCT
ATCCTGCTTGATACCAAAGGTCCGGAAATCCGCACCATGAAACTGGAAGG
CGGTAACGACGTTTCTCTGAAAGCTGGTCAGACCTTTACTTTCACCACTG
ATAAATCTGTTATCGGCAACAGCGAAATGGTTGCGGTAACGTATGAAGGT
TTCACTACTGACCTGTCTGTTGGCAACACCGTACTGGTTGACGATGGTCT
GATCGGTATGGAAGTTACCGCCATTGAAGGTAACAAAGTTATCTGTAAAG
TGCTGAACAACGGTGACCTGGGCGAAAACAAAGGTGTGAACCTGCCTGG
CGTTTCCATTGCTCTGCCAGCACTGGCTGAAAAAGACAAACAGGACCTGA
TCTTTGGTTGCGAACAGGGCGTAGACTTTGTTGCTGCTTCCTTTATTCGT
AAGCGTTCTGACGTTATCGAAATCCGTGAGCACCTGAAAGCGCACGGCG
GCGAAAACATCCACATCATCTCCAAAATCGAAAACCAGGAAGGCCTCAAC
AACTTCGACGAAATCCTCGAAGCCTCTGACGGCATCATGGTTGCGCGTGG
CGACCTGGGTGTAGAAATCCCGGTAGAAGAAGTTATCTTCGCCCAGAAGA
```

-continued

TGATGATCGAAAAATGTATCCGTGCACGTAAAGTCGTTATCACTGCGACC

CAGATGCTGGATTCCATGATCAAAAACCCACGCCCGACTCGCGCAGAAGC

CGGTGACGTTGCAAACGCCATCCTCGACGGTACTGACGCAGTGATGCTGT

CTGGTGAATCCGCAAAAGGTAAATACCCGCTGGAAGCGGTTTCTATCATG

GCGACCATCTGCGAACGTACCGACCGCGTGATGAACAGCCGTCTCGAGT

TCAACAATGACAACCGTAAACTGCGCATTACCGAAGCGGTATGCCGTGGT

GCCGTTGAAACTGCTGAAAAACTGGATGCTCCGCTGATCGTGGTTGCTAC

TCAGGGCGGTAAATCTGCTCGCGCAGTACGTAAATACTTCCCGGATGCCA

CCATCCTGGCACTGACCACCAACGAAAAAACGGCTCATCAGTTGGTACTG

AGCAAAGGCGTTGTGCCGCAGCTTGTTAAAGAGATCACTTCTACTGATGA

TTTCTACCGTCTGGGTAAAGAACTGGCTCTGCAAAGCGGTCTGGCACACA

AAGGTGACGTTGTAGTTATGGTTTCTGGTGCACTGGTTCCGAGCGGCACT

ACTAACACCGCATCTGTACACGTCCTGTAAAAGCTTGCGGCCGCGTCGTG

ACTGGGAAAACCCTGGCGACTAGTCTTGGACTCCTGTTGATAGATCCAGT

AATGACCTCAGAACTCCATCTGGATTTGTTCAGAACGCTCGGTTGCCGCC

GGGCGTTTTTTATTGGTGAGAATCCAGGGGTCCCCAATAATTACGATTTA

AATTTGTGTCTCAAAATCTCTGATGTTACATTGCACAAGATAAAAATATAT

CATCATGAACAATAAAACTGTCTGCTTACATAAACAGTAATACAAGGGGT

GTTATGAGCCATATTCAGCGTGAAACGAGCTGTAGCCGTCCGCGTCTGAA

CAGCAACATGGATGCGGATCTGTATGGCTATAAATGGGCGCGTGATAAC

GTGGGTCAGAGCGGCGCGACCATTTATCGTCTGTATGGCAAACCGGATG

CGCCGGAACTGTTTCTGAAACATGGCAAAGGCAGCGTGGCGAACGATGT

GACCGATGAAATGGTGCGTCTGAACTGGCTGACCGAATTTATGCCGCTGC

CGACCATTAAACATTTTATTCGCACCCCGGATGATGCGTGGCTGCTGACC

ACCGCGATTCCGGGCAAAACCGCGTTTCAGGTGCTGGAAGAATATCCGG

ATAGCGGCGAAAACATTGTGGATGCGCTGGCCGTGTTTCTGCGTCGTCTG

CATAGCATTCCGGTGTGCAACTGCCCGTTTAACAGCGATCGTGTGTTTCG

TCTGGCCCAGGCGCAGAGCCGTATGAACAACGGCCTGGTGGATGCGAGC

GATTTTGATGATGAACGTAACGGCTGGCCGGTGGAACAGGTGTGGAAAG

AAATGCATAAACTGCTGCCGTTTAGCCCGGATAGCGTGGTGACCCACGGC

GATTTTAGCCTGGATAACCTGATTTTCGATGAAGGCAAACTGATTGGCTG

CATTGATGTGGGCCGTGTGGGCATTGCGGATCGTTATCAGGATCTGGCCA

TTCTGTGGAACTGCCTGGGCGAATTTAGCCCGAGCCTGCAAAAACGTCTG

TTTCAGAAATATGGCATTGATAATCCGGATATGAACAAACTGCAATTTCA

TCTGATGCTGGATGAATTTTTCTAATAATTAATTGGACCGCGGTCCGCGC

GTTGTCCTTTTCCGCTGCATAACCCTGCTTCGGGGTCATTATAGCGATTT

TTTCGGTATATCCATCCTTTTTCGCACGATATACAGGATTTTGCCAAAGG

GTTCGTGTAGACTTTCCTTGGTGTATCCAACGGCGTCAGCCGGGCAGGAT

AGGTGAAGTAGGCCCACCCGCGAGCGGGTGTTCCTTCTTCACTGTCCCTT

ATTCGCACCTGGCGGTGCTCAACGGGAATCCTGCTCTGCGAGGCTGGCC

```
GTAGGCCGGCCGCGATGCAGGTGGCTGCTGAACCCCCAGCCGGAACTGA

CCCCACAAGGCCCTAGCGTTTGCAATGCACCAGGTCATCATTGACCCAGG

CGTGTTCCACCAGGCCGCTGCCTCGCAACTCTTCGCAGGCTTCGCCGACC

TGCTCGCGCCACTTCTTCACGCGGGTGGAATCCGATCCGCACATGAGGC

GGAAGGTTTCCAGCTTGAGCGGGTACGGCTCCCGGTGCGAGCTGAAATA

GTCGAACATCCGTCGGGCCGTCGGCGACAGCTTGCGGTACTTCTCCCATA

TGAATTTCGTGTAGTGGTCGCCAGCAAACAGCACGACGATTTCCTCGTCG

ATCAGGACCTGGCAACGGGACGTTTTCTTGCCACGGTCCAGGACGCGGA

AGCGGTGCAGCAGCGACACCGATTCCAGGTGCCCAACGCGGTCGGACGT

GAAGCCCATCGCCGTCGCCTGTAGGCGCGACAGGCATTCCTCGGCCTTC

GTGTAATACCGGCCATTGATCGACCAGCCCAGGTCCTGGCAAAGCTCGTA

GAACGTGAAGGTGATCGGCTCGCCGATAGGGGTGCGCTTCGCGTACTCC

AACACCTGCTGCCACACCAGTTCGTCATCGTCGGCCCGCAGCTCGACGCC

GGTGTAGGTGATCTTCACGTCCTTGTTGACGTGGAAAATGACCTTGTTTT

GCAGCGCCTCGCGCGGGATTTTCTTGTTGCGCGTGGTGAACAGGGCAGA

GCGGGCCGTGTCGTTTGGCATCGCTCGCATCGTGTCCGGCCACGGCGCA

ATATCGAACAAGGAAAGCTGCATTTCCTTGATCTGCTGCTTCGTGTGTTT

CAGCAACGCGGCCTGCTTGGCTTCGCTGACCTGTTTTGCCAGGTCCTCGC

CGGCGGTTTTTCGCTTCTTGGTCGTCATAGTTCCTCGCGTGTCGATGGTC

ATCGACTTCGCCAAACCTGCCGCCTCCTGTTCGAGACGACGCGAACGCTC

CACGGCGGCCGATGGCGCGGGCAGGGCAGGGGGAGCCAGTTGCACGCT

GTCGCGCTCGATCTTGGCCGTAGCTTGCTGGACTATCGAGCCGACGGACT

GGAAGGTTTCGCGGGGCGCACGCATGACGGTGCGGCTTGCGATGGTTTC

GGCATCCTCGGCGGAAAACCCCGCGTCGATCAGTTCTTGCCTGTATGCCT

TCCGGTCAAACGTCCGATTCATTCACCCTCCTTGCGGGATTGCCCCGGAA

TTAATTCCCCGGATCGATCCGTCGATCTTGATCCCCTGCGCCATCAGATC

CTTGGCGGCAAGAAAGCCATCCAGTTTACTTTGCAGGGCTTCCCAACCTT

ACCAGAGGGCGCCCCAGCTGGCAATTCCGGTTCGCTTGCTGTCCATAAAA

CCGCCCAGTCTAGCTATCGCCATGTAAGCCCACTGCAAGCTACCTGCTTT

CTCTTTGCGCTTGCGTTTTCCCTTGTCCAGATAGCCCAGTAGCTGACATT

CATCCGGGGTCAGCACCGTTTCTGCGGACTGGCTTTCTACGTGGCTGCCA

TTTTTGGGGTGAGGCCGTTCGCGGCCGAGGGGCGCAGCCCTGGGGGA

TGGGAGGCCCGCGTTAGCGGGCCGGGAGGGTTCGAGAAGGGGGGCAC

CCCCCTTCGGCGTGCGCGGTCACGCGCACAGGGCGCAGCCCTGGTTAAA

AACAAGGTTTATAAATATTGGTTTAAAAGCAGGTTAAAAGACAGGTTAGC

GGTGGCCGAAAAACGGGCGGAAACCCTTGCAAATGCTGGATTTTCTGCCT

GTGGACAGCCCCTCAAATGTCAATAGGTGCGCCCCTCATCTGTCAGCACT

CTGCCCCTCAAGTGTCAAGGATCGCGCCCCTCATCTGTCAGTAGTCGCGC

CCCTCAAGTGTCAATACCGCAGGGCACTTATCCCCAGGCTTGTCCACATC

ATCTGTGGGAAACTCGCGTAAAATCAGGCGTTTTCGCCGATTTGCGAGGC

TGGCCAGCTCCACGTCGCCGGCCGAAATCGAGCCTGCCCCTCATCTGTCA
```

```
ACGCCGCGCCGGGTGAGTCGGCCCCTCAAGTGTCAACGTCCGCCCCTCA

TCTGTCAGTGAGGGCCAAGTTTTCCGCGAGGTATCCACAACGCCGGCGG

CCCTACATGGCTCTGCTGTAGTGAGTGGGTTGCGCTCCGGCAGCGGTCCT

GATCCCCCGCAGAAAAAAAGGATCTCAAGAAGATCCTTTGATCTTTTCTA

CGGCGCGCCCAGCTGTCTAGGGCGGCGGATTTGTCCTACTCAGGAGAGC

GTTCACCGACAAACAACAGATAAAACGAAAGGCCCAGTCTTTCGACTGAG

CCTTTCGTTTTATTTGATGCCT
```

EXAMPLE 2—REPROGRAMMING SYNTHETIC BIOLOGY CHASSES FOR TARGETED CANCER THERAPY

Summary

The growing understanding of microbiology, immunology and cancer biology has prompted the application of living bacteria for cancer treatment. Exploiting ideas from synthetic biology, bacterial cancer therapy now promises unique solutions such as tumour targeting and controlled drug release. However, the bench-to-bedside translation of engineered bacteria is often impeded by genetic instability and potential spread of living therapeutics inside the patient. Here we describe the re-programming of two synthetic biology chasses, minicells and SimCells, for targeted cancer therapy. We engineer a surface display nanobody system to detect carcinoembryonic antigen, an important biomarker found commonly in colorectal cancer cells. We show that a chassis transformed with this system can achieve cancer cell specific binding in vitro. Without the addition of active cancer-killing circuit, these cancer-targeting minicells and SimCells can induce cancer cell death in vitro by compromising the plasma membrane of cancer cell. This work highlights the potential of minicells and SimCells as targeted cancer therapeutics and lays the foundation for synthetic biological therapy for other diseases.

Introduction

With the growth of synthetic biology in biotechnology, scientists can now engineer bacteria that have attenuated virulence[5], high tumour specificity[6], strict control of drug expression coupled with precise delivery (reviewed in 7) to unleash the full potential of bacterial therapy in cancer treatment. A more recent example includes the development of a probiotic strain, Escherichia coli Nissle 1917 (EcN) to produce cyclic di-nucleotides, a STimulator of INterferon Genes (STING) agonist, intratumorally to activate the antigen-presenting cells to produce type I interferons for subsequent antitumour immune response.[8] Such products may also be a product for expression of the chromosome-free bacterial cell described herein.

Thus far, most of the bacteria-based strategies rely on the intrinsic ability of bacteria to colonise and proliferate at the tumour microenvironment, especially within the hypoxic and necrotic tumour core.[8-10] However, previous clinical trials showed that the prominent tumour colonisation effect observed in a mouse model does not always translate to another host, such as human and canine.[11,12] To enhance tumour targeting, specific motifs such as affibody and ligand are engineered onto the bacterial outer membrane to achieve cell-specific delivery.[13,14] Yet, not all cancer cell specific markers have a naturally available ligand that can be readily folded and expressed onto the bacterial surface. In addition, each bacterial cell division carries the risk of gene mutation which could default the targeted delivery and drug expression system through loss-of-function mutation.[15]

We aim to overcome these challenges using an engineering approach: we adopted a modular surface display system reported previously to express a cancer-cell targeting nanobody on the outer membrane of our engineered Escherichia coli BL21 (DE3).[16] Specificity of this system can be modulated by raising the nanobody against a marker of interest through an immune library.[17] In this study, we used carcinoembryonic antigen (CEA), one of the most thoroughly studied tumour biomarkers in the cancer diagnostic and monitoring history, as our marker of interest.[18] We engineered a strain of E. coli that binds CEA in a clinical diagnostic setting which is then translated into in vitro specific binding of Caco2, a high CEA expressing colorectal cancer (CRC) cell line.[19] Next, we re-programmed two genome-free, non-replicating and metabolically active synthetic biology chasses, minicells[20] and SimCells[21], using the CEA-binding machinery to construct a cell specific cancer therapeutic (FIG. A1). We evaluated the property of both engineered chasses as a stand-alone cancer therapeutic in vitro without any additional synthetic circuit. Importantly, both chasses show their therapeutic potential without the inherent risk of genetic mutation which makes them safe and suitable for further animal testing.

Results

A Biological Agglutination Test Confirms the Binding of Engineered E. coli to CEA Surface displays of recombinant protein using bacterial outer membrane protein[22], lipoprotein[23], autotransporter protein[24] and ice nucleation protein[25] have successfully led to the development of multiple biotechnological applications. Nevertheless, the binding of E. coli to a target surface will require a surface display system that has high expression efficiency and precise protein folding without compromising cell viability. In this study, we adopted a previously reported system using β-intimin domain as the anchor which has shown to have high compatibility and great targeting ability.[16,26-28]

We first designed two surface display systems: (i) pNV_2 with low expression profile and (ii) pNV_3 with high expression profile (FIG. 36A) to accommodate our anti-CEA nanobody candidates, C17[ref 29] and C43[ref 30]. For control, we used an anti-spike protein nanobody, CYT[ref 31], which targets the receptor binding domain of the SARS-CoV-2 virus. Surface display of the nanobodies was confirmed by flow cytometry using a primary anti-Myc antibody and a secondary Alexa Fluor 488 conjugated antibody (FIG. 36B).

To investigate the binding ability of the nanobodies, we employed a biological agglutination test which resembles the clinically used latex agglutination test.[27,28] Briefly, in the presence of target analyte, surface-displayed nanobodies will cross-link with the target molecules resulting in agglutination through a bacteria-target-bacteria sandwich interaction. Visually, bacterial agglutination will create a cloudy or clear suspension while lack of binding will result in the formation of cell pellets when tested in a round-bottom 96-well plate. We set up the biological agglutination test following a standard diagnostic hemagglutination assay: a series of concentrations of human CEA protein ranging from 1 nM to 200 nM were added to a fixed amount of bacterial cells carrying the pNV plasmids in a round-bottom 96-well plate. For ease of visualisation, super folder green fluorescence protein (sfGFP) was cloned downstream to the nanobody in all pNV plasmids. After overnight incubation, cell agglutination was observed in cultures carrying pNVC17 and pNVC43 within the range of 5 to 200 nM of CEA while none of the controls achieved agglutination (FIG. 36C). This result demonstrates the binding capacity of engineered E. coli surface-displaying C17 and C43 nanobody towards human CEA protein. Consistent with the previously reported model, modifying the surface expression level of nanobody will shift the equivalence zone of the assay which results in different diagnostic sensitivity.[27,28] For all in vitro (and in vivo) cancer cell culture experiments, pNV_3 system was chosen (named pNV_sfGFP from here onwards) to increase the probability of binding.

Engineered E. Coli Specifically Binds to CEA-Expressing Colorectal Cancer Cells In Vitro.

We tested the in vitro binding efficacy of engineered E. coli to two colorectal cancer cell lines with different CEA expression strengths: (i) Caco2 with high CEA expression level and (ii) SW480 with low CEA expression level.[19]

For proof-of-concept experiments, a monolayer of both cancer cell lines was incubated with engineered E. coli up to 8 hours (FIGS. 37A-37B). All wells were washed thrice with fresh media to reduce non-specific binding prior to microscopic imaging. Adhesion of E. coli pNVC17_sfGFP and pNVC43_sfGFP to the high CEA-expressing colorectal cancer cell line, Caco2 were observed throughout the incubation period. More importantly, the control strains expressing a non-targeting nanobody (pNVCYT_sfGFP) or without a nanobody (proD_sfGFP) will not bind Caco2 even with a prolonged incubation of up to 8 hours. Similarly, specific binding did not occur between the low CEA expressing cell line SW480 and any of the engineered E. coli strains, which demonstrates that the adhesive specificity of engineered E. coli to targeted cancer cells is solely contributed by the surface displayed nanobody.

Purification and Engineering of Minicells to Target Colorectal Cancer Cells

Along with minC and minE proteins, minD plays a crucial role in bacterial cell division by confining the division septum at mid-cell region.[32] A common strategy to generate a chromosome-deficient minicells is to knock out the minD gene to create an aberrant cell division, in which minicells can then be purified through sequential centrifugation.[33] To generate minicells, we first deleted the minD gene of E. coli using the lambda Red recombineering system.[34] The successful mutant was confirmed via colony PCR (FIG. 38A). We then transformed the ΔminD strain with pNVC17_sfGFP for surface nanobody expression. Once the culture reached their late log phase ($OD_{600}$=0.6), we removed the parental cells by centrifuging at 2,000 g followed by the addition of 100 μg/mL of ceftriaxone[35], cefotaxime[36] and penicillin G[37] in which all antibiotics exert their bactericidal action through the inhibition of peptidoglycan cell wall synthesis to improve the yield of minicells. FIG. 38A shows the engineered minicells culture pre- and post-purification. Overnight $OD_{600}$ reading and agar plate incubation showed no further growth of purified minicells.

To investigate the binding efficacy of engineered minicells, we repeated the in vitro cancer cells experiment previously with minicells. As shown in FIG. 38B, specific binding can only be achieved between the high-CEA expressing cell line, Caco2 and minicells engineered with pNVC17_sfGFP. No adhesion was found on the low-CEA expressing cell line, SW480 or minicells transformed with unspecific nanobody pNVCYT_sfGFP. These results demonstrate that minicells do not have possess cancer binding ability and will only accomplish targeted adhesion through the surface displayed nanobody.

Generation and Re-Programming of Sim Cells to Target Cancer Cells

We recently reported the production and characterisation of an ICeuI endonuclease-induced, genome-less SimCell as a programmable synthetic biology chassis.[21] The generation of SimCells is based upon the recognition of ICeuI endonuclease on a defined 26-bp sequence ubiquitously found in most bacterial genomes that leads to a RecBCD-initiated double strand break.[38] To further improve the efficiency of SimCell conversion, we constructed a pRH12x plasmid which puts ICeuI under a tightly controlled repressor system, EilR[39], inducible by crystal violet. Compared to the previously reported TetR monitored pJKR-L-TetR system[21], our pRH12x system showed no visible basal expression and upon the induction of 1 μM crystal violet, a complete halt of growth can be achieved within 90 minutes, indicating high magnitude of ICeuI expression for SimCell generation.

To program SimCells for cancer cell targeting, we co-transformed E. coli with pNV43_sfGFP and pRH12x plasmids. Once the culture reached their early log phase ($OD_{600}$=0.3), we induced ICeuI expression to generate genome-less SimCells using 1 μM crystal violet. Simultaneously, we added cefotaxime and penicillin G to eliminate the actively replicating parental cells, yielding a high purity non-dividing SimCells culture. Overnight agar plate and $OD_{600}$ reading showed the lack of growth of SimCells compared to their uninduced counterpart. This result also shows the ICeuI endonuclease is tightly monitored and will not affect cellular activity without the addition of crystal violet.

We then assessed the binding capacity of programmed SimCells to targeted cancer cells. Adhesion of high CEA expressing Caco2 was achieved by both SimCells and uninduced E. coli (pRH12x without the induction of crystal violet) carrying the pNVC43_sfGFP plasmid within 2 hours of incubation. For controls, no binding occurs on the low CEA expressing SW480. Similarly, SimCells and uninduced E. coli carrying the pNVCYT_sfGFP plasmid did not bind to any of the colorectal cancer cells, which shows the specificity of re-programmed SimCells to targeted cancer cell line.

Discussion

An important lesson from past clinical trials using living bacteria for cancer treatment is that their intrinsic ability to colonise the tumour microenvironment does not always translate from model organisms to human (reviewed in[40]). This gives rise to another important question: in the cases where tumour regression was observed, is the colonisation and proliferation of bacteria at the tumour microenvironment accountable for the therapeutic effect, or is it a mere bacteria-incited cytokine storm? To realise the potential of bacterial cancer therapy, the ability of an engineered cancer cell to target cancer cells with high specificity is a prerequisite. In addition, one of the biggest hurdles to translate living therapeutics for clinical use is the regulatory considerations in deploying replication-competent bacteria in patients.[40] In this study, we addressed both concerns by engineering the non-replicating synthetic biology chasses, minicells and SimCells, to develop a targeted cancer therapeutic.

We first described a CEA diagnostic system using engineered E. coli surface-displaying anti-CEA nanobodies in a biological agglutination test setting. In contrast to a conventional bacterial biosensing system which requires active production of signal protein such as GFP or Lux protein, this simple platform allows the detection of cancer biomarker through the physical binding between engineered bacteria and target analyte. Further modulation on the sensitivity of the test is possible through the tuning of expression strength of anti-CEA nanobody on the bacterial surface. Previous reports also showed the usability of the biological agglutination test on more complex samples such as urine and blood.[27,28] Ideally, the CEA diagnostic system should be built to reach a sensitivity of 2.2 ng/ml (~12 pM) to have clinical significance.[41]

We showed the modularity of the pNV system in conferring cell binding specificity to engineered bacteria. With simple molecular cloning steps, we could modify the nanobody sequence to expand the cell binding repertoire. As shown in the in vitro cancer cell binding experiment, anti-CEA nanobodies C17 and C43 can be used interchangeably without affecting the binding capacity of engineered bacteria. To further enhance binding strength or to identify new target of interest, we could adopt a phage surface display library or induce an immune response in llama to generate new nanobody variants.[42,43]

Recent advances in synthetic biology have promised controllable, tumour specific and user-defined therapeutic payloads for bacterial cancer therapy (reviewed in [3,4,7,40,44]). While the collection of synthetic biology circuits (such as quorum lysis[45] and genetic kill switches[46]) for in vivo therapeutic applications continues to grow, the genetic stability and spreading of living therapeutics within a patient remain one of the biggest concerns to the regulatory bodies.[44,47] With minicells and SimCells, we remove the growth aspect of the living bacteria and thereby the inherent risk of gene mutation that comes with every doubling cycle. We showed the capability of both minicells and SimCells as stand-alone anti-cancer agents through in vitro experiments and their in vivo efficacy can be potentially enhanced through rationally designing and combining user-defined therapeutic payloads to achieve tumour clearance. As the binding and cancer killing mechanism can be delivered through independent genetic circuits, these chasses can be further customised and expanded to target other diseases. The modularity, scalability and reliability of these chasses can accentuate the impact of synthetic biology in the medical field, and we envision the deployment of minicells and SimCells to unlock this new class of bacterial therapeutics.

Methods

Bacterial Strains, Plasmids, Primers and Routine Cell Growth Conditions

A list of bacterial strains and plasmids used in this study is listed in Table AS1. In general, Escherichia coli DH5α was used for routine cloning and plasmid maintenance while E. coli BL21 (DE3) was used for the rest of the study unless stated otherwise. Primers and gene blocks used in this study are listed in Table AS2. All primers and gene blocks were ordered from Sigma Aldrich. Parts and backbones were amplified using Q5 High Fidelity DNA Polymerase (New England Biolabs, NEB) and plasmids were constructed using NEBuilder Hifi DNA Assembly (NEB).

For all routine bacterial cell growth and strain selection, bacteria were grown in Luria-Bertani (LB) media (with agitation, 250 rpm) or plated on LB agar (static) with corresponding antibiotics: kanamycin (Kan, 50 µg/mL), carbenicillin (Carb, 100 µg/mL) or chloramphenicol (Cm, 25 µg/mL) and incubated at 37° C., for 16 hours. All strains were transformed via heat-shock unless stated otherwise. Chemically competent cells and transformation were conducted according to methods described previously.[48,49] For strains containing double plasmid, transformation was done sequentially by first making the single-plasmid strain chemically competent again.

Cancer Cell Lines and Routine Cell Growth Conditions

Human colorectal cancer cell lines Caco2 and SW480 were kindly gifted by Professor Adrian Harris from the Department of Oncology, University of Oxford. Both cell lines were routinely grown as a monolayer in Dulbecco's modified Eagle's medium (DMEM, high glucose, pyruvate) supplemented with 10% fetal bovine serum (FBS) and Penicillin Streptomycin solution (100 U/mL) at 37° C. with 5% $CO_2$. Cells were generally grown to 70% confluency before sub-culturing or transfer to 24-well plate or 96-well plate.

Quantification of Bacterial Surface Expressing Nanobody Using Flow Cytometry

Overnight BL21 (DE3) culture carrying pNV_2 or pNV_3 plasmid (5 mL) was centrifuge at 4° C., 2,000 g for 5 minutes. 1 mL non-fat milk blocking buffer (1%) in PBS was added to resuspend the cell pellet. Culture was incubated at room temperature for 1 hour. 1.5 mL of the culture was transferred to an Eppendorf tube and were centrifuged at 4,000 g for 2 minutes. The pellet was washed twice and resuspended in 1 mL of PBS. 2 µL of primary anti-Myc antibody (Abcam, ab9106) was added to the 1 mL cell suspension and incubated at room temperature for 1.5 hours. The suspension was centrifuge at 1,000 g for 5 minutes and washed twice with 1 mL of PBS. The pellet was resuspended in 500 µL of PBS and added with 0.5 µL of secondary Alexa Fluor 488 conjugated antibody (Abcam, ab150077). Culture was incubated at room temperature for 1 hour. Finally, the culture was centrifuged at 1,000 g for 5 minutes, washed twice and resuspended in 1 mL of PBS. Flow cytometry was done using FACS Calibur (BD Biosciences) and analysed using CellQuest. The FL1 filter used to detect Alexa Fluor 488 has an excitation/emission at wavelength 488/530 nm.

Biological Agglutination Test

Overnight culture carrying pNV_2_sfGFP or pNV_3_sfGFP plasmid was diluted in PBS to $OD_{600}$=0.5. 100 µL of the diluted culture was transferred to a clear, round-bottom 96-well plate, supplemented with a series of concentration of human CEACAM5 protein (SinoBiological) ranging from 1 nM to 200 nM (volume added 0.5 µL to 2.5 µL). The plate was incubated statically at room temperature overnight before a top-view image was taken with VersaDoc Imaging system (Bio-rad) under FITC channel.

Generation of BL21 (DE3) ΔminD

Kanamycin resistance gene cassette (Kan$^R$ cassette) was amplified using Q5 High Fidelity DNA Polymerase (NEB) using primers minD-HR-Kan-for and minD-HR-Kan-rev, followed by PCR purification using QIAquick PCR purification kit (QIAgen).

All cloning and plasmid maintenance of pSIJ8 were done at 30° C. due to its temperature sensitivity. Overnight BL21 (DE3) culture transformed with pSIJ8 was sub-cultured 1:100 in 150 mL fresh LB-Carb media and incubated at 30° C., 250 rpm for 3 hours. Arabinose (15 mM) was added to induce the recombination machinery (exo, bet and gam) and incubated for a further 45 minutes at 30° C., 250 rpm. The bacterial culture was then made electrocompetent following methods described previously.[50]

Kan$^R$ cassette was transformed into BL21 pSIJ8 via electroporation: 50 uL of electrocompetent BL21 pSIJ8 was added with ~250 ng Kan$^R$ cassette (<2 µL) and mixed by pipetting up and down. The mixture was transferred into a 0.2 cm electroporation cuvette (Bio-rad) and pulsed at 2.5 kV using Celljet Uno (ThermoFisher Scientific). 1 mL of fresh LB was added immediately into the cuvette and mixed by pipetting up and down. The mixture was transferred to an Eppendorf tube and incubated at 30° C., 250 rpm for 4 hours. The mixture was centrifuged at 4,500 g for 10 minutes and the supernatant was removed until ~100 µL left in the Eppendorf tube. Cell pellet was resuspended in the left-over media and plated on LB-Carb-Kan agar at 30° C., overnight. On the next day, colony PCR was done using primers HR-check-for and HR-check-rev for success recombination. Colony was inoculated in LB-Kan and incubated at 37° C., 250 rpm, overnight to cure the pSIJ8 plasmid and make BL21 ΔminD::Kan$^R$ culture. This culture was subsequently made chemically competent to be transformed with the pNV plasmids.

Purification of Minicells

Overnight BL21 ΔminD culture was diluted 1:100 in 300 mL of LB-Kan-Cm and incubated at 37° C., 250 rpm for 3~4 hours until OD$_{600}$=0.6. Culture was centrifuged at 2,000 g for 10 minutes at 4° C. and the supernatant was retained for further centrifugation at 12,000 g for 15 minutes at 4° C. The pellet was resuspended in 1 mL of fresh LB, pooled together, and incubated at 37° C., 250 rpm for 45 minutes. Then, ceftriaxone (100 µg/mL), penicillin G (100 µg/mL) and cefotaxime (100 µg/mL) were added to the culture and further incubated at 37° C., 250 rpm for 2 hours. The culture was first centrifuged at 500 g for 10 minutes at 4° C. to remove cell debris. The supernatant was retained and further centrifuged at 12,000 g for 15 minutes at 4° C. The final pellet was resuspended in 1 mL of PBS and stored at 4° C. until further use. This purified culture is the minicells.

5 µL of pre-purified and post-purified culture were plated on LB-Cm-Kan agar plate and added into 195 µL of LB-Cm-Kan media in a 96-well plate, incubated overnight at 37° C. to collect OD$_{600}$ readings.

Generation of Genome-Less Sim Cells

To characterise the ICeuI endonuclease expression system, *E. coli* K12 MDS42 was transformed with pJKR-L-TetR-ICeuI (TetR controlled system) and pRH12x (EilR controlled system). Overnight cultures were diluted 1:100 in 200 µL of LB-Kan and transferred into a flat 96-well plate. The plate was sealed with Breath Easy sealing membrane and was incubated in the Synergy 2 microplate reader (BioTek) at 37° C. with constant orbital shaking at 1,000 rpm. OD$_{600}$ measurements were taken every 15 minutes for 18 hours. At the 4th hour, crystal violet (1 µM) and anhydrotetracycline (1 µM) were added into pRH12x and pJKR-L-TetR-ICeuI culture, respectively.

To re-programme SimCells to surface-display nanobody, overnight culture co-transformed with pRH12x and pNVC43_sfGFP/pNVCYT_sfGFP plasmids was diluted 1:100 in LB-Cm-Kan (50 mL) and incubated at 37° C., 250 rpm for 3 hours until OD$_{600}$ of ~0.3. The culture was split into half: 25 mL of 'Uninduced' culture was rested at 4° C. until further use; 25 mL of 'Induced' culture was added with crystal violet (1 µM), cefotaxime (100 µg/mL) and penicillin G (100 µg/mL) to induce ICeuI endonuclease expression and to kill parental cells. 'Induced' culture was incubated at 37° C., 250 rpm for another 2 hours before storing at 4° C. until further use. This 'Induced' culture is the genome-less Sim-Cells.

5 µL of 'Uninduced' and 'Induced' culture were plated on LB-Cm-Kan agar plate and added into 195 µL of LB-Cm-Kan media in a 96-well plate, incubated overnight at 37° C. to collect OD$_{600}$ readings.

In Vitro Cancer Binding

Cancer cells were seeded in 24-well tissue culture plate (~5,000 cells/well) and grown at 37° C. with 5% CO$_2$ to 50% confluency.

For BL21 (DE3) strains, overnight bacteria culture was diluted to OD$_{600}$=0.3 in PBS and centrifuged at 5,000 g for 5 minutes. After removing the supernatant, cell pellet was resuspended in DMEM supplemented with 10% FBS and Hoechst dye (0.5 µM) at the same volume (i.e., 10 mL diluted bacteria culture in PBS resuspended into 10 mL of supplemented DMEM after centrifugation and supernatant removal). For SimCell strains, 'Induced' culture was centrifuged at 5,000 g for 5 minutes and followed by similar steps as the BL21 (DE3) strains. For minicell strains, Hoechst dye (0.5 µM) was added into purified minicells in PBS directly.

Media for cancer cell culture in 24-well plate was removed and washed once with fresh media. 0.5 mL of BL21 (DE3), SimCells or minicells were added into each well for incubation at 37° C. with 5% CO$_2$ for 0, 2, 4 and 8 hours. For time point 0, 0.5 mL DMEM supplemented with FBS and Hoechst dye was added and incubated for 15 minutes prior to the addition of bacteria. At each timepoint, each well was washed thrice and added with 0.5 mL of fresh DMEM supplemented with FBS only before subjecting to fluorescence microscope imaging under 10× magnification with the Eclipse Ti fluorescence microscope (Nikon). Fields were viewed under brightfield or fluorescent illuminance (excitation/emission for sfGFP: 488/510 nm; Hoechst dye: 361/497 nm) at 10× or 20× objective.

In Vitro Cancer Killing

For time-lapse experiment, cancer cells were first seeded in 24-well tissue culture (~5,000 cells/well) and grown at 37° C. with 5% CO$_2$ to 50% confluency. Minicells and SimCells were prepared as described in the previous section, and 0.5 mL was added into each well for incubation at 37° C. with 5% CO$_2$ for 2 hours. After 2 hours incubation, each well was washed thrice and added with 0.5 mL of fresh DMEM supplemented with FBS and Ethidium Homodimer. Cultures were subjected to fluorescence microscope imaging under 10× magnification with the Eclipse Ti fluorescence microscope (Nikon) for 5 hours with an interval of 5 minutes. Fields were viewed under brightfield for T=0 and fluorescent illuminance (excitation/emission for sfGFP: 488/510 nm; Ethidium homodimer: 528/617 nm) for the time-lapse.

REFERENCES

1. Coley, W. B. II. Contribution to the Knowledge of Sarcoma. *Ann. Surg.* 14, 199-220 (1891).
2. McCarthy, E. F. The Toxins of William B. Coley and the Treatment of Bone and Soft-Tissue Sarcomas. *Iowa Orthop. J.* 26, 154-158 (2006).
3. Duong, M. T.-Q., Qin, Y., You, S.-H. & Min, J.-J. Bacteria-cancer interactions: bacteria-based cancer therapy. *Exp. Mol. Med.* 51, 1-15 (2019).
4. Sedighi, M. et al. Therapeutic bacteria to combat cancer; current advances, challenges, and opportunities. *Cancer Med.* 8, 3167-3181 (2019).
5. Ozdemir, T., Fedorec, A. J. H., Danino, T. & Barnes, C. P. Synthetic Biology and Engineered Live Biotherapeutics: Toward Increasing System Complexity. *Cell Syst.* 7, 5-16 (2018).
6. Park, S.-H. et al. RGD Peptide Cell-Surface Display Enhances the Targeting and Therapeutic Efficacy of Attenuated *Salmonella*-mediated Cancer Therapy. *Theranostics* 6, 1672-1682 (2016).
7. Chien, T., Doshi, A. & Danino, T. Advances in bacterial cancer therapies using synthetic biology. *Curr. Opin. Syst. Biol.* 5, 1-8 (2017).
8. Leventhal, D. S. et al. Immunotherapy with engineered bacteria by targeting the STING pathway for anti-tumor immunity. *Nat. Commun.* 11, 2739 (2020).
9. Zhang, Y. et al. *Escherichia coli* Nissle 1917 Targets and Restrains Mouse B16 Melanoma and 4T1 Breast Tumors through Expression of Azurin Protein. *Appl. Environ. Microbiol.* 78, 7603-7610 (2012).
10. Zheng, J. H. et al. Two-step enhanced cancer immunotherapy with engineered *Salmonella typhimurium* secreting heterologous flagellin. *Sci. Transl. Med.* 9, (2017).
11. Thamm, D. H. Systemic Administration of an Attenuated, Tumor-Targeting *Salmonella typhimurium* to Dogs with Spontaneous Neoplasia: Phase I Evaluation. *Clin. Cancer Res.* 11, 4827-4834 (2005).
12. Toso, J. F. et al. Phase I Study of the Intravenous Administration of Attenuated *Salmonella typhimurium* to Patients With Metastatic Melanoma. *J. Clin. Oncol. Off. J. Am. Soc. Clin. Oncol.* 20, 142-152 (2002).
13. Gujrati, V. et al. Bioengineered Bacterial Outer Membrane Vesicles as Cell-Specific Drug-Delivery Vehicles for Cancer Therapy. *ACS Nano* 8, 1525-1537 (2014).
14. Ho, C. L. et al. Engineered commensal microbes for diet-mediated colorectal-cancer chemoprevention. *Nat. Biomed. Eng.* 2, 27-37 (2018).
15. Sleight, S. C. & Sauro, H. M. Visualization of Evolutionary Stability Dynamics and Competitive Fitness of *Escherichia coli* Engineered with Randomized Multigene Circuits. *ACS Synth. Biol.* 2, 519-528 (2013).
16. Piñero-Lambea, C. et al. Programming Controlled Adhesion of *E. coli* to Target Surfaces, Cells, and Tumors with Synthetic Adhesins. *ACS Synth. Biol.* 4, 463-473 (2015).
17. Muyldermans, S. A guide to: generation and design of nanobodies. *FEBS J.* 288, 2084-2102 (2021).
18. Tong, G. et al. The role of tissue and serum carcinoembryonic antigen in stages I to III of colorectal cancer—A retrospective cohort study. *Cancer Med.* 7, 5327-5338 (2018).
19. Rama, A. R. et al. Specific Colon Cancer Cell Cytotoxicity Induced by Bacteriophage E Gene Expression under Transcriptional Control of Carcinoembryonic Antigen Promoter. *Int. J. Mol. Sci.* 16, 12601-12615 (2015).
20. Rampley, C. P. N. et al. Development of SimCells as a novel chassis for functional biosensors. *Sci. Rep.* 7, 7261 (2017).
21. Fan, C. et al. Chromosome-free bacterial cells are safe and programmable platforms for synthetic biology. *Proc. Natl. Acad. Sci.* 117, 6752-6761 (2020).
22. Lång, H. Outer membrane proteins as surface display systems. *Int. J. Med. Microbiol.* 290, 579-585 (2000).
23. van Bloois, E., Winter, R. T., Kolmar, H. & Fraaije, M. W. Decorating microbes: surface display of proteins on *Escherichia coli*. *Trends Biotechnol.* 29, 79-86 (2011).
24. Detzel, C., Maas, R., Tubeleviciute, A. & Jose, J. Autodisplay of nitrilase from *Klebsiella pneumoniae* and whole-cell degradation of oxynil herbicides and related compounds. *Appl. Microbiol. Biotechnol.* 97, 4887-4896 (2013).
25. Li, L. et al. A selective and sensitive d-xylose electrochemical biosensor based on xylose dehydrogenase displayed on the surface of bacteria and multi-walled carbon nanotubes modified electrode. *Biosens. Bioelectron.* 33, 100-105 (2012).
26. Salema, V. et al. Selection of Single Domain Antibodies from Immune Libraries Displayed on the Surface of *E. coli* Cells with Two β-Domains of Opposite Topologies. *PLOS ONE* 8, e75126 (2013).
27. Kylilis, N. et al. Whole-Cell Biosensor with Tunable Limit of Detection Enables Low-Cost Agglutination Assays for Medical Diagnostic Applications. *ACS Sens.* 4, 370-378 (2019).
28. Riangrungroj, P., Bever, C. S., Hammock, B. D. & Polizzi, K. M. A label-free optical whole-cell *Escherichia coli* biosensor for the detection of pyrethroid insecticide exposure. *Sci. Rep.* 9, 12466 (2019).
29. Kaliberov, S. A. et al. Adenoviral targeting using genetically incorporated camelid single variable domains. *Lab Invest* 94, 893-905 (2014).
30. Behar, G. et al. Llama single-domain antibodies directed against nonconventional epitopes of tumor-associated carcinoembryonic antigen absent from nonspecific cross-reacting antigen. *FEBS J.* 276, 3881-3893 (2009).
31. Hanke, L. et al. An alpaca nanobody neutralizes SARS-CoV-2 by blocking receptor interaction. *Nat. Commun.* 11, 4420 (2020).
32. de Boer, P. A. J., Crossley, R. E. & Rothfield, L. I. A division inhibitor and a topological specificity factor coded for by the minicell locus determine proper placement of the division septum in *E. coli*. *Cell* 56, 641-649 (1989).
33. Ebersbach, G., Galli, E., Møller-Jensen, J., Löwe, J. & Gerdes, K. Novel coiled-coil cell division factor ZapB stimulates Z ring assembly and cell division. *Mol. Microbiol.* 68, 720-735 (2008).
34. Jensen, S. I., Lennen, R. M., Herrgård, M. J. & Nielsen, A. T. Seven gene deletions in seven days: Fast generation of *Escherichia coli* strains tolerant to acetate and osmotic stress. *Sci. Rep.* 5, 17874 (2015).
35. Rawls, S. M. Antibiotics, β-Lactam. in *Encyclopedia of the Neurological Sciences (Second Edition)* (eds. Aminoff, M. J. & Daroff, R. B.) 207-209 (Academic Press, 2014). doi: 10.1016/B978-O-12-385157-4.00250-5.
36. LeFrock, J. L., Prince, R. A. & Leff, R. D. Mechanism of action, antimicrobial activity, pharmacology, adverse effects, and clinical efficacy of cefotaxime. *Pharmacotherapy* 2, 174-184 (1982).
37. Yocum, R. R., Rasmussen, J. R. & Strominger, J. L. The mechanism of action of penicillin. Penicillin acylates the active site of *Bacillus stearothermophilus* D-alanine carboxypeptidase. *J. Biol. Chem.* 255, 3977-3986 (1980).
38. Liu, S. L., Hessel, A. & Sanderson, K. E. Genomic mapping with I-Ceu I, an intron-encoded endonuclease specific for genes for ribosomal RNA, in *Salmonella* spp., *Escherichia coli*, and other bacteria. *Proc. Natl. Acad. Sci.* 90, 6874-6878 (1993).
39. Ruegg, T. L. et al. Jungle Express is a versatile repressor system for tight transcriptional control. *Nat. Commun.* 9, 3617 (2018).
40. Zhou, S., Gravekamp, C., Bermudes, D. & Liu, K. Tumour-targeting bacteria engineered to fight cancer. *Nat. Rev. Cancer* 18, 727-743 (2018).
41. Tan, E. et al. Diagnostic precision of carcinoembryonic antigen in the detection of recurrence of colorectal cancer. *Surg. Oncol.* 18, 15-24 (2009).
42. Tanha, J., Dubuc, G., Hirama, T., Narang, S. A. & Mackenzie, C. R. Selection by phage display of llama conventional VH fragments with heavy chain antibody VHH properties. *J. Immunol. Methods* 263, 97-109 (2002).
43. van der Linden, R. et al. Induction of immune responses and molecular cloning of the heavy chain antibody repertoire of *Lama glama*. *J. Immunol. Methods* 240, 185-195 (2000).
44. Sieow, B. F.-L., Wun, K. S., Yong, W. P., Hwang, I. Y. & Chang, M. W. Tweak to Treat: Reprograming Bacteria for Cancer Treatment. *Trends Cancer* 7, 447-464 (2021).
45. Din, M. O. et al. Synchronized cycles of bacterial lysis for in vivo delivery. *Nature* 536, 81-85 (2016).
46. Chan, C. T. Y., Lee, J. W., Cameron, D. E., Bashor, C. J. & Collins, J. J. 'Deadman' and 'Passcode' microbial kill switches for bacterial containment. *Nat. Chem. Biol.* 12, 82-86 (2016).
47. Aggarwal, N., Breedon, A. M. E., Davis, C. M., Hwang, I. Y. & Chang, M. W. Engineering probiotics for therapeutic applications: recent examples and translational outlook. *Curr. Opin. Biotechnol.* 65, 171-179 (2020).
48. Chang, A., Chau, V., Landas, J. & Pang, Y. Preparation of Calcium Competent *Escherichia coli* and Heat-Shock Transformation. *JEMI Methods* 1, 22-25 (2017).
49. Untergasser, A. Transformation of Chemical Competent Cells. *Untergasser's Lab* http://www.untergasser.de/lab/protocols/competent_cells_chemical_trafo_v1_0.htm.
50. Untergasser, A. Preparation of Electro-Competent Cells. *Untergasser's Lab* http://www.untergasser.de/lab/protocols/competent_cells_electro_v1_0.htm.

EXAMPLE 3 ENGINEERING GENOME-FREE BACTERIAL CELLS FOR EFFECTIVE SARS-COV-2 NEUTRALISATION

Summary

The ongoing COVID-19 pandemic poses an unprecedented impact on everyone's social life, healthcare services and the economy. With the vaccines in place, the world is in dire need of effective interventions for the ongoing COVID-19 pandemic. Here, we re-programmed a genome-free chassis, SimCell, to display nanobodies that neutralise against the spike protein receptor-binding domain (RBD) of SARS-CoV-2, a key a short immunogenic fragment that the virus uses to enter the host cell. We demonstrated >90% blocking efficiency towards Wuhan variant and South African SARS-CoV-2 RBDs using in vitro neutralisation assays, highlighting the potential of SimCell as a promising preventative and treatment for SARS-CoV-2 infections.

Introduction

August 2021, it has been more than one year since the whole world entered pandemic mode; everyone's life was changed profoundly by a novel coronavirus, SARS-CoV-2 (severe acute respiratory syndrome coronavirus 2). With the global effort, we witnessed the fastest vaccine development and rolled out in history. However, the promise of achieving herd immunity was challenged by the variants manifest and their fast spread worldwide. The surging need for vaccine doses and inequity of vaccine distribution between developed and developing countries proved vaccination alone might not be enough to end the pandemic, and the world urgently needs effective prophylactic and treatments to fight against SARS-CoV-2 infection.

Nanobodies (Nbs) are heavy-chain-only antibodies variable domains (VHH) obtained from camelids (1). Therefore, they appear to be more stable and less immunogenic (2) than the full-length antibody sequences, more suitable for human administration. With only 15 kDa in size, nanobodies can recognise and bind to epitopes inaccessible to traditional antibodies (3), and they are easy to engineer into multivalent nanobodies, which can target multiple epitopes to prevent the mutational escape of variants (4). Hence, they are a potential alternative to the monoclonal antibody for treating SARS-CoV-2 symptoms. To neutralise SARS-CoV-2 fusing to the host cell, we chose the RBD region of spike protein, a critical region that allows the virus to gain entry to the host cell, as our target of interest. Studies (3, 6) identified three classes of SARS-CoV-2 neutralising nanobodies: Class 1 nanobodies physically blocks the binding between spike protein and hACE-2 receptors with competitive binding. Class 2 nanobodies recognise a highly conserved epitope on RBD, which are often inaccessible by conventional antibodies. Class 3 nanobodies stabilise spike protein in the post-fusion conformation, preventing binding to the hACE2. In this study, we adopted the modular nanobody display platform (5) to express RBD neutralising nanobodies on the surface of the SimCell chassis. We selected four nanobody candidates: TY1 (7), NIH-CoV2nb-112 (8), mNb6 (9) and bispecific nanobody VE (4). TY1 is a monomeric nanobody isolated from immunised Alpaca, which showed high affinity towards the SARS-CoV-2 RBD (7). TY1 competitively bind to SARS-CoV-2, physically hindering the interaction between the virus and the human receptor. NIH-CoVnb-112 (8) from the phage display library exhibited competitive binding to RBD and showed high neutralisation efficiency against lentivirus pseudovirus. mNB6 is a monomeric nanobody isolated from the yeast display library, which showed high sensitivity and efficient neutralisation at a low nanomolar range (9). Both mNb6 and TY1 can stabilise spikes in the post-fusion form, preventing the interaction between spike protein and hACE2 from stopping cell fusion. Lastly, bispecific nanobody VE consists of nanobody V and nanobody E joint by a neutral protein linker (4). V and E each bind to a distinct epitope on RBD, one diverse and one conserved. VE showed promising results for neutralising SARS-CoV-2 variants and simultaneously targeting two epitopes, effectively preventing the emergence of mutational escape. We aimed to combine the therapeutic advantages of nanobodies and biological advantages of SimCell (10), developing a highly effective, stable, low cost and safe "smart particle" as a potential preventative and treatment to combat SARS-CoV-2 infections.

Results

Confirmation of Nanobody Surface Display and Binding to SARS-CoV-2 RBD

The specific binding of bacteria to the chosen target requires surface representation of nanobodies. In this study, we have adopted the pNV surface display system driven by a medium strength promoter J23105 to express SARS-CoV-2 RBD binding nanobodies, TY1, NIH-112, NB6, and a multivalent nanobody VE (FIG. 39A). We constructed all plasmids using NEB HiFi assembly, and we used immunofluorescence followed by flow cytometry to confirm the surface display of nanobodies on Escherichia coli BL21 (DE3). For immunofluorescence tagging, we used a primary anti-My-c tag antibody to bind Myc tag on the nanobody, and then secondary Alexa Fluor 488 conjugated antibody was used to give a fluorescence output. We ran the immunofluorescence samples through a FACs machine to detect the fluorescence signal (FIG. 39B). The FACs showed stronger fluorescence signals in the nanobody expressing Escherichia coli BL21 (DE3) strains: pNV_TY1, pNV_NB6, pNV_NIH112 and pNV_VE compared to the Escherichia coli BL21 (DE3) WT. Therefore, we concluded that the nanobodies were successfully displayed on the surface of Escherichia coli BL21 (DE3).

Next, we conducted a cell agglutination test to verify the binding to SARS-CoV-2 RBD. The cell agglutination test resembles a biological equivalence of a well-known in vitro detection method called the latex agglutination test. In the presence of the desired antigen, the nanobody will bind to the antigen, forming cross-links between bacterial cells and the antigen, which leads to cell agglutination. The bacterium-protein—bacterium sandwich can be visualised as a cloudy suspension, while the absence of the desired antigen leads to a cell pellet formation at the bottom of the well. A GFP reporter gene was cloned into all pNV_constructs at this stage for better visualisation (shown as pNV_sfGFP). We selected the RBD antigen concentration range between 0.83-42 nM. For negative control, we used the C17 nanobody (12), which exhibited specific binding towards carcinoembryonic antigen (CEA). We mixed the antigen with an equal concentration of cell cultures in a round bottom well plate and incubated the plate overnight at room temperature. We observed agglutination in pNVNB6_sfGFP across all concentrations, pNVNIH112_sfGFP exhibited binding only at the highest concentration 42 nM of RBD, whilst pNVTY1_sfGFP and the negative control pNVC17_sfGFP showed no agglutination at all (FIG. 40A). Therefore, we demonstrated the selective RBD binding function of NB6 and NIH112, while NB6 could detect antigens at the low molar range. Therefore, we concluded that pNVNB6_sfGFP had the highest sensitivity targeting against SARS-CoV-2 RBD, which confirmed the findings in the original paper. We confirmed the surface expression of a 30 kDa bispecific nanobody on the surface, VE, consisting of nanobody V and nanobody E joint by a neutral protein linker. In the cell agglutination assay, pNV_VE sfGFP could detect RBD antigen up to 4.2 nM (FIG. 40A). To further investigate the binding of the pNVNB6_sfGFP towards SARS-CoV-2 RBD, we performed whole cell ELISA by fixing the S1 RBD antigen onto microplates and incubated pNVNB6_sfGFP in the RBD coated plate. Fluorescence microscopic image was taken using BioTek Cytation5 imaging reader. The fluorescence microscope image showed only pNVNB6_sfGFP expressing cells could adhere onto the SARS-CoV-2 RBD coated plate, whilst the negative control pNVC17_sfGFP cells were washed away, further demonstrated the specific binding of pNVNB6_sfGFP towards desired target (FIG. 40B).

SimCell SARS-COV-2 Viral Neutralisation Assay

Based on two neutralisation hypotheses, we tested the neutralisation efficiencies of NB6, which showed high sensitivity toward RBD at low concentrations, and VE, which could bind to two distinct epitopes on RBD and suppress viral mutational escape. We employed an in vitro neutralisation assay, which uses hACE2-RBD protein-protein interaction to mimic the virus-receptor interaction. We used this assay (13) to examine the neutralisation efficiency of pNV_NB6 sfGFP and pNV_VE sfGFP SimCells against 1) Wuhan Sars-Cov-2 variant RBD and 2) South African Sars-Cov-2 variant RBD (purchased from GenScript) binding toward hACE-2 (Thermo Fisher) (FIGS. 41A-41B). For negative control, we used pNV_C17, which is anti-CEA and unspecific for Sars-Cov-2 RBD. All wells were washed with 1×PBST 5 times to remove the unbound HRP-RBD completely. (FIG. 42A) showed the percentage neutralisation in the presence of NB6 expressing whole cells and SimCells. NB6 whole cell exhibited on average 99% neutralisation efficiency while NB6 SimCell exhibited >90% of neutralisation efficiency across all RBD concentrations for Wuhan variant RBD. This result demonstrated the highly effective neutralisation of RBD from binding to the hACE-2 by both NB6 expressing whole-cell and SimCells. pNV_VE sfGFP was less effective in blocking Wuhan RBD (FIG. 42A) than NB6. However, pNV_VE sfGFP effectively blocked South African variant RBD, while NB6 exhibited low neutralisation effect (FIG. 42B). This data confirmed that monomeric NB6 binds specifically to a diverse epitope on the RBD whilst VE binds two different epitopes, one of which is conserved between the Wuhan variant and South African variant.

Next, we deployed the pseudovirus neutralisation assay and micro-fusion assay developed by Thakur, N et al., (14) (FIG. 44) further to investigate the neutralisation effect of the RBD specific SimCells. Pseudovirus particles are replication-deficient viral vectors with the expression of recombinant viral glycoprotein on their surfaces. We used an HIV-based system to investigate the interaction between Wuhan, Beta and Delta Sars-Cov-2 spike variants with the hACE-2 receptor in the presence of SimCells. With the mVNT assay (FIG. 44), the highest concentration of Sim-Cell-109, which appeared to be toxic to the cells. However, we observed significant neutralisation with 5×108 NB6 SimCells and VE SimCells with Beta and Delta glycoprotein expressing pseudovirus particles. Most importantly, we saw no neutralisation effect with the unspecific control, Nipah glycoprotein representing pseudovirus particles, indicating the difference in luminescence was due to specific blocking of Sars-CoV-2 spike from entering the hACE-2 expressing cell. However, we observed induction of cell entry with mVNT as the percentage untreated went above 100%. Therefore, we used the mFIT assay to evaluate this observation. In the mFIT assay, effector cells (HEK293T) express the viral glycoprotein of interest and half of the signalling proteins, while the target cells express the hACE-2 protein on the surface and the other half of the signalling proteins. The prevention of the reconstitution of the reporter proteins in the fused cells indicates fusion inhibitory activities (FIG. 43B). In contrast, in (FIG. 43B) the absence of neutralisation, vGP-mediated cell-cell fusion results in the reconstitution of the split reporter and increased GFP and luciferase signals. In the presence of SimCells displaying spike specific nanobodies, we observed significant neutralisation with Wuhan, Beta and Delta glycoprotein in the mFIT assay compared with the SimCell no nanobody control (FIG. 45). Moreover, no induction of cell entry was observed with mFIT. Therefore, the promotion of cell entry could be an assay-specific phenomenon. FIGS. 46A-46C gave provided visual images of the mFIT assay, and SimCells appear to be only aggregating specifically around the Spike-expressing effector cells, indicating spike-specific nanobodies expressing SimCells were binding to the glycoprotein expressing cells for neutralisation.

Discussion

With the ongoing COVID-19 pandemic caused by SARS-CoV-2 and the emergence of more transmissible variants, the vaccine alone is not enough to end the pandemic. We desperately need cheap and effective prevention and treatment to keep coronavirus infections at bay. Neutralising nanobodies demonstrated promising preclinical results and are versatile tools for protecting against variants when the variants compromise the effect of the vaccine.

In this study, we adopted a modular nanobody display system in E. coli. To demonstrate the modularity of this system, we successfully displayed four different SARS-CoV-2 nanobodies, TY1, NIH-CoVnb-112, Nb6 and bispecific nanobodies VE by only replacing the nanobody coding sequences using simple cloning method. We employed a simple cell agglutination assay to confirm the binding of the engineered bacteria and the desire antigen, SARS-CoV-2 RBD. pNV_Nb6 sfGFP was highly sensitive and could detect antigen at low nanomolar concentration, 0.83 nM, while multivalent nanobody VE showed binding up to 4.2 nM of RBD.

We designed an in vitro protein-protein neutralisation assay using hACE2 and HRP conjugated RBDs to mimic the virus and human receptor interactions. Nanobody displaying SimCell showed highly effective neutralisation against HRP-RBD, pNV_NB6 SimCell could neutralise >90% of the binding between SARS-CoV-2 RBD and hACE-2 while the bispecific nanobody VE showed effective neutralisation >95% against the South African variant RBD. The protein-protein neutralisation assay together with the pseudo virus neutralisation assays provided solid evidence that nanobodies displaying SimCell can effectively neutralise viral particles. We envisioned SimCell as a potential prophylactic for fighting against SARS-CoV-2 infection.

Materials and Methods

Cell Agglutination Assay.

Overnight culture of pNV_sfGFP nanobody displaying strain was centrifuged at ×2000 g at 4 C for 5 mins and washed with 1×PBS for 3 times, followed by dilution with 1×PBS to OD600=0.5. 100 µL of the diluted culture was added into a U-shape round bottom 96-well plate with a series of concentration of SARS-CoV-2 RBD (Thermo Fisher). After overnight static incubation at room temperature, a top-view image was taken with VersaDoc Imaging system (Bio-rad) under FITC channel.

Cell Adhesion Assay.

ELISA plates (Nunc, MaxiSorp) were coated with 100 µL/well of RBD antigen diluted in PBS (pH 7.4) at the desired concentration and incubated overnight at 4° C. Plates were washed three times with washing buffer (0.05% Tween-20 in PBS). 5 ml overnight pNV_sfGFP cultures spun (×2000 g 4 C for 5 mins) and washed with 1×PBS 3 times. The cell pellet was resuspended in 600 µl of 1% skimmed milk PBST and incubate at room temperature for 1 hr. Spin and wash the blocked cultures with 1×PBS, followed by dilution with 1×PBS to OD600~1. Add 100 µl of diluted cultures into individual wells, then incubate at RT for 1 hr. Cell cultures were removed and washed with PBST four times before taking the fluorescence image using a BioTek imager.

Neutralisation Assay.

A MaxiSORP ELISA plate (Nunc) was pre-coated with 100 ng of human ACE-2 (hACE-2) resuspended in 50 µL of 100 mM carbonate-bicarbonate coating buffer (pH 9.6), followed by incubation at 4° C. overnight. The coated plate was washed with 1×PBST four times and block with blocking buffer (SuperBlock™ Thermo Fisher). After the blocking buffer was completely dried off, the coated plate could be used immediately or stored at 4° C. for later use.

HRP-conjugated SARS-CoV-2 (GenScript) was quantified using a protein quantification kit (Thermo Fisher QuanT-iT protein quantification assay). For the no binding assay, HRP-conjugated SARS-CoV-2 Wuhan variant and South African RBD (all produced by GenScript) was added to the hACE-2-coated plate at dilution series ranging from 4.3 nM-32.4 nM in 50 µL of PBS buffer for 1 h at room temperature. Wash away the unbound HRP-conjugated RBD with phosphate-buffered saline, 0.05% Tween-20 (PBST) five times. To take a colorimetric measurement, add 100 µL of a chromogenic substrate, 3,3',5,5'-tetramethylbenzidine (TMB) 30

(Invitrogen) and incubate for 15 mins allowing enzymatic reaction with HRP to take place. Then, stop the reaction with an equal volume of TMB stop solution, and the absorbance readings at 450 nm were acquired using a Tecan Spark plate reader.

For the nanobody expressing whole cell/SimCell neutralisation assay, the same dilution series of SARS-CoV-2 HRP-RBD was pre-incubated with 50 µL of PBS diluted bacteria whole cells/SimCells OD=2 for 1 h at 37° C. The incubated mixture was into a MaxiSORP ELISA plate coated with hACE-2 (100 ng per well, as described above) for 1 h at room temperature. Five PBST washes were performed to remove the unbound antigens.

mVNT Assay

Prior to the mVNT assay, HEK293T cells were transfected with hACE2 plasmid. HEK293T expressing hACE2 receptor acts as the target cell in the mVNT assay.

Dilute the SimCell samples and add 100 µl of the diluted SimCell samples in triplicates to the top row of a flat white-bottomed 96-well plate and titrate 2-fold down the plate. The last row will be used as the untreated control. 50 µl of pseudovirus particle was added per well, including the untreated controls. Incubate for 1 h at 37° C., 5% CO2. Harvest the transfected HEK293T cells, transfer it to a 50 ml Falcon and dilute cells to 2× 105/ml with DMEM-10%. Seed 100 µl of diluted cells (~2× 104 per well) onto each well containing SimCell samples+pseudoparticles and the untreated controls. Incubate for 48 h at 37° C., 5% CO2. Remove the media from the wells before adding 50 µl of Bright-Glo™ diluted 1:1 with serum free, phenol red free DMEM. Incubate the plate in the dark for 5 min then read on a GloMax Multi+ Detection System.

mFIT Assay

SimCell samples were diluted to optimized and plated at 25 µl/well in a white-bottomed, sterile 96-well plate (Corning), including no SimCell controls. The SimCell samples were incubated with 2×10⁴ effector cells in 50 µl at 37° C., 5% CO2 for 1 h, followed by adding target cells to corresponding wells and incubated for 18-24 h before luminescence readings were taken.

IncuCyte

IncuCyte S3 live cell imaging system (Essen BioScience) was used to visualise SimCell neutralisation in mFIT assay, cells were plated in clear flat bottomed 96-well plates (Nunc) and imaged every hour for 24 hrs. Five fields of view were taken per well at 10× magnification, and images were analysed using IncuCyte S3 software (Essen BioScience).

REFERENCE

1. Chen M, Rosenberg J, Cai X, Lee A C H, Shi J, Nguyen M, et al. Nanotraps for the containment and clearance of SARS-CoV-2. Matter. 2021; 4 (6): 2059-82.
2. Hamers-Casterman C, Atarhouch T, Muyldermans Sa, Robinson G, Hammers C, Songa E B, et al. Naturally occurring antibodies devoid of light chains. Nature. 1993; 363 (6428): 446-8.
3. Nambulli S, Xiang Y, Tilston-Lunel N L, Rennick L J, Sang Z, Klimstra W B, et al. Inhalable Nanobody (PiN-21) prevents and treats SARS-CoV-2 infections in Syrian hamsters at ultra-low doses. Science Advances. 2021; 7 (22): eabh0319.
4. Koenig P-A, Das H, Liu H, Kümmerer BM, Gohr F N, Jenster L-M, et al. Structure-guided multivalent nanobodies block SARS-CoV-2 infection and suppress mutational escape. Science. 2021; 371 (6530).
5. Salema V, Fernández LÁ. *Escherichia coli* surface display for the selection of nanobodies. Microbial biotechnology. 2017; 10 (6): 1468-84.
6. Xu J, Xu K, Jung S, Conte A, Lieberman J, Muecksch F, et al. Nanobodies from camelid mice and llamas neutralize SARS-CoV-2 variants. Nature. 2021; 595 (7866): 278-82.
7. Hanke L, Perez L V, Sheward D J, Das H, Schulte T, Moliner-Morro A, et al. An alpaca nanobody neutralizes SARS-CoV-2 by blocking receptor interaction. Nature communications. 2020; 11 (1): 1-9.
8. Esparza T J, Martin N P, Anderson G P, Goldman E R, Brody D L. High affinity nanobodies block SARS-CoV-2 spike receptor binding domain interaction with human angiotensin converting enzyme. Scientific reports. 2020; 10 (1): 1-13.
9. Schoof M, Faust B, Saunders R A, Sangwan S, Rezelj V, Hoppe N, et al. An ultrapotent synthetic nanobody neutralizes SARS-CoV-2 by stabilizing inactive Spike. Science. 2020; 370 (6523): 1473-9.
10. Fan C, Davison P A, Habgood R, Zeng H, Decker C M, Salazar M G, et al. Chromosome-free bacterial cells are safe and programmable platforms for synthetic biology. Proceedings of the National Academy of Sciences. 2020; 117 (12): 6752-61.
11. Güttler T, Aksu M, Dickmanns A, Stegmann K M, Gregor K, Rees R, et al. Neutralization of SARS-CoV-2 by highly potent, hyperthermostable, and mutation-tolerant nanobodies. The EMBO Journal. 2021: e107985.'
12. Kaliberov S A, Kaliberova L N, Buggio M, Tremblay J M, Shoemaker C B, Curiel D T. Adenoviral targeting using genetically incorporated camelid single variable domains. Laboratory investigation. 2014; 94 (8): 893-905.
13. Tan C W, Chia W N, Qin X, Liu P, Chen M I-C, Tiu C, et al. A SARS-CoV-2 surrogate virus neutralization test based on antibody-mediated blockage of ACE2-spike protein-protein interaction. Nature biotechnology. 2020; 38 (9): 1073-8.
14. Thakur N, Conceicao C, Isaacs A, Human S, Modhiran N, McLean R K, Pedrera M, Tan T K, Rijal P, Townsend A, Taylor G. Micro-fusion inhibition tests: quantifying antibody neutralization of virus-mediated cell-cell fusion. The Journal of general virology. 2021; 102 (1).

The invention claimed is:

1. A method of producing a chromosome-free bacterial cell having surface-displayed nanobodies, comprising:
    i) culturing a bacterial cell that is transformed with recombinant nucleic acid for expression of a fusion protein comprising or consisting of a nanobody and an outer-membrane anchor polypeptide;
    ii) degrading native chromosomal DNA in the bacterial cell to provide a chromosome-free bacterial cell by expressing an endonuclease in the bacterial cell that is capable of recognition and double-stranded cutting of the native chromosomal DNA, wherein the expression of the endonuclease is under control of an inducible or repressible promoter; and
    iii) transforming the chromosome-free bacterial cell with recombinant nucleic acid encoding enzymes of one or more biochemical energy pathways, or parts thereof, which provide the chromosome-free bacterial cell with energy.

2. The method according to claim 1, wherein the endonuclease for degrading the chromosomal DNA comprises a homing endonuclease.

3. The method according to claim 1, wherein the endonuclease for degrading the chromosomal DNA is I-CeuI, or a homologue thereof.

4. The method according to claim 1, wherein the promoter for the endonuclease is under the control of TetR or EilR.

5. The method according to claim 1, wherein expressing the endonuclease in the bacterial cell comprises exposing the bacterial cell to an inducer molecule arranged to induce or de-repress the promoter of the endonuclease.

6. The method according to claim 1, wherein expressing an endonuclease in the bacterial cell comprises the steps of:
    i) providing a donor nucleic acid encoding the endonuclease gene, wherein the endonuclease gene is promoterless; or wherein the endonuclease gene is operably linked to a promoter, and the donor nucleic acid is further arranged to form a hairpin loop to prevent expression of the endonuclease;
    ii) using the donor nucleic acid as a template to form a PCR product encoding the endonuclease, and inserting the PCR product into a nucleic acid for transformation of the bacterial cell, wherein the endonuclease gene is inserted into a position such that it is under control of the inducible or repressible promoter; or or recombining the endonuclease gene encoded on the donor nucleic acid with a nucleic acid for transformation of the bacterial cell, wherein the endonuclease gene is recombined into a position such that it is under control of the inducible or repressible promoter.

7. The method according to claim 1, wherein the biochemical energy pathway is capable of the production of ATP and NAD(H).

8. The method according to claim 1, wherein the biochemical energy pathway is the glycolysis pathway, or part thereof.

9. The method according to claim 1, wherein the bacterial cell is transformed with nucleic acid encoding one or more, or all, enzymes of the glycolysis pathway.

10. The method according to claim 1, wherein the bacterial cell is transformed with nucleic acid encoding glyceraldehyde-3-phosphate dehydrogenase and/or phosphoglycerate kinase.

11. The method according to claim 1, wherein the expression of the biochemical energy pathway(s) is regulated under the control of an inducible or repressible promoter.

12. The method according to claim 1, wherein the bacterial cell or the resulting chromosome-free bacterial cell, is transformed with nucleic acid encoding a product for expression.

13. The method according to claim 12, wherein the product comprises any one or more of a peptide, a protein, or a nucleic acid.

14. The method according to claim 12, wherein the product for expression is selected from the group consisting of a biological drug, a vaccine, and an enzyme catalyst.

15. The method according to claim 1, wherein the method further comprises inducing the death of any bacterial cells in which the chromosomal DNA remains intact after step ii and/or any actively dividing bacterial cells.

16. The method according to claim 1, wherein the bacterial cell is selected from the bacterial species of *Escherichia* spp., *Pseudomonas* spp., and *Ralstonia* spp.

17. A chromosome-free bacterial cell produced by the method of claim 1.

18. A chromosome-free bacterial cell, comprising:
i) recombinant nucleic acid encoding an endonuclease, wherein the expression of the endonuclease is under control of an inducible or repressible promoter; and
ii) nucleic acid encoding enzymes of one or more biochemical energy pathways, or parts thereof, which provide the chromosome-free bacterial cell with energy;
optionally wherein the chromosome-free bacterial cell further comprises nucleic acid encoding a product for expression.

19. A composition comprising a population of chromosome-free bacterial cells according to claim 17.

20. A chromosome-free bacterial cell according to claim 17, or a composition comprising a population of said chromosome-free bacterial cells, for use as a medicament or vaccine.

21. A chromosome-free bacterial cell according to claim 17, or a composition comprising a population of said chromosome-free bacterial cells, for use in treating or preventing a disease or condition in a subject.

22. A method of treatment of disease or condition, the method comprising the administration of the chromosome-free bacterial cell according to claim 17, or a composition comprising a population of said chromosome-free bacterial cells to a subject in need thereof.

23. The chromosome-free bacterial cell or composition for the use according to claim 20, wherein the disease to be treated or prevented comprises viral infection, diabetes or cancer.

24. A method comprising using a chromosome-free bacterial cell according to claim 17, or a composition comprising a population of said chromosome-free bacterial cells, as a biosensor and/or biocatalyst, or to produce a biochemical product.

25. A method of producing a product and/or a biochemical, the method comprising use of the chromosome-free bacterial cell according to claim 17, or a composition comprising a population of said chromosome-free bacterial cells, to express a product for expression, or further produce a biochemical by using the product for expression as a biocatalyst.

* * * * *